(12) United States Patent
Thurman et al.

(10) Patent No.: US 10,751,579 B2
(45) Date of Patent: Aug. 25, 2020

(54) FOOTBALL SENSING

(71) Applicant: WILSON SPORTING GOODS CO., Chicago, IL (US)

(72) Inventors: Robert T. Thurman, Plainfield, IL (US); Kevin L. Krysiak, Palatine, IL (US); Daniel E. Hare, Park Ridge, IL (US); Frank Garrett, Jr., Barrington, IL (US); David Betzold, Evanston, IL (US); David J. Proeber, Milwaukee, WI (US)

(73) Assignee: Wilson Sporting Goods Co., Chicago, IL (US)

( * ) Notice: Subject to any disclaimer, the term of this patent is extended or adjusted under 35 U.S.C. 154(b) by 282 days.

(21) Appl. No.: 15/886,919

(22) Filed: Feb. 2, 2018

(65) Prior Publication Data

US 2018/0200582 A1   Jul. 19, 2018

Related U.S. Application Data

(63) Continuation-in-part of application No. 15/583,466, filed on May 1, 2017, now Pat. No. 10,398,945,
(Continued)

(51) Int. Cl.
*A63F 13/00* (2014.01)
*A63B 43/00* (2006.01)
(Continued)

(52) U.S. Cl.
CPC ............ *A63B 43/004* (2013.01); *A63B 41/02* (2013.01); *A63B 41/08* (2013.01); *A63B 43/002* (2013.01);
(Continued)

(58) Field of Classification Search
CPC ............ A63B 2220/40; A63B 2220/44; A63B 2220/007; A63B 2220/0062; A63B 2220/002
See application file for complete search history.

(56) References Cited

U.S. PATENT DOCUMENTS

| 495,863 A | 4/1893 | Whitzel |
| 996,458 A | 6/1911 | Coleman |

(Continued)

FOREIGN PATENT DOCUMENTS

| EP | 1866039 B1 | 7/2006 |
| EP | 1909925 B1 | 7/2006 |

(Continued)

*Primary Examiner* — David L Lewis
*Assistant Examiner* — Eric M Thomas
(74) *Attorney, Agent, or Firm* — Terence P. O'Brien; Todd A. Rathe

(57) ABSTRACT

An automated objective American-football evaluation system may include an American-style football, at least one sensor carried by the football, the at least one sensor comprising at least one accelerometer carried by the football and electronics. The electronics are to: (a) receive a string of sensor signals from the at least one sensor; (b) determine a characteristic of a throw of the football based upon the received string of sensor signals; (c) determine an identity of a football player associated with the throw of the football; (d) assign the determined characteristic of the throw of the football to the determined identity of the football player; and (e) output the determined characteristic of the throw, the determined identity of the football player and the assignment of the determined characteristic of the throw of the football to the determined identity the football.

24 Claims, 86 Drawing Sheets

Related U.S. Application Data which is a continuation of application No. 14/644,388, filed on Mar. 11, 2015, now Pat. No. 9,636,550, which is a continuation-in-part of application No. 14/495,225, filed on Sep. 24, 2014, now Pat. No. 9,776,047, which is a continuation-in-part of application No. 14/071,544, filed on Nov. 4, 2013, now Pat. No. 9,339,710, which is a continuation of application No. 12/947,920, filed on Nov. 17, 2010, now Pat. No. 8,870,689.

(60) Provisional application No. 61/891,487, filed on Oct. 16, 2013, provisional application No. 61/798,738, filed on Mar. 15, 2013, provisional application No. 61/800,972, filed on Mar. 15, 2013, provisional application No. 61/788,304, filed on Mar. 15, 2013, provisional application No. 61/724,668, filed on Nov. 9, 2012, provisional application No. 61/262,586, filed on Nov. 19, 2009.

(51) Int. Cl.
| | | |
|---|---|---|
| *A63B 41/02* | (2006.01) | |
| *A63B 41/08* | (2006.01) | |
| *A63B 69/00* | (2006.01) | |
| *G06K 9/00* | (2006.01) | |
| *G09B 19/00* | (2006.01) | |
| *A63B 24/00* | (2006.01) | |
| *G07C 1/22* | (2006.01) | |
| *A63B 71/06* | (2006.01) | |

(52) U.S. Cl.
CPC ........ *A63B 69/002* (2013.01); *G06K 9/00335* (2013.01); *G09B 19/0038* (2013.01); *A63B 24/0062* (2013.01); *A63B 71/0622* (2013.01); *A63B 2024/0071* (2013.01); *A63B 2071/0625* (2013.01); *A63B 2220/10* (2013.01); *A63B 2220/30* (2013.01); *A63B 2220/35* (2013.01); *A63B 2220/40* (2013.01); *A63B 2220/44* (2013.01); *A63B 2220/62* (2013.01); *A63B 2220/72* (2013.01); *A63B 2225/50* (2013.01); *A63B 2225/54* (2013.01); *A63B 2243/007* (2013.01); *G07C 1/22* (2013.01)

(56) References Cited

U.S. PATENT DOCUMENTS

| | | |
|---|---|---|
| 1,559,364 A | 4/1923 | Pearce |
| 2,020,484 A | 5/1934 | Turner |
| 2,307,362 A | 3/1942 | Dupler |
| 2,849,819 A | 10/1955 | Murphy et al. |
| 2,871,343 A | 1/1959 | Whitney |
| 2,903,820 A | 9/1959 | Bodell |
| 3,011,048 A | 11/1961 | O'Brien |
| 3,229,976 A | 1/1966 | Allen, Jr. |
| 3,304,651 A | 2/1967 | Deyerl |
| 3,351,347 A | 11/1967 | Smith et al. |
| 3,458,205 A | 7/1969 | Smith et al. |
| 3,521,886 A | 7/1970 | Bosco |
| 3,580,575 A | 5/1971 | Speeth |
| 3,610,916 A | 10/1971 | Meehan |
| 3,616,165 A | 10/1971 | Nishi |
| 3,745,677 A | 7/1973 | Moran |
| 3,786,246 A | 1/1974 | Johnson et al. |
| 3,804,411 A | 4/1974 | Hendry |
| 3,935,669 A | 2/1976 | Potrzuski et al. |
| 4,002,893 A | 1/1977 | Newcomb et al. |
| 4,133,528 A | 1/1979 | Koblick |
| 4,479,649 A | 10/1984 | Newcomb et al. |
| 4,542,445 A | 9/1985 | Marietta |
| 4,563,160 A | 1/1986 | Lee |
| 4,577,865 A | 3/1986 | Shishido |
| 4,607,850 A | 8/1986 | O'Riley |
| 4,660,831 A | 4/1987 | Kralik |
| 4,701,146 A | 10/1987 | Swenson |
| 4,776,589 A | 10/1988 | Yang |
| 4,801,141 A | 1/1989 | Rumsey |
| 4,963,117 A | 10/1990 | Gualdoni |
| 4,967,596 A | 11/1990 | Rilling et al. |
| 4,997,403 A | 3/1991 | Akman |
| 4,999,603 A | 3/1991 | Mele et al. |
| 5,039,977 A | 8/1991 | Mele et al. |
| 5,054,778 A | 10/1991 | Maleyko |
| 5,066,011 A | 11/1991 | Dykstra et al. |
| 5,066,012 A | 11/1991 | Stark |
| 5,071,122 A | 12/1991 | Messina |
| 5,080,359 A | 1/1992 | Thill |
| 5,102,131 A | 4/1992 | Remington et al. |
| 5,170,664 A | 12/1992 | Hirsh et al. |
| 5,186,458 A | 2/1993 | Redondo |
| 5,228,686 A | 7/1993 | Maleyko |
| 5,236,383 A | 8/1993 | Connelly |
| 5,319,531 A | 6/1994 | Kutnyak |
| 5,388,825 A | 2/1995 | Myers et al. |
| 5,403,000 A | 4/1995 | Woosley |
| 5,480,144 A | 1/1996 | Downing |
| 5,564,702 A | 10/1996 | Meffert |
| 5,609,411 A | 3/1997 | Wang |
| 5,639,076 A | 6/1997 | Cmiel et al. |
| 5,683,316 A | 11/1997 | Campbell |
| 5,694,340 A | 12/1997 | Kim |
| 5,725,445 A | 3/1998 | Kennedy et al. |
| 5,755,634 A | 3/1998 | Huang |
| 5,820,484 A | 10/1998 | Terry |
| 5,833,549 A | 11/1998 | Zur et al. |
| 5,882,204 A | 3/1999 | Iannazo et al. |
| 5,888,156 A | 3/1999 | Cmiel et al. |
| 5,976,038 A | 11/1999 | Orenstein et al. |
| 6,073,086 A | 6/2000 | Marinelli |
| 6,142,894 A | 11/2000 | Lee |
| 6,148,271 A | 11/2000 | Marinelli |
| 6,151,563 A | 11/2000 | Marinelli |
| 6,157,898 A | 12/2000 | Marinelli |
| 6,224,493 B1 | 5/2001 | Lee et al. |
| 6,251,035 B1 | 6/2001 | Fa |
| 6,398,616 B1 | 6/2002 | Motosko, III |
| 6,416,327 B1 | 7/2002 | Wittenbecher |
| 6,428,432 B1 | 8/2002 | Kachel |
| 6,482,071 B1 | 11/2002 | Wilgosz |
| 6,537,125 B1 | 3/2003 | Motosko, III |
| 6,547,623 B1 | 4/2003 | Collado |
| 6,572,492 B2 | 6/2003 | Tinsman |
| 6,702,292 B2 | 3/2004 | Takowsky |
| 6,722,889 B1 | 4/2004 | Page et al. |
| 6,725,719 B2 | 4/2004 | Cardarelli |
| 6,726,580 B2 | 4/2004 | Peterson |
| 6,780,130 B1 | 8/2004 | Monochello |
| 7,014,581 B2 | 3/2006 | Ng |
| 7,021,140 B2 | 4/2006 | Perkins |
| 7,140,248 B1 | 11/2006 | Brundage |
| 7,148,583 B1 | 12/2006 | Shau et al. |
| 7,179,181 B2 | 2/2007 | Ko |
| 7,234,351 B2 | 6/2007 | Perkins |
| 7,288,037 B2 | 10/2007 | Myers |
| 7,487,045 B1 | 2/2009 | Vieira |
| 7,674,195 B2 | 3/2010 | Romcevich |
| 7,719,469 B2 | 5/2010 | Englert et al. |
| 7,727,097 B2 | 6/2010 | Siegel et al. |
| 7,740,551 B2 | 6/2010 | Nurnberg et al. |
| 7,795,861 B2 | 9/2010 | Englert et al. |
| 7,811,163 B2 | 10/2010 | Ratcliffe |
| 7,814,791 B2 | 10/2010 | Andersson et al. |
| 7,867,113 B2 | 1/2011 | Petersen |
| 7,867,115 B2 | 1/2011 | Zawitz |
| 7,891,666 B2 | 2/2011 | Kuenzler et al. |
| 7,915,887 B2 | 3/2011 | Engler |
| 7,927,253 B2 | 4/2011 | Vincent et al. |
| 7,998,004 B2 | 8/2011 | Klein |
| 8,010,105 B2 | 8/2011 | Buckley et al. |
| 8,036,826 B2 | 10/2011 | MacIntosh et al. |

(56) References Cited

U.S. PATENT DOCUMENTS

| Patent/Publication No. | Date | Inventor(s) |
|---|---|---|
| 8,057,328 B2 | 11/2011 | Englert |
| 8,066,572 B1 | 11/2011 | Timmons et al. |
| 8,070,620 B2 | 12/2011 | Rankin |
| 8,079,925 B2 | 12/2011 | Englert et al. |
| 8,172,722 B2 | 5/2012 | Molyneux et al. |
| 8,221,290 B2 | 7/2012 | Vincent et al. |
| 8,228,056 B2 | 7/2012 | Bucher |
| 8,231,487 B2 | 7/2012 | Nurnberg et al. |
| 8,231,506 B2 | 7/2012 | Molyneux et al. |
| 8,340,740 B2 | 12/2012 | Holzer et al. |
| 8,353,791 B2 | 1/2013 | Holthouse et al. |
| 8,409,024 B2 | 4/2013 | Marty et al. |
| 8,439,773 B2 | 5/2013 | Silagy |
| 8,506,430 B2 | 8/2013 | Von Der Gruen et al. |
| 8,512,177 B2 | 8/2013 | Krysiak et al. |
| 8,517,870 B2 | 8/2013 | Crowley et al. |
| 8,535,185 B2 | 9/2013 | Englert |
| 8,540,560 B2 | 9/2013 | Crowley et al. |
| 8,562,487 B2 | 10/2013 | Berggren et al. |
| 8,579,632 B2 | 11/2013 | Crowley |
| 8,597,095 B2 | 12/2013 | Crowley et al. |
| 8,617,008 B2 | 12/2013 | Marty et al. |
| 8,622,832 B2 | 1/2014 | Marty et al. |
| 8,678,897 B2 | 3/2014 | Englert et al. |
| 8,725,452 B2 | 5/2014 | Han |
| 8,758,172 B2 | 6/2014 | Creguer |
| 8,781,610 B2 | 7/2014 | Han |
| 8,903,521 B2 | 12/2014 | Goree et al. |
| 8,905,855 B2 | 12/2014 | Fitzpatrick et al. |
| 8,941,723 B2 | 1/2015 | Bentley et al. |
| 8,944,928 B2 | 2/2015 | Kaps et al. |
| 8,944,939 B2 | 2/2015 | Clark et al. |
| 8,951,106 B2 | 2/2015 | Crowley et al. |
| 8,989,441 B2 | 3/2015 | Han et al. |
| 2002/0123386 A1 | 9/2002 | Perlmutter |
| 2002/0137582 A1 | 9/2002 | Yu |
| 2003/0054905 A1 | 3/2003 | King, Jr. |
| 2003/0073518 A1 | 4/2003 | Marty et al. |
| 2003/0224885 A1 | 12/2003 | Leal et al. |
| 2004/0219964 A1 | 11/2004 | Bleckley et al. |
| 2005/0049092 A1 | 3/2005 | Lo |
| 2005/0288133 A1 | 12/2005 | Rudell |
| 2005/0288134 A1 | 12/2005 | Smith |
| 2006/0063622 A1 | 3/2006 | Nurnberg et al. |
| 2006/0105857 A1 | 5/2006 | Stark |
| 2007/0037641 A1 | 2/2007 | Wong |
| 2007/0074752 A1 | 4/2007 | Shau et al. |
| 2007/0091084 A1 | 4/2007 | Ueshima et al. |
| 2007/0167266 A1 | 7/2007 | DeVall |
| 2007/0173355 A1 | 7/2007 | Klein |
| 2007/0178967 A1 | 8/2007 | Rosenberg |
| 2007/0026975 A1 | 11/2007 | Marty et al. |
| 2007/0281811 A1 | 12/2007 | Wang |
| 2007/0299625 A1 | 12/2007 | Englert et al. |
| 2008/0088303 A1 | 4/2008 | Englert |
| 2008/0174281 A1 | 7/2008 | Shau |
| 2008/0274844 A1 | 11/2008 | Ward |
| 2008/0312010 A1 | 12/2008 | Marty et al. |
| 2009/0029754 A1 | 1/2009 | Slocum et al. |
| 2009/0040761 A1 | 2/2009 | Huang et al. |
| 2009/0048039 A1 | 2/2009 | Holthouse et al. |
| 2009/0062033 A1 | 3/2009 | Harada |
| 2009/0072817 A1 | 3/2009 | Bucher |
| 2009/0191990 A1 | 7/2009 | Smith |
| 2009/0210078 A1 | 8/2009 | Crowley |
| 2009/0298588 A1 | 12/2009 | Gopinath et al. |
| 2009/0325739 A1 | 12/2009 | Gold |
| 2010/0035710 A1 | 2/2010 | Smith |
| 2010/0036753 A1 | 2/2010 | Harvill et al. |
| 2010/0069181 A1 | 3/2010 | Lin |
| 2010/0130314 A1 | 5/2010 | Von Der Gruen et al. |
| 2010/0130315 A1 | 5/2010 | Steidle |
| 2010/0184563 A1* | 7/2010 | Molyneux ............ A43B 1/0054 482/1 |
| 2010/0198043 A1 | 8/2010 | Holzer et al. |
| 2010/0222163 A1 | 9/2010 | Eskidsen |
| 2010/0261557 A1 | 10/2010 | Joseph et al. |
| 2011/0118062 A1 | 5/2011 | Kyrsiak et al. |
| 2011/0118064 A1 | 5/2011 | Krysiak et al. |
| 2011/0118065 A1 | 5/2011 | Krysiak et al. |
| 2011/0119022 A1 | 5/2011 | Kuenzler et al. |
| 2011/0136603 A1 | 6/2011 | Lin et al. |
| 2011/0212798 A1 | 9/2011 | Zawitz |
| 2011/0269517 A1 | 11/2011 | Englert et al. |
| 2011/0287878 A1 | 11/2011 | Englert |
| 2011/0304497 A1* | 12/2011 | Molyneux ............ A43B 1/0054 342/42 |
| 2011/0316529 A1 | 12/2011 | Stancil et al. |
| 2012/0029666 A1 | 2/2012 | Crowley et al. |
| 2012/0040785 A1 | 2/2012 | De Sort |
| 2012/0058845 A1 | 3/2012 | Crowley et al. |
| 2012/0071282 A1 | 3/2012 | Smith |
| 2012/0094787 A1 | 4/2012 | Weiss |
| 2012/0139493 A1 | 6/2012 | Sakurai et al. |
| 2012/0169589 A1 | 7/2012 | Albano et al. |
| 2012/0172129 A1 | 7/2012 | Vaananen |
| 2012/0206234 A1 | 8/2012 | Case, Jr. |
| 2012/0212505 A1 | 8/2012 | Burroughs et al. |
| 2012/0244969 A1 | 9/2012 | Binder |
| 2012/0262329 A1 | 10/2012 | Molyneux et al. |
| 2012/0264549 A1 | 10/2012 | Homsi et al. |
| 2012/0277040 A1 | 11/2012 | Vincent et al. |
| 2012/0277890 A1 | 11/2012 | Han |
| 2012/0278023 A1 | 11/2012 | Han |
| 2013/0005512 A1 | 1/2013 | Joseph et al. |
| 2013/0023365 A1 | 1/2013 | Idoni-Matthews et al. |
| 2013/0068017 A1 | 3/2013 | Perkins et al. |
| 2013/0073247 A1 | 3/2013 | Perkins et al. |
| 2013/0073248 A1 | 3/2013 | Perkins et al. |
| 2013/0085006 A1 | 4/2013 | Nilwong et al. |
| 2013/0090750 A1 | 4/2013 | Herrman et al. |
| 2013/0095961 A1* | 4/2013 | Marty ................ A63B 24/0003 473/450 |
| 2013/0167290 A1 | 7/2013 | Ben Ezra |
| 2013/0196801 A1 | 8/2013 | Eskildsen |
| 2013/0316772 A1 | 11/2013 | Kong |
| 2014/0009258 A1 | 1/2014 | Case, Jr. |
| 2014/0018181 A1 | 1/2014 | Blake et al. |
| 2014/0031151 A1 | 1/2014 | Crowley et al. |
| 2014/0039651 A1 | 2/2014 | Crowley |
| 2014/0081436 A1 | 3/2014 | Crowley et al. |
| 2014/0120960 A1 | 5/2014 | Hohteri |
| 2014/0128182 A1 | 5/2014 | Hohteri |
| 2014/0228155 A1 | 8/2014 | Hohteri |
| 2014/0295874 A1 | 10/2014 | Hohteri et al. |
| 2014/0303759 A1 | 10/2014 | Hohteri |
| 2014/0309058 A1 | 10/2014 | San Juan |
| 2014/0342329 A1 | 11/2014 | Debenedetto et al. |
| 2014/0375817 A1 | 12/2014 | Meschter et al. |
| 2015/0011343 A1 | 1/2015 | Krysiak et al. |
| 2015/0112464 A1 | 4/2015 | Crowley et al. |
| 2015/0165294 A1 | 6/2015 | Wackerly |
| 2015/0246277 A1 | 9/2015 | King et al. |
| 2015/0328516 A1* | 11/2015 | Coza .................... A63B 69/002 473/446 |
| 2015/0382076 A1 | 12/2015 | Davisson et al. |
| 2016/0001136 A1 | 1/2016 | King et al. |

FOREIGN PATENT DOCUMENTS

| | | |
|---|---|---|
| EP | 1852155 A1 | 9/2006 |
| EP | 1852155 B1 | 9/2006 |
| WO | 2007084850 A2 | 7/2007 |
| WO | 2008043450 A1 | 4/2008 |
| WO | 2008043465 A1 | 4/2008 |
| WO | 2008080626 A1 | 7/2008 |
| WO | 2008104247 A1 | 9/2008 |
| WO | 2008119479 A1 | 10/2008 |
| WO | 2009006931 A1 | 1/2009 |
| WO | 2010054849 A1 | 5/2010 |

* cited by examiner

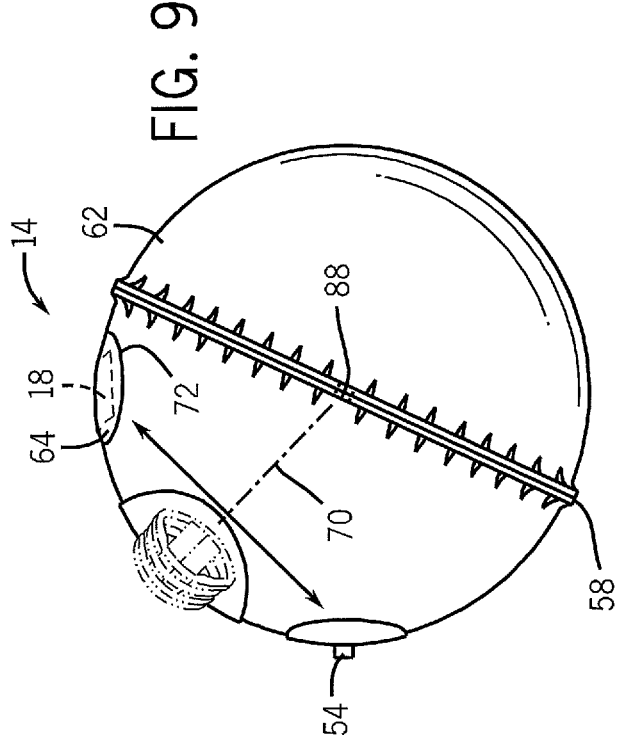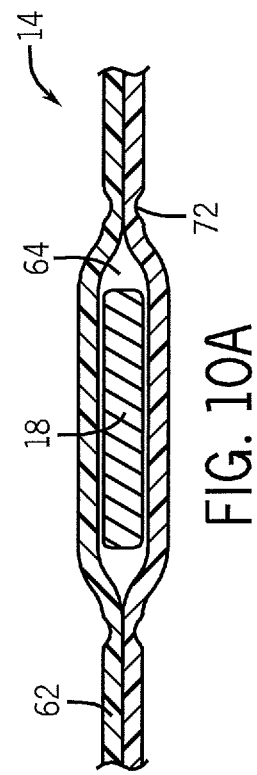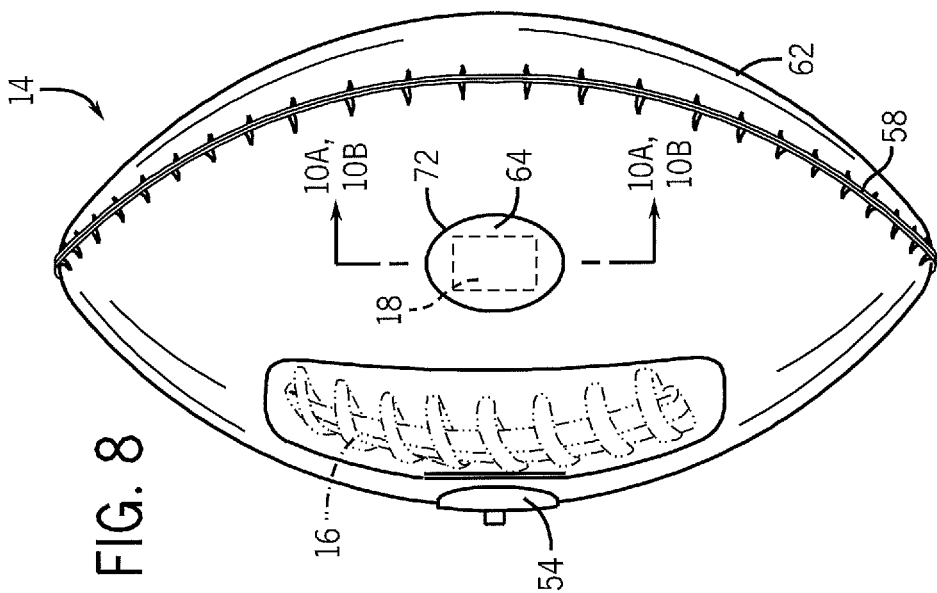

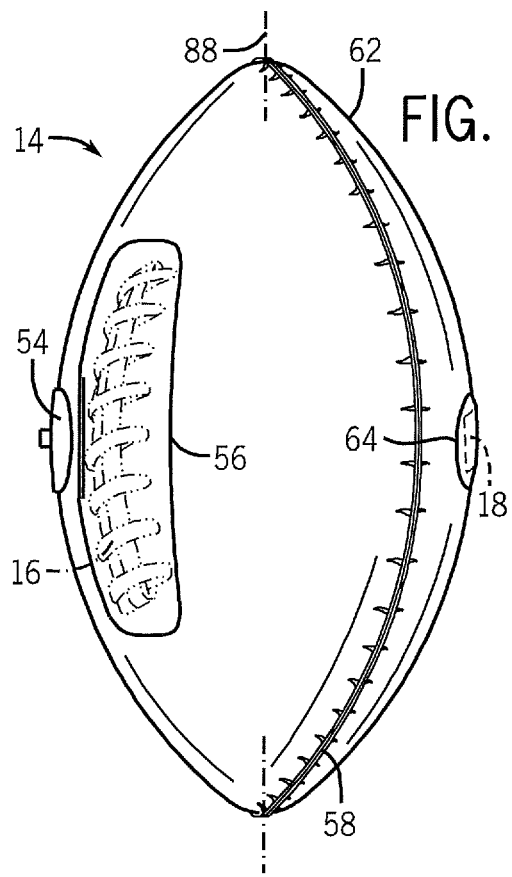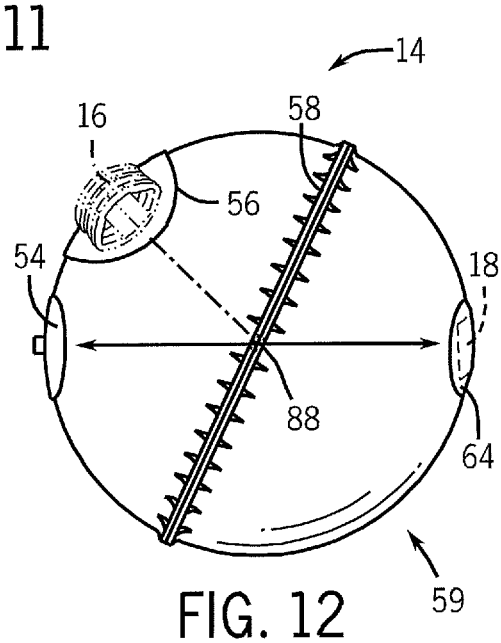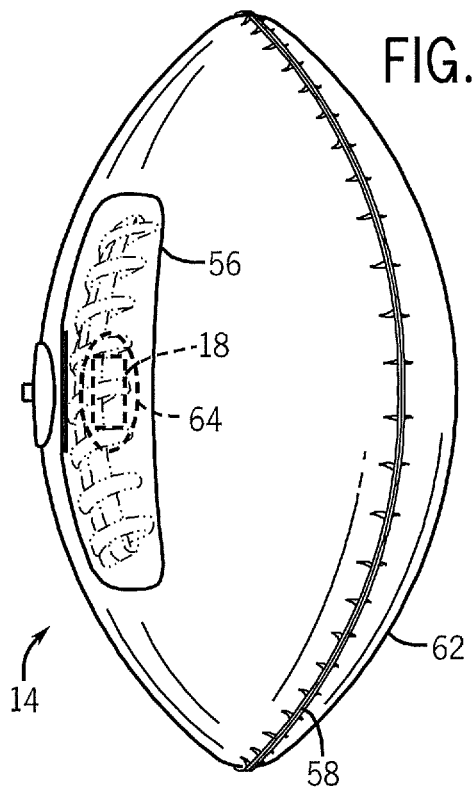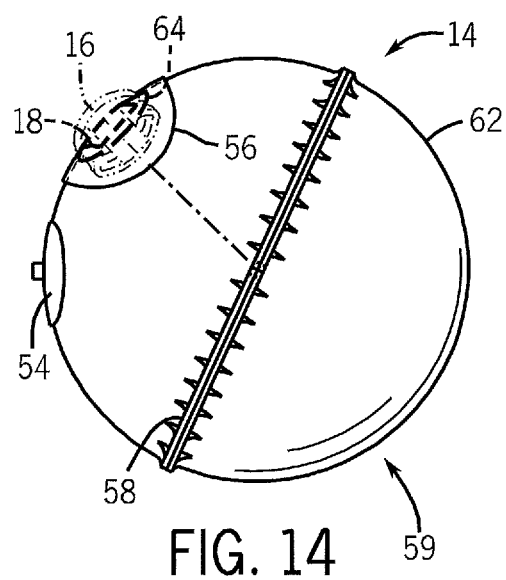

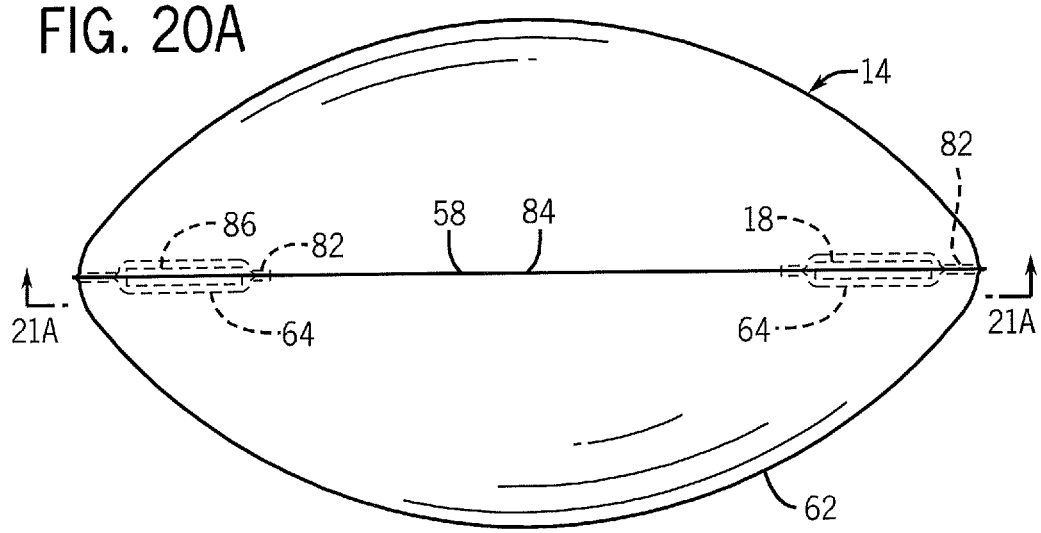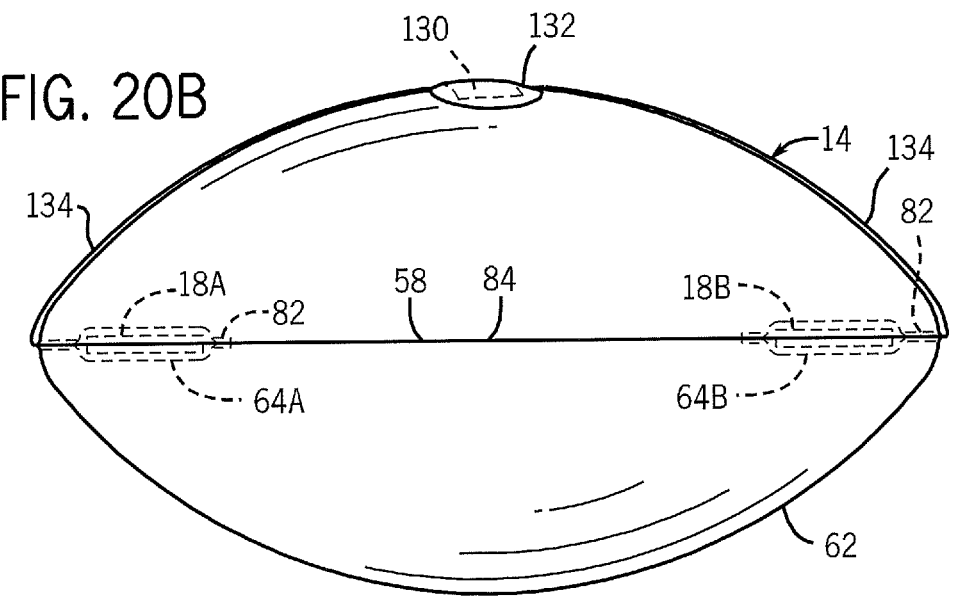

| ATTEMPT | KICK | LAUCH ANGLE | SPEED | SPIN | ATTEMPT | DIRECTION | DISTANCE |
|---|---|---|---|---|---|---|---|
| | 1 | 60 | 80 mph | 220 rpm | MAKE | CENTER | 20 yds |
| | 2 | 65 | 85 mph | 240 rpm | MAKE | LEFT | 35 yds |
| | 3 | 75 | 84 mph | 230 rpm | MISS | RIGHT | 30 yds |
| | 4 | 72 | 82 mph | 225 rpm | MISS | LEFT | 40 yds |
| | 5 | 76 | 83 mph | 235 rpm | MAKE | CENTER | 30 yds |
| | 1-5 | 6-10 | 11-15 | 16-20 | 21-25 | 26-30 | |

| | INITIAL SPIRAL ABOUT LONG AXIS ($\omega_y$) | INITIAL NOSE PRECESSION ABOUT L VECTOR ($\omega_p$) | RATIO OF WOBBLE TO SPIRAL ($\omega_p/\omega_y$) | FOOTBALL NOSE ANGLE TO L VECTOR (q) |
|---|---|---|---|---|
| THROW # | SPIRAL RPM | WOBBLE RPM | % | DEGREE |
| 1 | 280 | 179 | 63.9% | 15.9 |
| 2 | 266 | 168 | 63.2% | 13.5 |
| 3 | 329 | 217 | 66.0% | 20.7 |
| 4 | 294 | 183 | 62.2% | 7.8 |
| 5 | 281 | 181 | 64.4% | 16.4 |
| 6 | 283 | 180 | 63.6% | 13.7 |
| 7 | 263 | 172 | 65.4% | 19.7 |
| 8 | 239 | 149 | 62.3% | 8.2 |
| 9 | 294 | 215 | 73.1% | 32.7 |
| 10 | 280 | 183 | 65.4% | 19.2 |

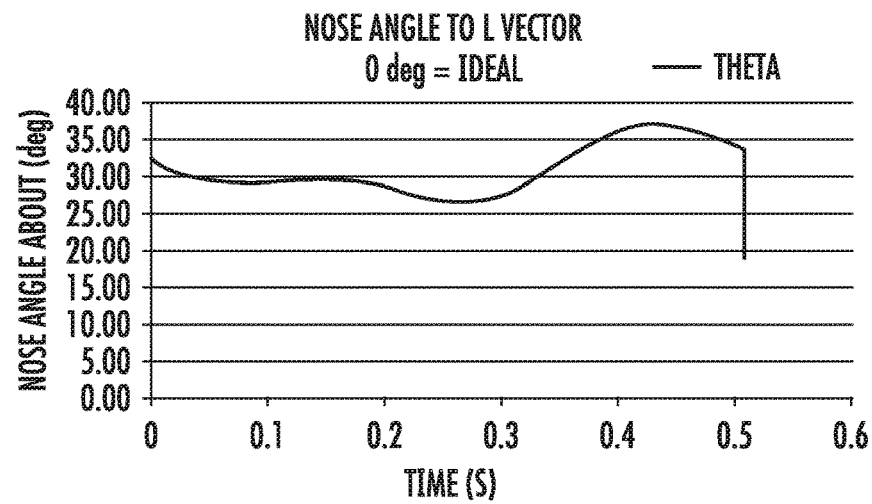
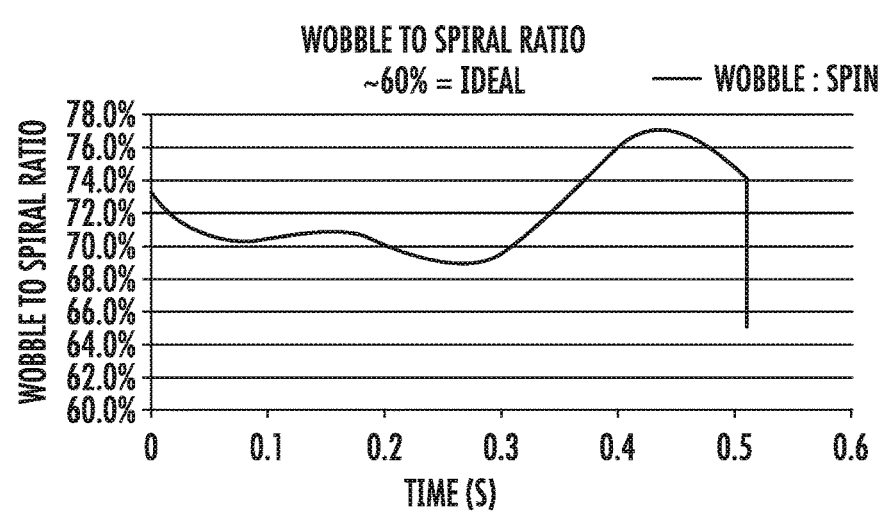
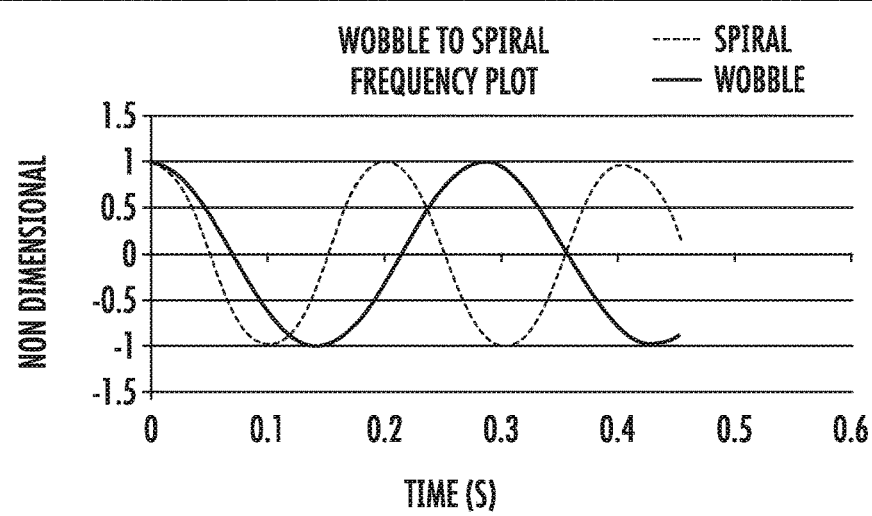
FIG. 88

FOOTBALL SENSING

RELATED U.S. APPLICATION DATA

The present application is a continuation-in-part of U.S. patent application Ser. No. 15/583,466 filed on May 1, 2017 which is a continuation application of U.S. patent application Ser. No. 14/644,388 filed on Mar. 11, 2015 (now U.S. Pat. No. 9,636,550), incorporated by reference in its entirety. U.S. patent application Ser. No. 14/644,388 is a continuation-in-part of U.S. patent application Ser. No. 14/495,225 filed on Sep. 24, 2014 (now U.S. Pat. No. 9,776,047), which is a continuation of U.S. patent application Ser. No. 12/947,920 filed on Nov. 17, 2010 (now U.S. Pat. No. 8,870,689), which claims the benefit of the filing date under 35 U.S. C. § 119(e) of U.S. Provisional Patent Appl. Ser. No. 61/262,586 filed on Nov. 19, 2009, the full disclosures of which are hereby incorporated by reference in their entirety. U.S. patent application Ser. No. 14/644,388 is also a continuation-in-part of U.S. patent application Ser. No. 14/071,544 filed on Nov. 4, 2013 (now U.S. Pat. No. 9,339,710). U.S. patent application Ser. No. 14/071,544 claims: the benefit of the filing date under 35 U.S.C. § 119(e) of U.S. Provisional Patent Application Ser. No. 61/724,668, filed on Nov. 9, 2012, the full disclosures of which are hereby incorporated by reference in their entirety; the benefit of the filing date under 35 U.S.C. § 119(e) of U.S. Provisional Patent Application Ser. Nos. 61/788,304, 61/798,738 and 61/800,972, filed on Mar. 15, 2013, which are hereby incorporated by reference in their entirety; and the benefit of the filing date under 35 U.S.C. § 119(e) of U.S. Provisional Patent Application Ser. No. 61/891,487, filed on Oct. 16, 2013, which is hereby incorporated by reference in its entirety.

BACKGROUND

Many sports, such as American football, involve imparting motion to a physical ball. In an effort to monitor and improve performance, it is important to monitor and understand the movement of the football during a game or practice. What is needed is a sports performance system with ball sensing that can be used to enable users, players, teams, coaches, friends, fans and organizations to monitor and/or improve their performance, a player's performance, and/or a team's performance.

BRIEF DESCRIPTION OF THE DRAWINGS

FIG. 8 is a side view of a bladder of a football in accordance with a preferred embodiment of the present invention.

FIG. 9 is an end view of the bladder of the football of FIG. 8.

FIG. 10A is a cross-sectional view of a portion of the bladder taken about line 10A-10A of FIG. 8.

FIG. 11 is a side view of a bladder of a football in accordance with an alternative preferred embodiment of the present invention.

FIG. 12 is an end view of the bladder of the football of FIG. 11.

FIG. 13 is a side view of a bladder of a football in accordance with an alternative preferred embodiment of the present invention.

FIG. 14 is an end view of the bladder of the football of FIG. 13.

FIG. 20A is a side view of a bladder of a football in accordance with another alternative preferred embodiment of the present invention.

FIG. 20B is a side view of a bladder of a football in accordance with another alternative preferred embodiment of the present invention.

FIG. 61 illustrates an example screenshot of an example implementation of the sport performance system of FIG. 31 in which the perform tab option of kick is selected including a graphic depicting the trajectory of a football during a field-goal kick attempt and data relating the field goal attempt.

FIGS. 64 through 74 illustrate example screenshots of an example implementation of the sport performance system of FIG. 31 in which the perform tab option of kick is selected including data relating to current and historical field goal attempts.

Figure 31:
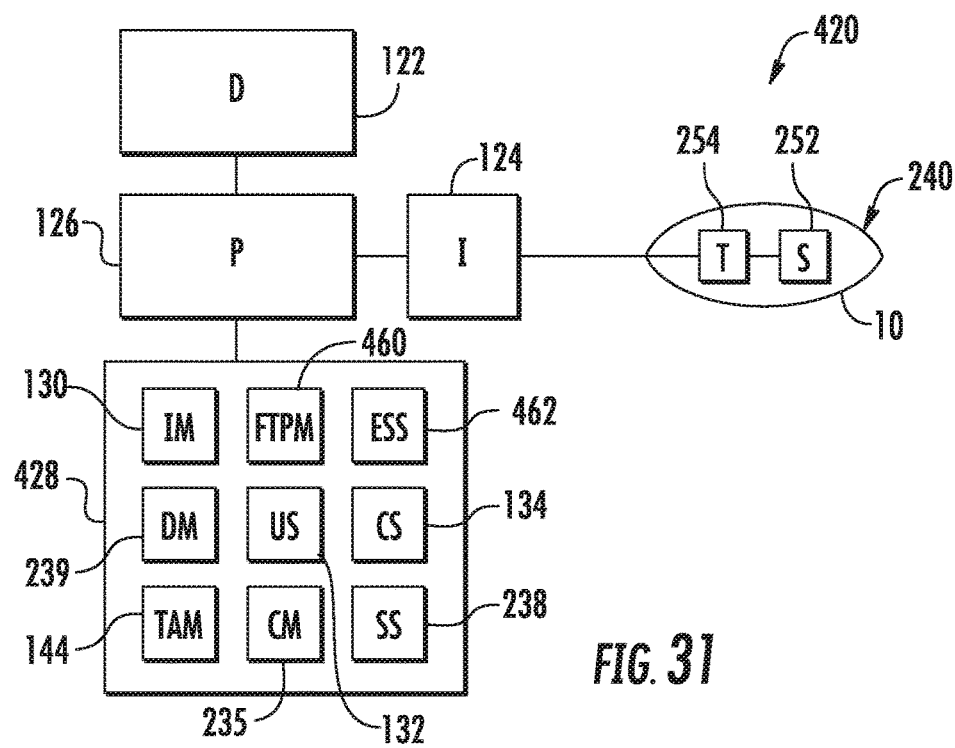
Figure 82:
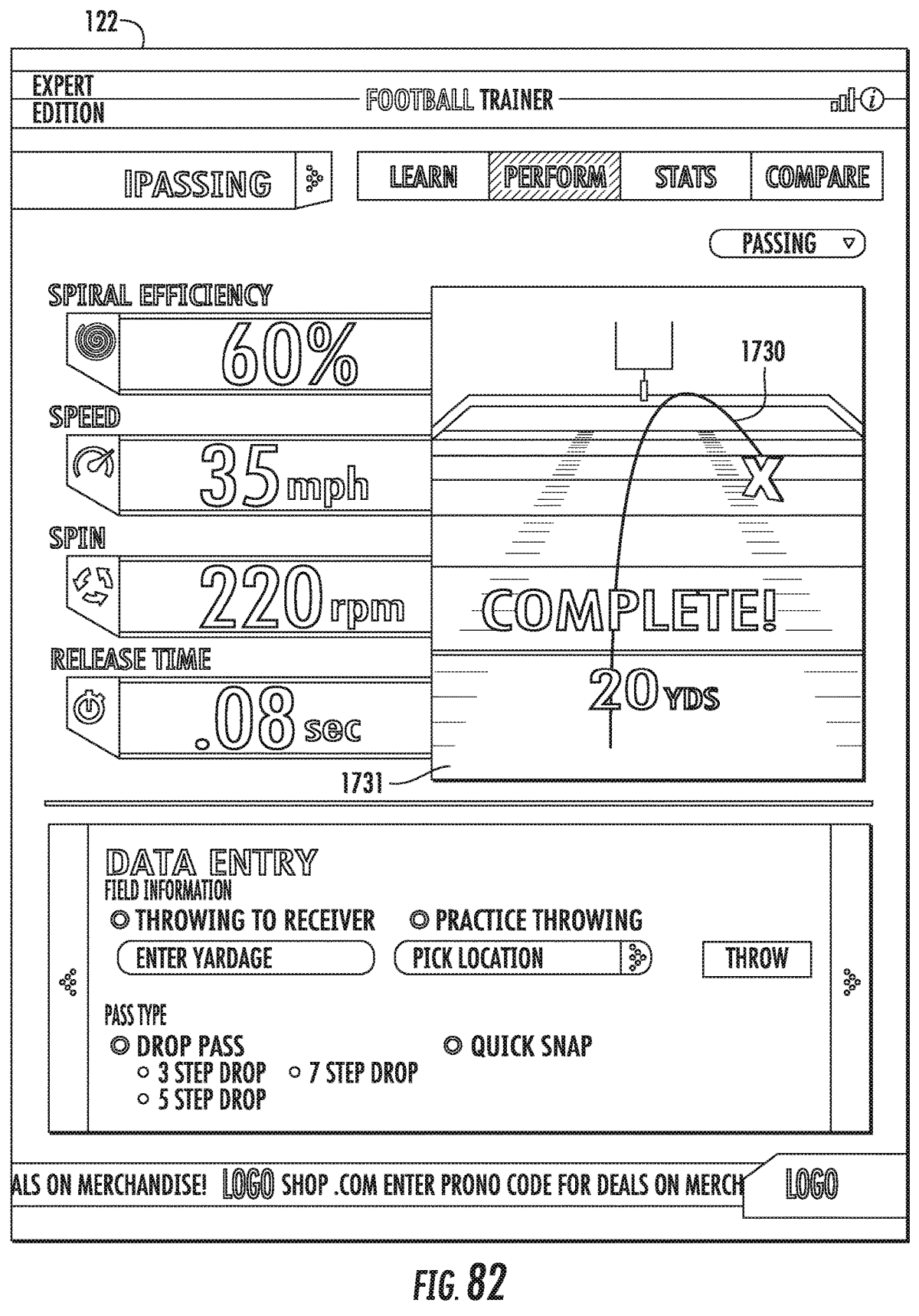

FIG. 82 illustrates an example screenshot of an example implementation of the sport performance system of FIG. 31 in which the perform tab option of pass is selected including a graphic depicting the trajectory of a football during a pass toward a target on a football field and data relating the pass.

Figure 83:
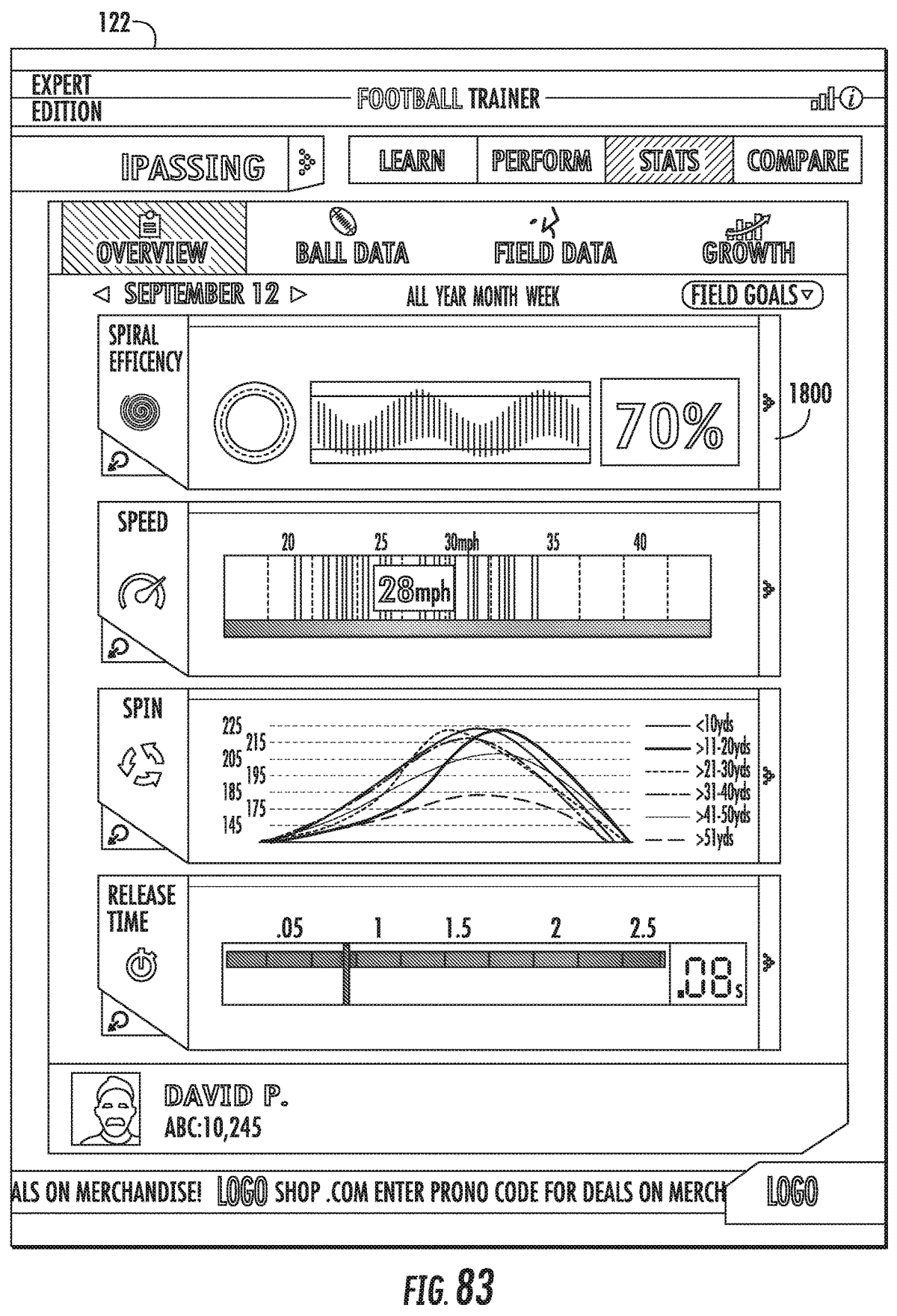

FIG. 83 illustrates an example screenshot of an example implementation of the sport performance system of FIG. 31 in which the perform tab option of pass is selected including graphics illustrating data relating to the pass.

Figures 84, 85:
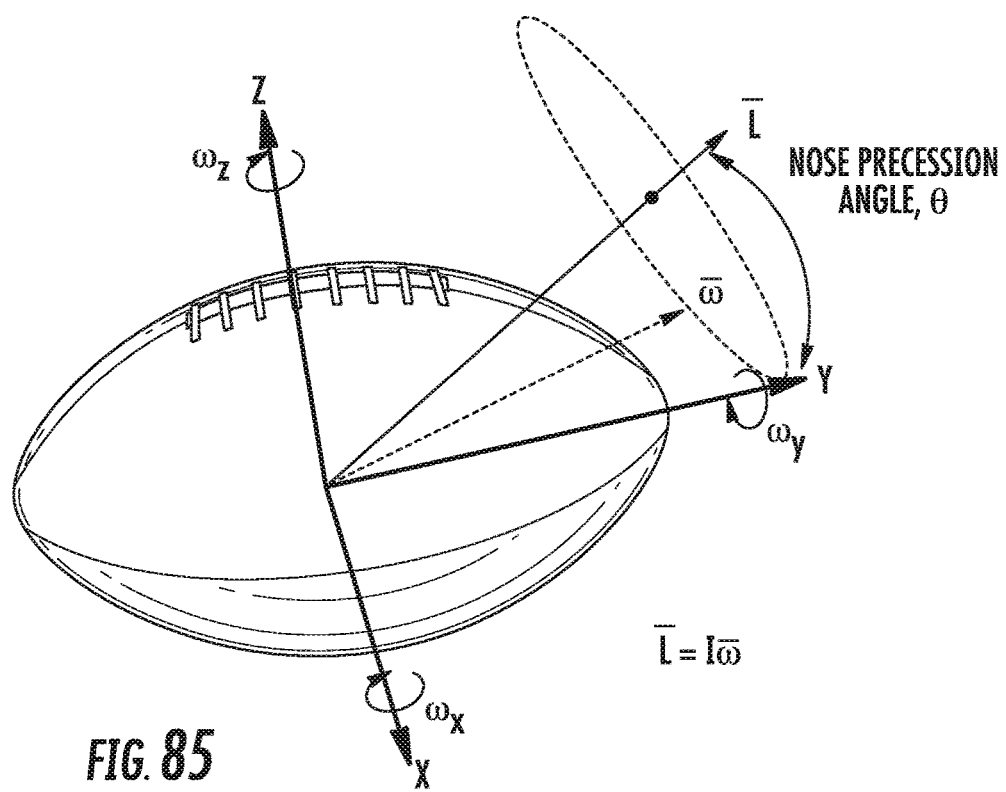
Figure 86:
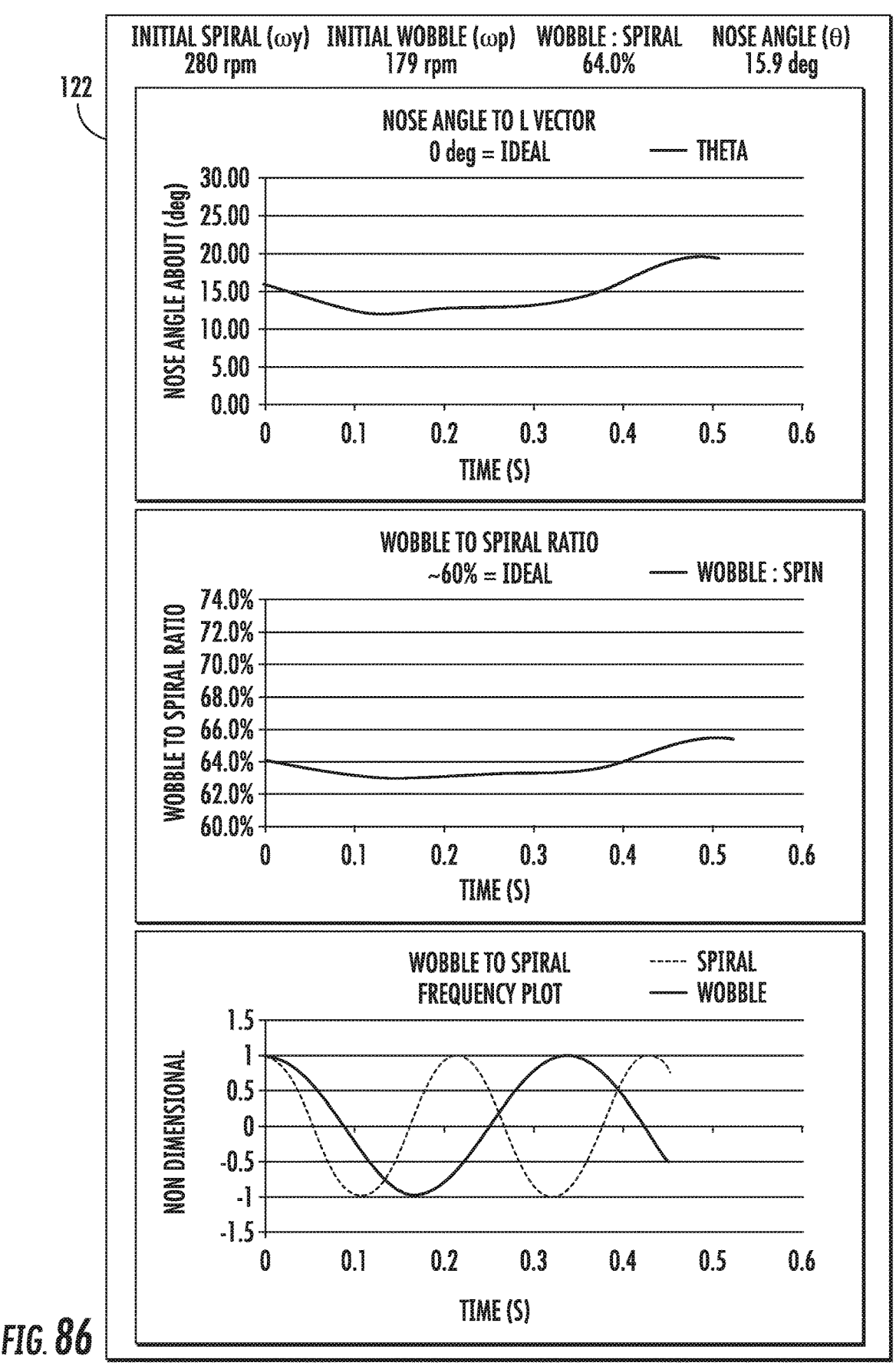
Figure 87:
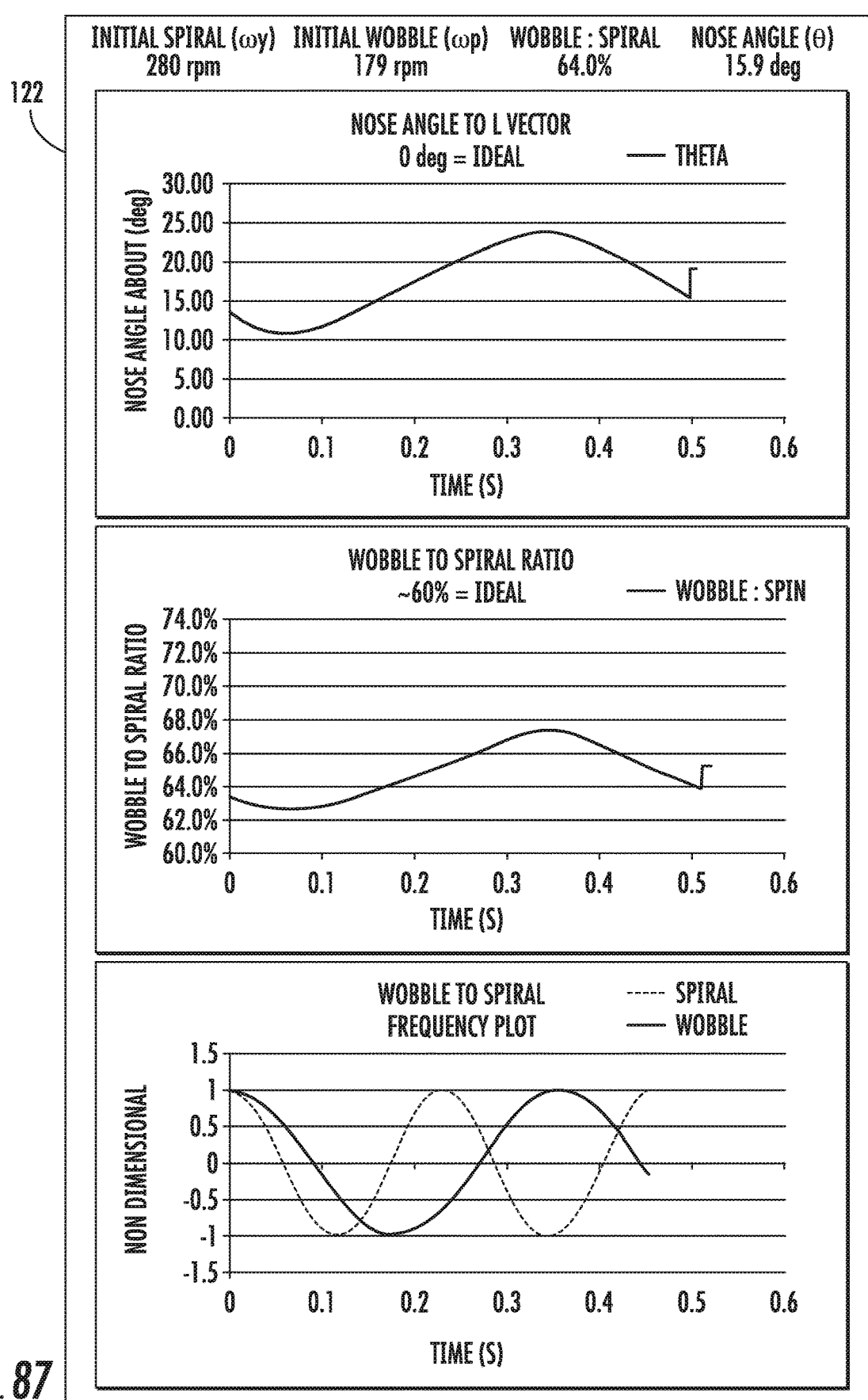
Figure 89:
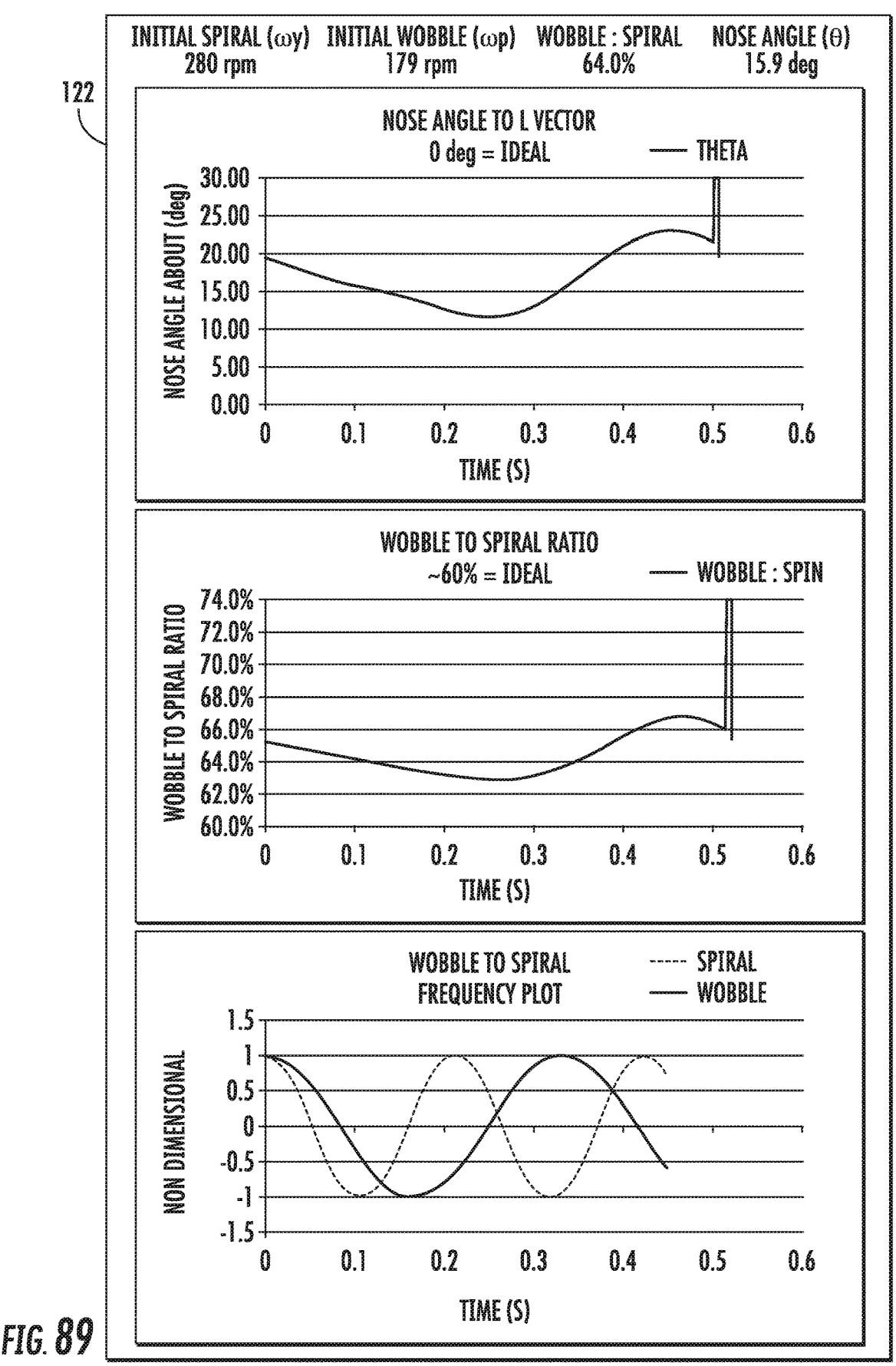

FIG. 84 illustrates data resulting from 10 example throws of a football.

FIG. 85 is a diagram of an example football illustrating example vectors and axes representing rotational and linear forces acting upon the football.

FIGS. 86-89 are diagrams of example screenshots presented by the system of FIG. 5 illustrating graphical data relating to thrown footballs.

Figure 90:
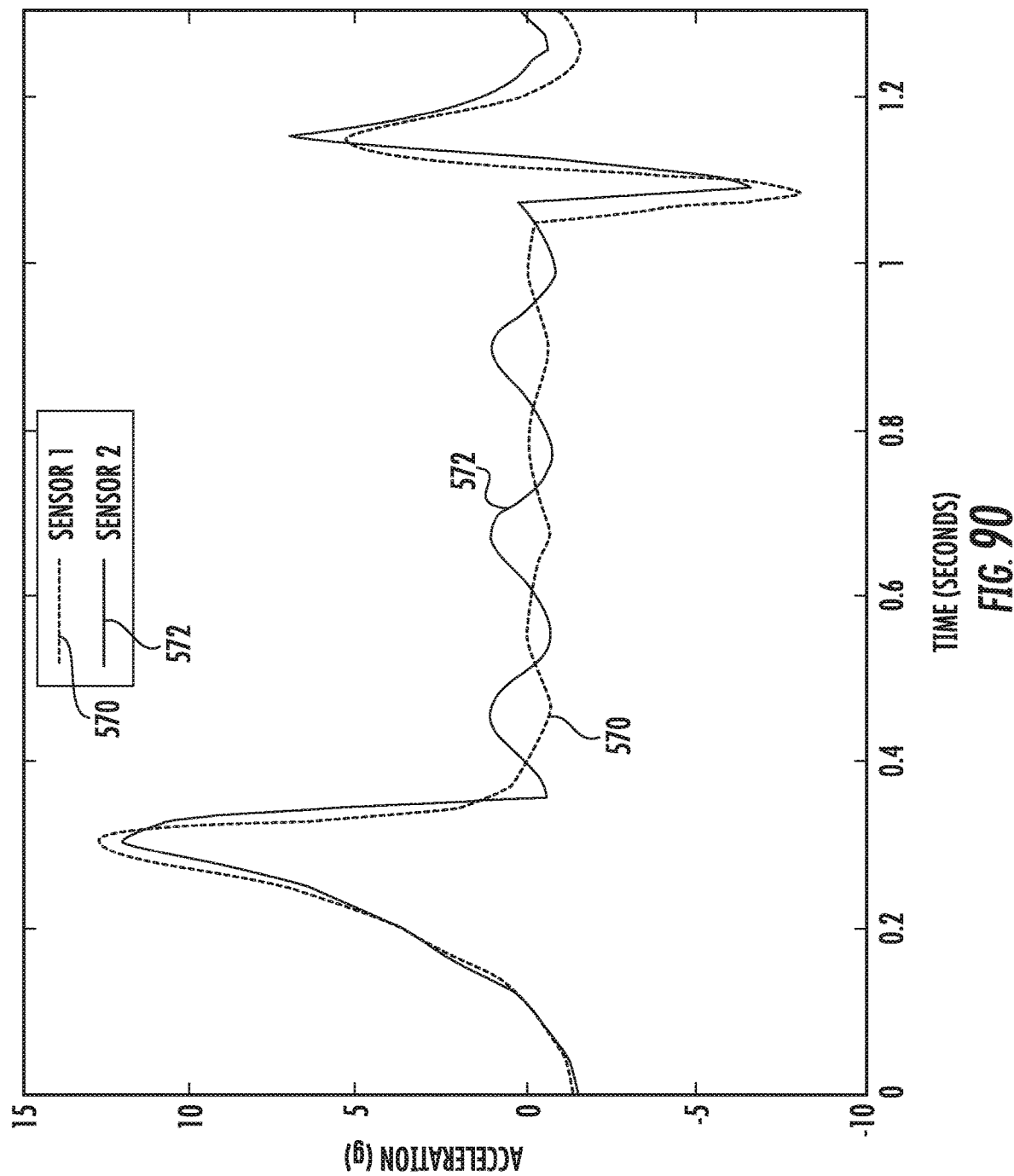

FIG. 90 is a graph illustrated acceleration data over time of a thrown football.

Figure 91:
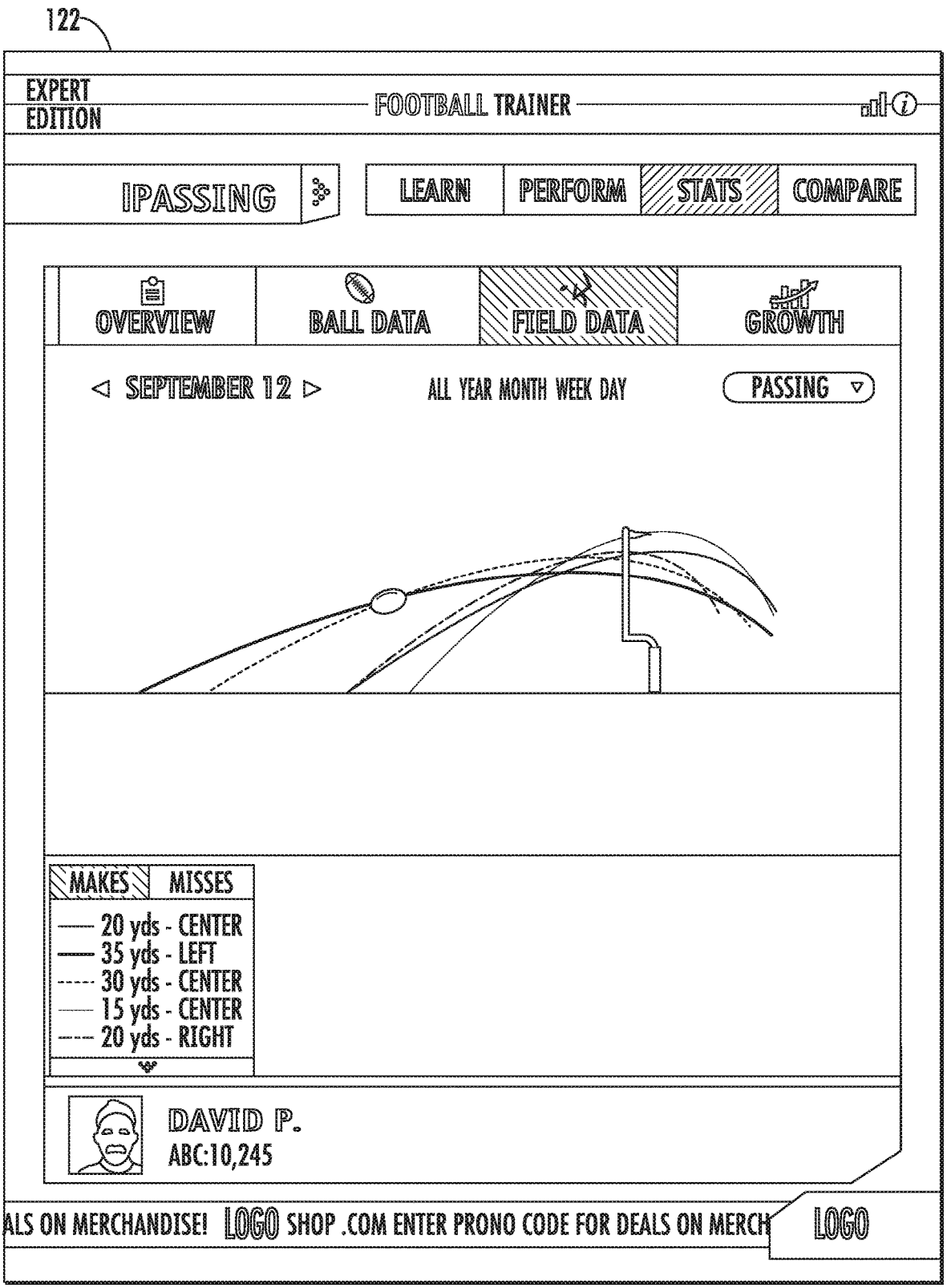

FIG. 91 illustrates an example screenshot of an example implementation of the sport performance system of FIG. 31 illustrating the results of football events over time.

Figure 92:
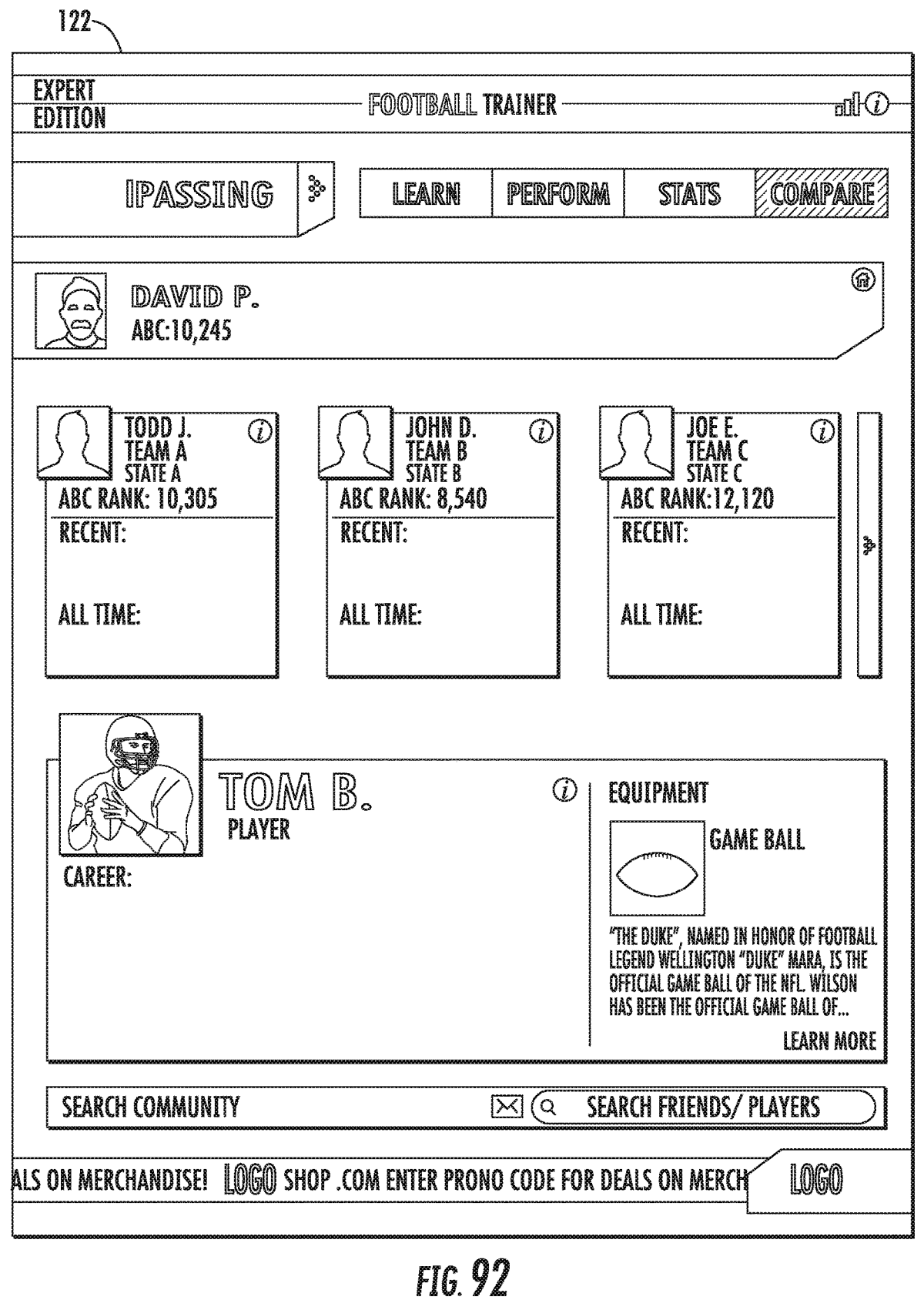

FIG. 92 illustrates an example screenshot of an example implementation of the sport performance system of FIG. 31 in which the perform tab option of pass selected including information comparing the user to other users or celebrities.

Figure 93:
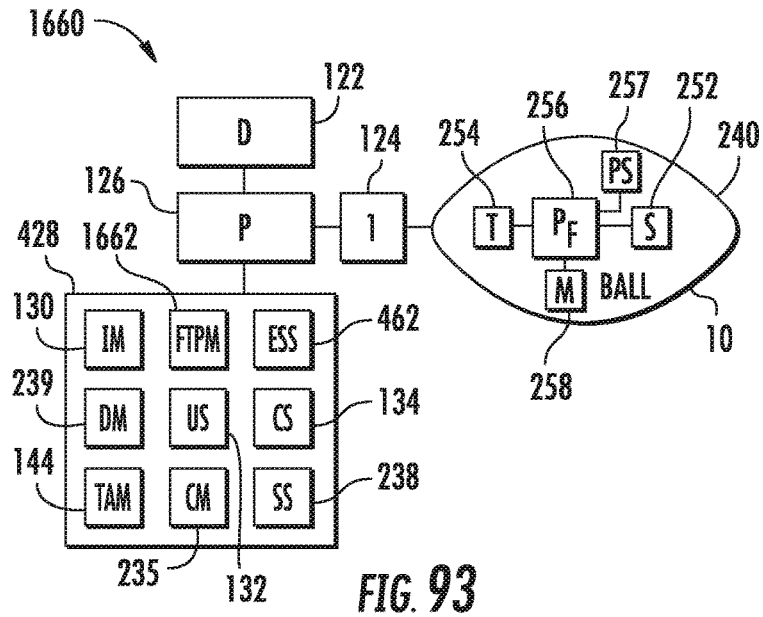

FIG. 93 is a schematic diagram of an example sports evaluation system.

Figure 94:
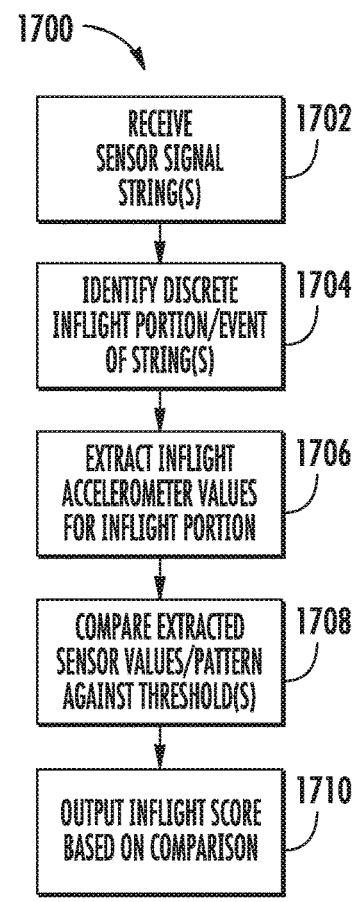

FIG. 94 is a flow diagram of an example method for evaluating in-flight characteristics of a football.

Figure 95:
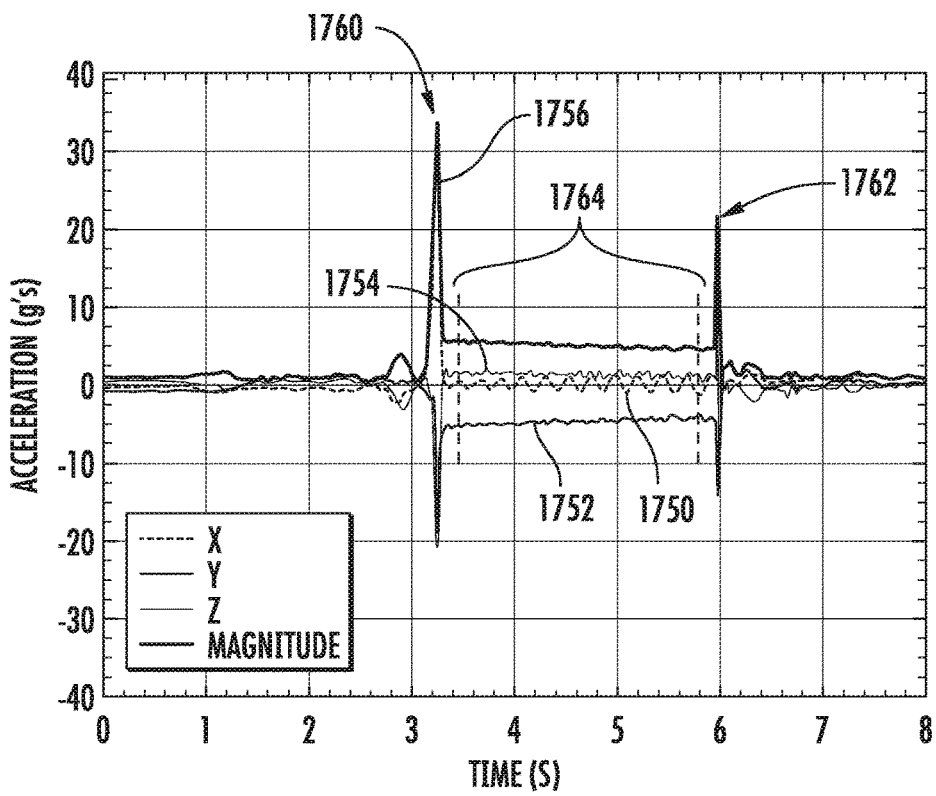

FIG. 95 is a diagram of strings of sensor signals received from a football of system 1660 during flight of the football.

Figure 96A:
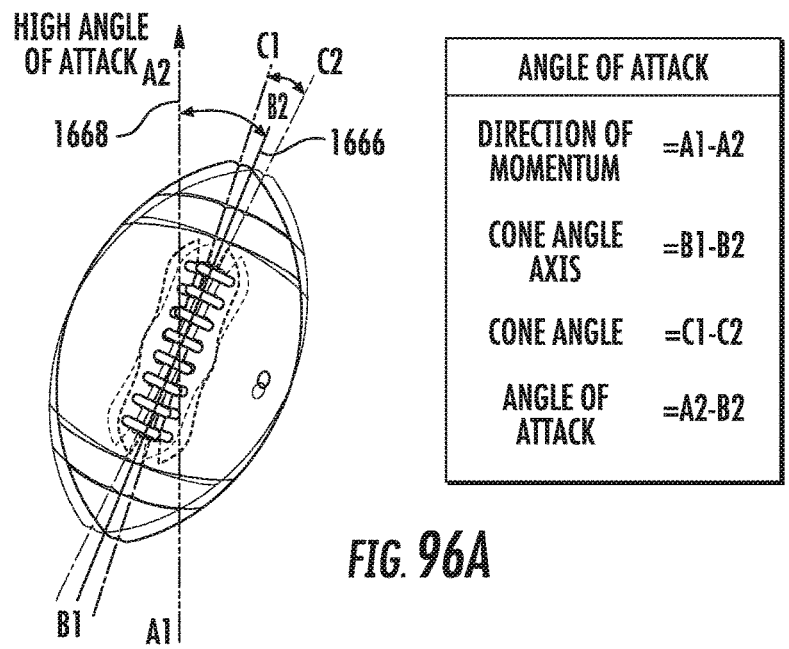

FIG. 96A is a diagram illustrating an example angle of attack of a football.

Figure 96B:
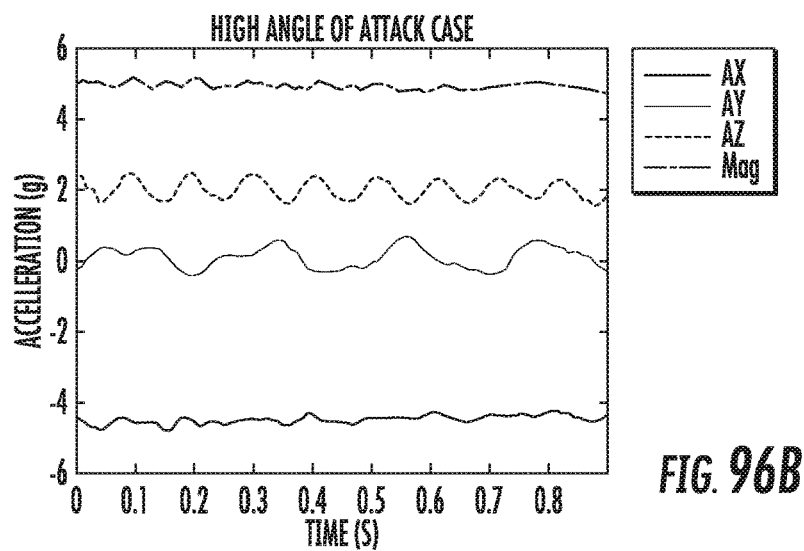

FIG. 96B is a graphical representation of acceleration over time of a football traveling at a high angle of attack.

Figure 96C:
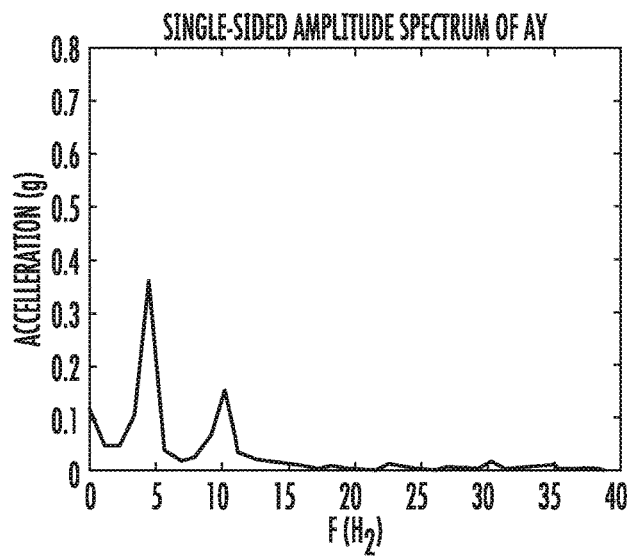

FIG. 96C is a graphical representation of acceleration and frequency of a single-sided amplitude spectrum of acceleration with respect to a y-axis of the football traveling at a high angle of attack.

Figure 97A:
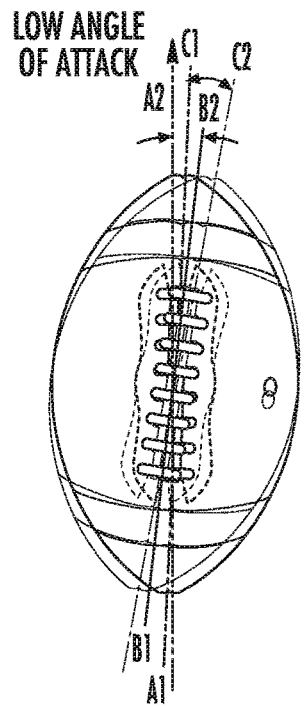

FIG. 97A is a diagram of strings of sensor signals received from the football of system 1660 during a throw having a low angle of attack.

Figure 97B:
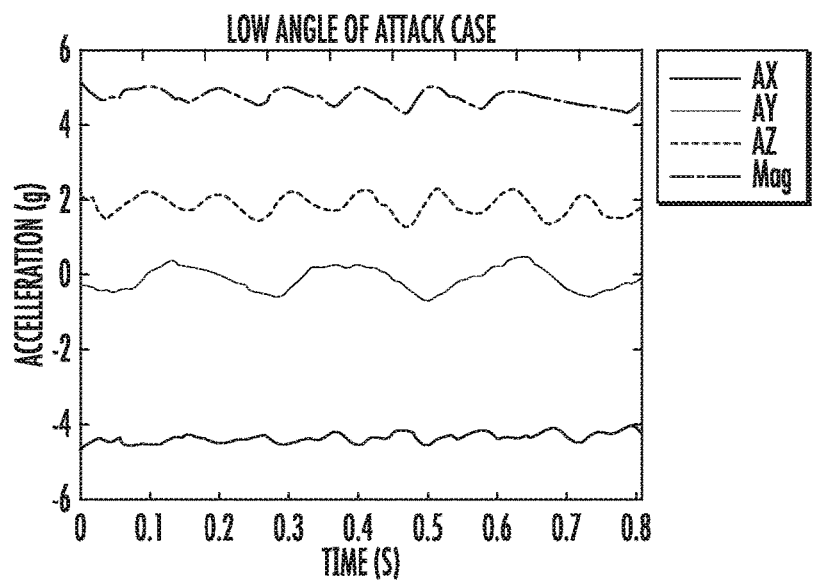

FIG. 97B is a graphical representation of acceleration over time of a football traveling at a low angle of attack.

Figure 97C:
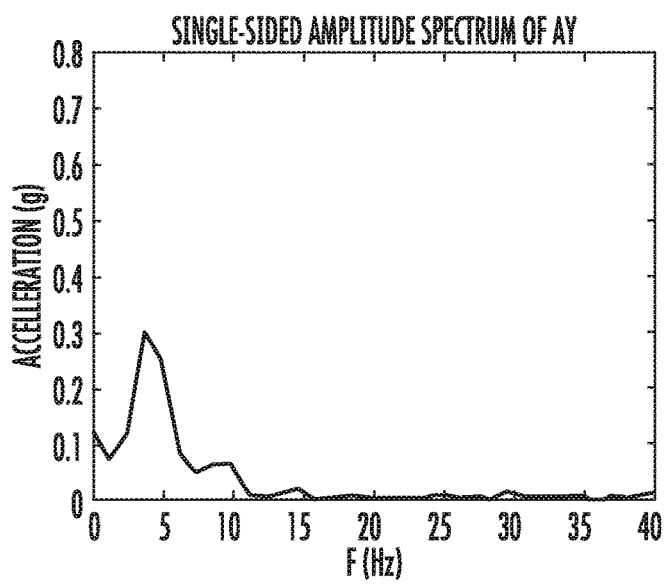

FIG. 97C is a graphical representation of acceleration and frequency of a single-sided amplitude spectrum of acceleration with respect to a y-axis of the football traveling at a low angle of attack.

Figure 98A:
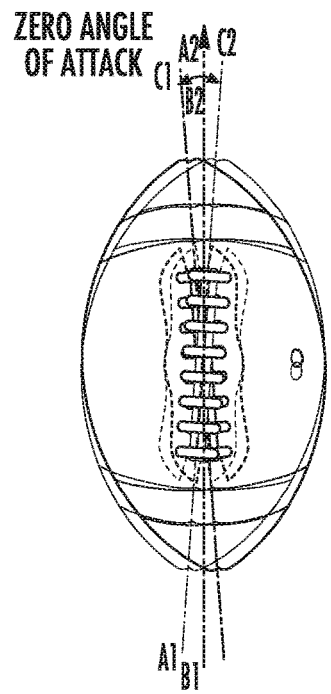

FIG. 98A is a diagram of strings of sensor signals received from the football of system 1660 during a throwing having a high angle of attack.

Figure 98B:
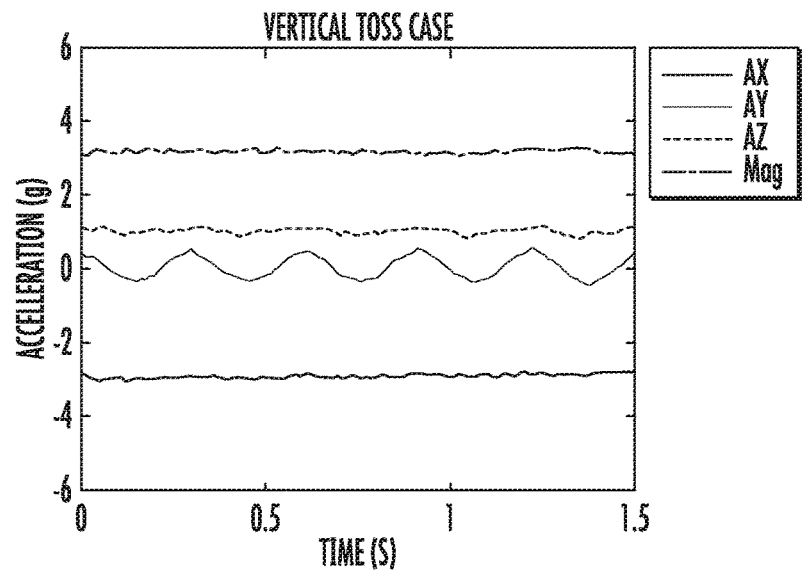

FIG. 98B is a graphical representation of acceleration over time of a football traveling at a zero angle of attack in a vertical toss.

Figure 98C:
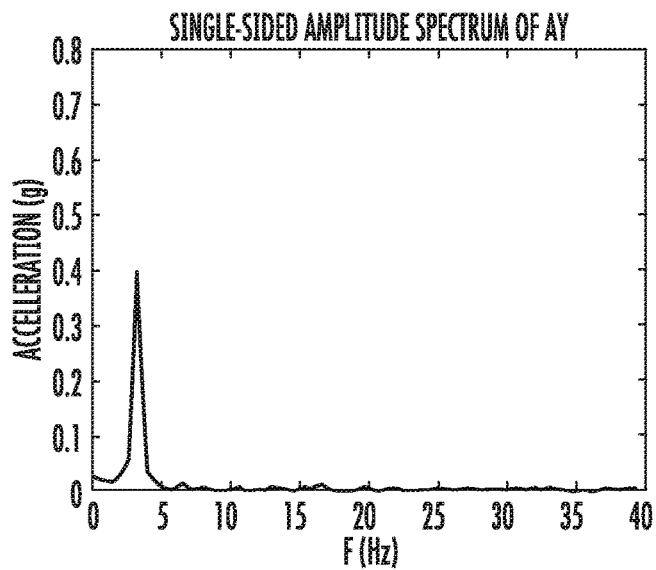

FIG. 98C is a graphical representation of acceleration and frequency of a single-sided amplitude spectrum of acceleration with respect to a y-axis of the football traveling at a zero angle of attack.

Figure 99:
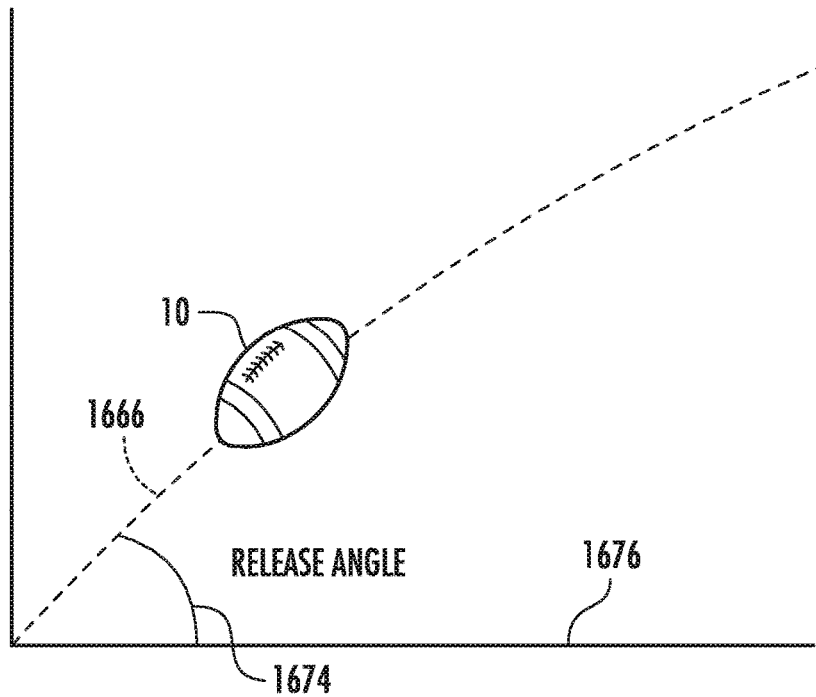

FIG. 99 is a diagram illustrating an example release angle of football in-flight.

Figure 100C:
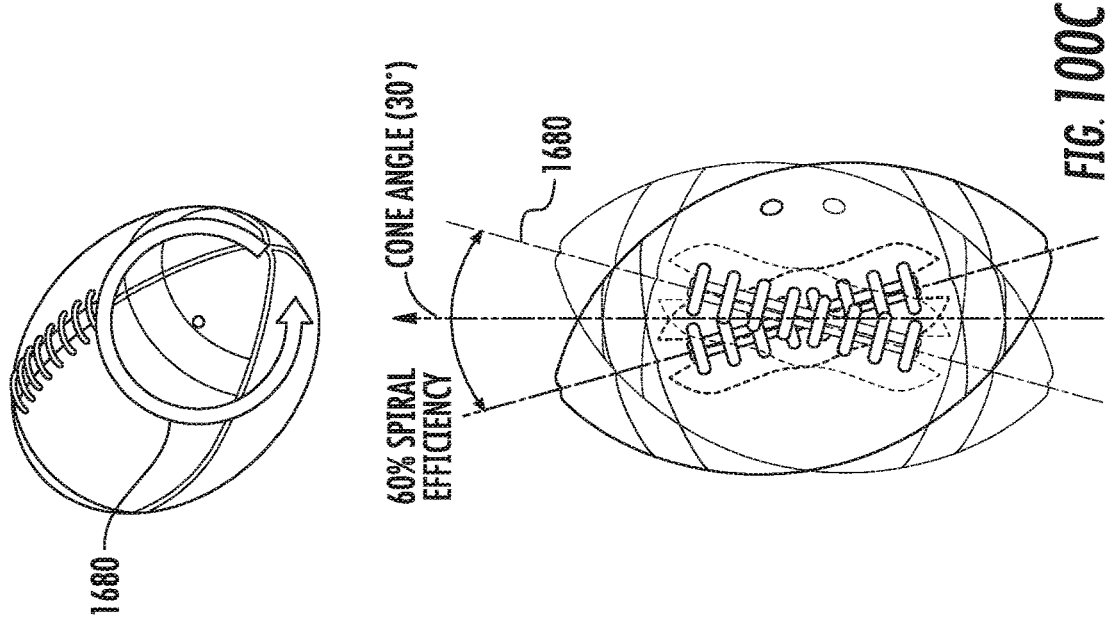
Figure 100B:
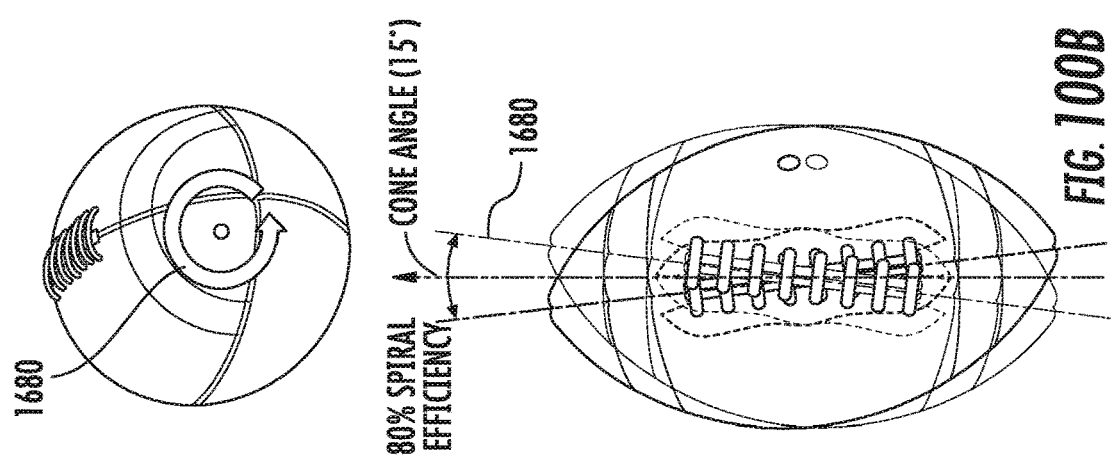
Figure 100A:
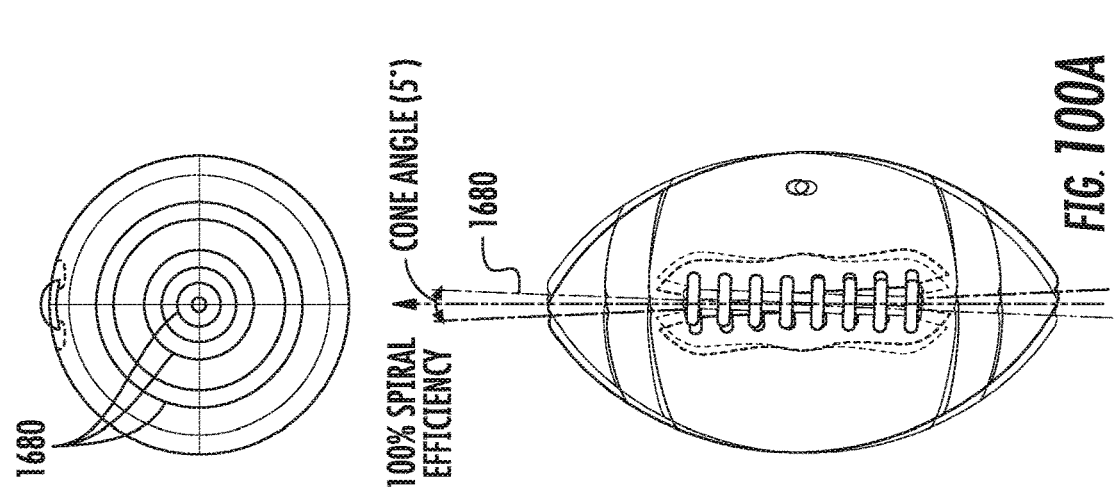

FIGS. 100A through 100C are diagrams illustrating examples of a football in-flight with: a 100 percent spiral efficiency and a low cone angle; an 80 percent spiral efficiency and an intermediate cone angle; and a 60 percent spiral efficiency and a high cone angle, respectively.

Figure 101:
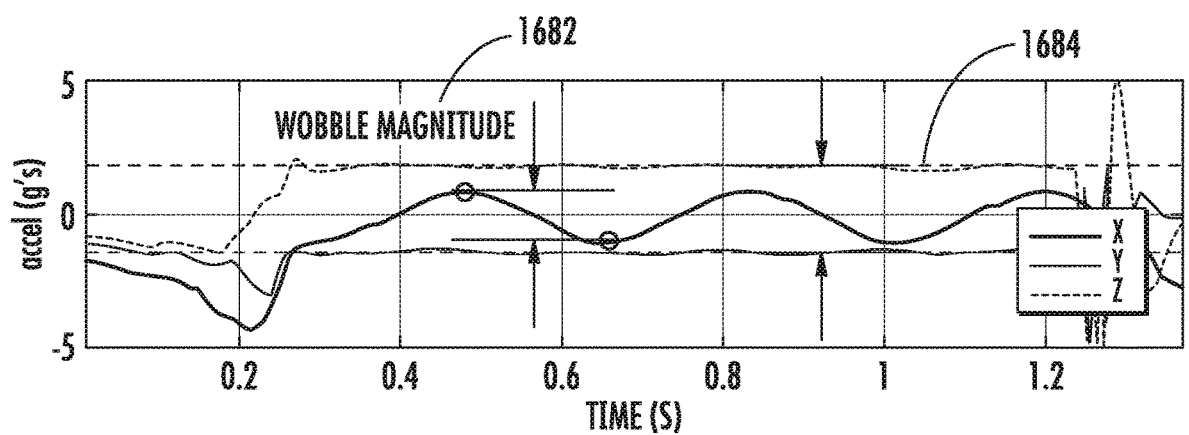

FIG. 101 is a diagram of strings of sensor signals received from the football of system 1660 during flight of the football, wherein such signals are used by system 1660 to determine the cone angle of the ball in flight.

Figure 102:
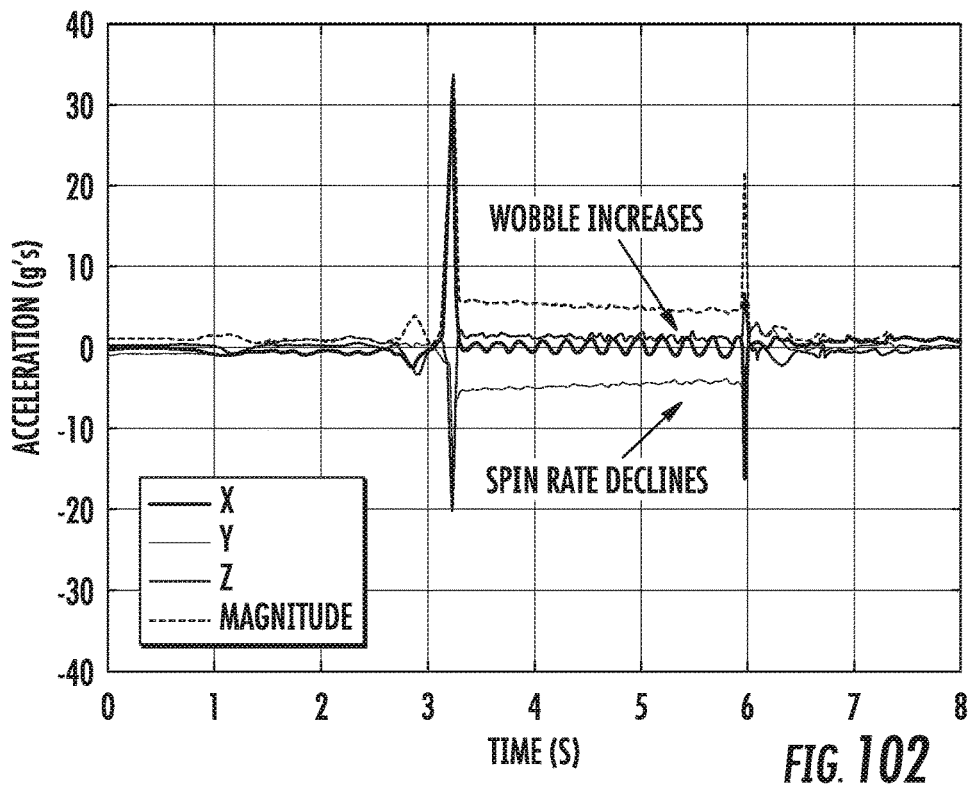

FIG. 102 is a diagram of strings of sensor signals received from the football of system 1660 during flight of the football, wherein such signals are used by system 1660 to identify spiral decay.

Figure 103:
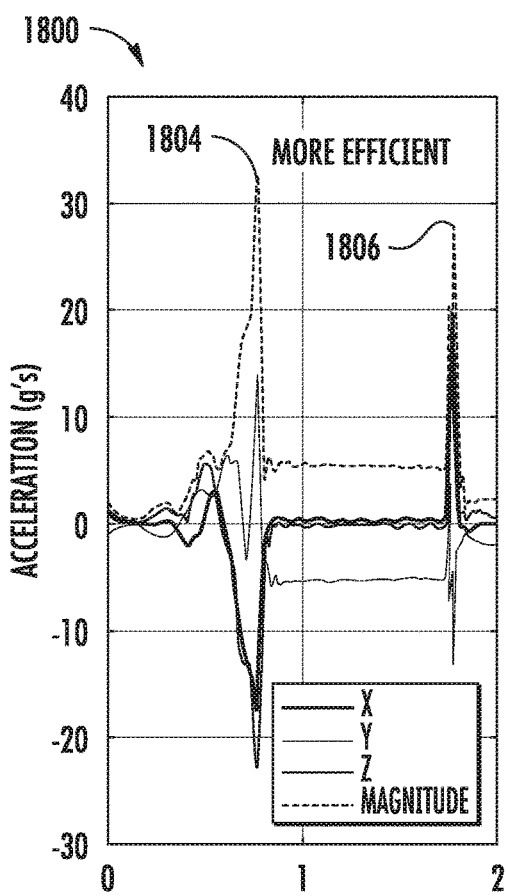

FIG. 103 is a diagram of strings of sensor signals received from the football of system 1660 associated with a first more efficient throw of the football.

Figure 104:
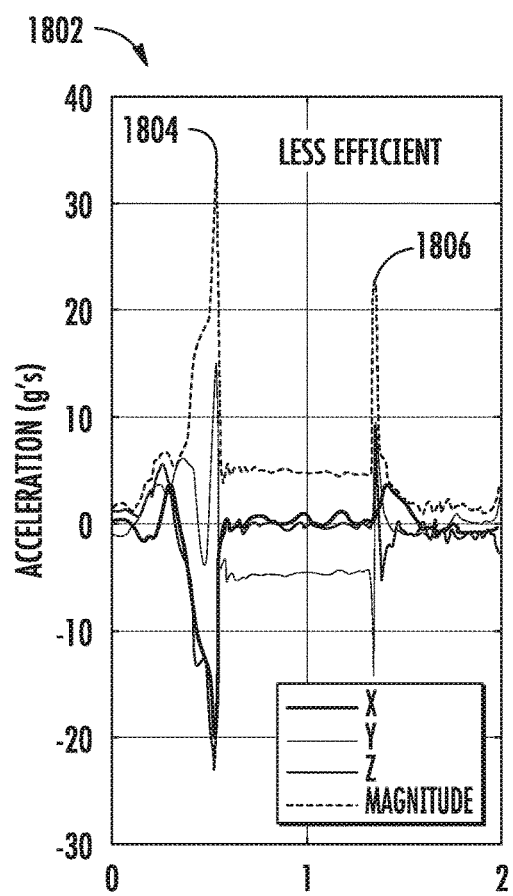

FIG. 104 is a diagram of strings of sensor signals received from the football of system 1660 associated with a second less efficient throw of the football.

Figure 105:
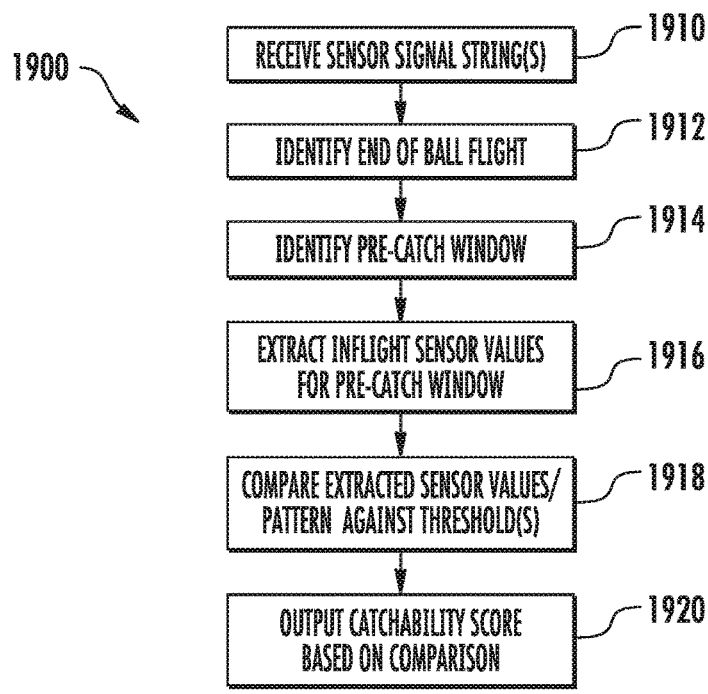

FIG. 105 is a flow diagram of an example method for identifying a catchability of a ball in flight.

Figures 106, 107:
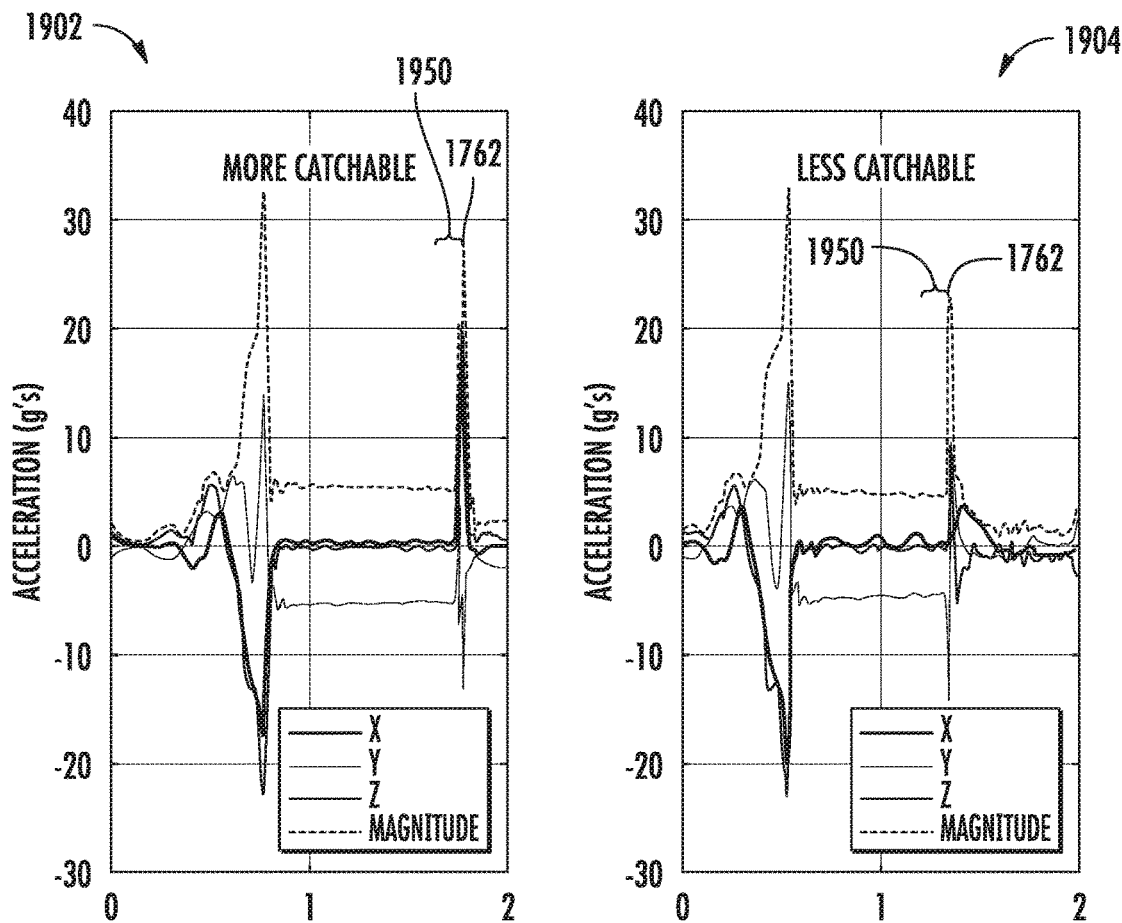

FIG. 106 is a diagram of strings of sensor signals received from the football of system 1660 and associated with a more catchable football.

FIG. 107 is a diagram of strings of sensor signals received from the football of system 1660 and associated with a less catchable football.

Figure 108:
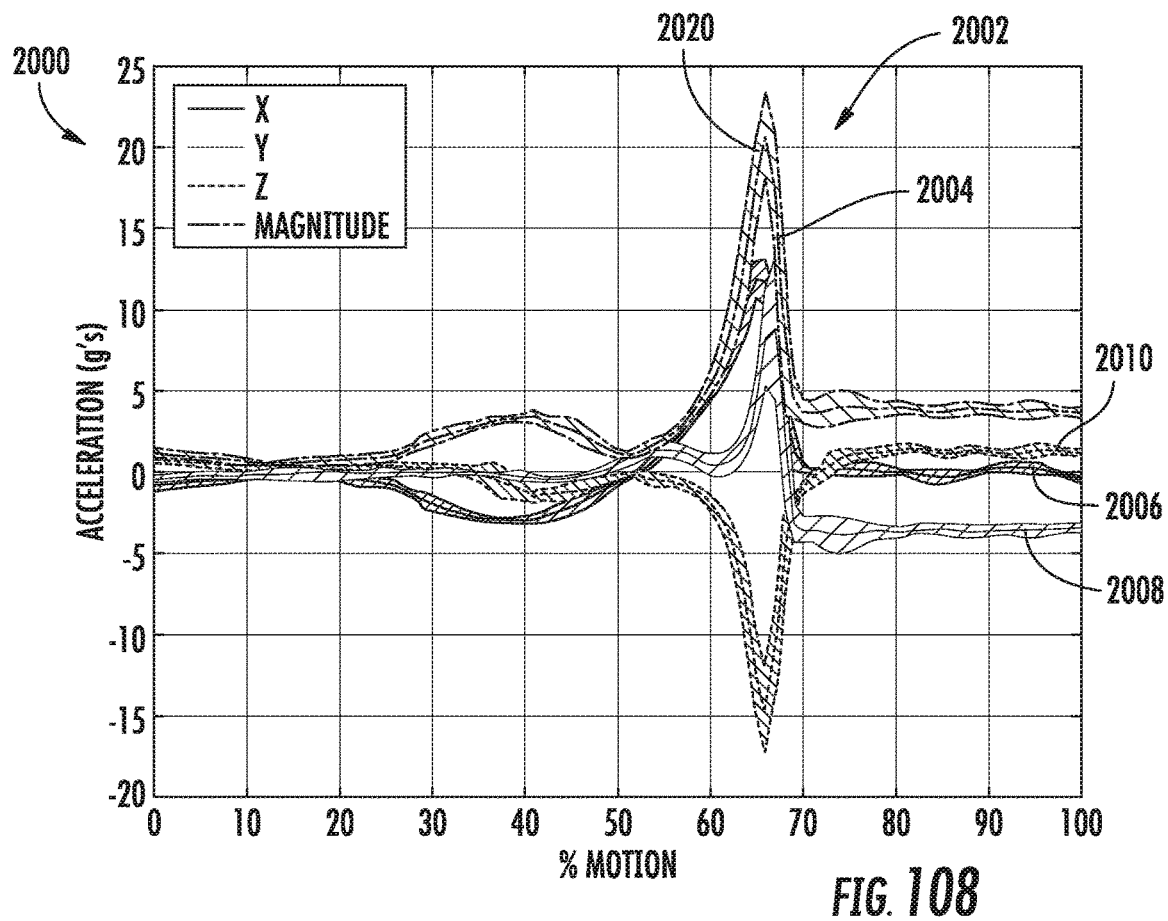

FIG. 108 is a diagram of a statistical variability for different strings of sensor signals for motion of the football by a football player over a period of time.

Figure 109:
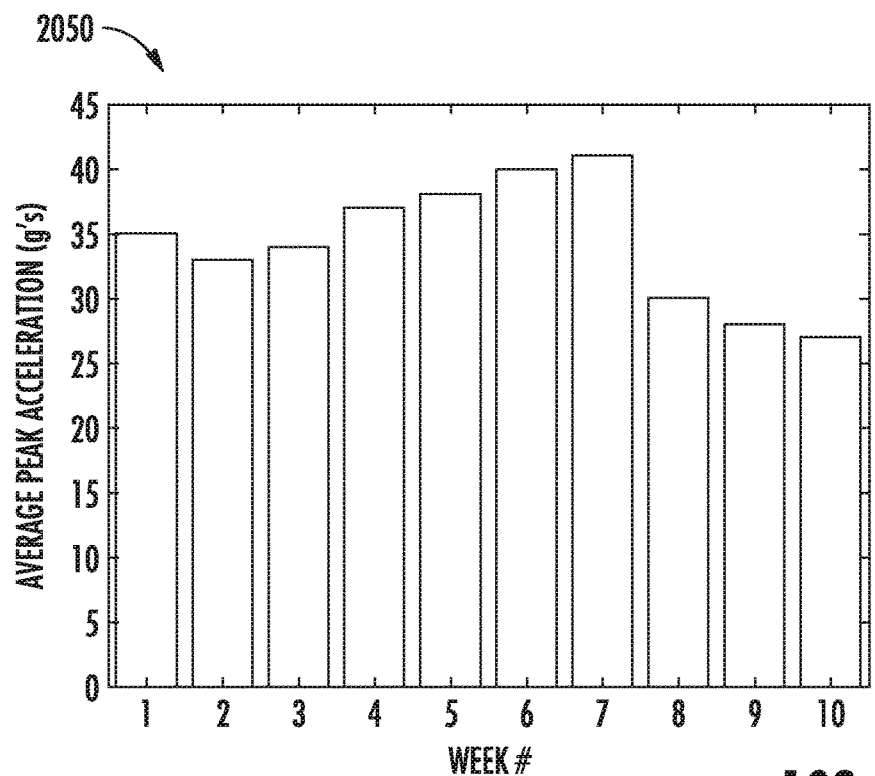

FIG. 109 is a diagram illustrating a an average of peak acceleration for the magnitude of strings of sensor signals received from the football of system 1660 over time for an individual football player.

Figure 110:
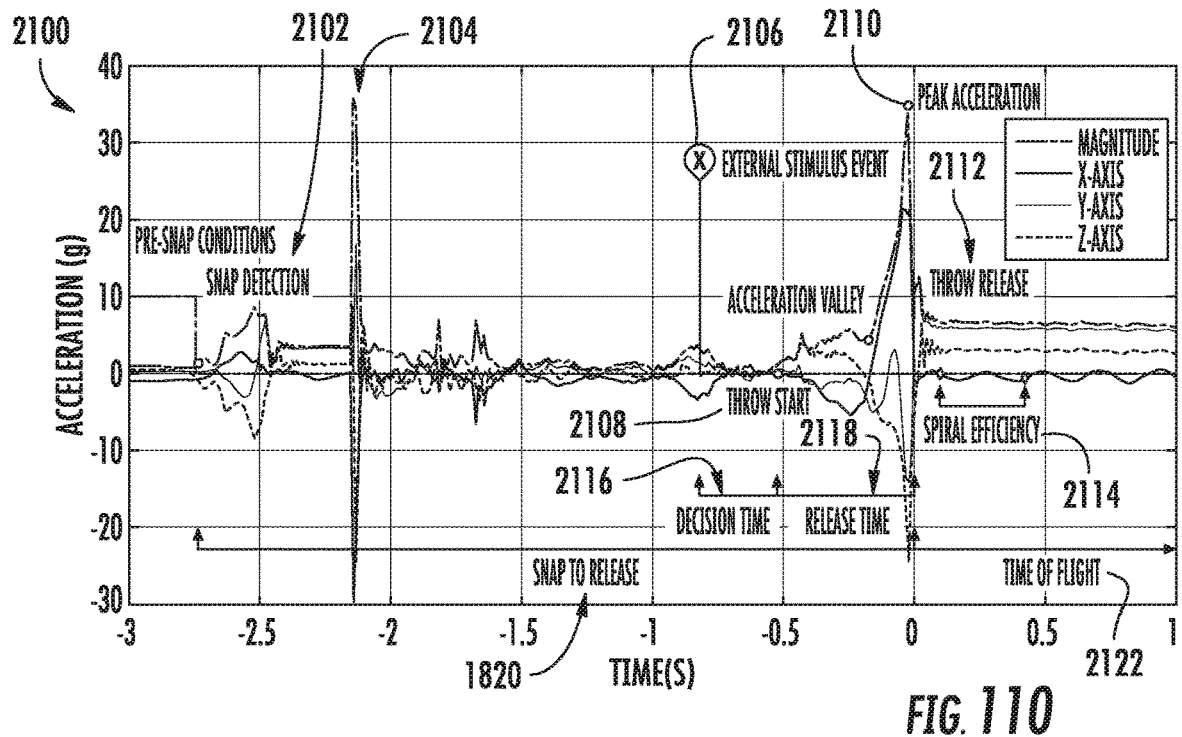

FIG. 110 is a diagram of strings of sensor signals received from the football of system 1660 during which an external stimulus is applied.

Figure 111:
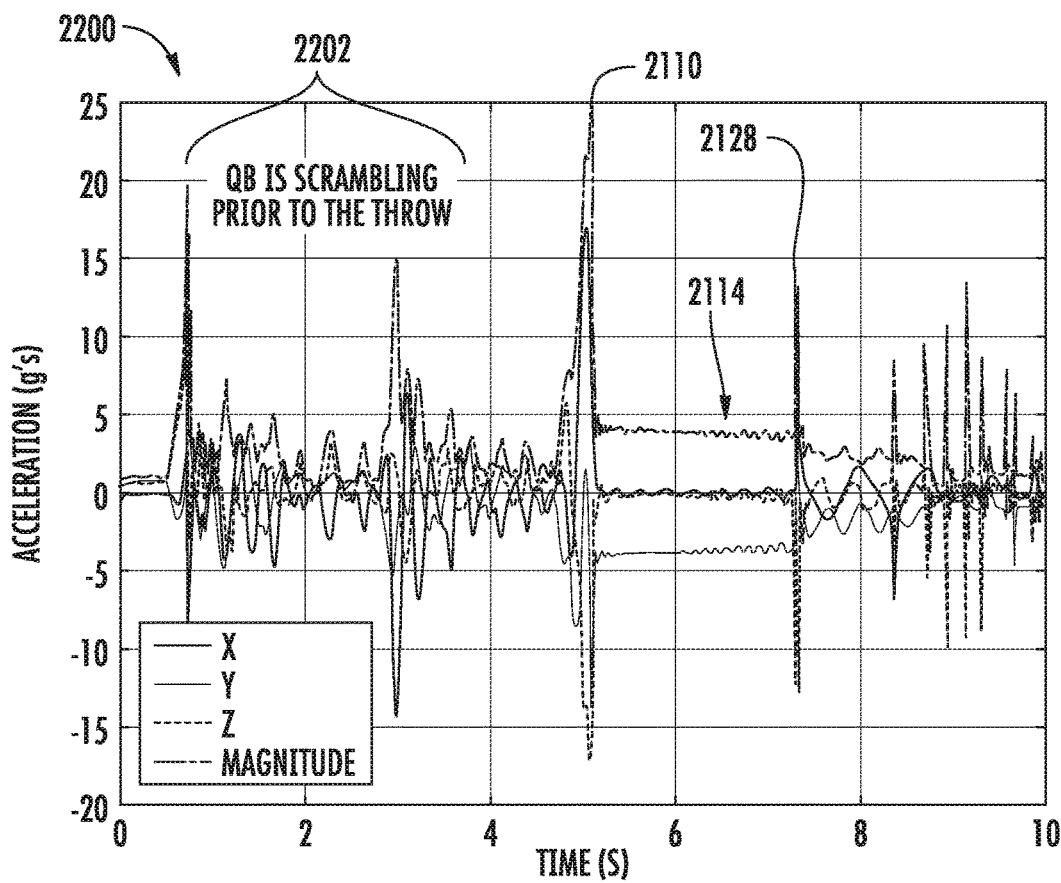

FIG. 111 is a diagram of strings of sensor signals received from the football of system 1660, illustrating scrambling of a quarterback prior to a throw of the football.

Figure 112:
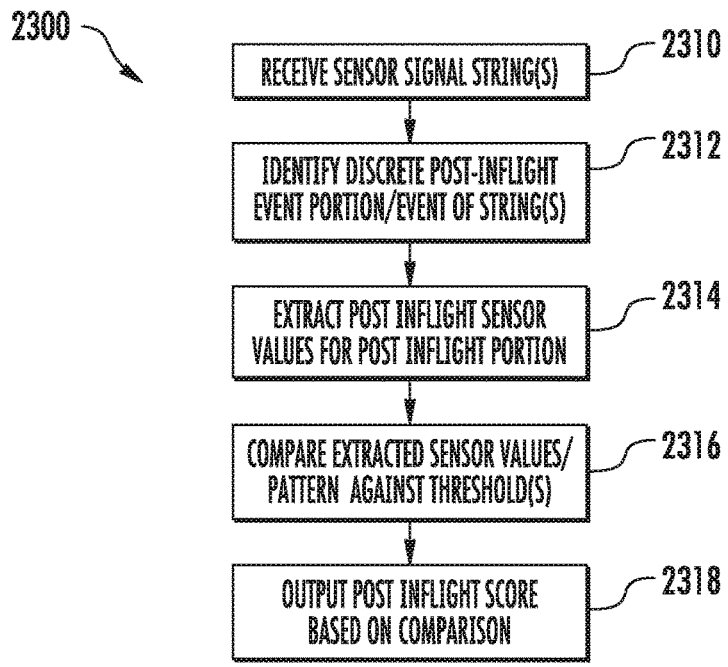

FIG. 112 is a flow diagram of an example method for evaluating post in-flight events based upon strings of sensor signals received from a football.

Figures 113, 114:
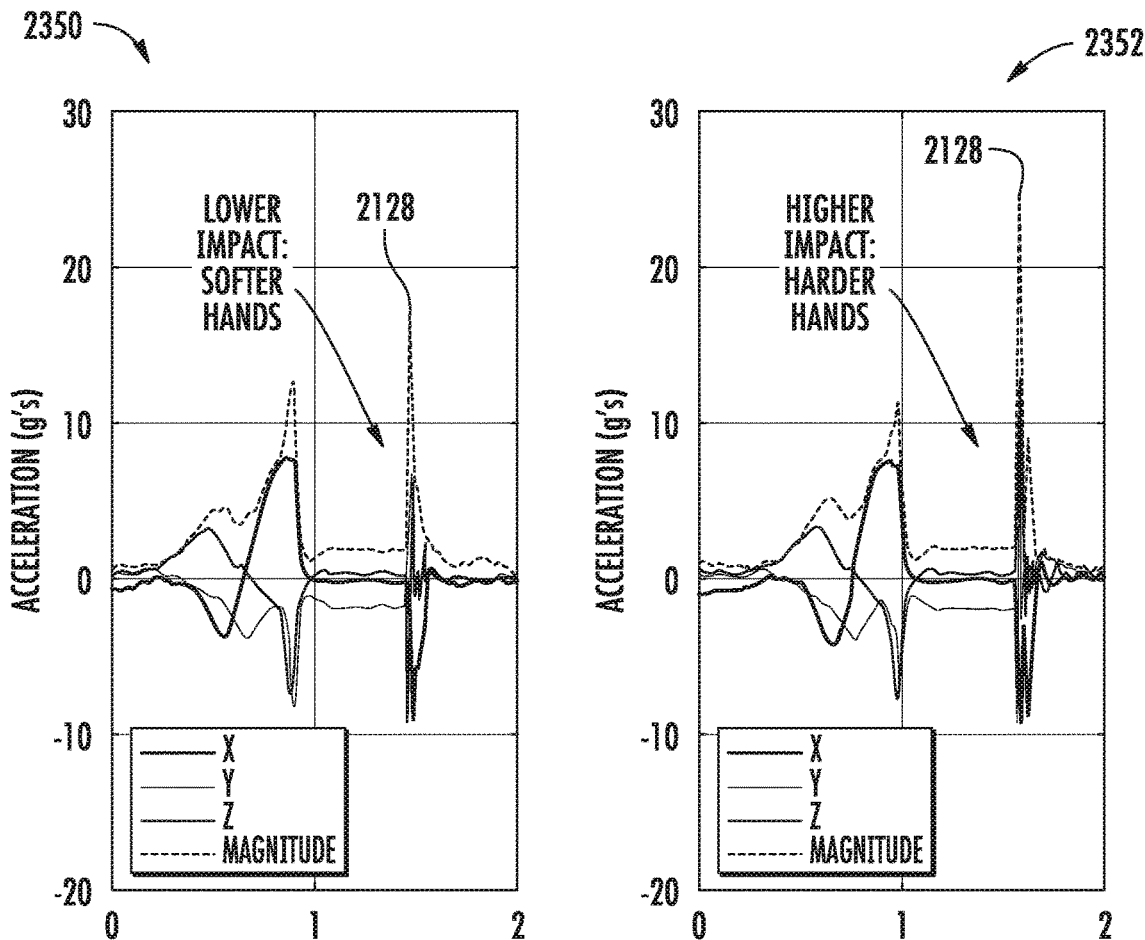

FIG. 113 is a diagram of strings of sensor signals received from the football of system 1660 corresponding to a first catch quality.

FIG. 114 is a diagram of strings of sensor signals received from the football of system 1660 corresponding to a second catch quality.

Figure 115:
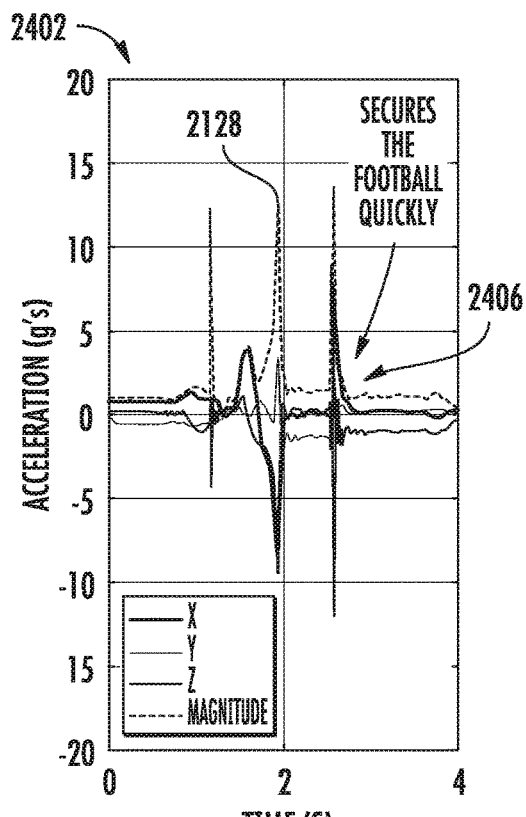

FIG. 115 is a diagram of strings of sensor signals received from the football of system 1660 corresponding to a first time for securing the football following a catch.

Figure 116:
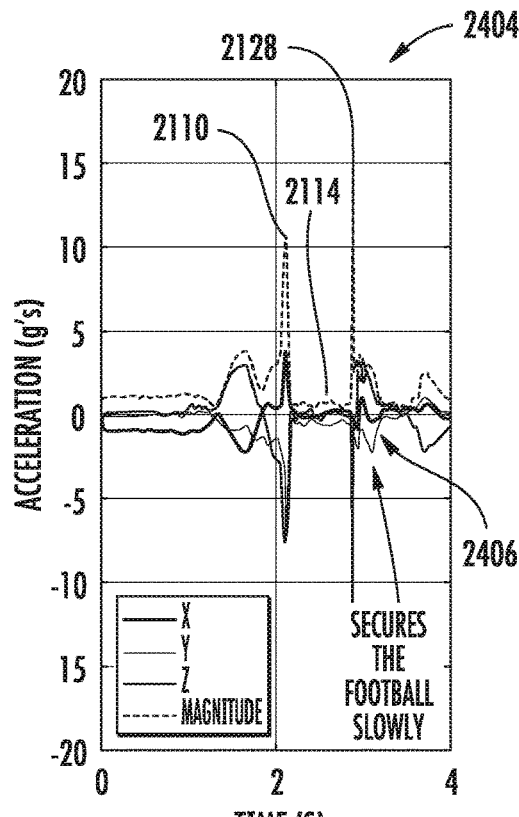

FIG. 116 is a diagram of strings of sensor signals received from the football of system 1660 corresponding to a second time for securing the football following a catch.

Figure 117:
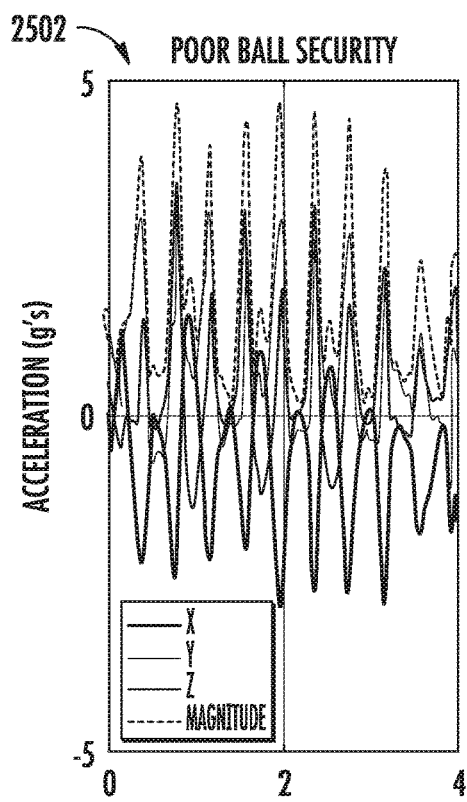

FIG. 117 is a diagram of strings of sensor signals received from the football of system 1660 corresponding to a first level of ball security for the football.

Figure 118:
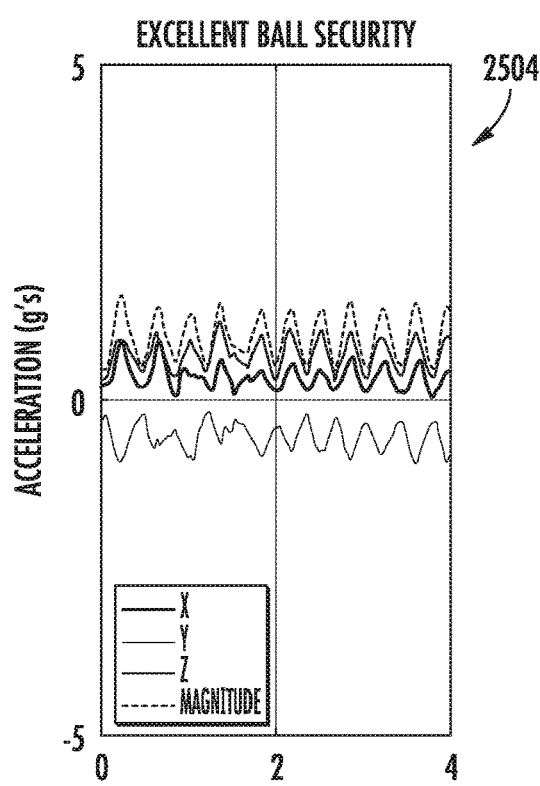

FIG. 118 is a diagram of strings of sensor signals received from the football of system 1660 corresponding to a second level of ball security for the football.

Figure 119:
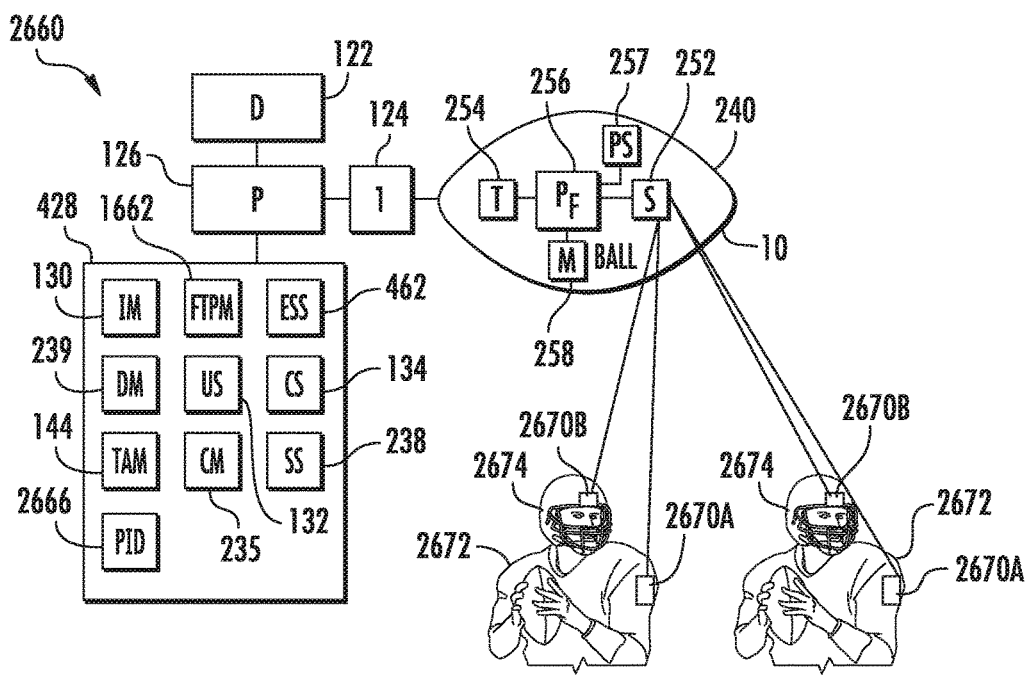

FIG. 119 schematic diagram of another example sports evaluation system.

Figure 120:
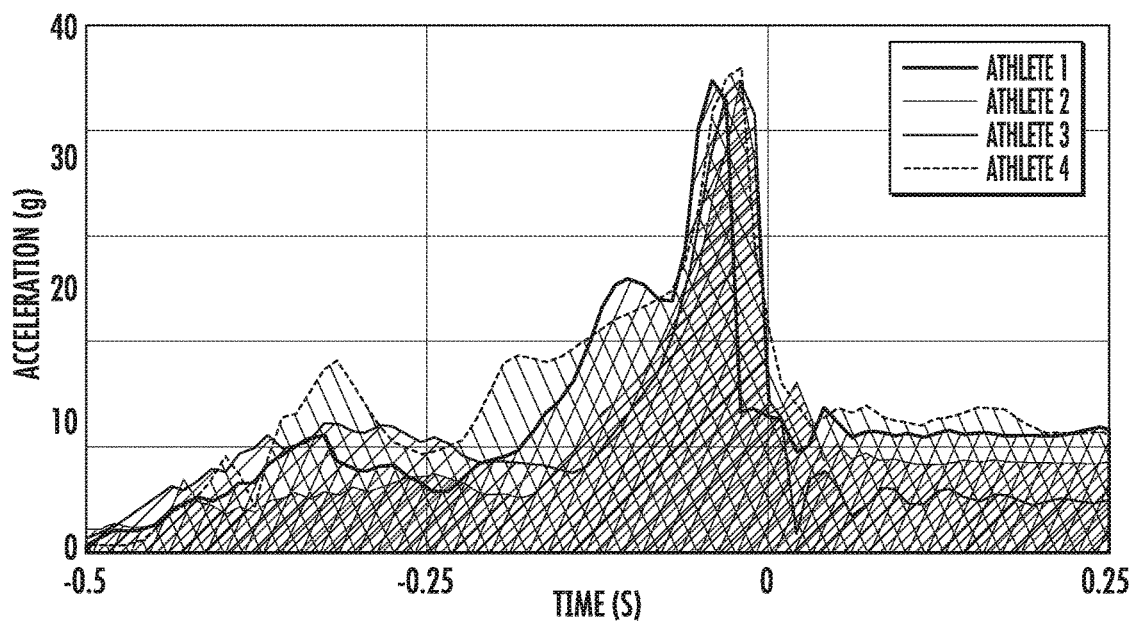

FIG. 120 is a diagram of different signature throwing motion profiles for different athletes/quarterbacks, wherein the different throwing motion profiles are recorded and used by system 2660 to assign accelerometer signal analysis results to athletes/quarterbacks.

DETAILED DESCRIPTION

Figure 1:
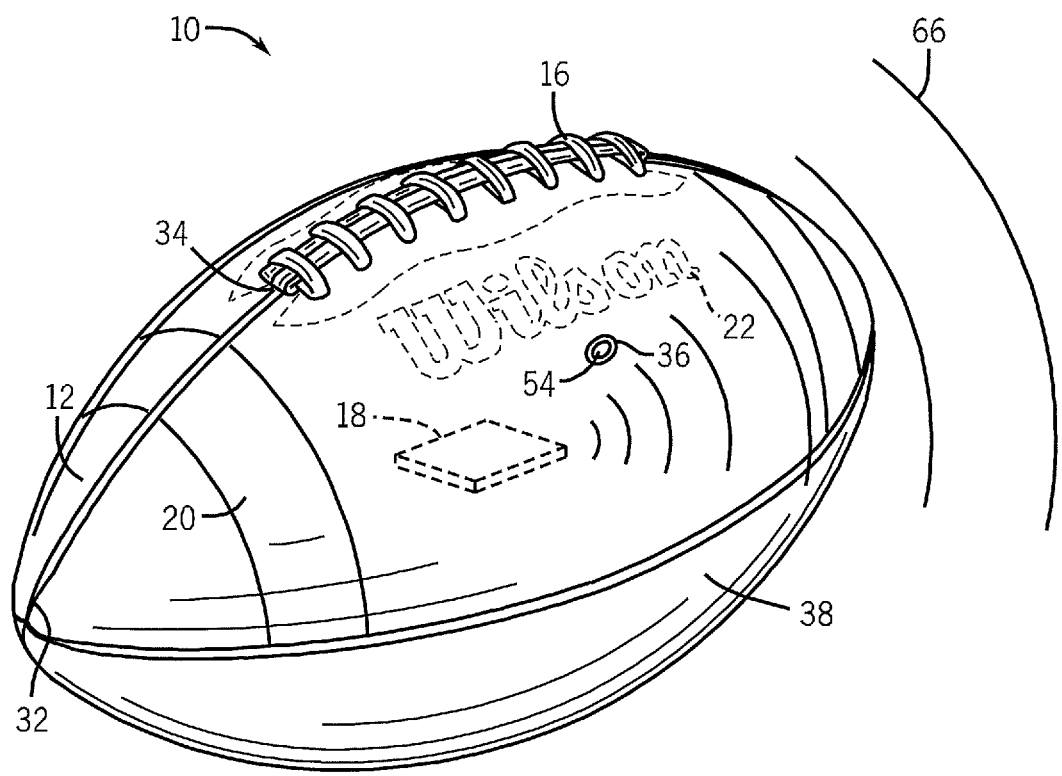
FIG. 1 is a side perspective view of an American football in accordance with a preferred embodiment of the present invention.

Referring to FIG. 1, an American football is indicated generally at 10. The football 10 is one example of an inflatable game ball. The present invention is primarily directed toward American footballs, and many features are unique to American footballs. However, other aspects and features of the present invention are applicable to other sports games, such as, for example, basketballs, volleyballs, soccer balls, baseballs, softballs, lacrosse balls and rugby balls.

The football 10 is a generally prolate spheroidal shaped inflatable object having a major longitudinal dimension and a minor transverse dimension. The football 10 is configured to be grasped, thrown, caught, kicked, and carried by a player during use. The football 10 includes, a cover 12, a bladder 14 (FIG. 2), a lacing 16, and an electronic circuit 18. In some embodiments, the football 10 can also include a plurality of stripes 20 and one or more logos 22.

Figure 2:
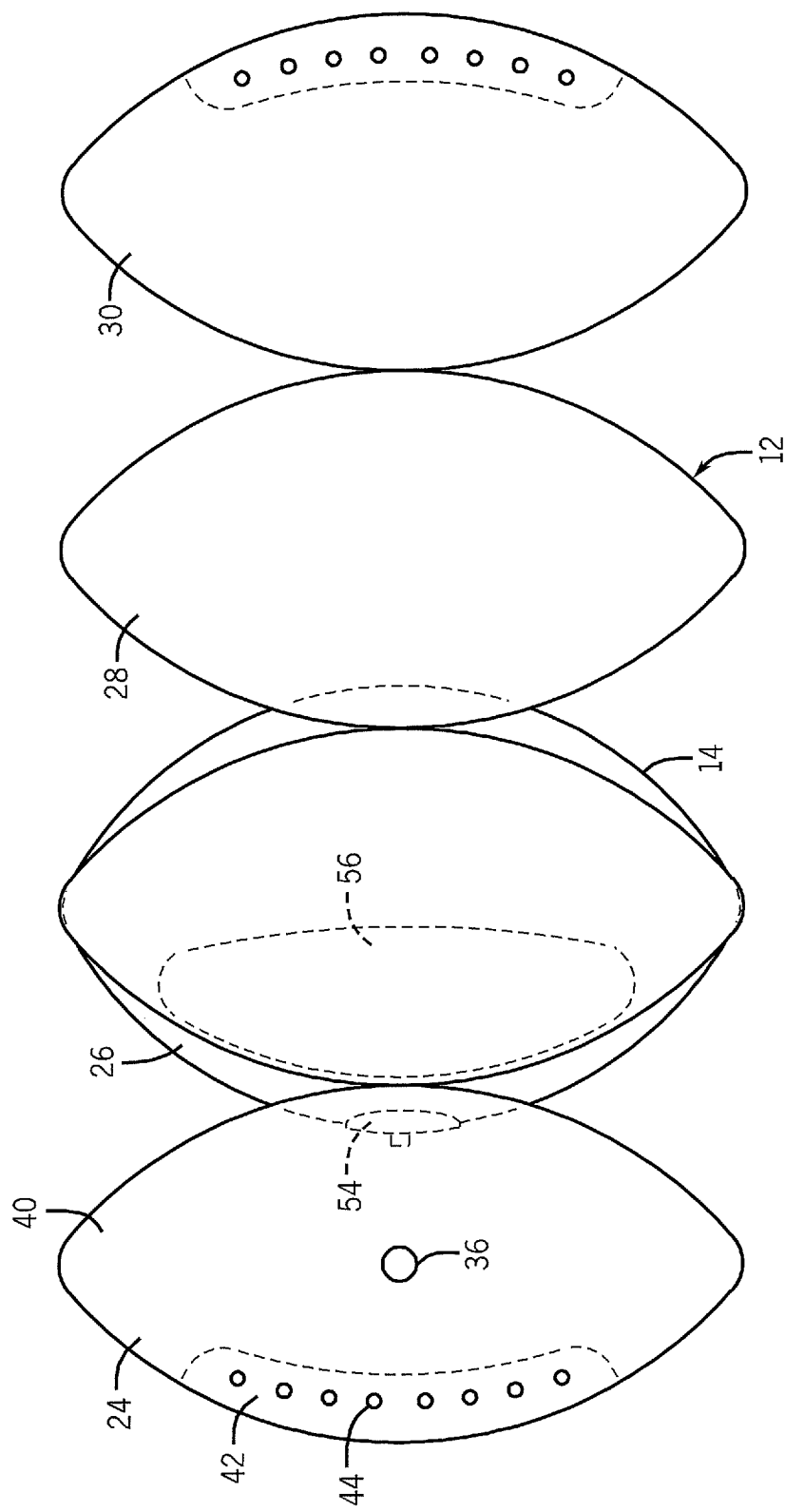
FIG. 2 is a top view of the football of FIG. 1 having four cover panels uncovered from a bladder of the football.
Figure 6:
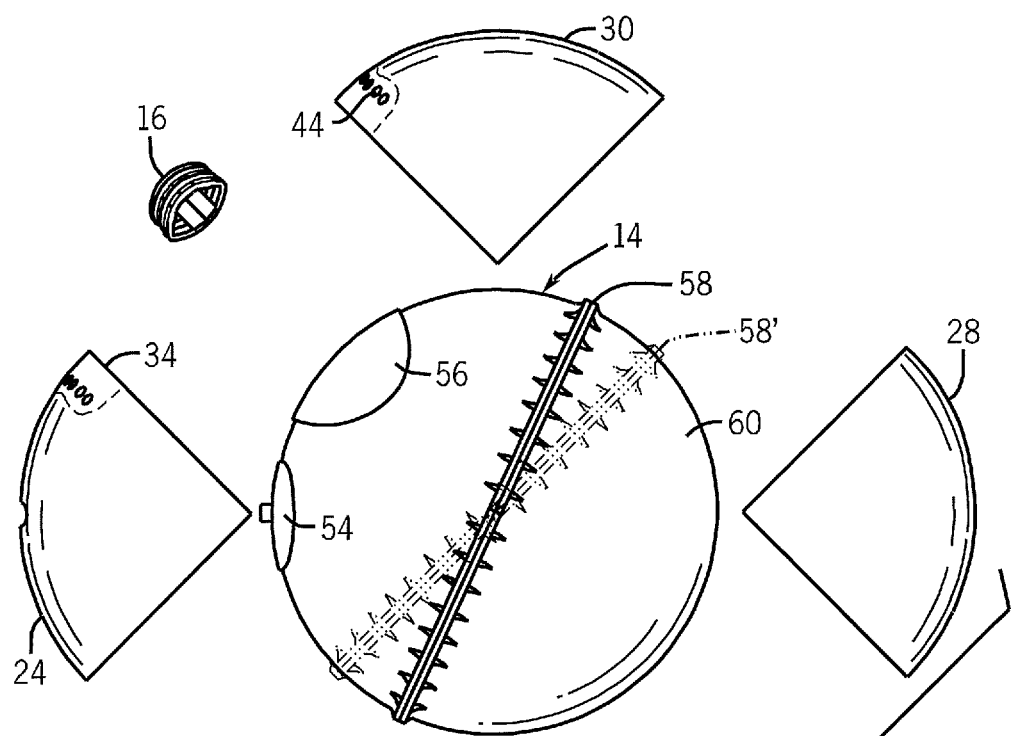
FIG. 6 is an exploded end view of the football of FIG. 1.

Referring to FIGS. 1, 2 and 6, the cover 12 is a prolate spheroidal shaped outer body preferably formed from first, second, third and fourth cover panels 24, 26, 28 and 30 that are joined to one another along generally longitudinally extending seams 32. The panels 24-30 are preferably stitched to each other. In alternative embodiments, the panels can be bonded, fused, stapled or otherwise fastened together with or without stitching. The longitudinal seam 32 connecting the first and fourth cover panels 24 and 30 includes a longitudinally extending slot 34. The slot 34 provides an opening for inserting the bladder 14 and, if applicable, other layers of material that may be applied over the bladder. The first cover panel 24 includes a valve aperture 36. The cover 12 provides the football 10 with a durable and grippable outer surface. An outer surface of the cover 12 preferably includes a pebbled texture for enhancing the grip and improving the aesthetics of the football 10. In alternative preferred embodiments, the cover 12 can be formed of a single piece or of two, three, five or other numbers of cover panels.

Figure 7A:
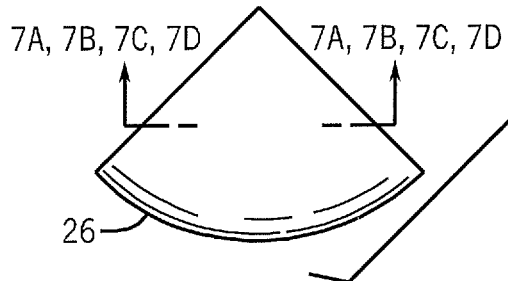
FIG. 7A is a cross-sectional view of a portion of the cover of the football taken about line 7A-7A of FIG. 6.

Referring to FIGS. 6 and 7A, one preferred embodiment of the construction of the cover panel 26 is shown. The cover panel 26 along with cover panels 24, 28 and 30 substantially enclose and protect the bladder 14. In a preferred embodiment, the cover panel 26 includes an outermost layer 38 that is formed of a durable, highly grippable material, such as, for example, a natural leather. Alternatively, the outermost layer 38 can be formed of other materials, such as, polyurethane, a synthetic leather, rubber, pigskin, other synthetic polymeric materials and/or combinations thereof. A lining 40 is applied via an adhesive to the inner surface of the outermost layer 38. Alternatively, the lining 40 can be bonded, cured, stitched sewn, press-fit, and/or fastened to the outermost layer 38. In still other embodiments, the lining can be a separate layer unattached to the outermost layer. The lining 40 is a layer of tough, durable material that increases the strength and durability of the football 10. The lining 40 is preferably formed of one or more layers of woven fabric and one or more layers of polyvinylchloride that are cured together to form an impregnated fabric layer. Alternatively, the lining can be formed of unwoven fabric, layers of fibers, rubber, a latex, ethyl vinyl acetate (eva), other polymeric elastomeric materials and/or combinations thereof. The lining 40 enables the football 10 to retain its desired shape and firmness. Referring to FIG. 2, the cover panels 24 and 30 preferably also include a reinforcing panel 42 at the laced region of the football 10 for providing further strength and structural integrity to the laced region of the football 10. The reinforcing panel 42 is preferably formed of the same material as the lining 40. Alternatively, other lining materials can also be used. Lace holes 44 are formed in the cover panels 24 and 30 at the reinforcing panels 42.

Figure 7B:
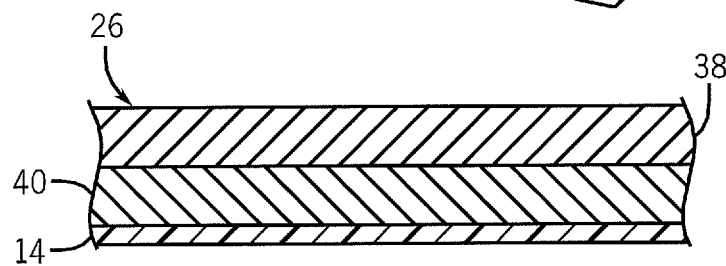
FIG. 7B is a cross-sectional view of a portion of the cover of the football taken about line 7B-7B of FIG. 6 in accordance with an alternative preferred embodiment of the present invention.
Figure 7C:
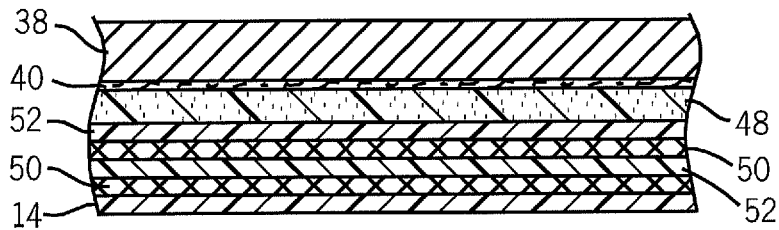
FIG. 7C is a cross-sectional view of a portion of the cover of the football taken about line 7C-7C of FIG. 6 in accordance with an alternative preferred embodiment of the present invention.
Figure 7D:
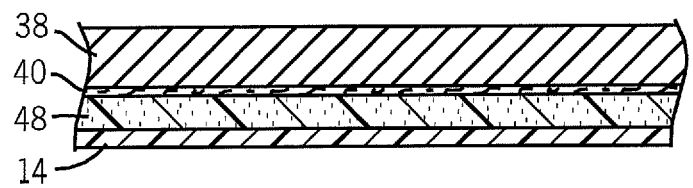
FIG. 7D is a cross-sectional view of a portion of the cover of the football taken about line 7D-7D of FIG. 6 in accordance with an alternative preferred embodiment of the present invention.

In alternative preferred embodiments, the cover 12 can have alternate constructions and one or more of layers of different materials can be formed over the bladder 14 beneath the cover 12. Referring to FIGS. 7B through 7D, alternative constructions of the cover 12 and additional layers of the football 10 are shown. In FIG. 7B, the cover 12 is a multilayered structure including a layer of windings 46 applied over the bladder 14 and a layer of padding 48 such as a sponge rubber layer formed over the layer of windings 46. Alternatively, other types or layers of padding materials can be used such as foams, sponges, and/or fibrous materials. The lining 40 can be formed of varying thicknesses or removed entirely. In FIG. 7C, fabric layers 50 are sandwiched with layers of rubber 52 to form a lining layer positioned over the bladder 14. A layer of padding 48 can be positioned over the layers 50 and 52 and beneath the outermost layer 38 and optionally a liner 40. In FIG. 7D, yet another construction is shown with a layer of padding 48 applied over the bladder 14 with lining 40 and the outermost layer 38 positioned over the layer of padding 48. Accordingly, the present invention contemplates the construction of the football 10 surrounding the bladder 14 taking the form of any combination of an outermost layer, a lining, one or more layers of padding, a winding layer, one or more fabric layers and one or more layers of elastomeric material.

Referring to FIGS. 1 and 2, the lacing 16 is used to further connect the cover panels 24 and 30 and to close the slot 34. The lacing 16 extends through the lace holes 44 of the cover panels 24 and 30. The lacing 16 also provides raised surfaces for a player to contact when passing, catching or holding onto the football 10.

Figure 3:
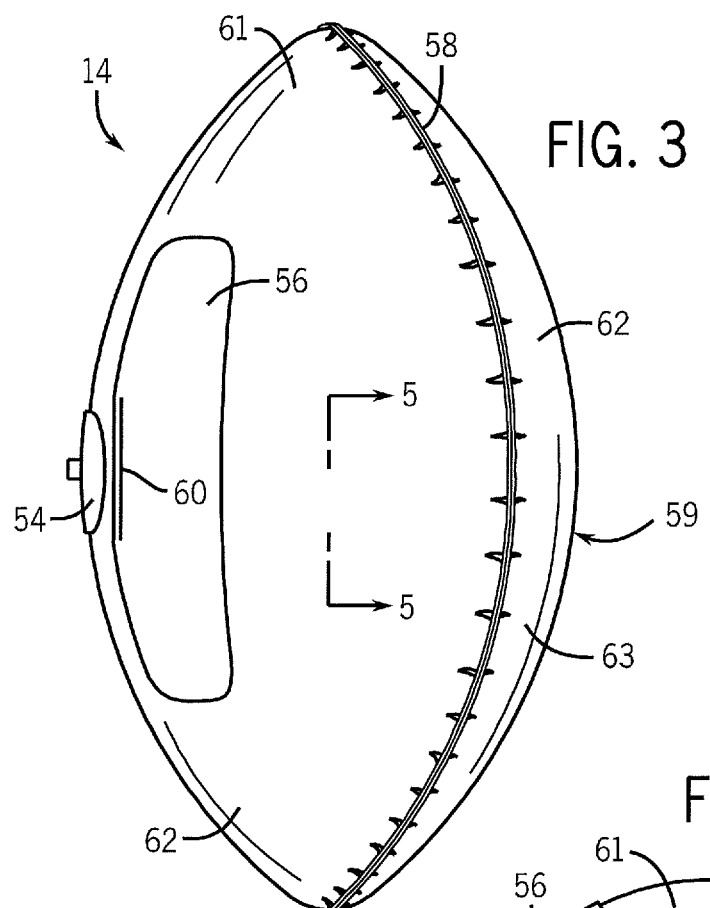
FIG. 3 is a side view of a bladder of the football of FIG. 1.
Figure 4:
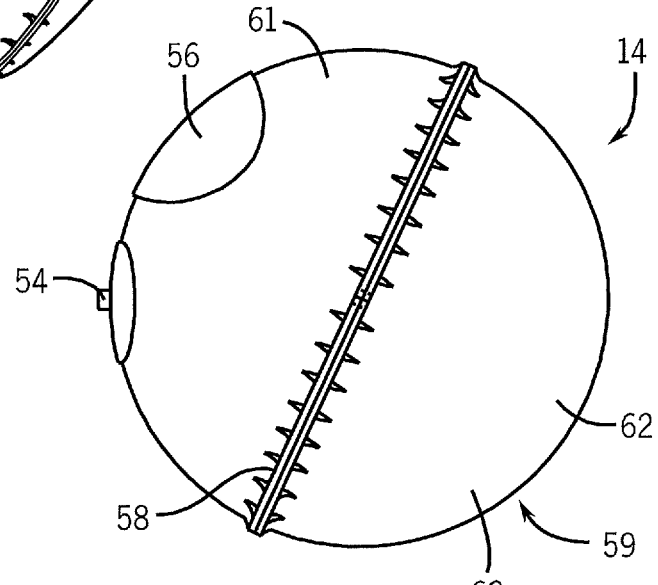
FIG. 4 is an end view of the bladder of FIG. 3.

Referring to FIGS. 2 through 4, the bladder 14 is an inflatable air tube preferably having a generally prolate spheroidal shape. The bladder 14 is inserted into the cover 12 through the slot 34. Alternatively, the cover 12, and other layers as applicable, can be formed over, positioned over or applied to the bladder. The bladder 14 receives and retains compressed air through a valve assembly 54 mounted to the bladder 14. The valve assembly 54 is configured to allow air to enter the bladder through use of an inflation needle (not shown) and, when removed, retain the air within the bladder 14. A portion of the valve assembly 54 is configured to extend into the valve aperture 36, which serves to orientate the bladder 14 with respect to the cover 12. In this manner, the position of the bladder 14 within the football 10 can be determined. The bladder 14 preferably includes a flap 56 positioned beneath the location of the lacing 16 for further protecting the bladder 14 from the lacing 16. The flap 56 is formed of a flexible material, preferably a vinyl. At least one edge 60 of the flap 56 is bonded to the bladder 14 through radio frequency (RF) welding. Alternatively, the flap can be formed of other materials, such as, for example, a urethane, a neoprene, a thermoplastic, a fabric, rubber, eva, leather, a foam layer, other polymeric material, or combinations thereof. In alternative preferred embodiments, the flap can be attached to the inner surface of the cover or another intermediate layer overlying the bladder. In another preferred embodiment, the football can be formed without the flap.

Referring to FIGS. 3 through 6, the bladder 14 is preferably formed of two multilayer sheets 62 of flexible, airtight material that are bonded to each other to form a bladder seam 58 through RF welding. The bladder seam 58 formed by the two sheets 62 defines an expandable cavity within the bladder 14. Alternatively, other means for forming an airtight bond between the two sheets 62 of material can also be used, including, for example, thermally bonded, chemical bonding, adhesive bonding, stitching, press-fitting, clamping and combinations thereof. The sheets 62 can also be referred to as walls, or side walls of the bladder, such as first and second side walls 61 and 63. The bladder seam 58 preferably extends generally longitudinally about the football 10. In alternative embodiments, the bladder seam 58 can be one or more seams extending longitudinally, laterally, in a helical manner or other path about the bladder 14. In another preferred embodiments, the bladder can be seamless and formed of a single or multi-layer sheet of material. The bladder 14 is preferably formed of a polyester urethane or an ether urethane, but can also be formed of other materials including other urethanes, other polymeric materials, rubber, vinyl, eva and combinations thereof.

Referring to FIG. 6, the location of the bladder seam 58 is also preferably positioned away, or angularly spaced, from the longitudinal seam 32 of the cover 12 with respect to a longitudinal axis 88 of the football 10 so that the seam 32 and the bladder seam 58 do not directly overlay each other. Alternatively, the bladder seam 58' can be rotated such that it is aligned with one or more of the seams 32.

Referring to FIG. 4, the sheets 62 of the bladder 14 are advantageously positioned such that the generally, longitudinally extending bladder seam 58 is positioned such that the bladder seam 58 does not interfere with a typical punt or kick-off of the football 10. The bladder seam 58 is preferably positioned such that it does not interfere with the side of the football opposite of the lacing 16. The flap 56 indicates the location of the lacing 16 over the bladder 14 on the assembled football. Therefore the side of the football 10 opposite the lacing is substantially free from the bladder seam 58. Since punters and kickers typically rotate the football 10 such that the laces are away from the location where the punter or kicker punts or kicks the football, the bladder seam 58 (and the bladder seam 58') is advantageously positioned so as not to extend over an area (kicking/punting region 59) of the football 10 that is likely to be impacted by the foot of the punter or kicker.

Figure 5A:
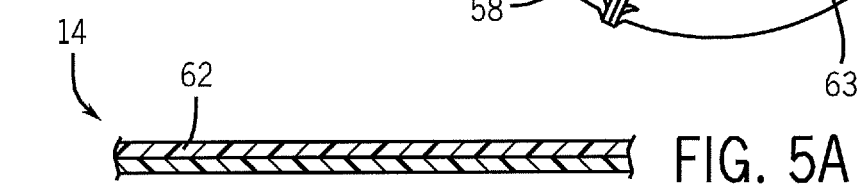
FIG. 5A is a cross-sectional view of the bladder taken about line 5-5 of FIG. 3.
Figure 5B:
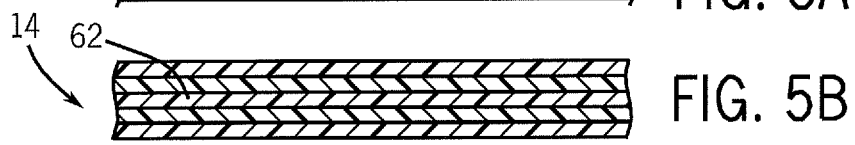
FIG. 5B is a cross-sectional view of the bladder taken about line 5-5 of FIG. 3 in accordance with an alternative preferred embodiment of the present invention.

Referring to FIGS. 5A and 5B, each multi-layer sheet 62 of the bladder 14 is formed of two or more layers of material. In FIG. 5A, the bladder 14 is formed of two layers and in FIG. 5B the bladder is formed of five layers. In other preferred embodiments, the sheet 62 of the bladder 14 can be a single layer or other multilayer combinations.

Referring to FIG. 1, an electronic circuit 18 is shown in association with the football 10. The term "circuit" refers to one or more electronic components. The one or more components can stand alone (such as a battery) or positioned on a substrate, circuit board or within a potting material. The one or more electronic components may represent an entire circuit, a portion of a circuit, an entire system or sub-system or portion thereof. FIGS. 1, and 8 through 26 illustrate various implementations of the present invention in which the electronic circuit 18 is optimally positioned on or within the football 10 to optimize the effectiveness of the electronics and to minimize or eliminate any negative impact the electronics may have on the play, feel and/or performance of the football 10. The positioning of the electronic circuit 18 can also improve the feel, play and/or performance of the football 10. The electronic circuit 18 is a circuit board including one or more electronic circuits and electronic devices. The electronic circuit 18 is configured to actively transmit one or more electronic signals 66 used to indicate the location, movement, speed, acceleration, deceleration, rotation, pressure and/or temperature of the football. Alternatively, the electronic circuit 18 can include a passive circuit that allows for the detection of the location, movement, speed, acceleration, deceleration, rotation and/or temperature of the football to be ascertained when subjected to a magnetic field or other sensing system. In one implementation, the electronic circuit 18 can have a weight of less than 1 ounce, and in another implementation, the weight of the circuit 18 can be less than 0.5 ounce. In other implementations, other weights for the circuit can be used.

FIGS. 8 through 23 illustrate the electronic circuit 18 retained within one or more pockets 64 within or on the bladder 14. The present invention contemplates that alternative means for securing the electronic circuit to or within the bladder can also be employed. In alternative preferred embodiments, the electronic circuit 18 can be bonded, fused, clipped, retained, fastened through hook and loop fasteners, buckles or other fasteners to the bladder.

Referring to FIGS. 8 and 9, one preferred embodiment of the present invention is illustrated. The lacing 16 is shown in silhouette over the flap 56 to indicate the position of the lacing 16 on the football 10. The electronic circuit 18 is positioned in the pocket 64 formed by the multi-layer sheet 62 of the bladder 14 or applied to the bladder 14. The pocket 64 is preferably formed at a location that is symmetrical with the valve assembly 54. In particular, the pocket 64 and the valve assembly 54 are symmetrically positioned or substantially equidistant from a longitudinally extending first plane 70. The first plane 70 extends through the longitudinal center of the lacing 16 and the longitudinal axis 88 such that the pocket 64 and the electronic circuit 18 are balanced about, or symmetrical about, the plane 70 with respect to the valve assembly 54. In one particularly preferred embodiment, the weight of the electronic circuit 18 can be configured to be substantially the same as the weight of the valve assembly 54. The position of the electronic circuit 18 is also advantageously positioned away from the kicking or punting side of the football 10 (kicking/punting region 59). Therefore, the electronic circuit 18 is less likely to receive or be affected by the blunt impact of a kick or punt during play. Further, by positioning the electronic circuit 18 on or within the bladder 14, the electronic circuit 18 is protected by the cover panel 30 from the outside environment, including moisture, rain, snow and mud. Additionally, through placement of the electronic circuit 18 in the pocket 64 on the sheet 62 of the bladder 15, the electronic circuit 18 can be maintained in a relatively fixed position or location with respect to the cover 12 of the ball. Given the air pressure of the bladder 14, the durability and strength of the cover 12 and the location of the electronic circuit 18 on the bladder 14, the electronic circuit 18 can be maintained in a generally predetermined position during play, with minimal movement apart from the cover 12 or the lacing 16 of the football 10.

The size of the electronic circuit 18 and/or the pocket 64 can vary to meet the size of the circuit and/or circuit. Additionally, the number of circuits, chips or circuit components can be one or more depending upon a particular implementation. Further, the one or more circuits, chips or circuit components can be enclosed with one or more pockets or coupled, bonded, attached or fastened to the bladder or other component of the football without the use of a pocket.

Referring to FIG. 10A, the electronic circuit 18 is shown positioned between two layers of the multi-layer sheet 62 forming the bladder 14. The multi-layered sheet 62 is heat sealed, preferably through RF welding, around the perimeter of the electronic circuit 18 to create a pocket seal 72 forming the pocket 64. The pocket 64 retains the electronic circuit 18 in a fixed position or within a confined area. The sheet 62 can be formed to exactly follow the contour of the electronic circuit such that little or no space exists in the pocket 64 around the circuit 18 and thereby retaining the electronic circuit 18 in a substantially fixed position.

Figure 10B:
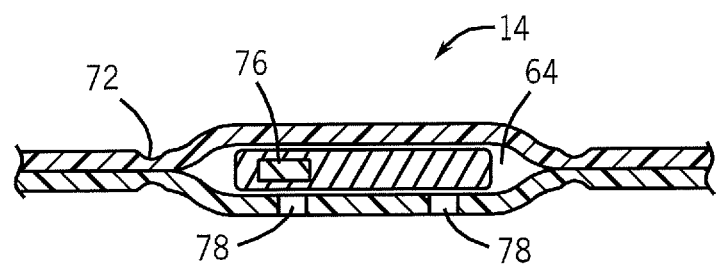
FIG. 10B is a cross-sectional view of a portion of the bladder taken about line 10B-10B of FIG. 8 and in accordance with an alternative preferred embodiment of the present invention.

Referring to FIG. 10B, an alternative preferred embodiment of the pocket 64 of the bladder 14 is shown. The electronic circuit 18 can include a pneumatic sensor or a pressure sensor 76 for sensing air pressure changes within the bladder 14. The sensor 76 can be used to monitor air pressure within the bladder 14 and serve to activate the electronic circuit when a pressure fluctuation is sensed. In this manner, the sensor 76 can be used as part of the control logic of the electronic circuit 18 to maximize available battery life of the electronic sensor and/or circuit. The electronic circuit 18 can include shutdown logic that places the electronics of the electronic circuit 18 into a standby or sleep mode until the football 10 is put into play. When the football 10 is moved, passed, kicked or punted, the air pressure within the football 10 can fluctuate or change. This change in air pressure is sensed by the sensor 76, which then activates the electronic circuit 18 and places it in an operating mode. In order to allow for the electronic circuit 18 and the sensor 76 to sense changes of air pressure within the bladder 14, one or more pocket openings 78 are formed in the inner layer or layers of the multilayered sheet 62 of the bladder 14. The pocket openings 78 enable the sensor 76 to sense air pressure fluctuations within the bladder 14 while enabling the bladder 14 to maintain its structural integrity and retain air within the bladder 14. In an alternative preferred embodiment, the sensor 76 can be a piezoelectric sensor or other form of motion sensor that enables the circuitry of the electronic circuit 18 to activate when the football 10 is placed in motion, and enter a standby or sleep mode when the football 10 is at rest for a predetermined amount of time. The predetermined amount of time is preferably set at a value within the range of 5 minutes to 120 minutes.

The air pressure sensor 76 can also be used to indicate the air pressure within the bladder 14 and therefore the pressure of the football 10 itself. The signal produced through the sensor 76 and from the electronic circuit 18 can be used to confirm that the air pressure is within a desired range or at a specific desired setting. For example, Official Wilson®, NFL® Footballs have a recommended air pressure range between 11-13 psi. Additionally, Official Wilson®, NFL® footballs used in NFL® football games have an air pressure within the range of 12.5 to 13.5 psi. It is generally known that kickers and punters prefer game footballs that are inflated to a higher pressure. The NFL® takes precautions to ensure that the game footballs used for kicking or punting are inflated within the allowable pressure range or recommended operating pressure range (12.5 to 13.5 psi). However, in some organized football leagues, the game footballs may not be tightly controlled and a team, punter or kicker may have the ability to select from a group of game balls. If the game balls have the pressure sensor 76, one could use this information to select the game football that is the most pressurized (having the highest pressure). The electronic circuit 18 can also include a temperature sensor for monitoring the temperature of the football 10. In cold temperatures, footballs used for kicking or punting are often kept in warmer locations (close to 70 F) to improve the responsiveness and performance of the football when kicked or punted. An electronic circuit including a temperature sensor can be used to enable a team, kicker or punter to select the best football (most desirable temperature) for kicking or punting. Additionally, an organized league could implement a temperature range for the football relative to ambient game time temperature (e.g. plus or minus 20 degrees F. of ambient temperature).

Figure 10C:
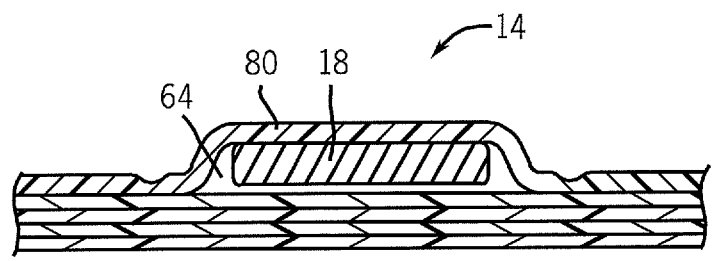
FIG. 10C is a cross-sectional view of a portion of the bladder in accordance with another alternative preferred embodiment of the present invention.

Referring to FIG. 10C, the pocket 64 can be formed by adding an additional sheet 80 of material to the inner or outer surface of the bladder 14. The sheet 80 can be thermally sealed to the bladder 14, preferably through RF welding, to retain the electronic circuit 18 on the inner or outer surface of the bladder 14. Alternatively, the additional sheet 80 can be attached to the bladder 14 through other fastening means.

Referring to FIGS. 11 and 12, an alternative preferred embodiment of the present invention is illustrated. The position of the lacing 16 relative to the bladder 14 is shown in silhouette. The electronic circuit 18 and the pocket 64 can be positioned at a location on or within the multi-layered sheet 62 of the bladder 14 that is opposite of the valve assembly 54 with respect to the longitudinal axis 88. In this configuration, a second plane that also intersects the longitudinal axis 88 can also intersect at least a portion of the valve assembly 54 and at least a portion of the electronic circuit 18. In this location, the electronic circuit 18 is balanced by the valve assembly 54. The electronic circuit 18 can be configured to have a weight that is substantially the same as the valve assembly 54 thereby improving the balance of the football 10 about the longitudinal axis 88. The distance of the valve assembly 54 and the electronic circuit 18 can be substantially equidistant from the axis 88. The location is also away from primary kicking and punting location (kicking/punting region 59) on the football 10 opposite the lacing 16.

Referring to FIGS. 13 and 14, an alternative preferred embodiment of the present invention is illustrated. The position of the lacing 16 relative to the bladder 14 is shown in silhouette. The electronic circuit 18 and the pocket 64 can be positioned at a location on or within the multi-layered sheet 62 of the bladder 14 that is underneath the lacing 16 and the flap 56. In this location, the electronic circuit 18 is protected from impacts during play by the lacing 16, the cover 12 (FIG. 1), and the flap 56. Further, the location of the electronic circuit 18 is directly opposite the kicking/punting region 59 on the football 10. The location on the bladder 14 beneath the lacing 16 on the football 10 is very advantageous because the electronic circuit 18 is protected from a vast majority of the foreseeable impacts that occur to the football during play. Further, the location of the electronic circuit 18 at the sheet 62 of the bladder 14 adjacent the cover and the lacing keeps electronic circuit 18 in a generally fixed position during use. In one preferred embodiment, the electronic circuit 18 is used to provide a small amount of additional weight near the laced region of the football 10 that can enhance the player's ability to impart rotation or spin to the football 10 as it is thrown or passed. In other preferred embodiments, weight is removed from the lacing or the cover to compensate for the small amount of additional weight added from the electronic circuit 18.

Figure 15:
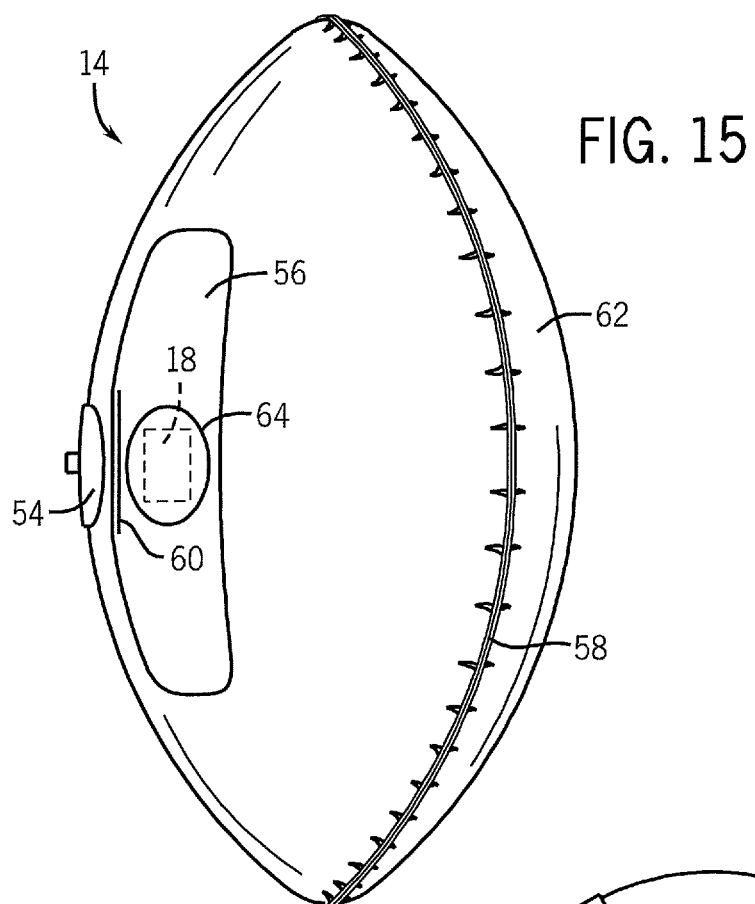
FIG. 15 is a side view of a bladder of a football in accordance with an alternative preferred embodiment of the present invention.
Figure 16:
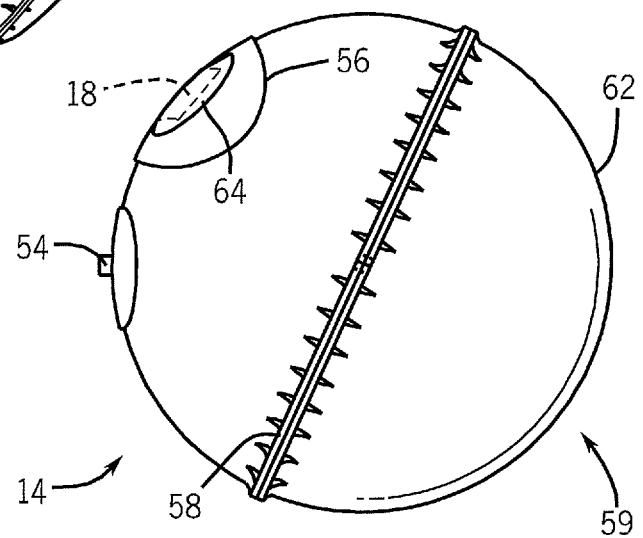
FIG. 16 is an end view of the bladder of the football of FIG. 15.

Referring to FIGS. 15 and 16, an alternative preferred embodiment of the present invention is illustrated. The electronic circuit 18 and the pocket 64 can be positioned on the flap 56 at a location that is underneath the lacing 16. In this location, the electronic circuit 18 is protected from impacts during play by the lacing 16, and the cover 12 (FIG. 1). Further, the location of the electronic circuit 18 is directly opposite the kicking/punting region 59 on the football 10. In one preferred embodiment, the electronic circuit 18 is used to provide a small amount of additional weight near the laced region of the football 10 that can enhance the player's ability to impart rotation or spin to the football 10 as it is thrown or passed. In other preferred embodiments, weight is removed from the lacing or the cover to compensate for the small amount of additional weight added from the electronic circuit 18.

Figure 17:
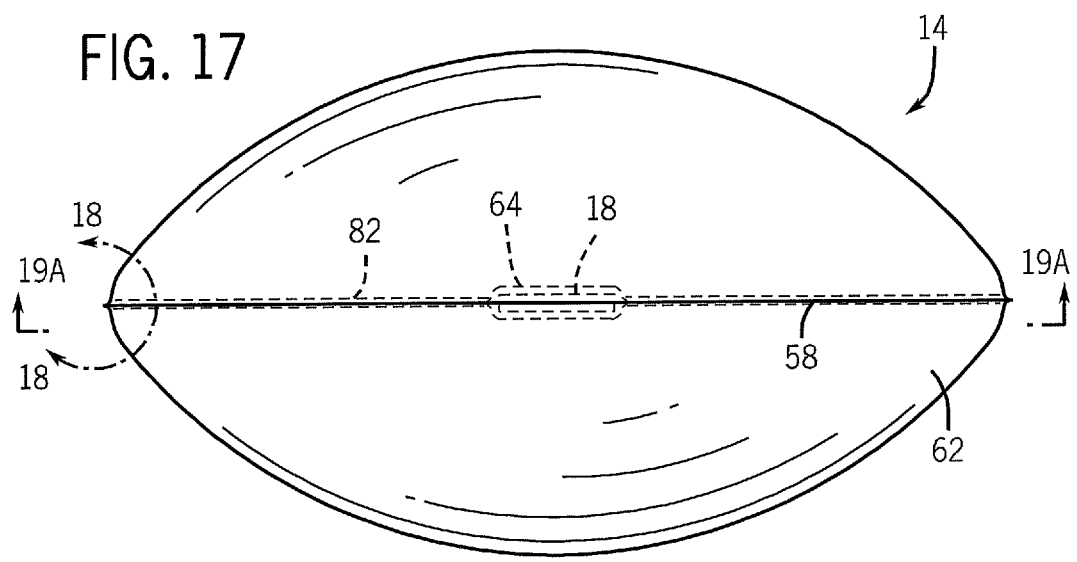
FIG. 17 is a side view of a bladder of a football in accordance with an alternative preferred embodiment of the present invention.
Figure 18:
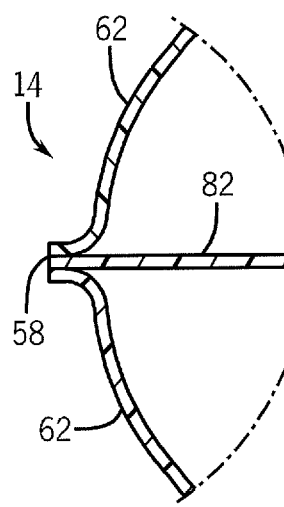
FIG. 18 is a cross-sectional view of a portion of the bladder taken about curved line 18-18 of FIG. 17.
Figure 19A:
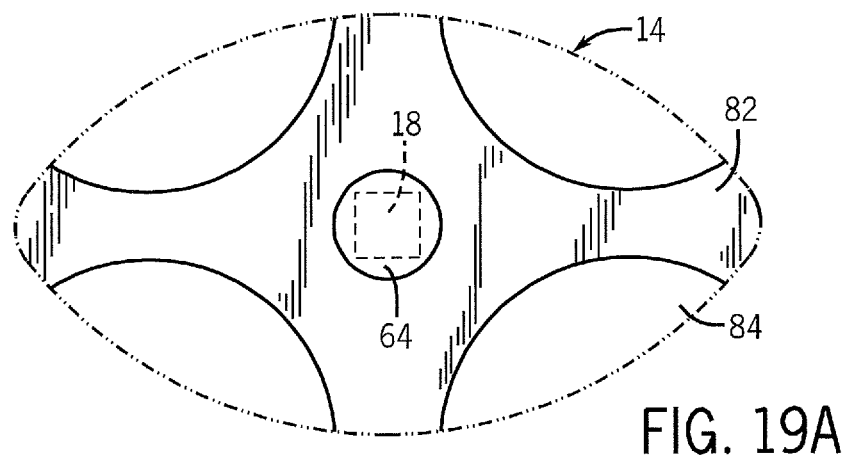
FIG. 19A is a cross-sectional view of the bladder taken about line 19A-19A of FIG. 17.

Referring to FIGS. 17, 18 and 19A, an alternative preferred embodiment of the present invention is illustrated. One or more electronic circuits 18 or circuit components, and/or one or more pockets 64 can be positioned on a cross-member 82 longitudinally extending across the bladder 14. The cross-member 82 can be a planar, single or multi-layered sheet of material used to support the electronic circuit 18 within the internal volume of bladder 14. In one particularly preferred embodiment, the cross-member 82 is a sheet that is bonded, preferably through RF welding, between first and second multi-layered sheets 62 of the bladder 14. The cross-member 82 thereby becomes part of the bladder seam 58, which provides generally uniform structural support to the cross-member 82. The cross-member 82 can be formed of a mixture of vinyl and polyester urethane. The mixture can be new material or a regrind of such materials. Alternatively, it can be formed of vinyl, other urethanes, fabric, a thermoplastic, other polymeric materials, rubber and combinations thereof. The cross-member 82 provides support to the electronic circuit 18 in two dimensions across a plane. The uniform support provided by the bladder seam 58 enables the electronic circuit 58 to be supported in the single plane. The material of the cross-member 82 and the tightness, tautness, or tension created during the formation of the bladder 14 can be varied to produce the desired operating position for the electronic circuit 18. A stiffer, more rigid and/or higher tensioned material forming the cross-member 82 can be used to inhibit movement of the electronic circuit 18 during play. In one preferred embodiment the cross-member 82 has a thickness of at least 0.004 inch, has an ultimate tensile strength of at least 3000 psi and has an ultimate elongation of at least 250 percent. In a particularly preferred embodiment, the cross-member has a thickness of at least 0.005 inch, an ultimate tensile strength of at least 7000 psi and an ultimate elongation of at least 400 percent.

The cross-member 82 preferably includes one or more openings 84 for allowing air within the bladder 14 to move freely from one side of the cross-member 84 to the other, and to readily equalize within the bladder during use. Without the openings 84, upon a sudden impact, such as a punt, a kick-off or a field goal attempt, a portion of the cover, typically opposite of the lacing, deflects inward thereby increasing the pressure of the air on kicked side of the football. Without the openings 84, the further pressurized air cannot communicate with the volume of air on the opposite side of the cross-member to equalize the pressure within the football. The pressure difference can have a negative effect on the flight and performance of the football, such as kicking distance, and the feel of the football. The openings 84 eliminate this issue by allowing for pressure to readily equalize throughout the internal volume of the bladder 14 following an impact.

Referring to FIG. 19A, the cross-member 82 supports the electronic circuit 18 longitudinally and laterally about a plane defined by the cross-member 82. The cross-member 82 and the bladder seam 58 define the four symmetrically spaced openings 84.

The cross-member 82 can be formed of a very rigid and/or taut material inhibiting movement of the electronic circuit 18 during movement of the football 10 and following impacts to the cover 12 of the football 10. Accordingly, when the bladder 14 within the football 10 is inflated to the recommended operating pressure range, the bladder 14 expands under the pressure. The expansion of the bladder 14 and the bladder seam 58 can render the cross-member taut and applies a tensile load to the cross-member 82 to keep the cross-member 82 in a taut position. The inflation of the bladder 14 to the recommended operating pressure can place a tensile load onto the cross-member 82. The tensile load is preferably at least 10 psi. In a particularly preferred embodiment, the tensile load is at least 50 psi. Additionally, the inflation of the bladder 14 to the recommended operating pressure can also cause the cross-member 82 to elongate in one or more direction depending upon the points of attachment of the cross-member 82 to the bladder side walls at the bladder seam 58. The elongation of the cross-member 82 is preferably within the range of 10 to 300 percent in at least one direction about the cross-member 82. In alternative embodiments, the cross-member 82 can be formed of a flexible material that more readily absorbs impacts during use.

Figure 19B:
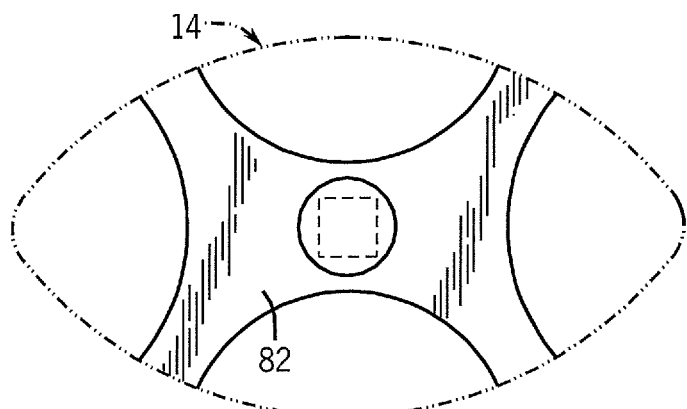
FIGS. 19B through 19E are cross-sectional views of a bladder of a football in accordance with other alternative preferred embodiments of the present invention.
Figure 19C:
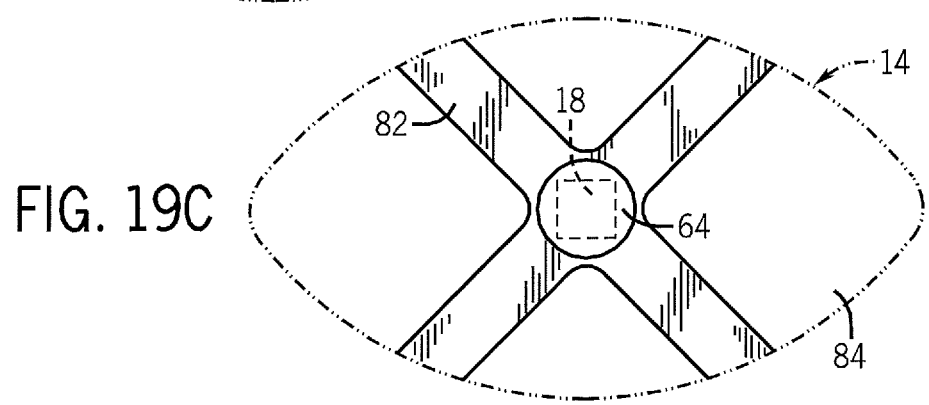

Referring to FIGS. 19B and 19C, two alternative preferred embodiments of the cross-member 82 within the bladder 14 are shown. In each embodiment, the openings 84 are defined by the cross-member 82 and the bladder seam 58. In each embodiment, the electronic circuit 18 is supported bi-directionally about the plane defined by the cross-member 82 and the bladder seam 58.

Figure 19D:
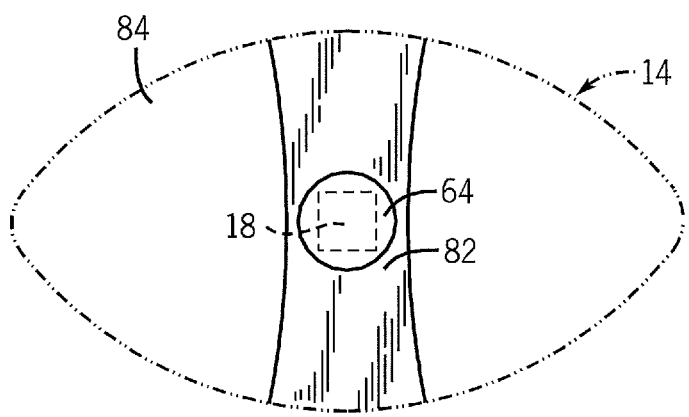
Figure 19E:
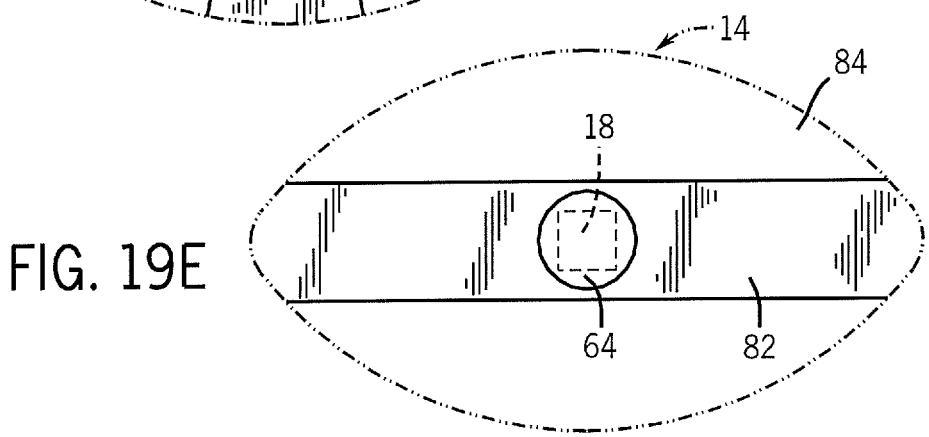

Referring to FIGS. 19D and 19E, two additional alternative preferred embodiments of the cross-member 82 within the bladder 14 are shown. In FIG. 19D, the cross-member 82 extends laterally or transversely across the internal volume of the bladder 14. In FIG. 19E, the cross-member 82 extends longitudinally across the internal volume of the bladder 14. In each embodiment, the cross-member 82 and the bladder seam 58 define two large openings 84. In other alternative preferred embodiments, the cross-member 82 can be formed of a plurality of threads, cords, wires, strings, springs, straps, bands, sheets or combinations thereof that support the electronic circuit 18 within the bladder 14.

Figure 21A:
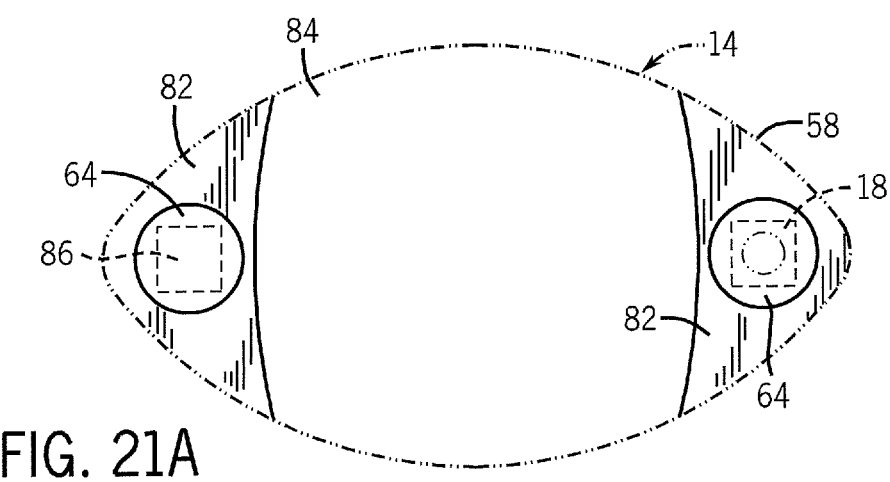
FIG. 21A is a cross-sectional view of the bladder taken about line 21A-21A of FIG. 20.

Referring to FIGS. 20A and 21A, another alternative preferred embodiment of the present invention is shown. The bladder 14 can be formed with one or more cross-members 82 extending across the bladder 14 along a plane defined by the cross-member 82. Each of the cross-members 82 is positioned between the sheets 62 of the bladder 14 and is secured to the bladder 14 at the bladder seam 58. In FIGS. 20A and 21A, two cross-members 82 are formed and positioned at opposite ends of the bladder 14. Each cross-member 82 can include the pocket 64 for receiving an electronic circuit 18 or a counterweight 86. Two separate electronic circuits (or circuit components) 18 can be used in this preferred embodiment, or a single electronic circuit 18 can be positioned on one cross-member 82 and the counterweight 86 can be positioned at the opposite end of the bladder 14. In this embodiment, the electronic circuit 18 is suspended within the bladder 14 by one of the cross-members 82 at a position that is close to one end of the bladder 14. The distance between the electronic circuit 18 and the bladder seam 58 is very small reducing the ability of the cross-member 82 and the electronic circuit 18 to deflect during use. Further, the end of the football 10 is inherently more rigid and stable than the central regions of the football 10. The ends of the football 10 deflect significantly less than the central regions of the football 10 upon impact. Therefore, the electronic circuit 18 is less likely to be affected by impacts to the cover of the football 10. The counterweight 86 can be positioned in a second cross-member 82, located at the opposite end of the bladder 14, to counterbalance the electronic circuit 18. The counterweight 86 can have substantially the same weight as the electronic circuit 18. Although FIGS. 20A and 21A illustrate a separate cross-member 82, one at each end of the bladder 14 with an electronic circuit and a counterweight positioned in the pockets of the separate cross-members, in an alternative preferred embodiment, a single cross-member 82 positioned at one end of the bladder and having a pocket 64 with the electronic circuit within it can be used. In this embodiment, neither an electronic circuit nor a counterweight is positioned at the opposite end of the bladder.

Figure 21B:
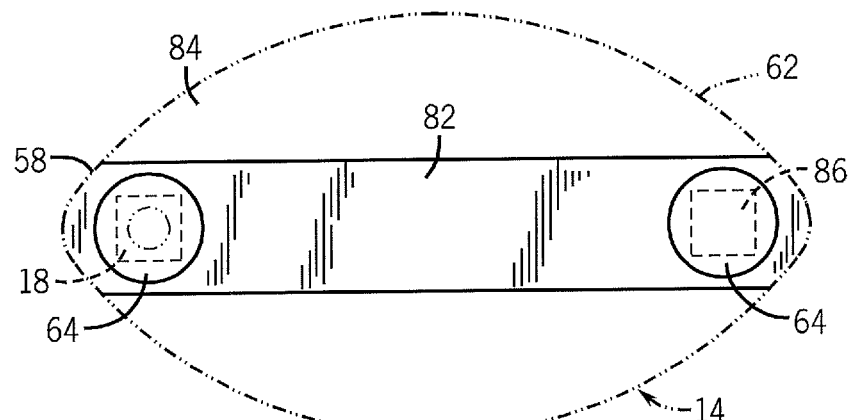
FIG. 21B is a cross-sectional view of a bladder of a football in accordance with another alternative preferred embodiment of the present invention.

Referring to FIG. 21B, in another alternative preferred embodiment, a single cross-member 82 can be used to support both the electronic circuit 18 and/or the counterweight 86 (or a second electronic circuit). Preferably, the electronic circuit 18 and the counterweight 86 are positioned at or near opposite ends of the internal volume of the bladder 14. In this embodiment, the single cross-member 82 includes two pockets 64 (one at each end of the bladder 14). One pocket 64 retains the electronic circuit and the second pocket 64 contains either the counterweight 86 or a second electronic circuit. The single cross-member 82 is shown extending longitudinally about the bladder 14 in a plane defined by the cross-member 82. The cross-member 82 is secured to the sheets 62 of the bladder 14 at the bladder seam 58.

Referring to FIG. 20B, in another alternative preferred embodiment, the bladder 14 can be formed with one or more cross-members 82 extending across the bladder 14 along a plane defined by the cross-member 82 and by the bladder seam 58. Each of the cross-members 82 is positioned between the sheets 62 of the bladder 14 and is secured to the bladder 14 at the bladder seam 58. The cross-member 82 can include the first and second pockets 64A and 64B for receiving first and second electronic circuits 18A and 18B. The first and second electronic circuits (or circuit components) 18A and 18B can be positioned at the opposite ends of the bladder 14. In this embodiment, the electronic circuits 18A and 18B are suspended within the bladder 14 by the cross-member(s) 82 at a position that is close to the respective ends of the bladder 14. The distance between each of the electronic circuits 18A and 18B and the bladder seam 58 is very small reducing the ability of the cross-member 82 and the electronic circuit 18 to deflect during use, and enabling the electronic circuits 18A and 18B to be maintained in a generally stable position within the bladder 14. The ends of the football 10 are inherently more rigid and stable than the central regions of the football 10 and deflect significantly less than the central regions of the football 10 upon impact. Therefore, the electronic circuits 18A and 18B are less likely to be affected by impacts to the cover of the football 10.

In this embodiment, the first and second circuits 18A and 18B can be used together to accurately transmit and/or indicate the correct position, speed, rotation, acceleration, deceleration and movement of football 10. The two electronic circuits 18A and 18B can be used to improve the accuracy and reliability of the monitoring system. Alternatively, the first and second circuits 18A and 18B can be essentially the same with one circuit providing redundancy, or serving as a backup, to the other in event of a circuit failure. In this embodiment, another circuit 131 (or circuit component, such as a battery) can be secured to the bladder 14 in a pocket 133. Alternatively, the circuit 131 can be coupled to the bladder 14 through other means, such as for example, bonding or hook and loop fastening. The location of the pocket 133 and the circuit 131 is at the multi-layered sheet 62 of the bladder 14, preferably at a location that will be beneath the lacing on a completely assembled football 10.

Wires 135 or leads can be used to operably connect the circuit 131 to the first and second circuits 18A and 18B.

Figure 22:
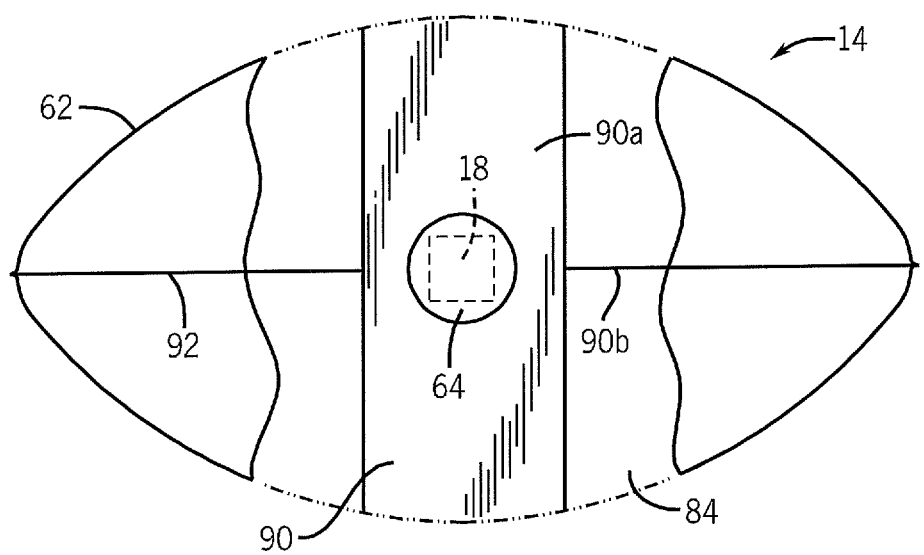
FIG. 22 is a side view of a bladder of a football in accordance with another alternative preferred embodiment of the present invention with a portion of the bladder removed to show the internal structure of the bladder.
Figure 23:
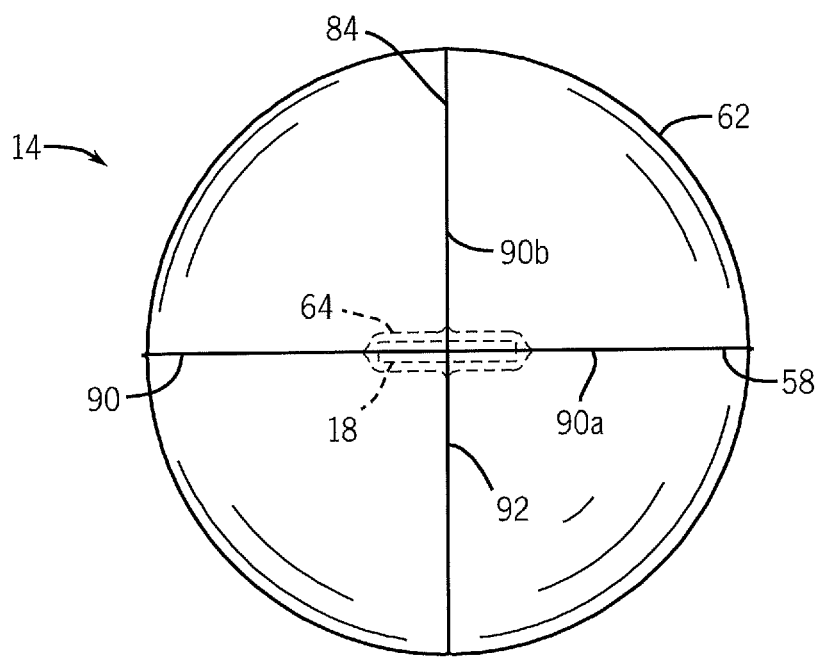
FIG. 23 is an end view of the bladder of the football of FIG. 22.

Referring to FIGS. 22 and 23, another alternative preferred embodiment of the present invention is illustrated. In preceding embodiments, the cross-member 82 extends about a single plane providing two-dimensional support to the electronic circuit 18. In other alternative embodiments, the three-dimensional cross-member 90 can be used. The cross-member 90 can include two or more planar sections that connect to multiple locations about the sheets 62 of the bladder 14. In one particularly preferred embodiment, the cross-member 90 includes a first section 90a that extends laterally across the bladder 14 about a plane defined by the bladder seam 58 and in a manner similar to the cross-member 82 of FIG. 19D, and a second section 90b that extends orthogonally from the first section 90a. The first section 90a includes the pocket 64 that retains the electronic circuit 18. In an alternative preferred embodiment, the pocket can reside on the second section 90b. The openings 84 are formed in both sections 90a and 90b of the cross-member 90 to allow for air to move freely and readily equalize within the bladder 14. The second section 90b is preferably secured to the bladder 14 by a second bladder seam 92 that secures the edges of the sheets 62 of the bladder 14. Accordingly, in the present preferred embodiment, the bladder 14 is formed of four separate multi-layered sheets 62 that are bonded together at first and second generally longitudinally extending bladder seams 58 and 92. The bladder seams 58 and 92 provide an effective, secure, reliable and durable means of attaching the cross-member 90 to the bladder 14. The three dimensional support of the electronic circuit 18 provided by the cross-member 90 can substantially inhibit movement of the electronic circuit during use. In alternative preferred embodiments, some edges of the cross-member can be secured to the bladder 14 through other means, such as for example, being bonded, fused, clipped, fastened via hoop and loop fasteners, buckles, or other fasteners. In such embodiments, the bladder can be formed without a bladder seam, with a single bladder seam, or two or more bladder seams. The three dimensional cross-member 90 can be arranged to form substantially 90 degree angles between the sections of the cross-member as illustrated. Alternatively, the sections of the cross member can extend at other angles from each other to provide three-dimensional support to the electronic circuit positioned within the bladder 14. In another alternative preferred embodiment, the electronic circuit 18 can be supported in a three-dimensional fashion through a plurality of threads, cords, wires, fibers, fabric strips, laces or combinations thereof. FIGS. 17 to 23 disclose various implementations of one or more cross-members 82, 90 and/or 92 within the bladder 14. It is contemplated that other configurations of one or more cross-members can also be used.

Figure 24:
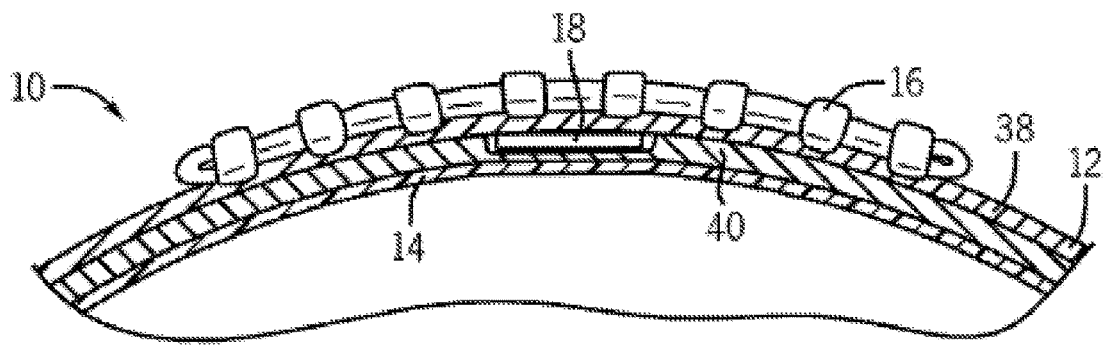
FIGS. 24-26 are cross-sectional views of a section of a football in accordance with other alternative preferred embodiments of the present invention.
Figure 25:
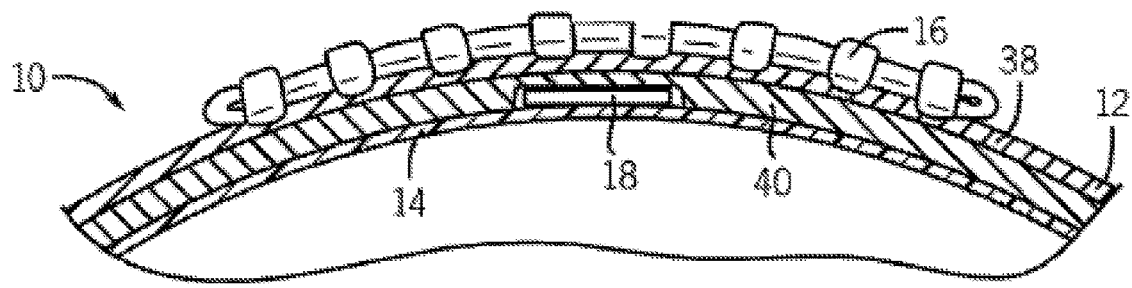
Figure 26:
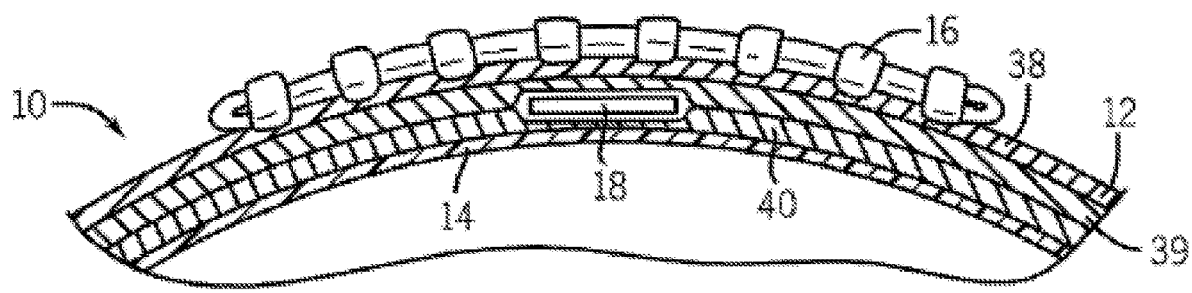

Referring to FIGS. 24 through 26, alternative preferred embodiments of the present invention are illustrated. The electronic circuit 18 can be positioned outside of the bladder 14 in other locations within the football 10. In FIG. 24, the electronic circuit 18 can be positioned within the cover 12 beneath the outermost surface 38 in a recess formed in the lining 40 of the cover 12. The electronic circuit 18 can also be advantageously positioned beneath the lacing 16 for additional protection and positioning away from the kicking region of the football 10. Referring to FIG. 25, the electronic circuit 18 can also be positioned on the inner surface of the lining 40 adjacent to the bladder 14. In another preferred embodiment, one or more intermediate layers 39 can be positioned between the liner 40 and the bladder 14. The electronic circuit 18 can be positioned within the intermediate layer 39 or between the lining and the intermediate layer as shown in FIG. 26. If additional intermediate layers are employed in the football construction, the electronic circuit can positioned over, under or within such intermediate layers. In other implementations, the circuit 18 can be positioned at other positions on or within the cover, liner and/or bladder.

Figure 27:
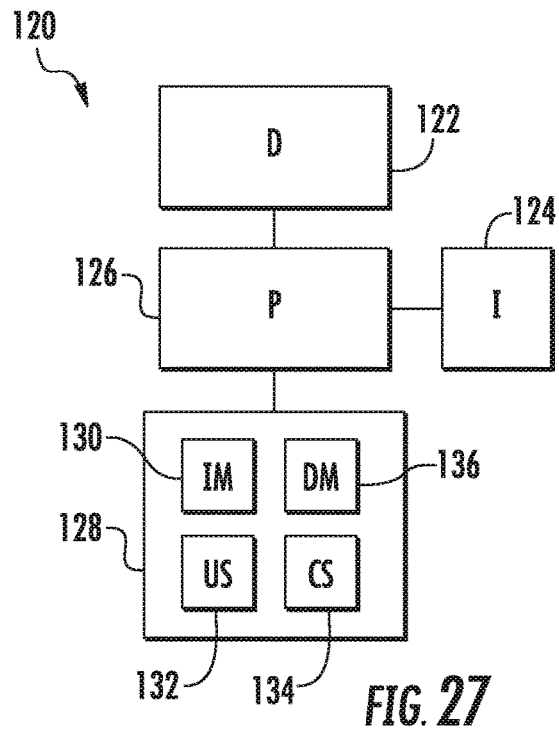
FIG. 27 is a block diagram of an example sport performance system.

FIG. 27 schematically illustrates an example sport performance system 120. Sport performance system 120 utilizes information pertaining to travel or motion of a ball of a sport to provide assistance and motivation to a person endeavoring to improve his or her performance in the sport. Sport performance system 120 comprises a display 122, an input 124, a processor 126 or 256 and a memory 128.

Display 122 comprises a screen, monitor, or other device by which data and information may be presented. The display 122 can be part of a portable electronic device such as a portable smart phone, a portable personal data assistant, a portable digital music player (IPOD etc), a portable tablet, a laptop or desktop computer. Input 124 comprises a device by which signals and/or data pertaining to the travel, movement and/or rotation of the ball of a sport may be received. In one implementation, input 124 may comprise a device by which data pertaining to travel of the ball of a sport may be input into system 120. In such an implementation, input 124 may comprise a keyboard, a keypad, a touch screen (possibly incorporated as part of display 122), a stylus, a mouse, a touchpad or a microphone with associated speech recognition software. In another implementation, input 124 may comprise a device by which signals may be received. For example, input 124 may comprise a port or an antenna (possibly incorporated as part of a wireless card). In one implementation, input 124 may receive signals or data pertaining to travel of the ball of the sport from an external or remote server or data source. In one implementation, input 124 may receive signals directly from a transmitter carried by the ball and in communication with one or more sensors also carried by the ball. In one implementation, input 124 may comprise a memory card reader, wherein a memory card may be connected to the ball to receive a sensed data pertaining to travel of the ball and wherein the memory card is removed or separated from the ball and inserted into the memory card reader of input 124 to input such data to system 120. In such an implementation, the memory card may receive sensed data from the one or more sensors carried by the ball while the ball is in motion and in use or the memory card may receive sensed data that is been stored by a memory carried by the ball, allowing the memory card to be connected to the ball for receiving such sensed data when the ball is not in use.

Processor 126 comprises one or more processing units configured to carry out instructions contained in one or more instruction modules of memory 128. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, memory 128 may be embodied as part of one or more application-specific integrated circuits (ASICs). In another implementation, memory 128 can be flash memory or include flash memory. Unless otherwise specifically noted, the controller is not limited to any specific combination of hardware circuitry and software, nor to any particular source for the instructions executed by the processing unit.

Memory 128 comprises a persistent storage device or non-transient computer-readable medium storing data and code. In the example illustrated, processor 126 comprises an input module 130, a user storage 132, a celebrity storage 134 and a display module 136. Input module 130 comprises software or code stored in memory 128 that is configured to instruct or direct memory 128 to receive or obtain signals or data through input 124 pertaining to travel of a ball of a sport.

User storage 132 comprises that portion of memory 128 in which the input data or signals received under the direction of input module 130 are stored for subsequent retrieval and/or analysis. Celebrity storage 134 comprises that portion of memory 128 in which data pertaining to travel of the ball imparted by a celebrity in the sport is stored. For purposes of this disclosure, a "celebrity" shall mean a person who has attained notoriety for his or her performance in the sport. Examples of such celebrities include professional athletes, college athletes, Olympians and athletes who have acquired notoriety due to their skill level. Although celebrity storage 134 is illustrated as being part of memory 128 which also includes user storage 132 for storing user data pertaining to travel of the ball, in other implementations, celebrity storage 134 may be located remote of memory 128. For example, celebrity storage 134 may be alternatively provided at a remote server which may be accessed across a local or wide area network.

Display module 136 comprises code or software stored in processor 126 configured to direct memory 128 to retrieve data pertaining to travel of the ball by the celebrity in the sport from celebrity storage 134 and to display a comparison of the input signals and/or data pertaining to travel of the ball imparted by the user to the retrieved data pertaining to travel of the ball by the celebrity. Display module 136 may direct memory 128 to retrieve specific user data from user storage 132, may direct memory 128 to retrieve celebrity data from celebrity storage 134 and may direct memory 128 to present a comparison on display 122.

For example, in one implementation, the data or signals received may pertain to travel of a football. In such an implementation, display module 136 may present a comparison on display 122 of the user's throwing of the football with a celebrity's throwing of the football. For example, display 122 may present a comparison of a user's throwing of the football to the throwing of a football by a well-known football celebrity such as Aaron Rodgers of the Green Bay Packers or Tom Brady of the New England Patriots. Such a comparison may comprise one or more graphs depicting various parameters relating to travel the football such as distance, speed, trajectory, target accuracy, quarterback passing release time, snap to pass time, spin, rotation and the like. Such a comparison may comprise side-by-side or concurrent lines or arcs representing a trajectory of the football, wherein colors, line types, line thicknesses, brightness levels, flashing rates, different symbols and the like forming the concurrent lines or arcs may be used to simultaneously present information regarding more than one parameter on the display 122. As a result, system 120 provides a user with a motivational tool by allowing the user to compare his or her individual parameters pertaining to travel of the football to the same individual parameters of a celebrity having above-average skills in the sport. Similar implementations may be made with respect to other sports.

Figure 28:
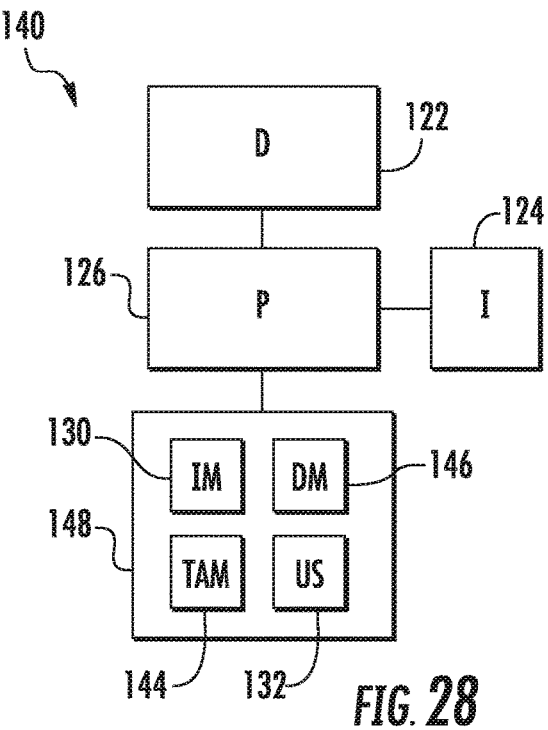
FIGS. 28-32 are block diagrams of other example implementations of the sport performance system of FIG. 27.

FIG. 28 schematically illustrates a sport performance system 140. Sport performance system 140 comprises display 122, input 124, processor 126 and a memory 148. Memory 148 is similar to memory 128 except that memory 148 comprises a target accuracy module 144 and a display module 146. Target accuracy module 144 comprises code or software stored in memory 148 configured to direct processor 126 to determine a target accuracy based upon the data and signals received through input 124. Display module 146 comprises code or software contained on memory 148 that is configured to direct processor 126 to display or present the determined target accuracy on display 122.

For example, in one implementation, with respect to travel of a football, the target may comprise a field goal. Target accuracy module 144 may determine, predict or estimate whether or not such a field goal would be successful given the football travel parameter values received through input 124 such as the speed of the football, the launch angle of the football, the trajectory or distance of the football, the spin or rotation of the football and the like. In one implementation, target accuracy module 144 predicts such accuracy independent of the existence of actual field goal posts or crossbars. As a result, a person may practice field goal kicks and receive predicted results on any field or in any park despite the field or the park not having such goal posts or crossbars.

In one implementation, target accuracy module 144 may additionally use additional input such as the placement of the football (the hashmark) prior to the kick and the distance from the goalposts (the yard line or yard marker) as part of its determination of whether a field goal target would be successful for a particular sample of data taken from a particular kick of the football. In one implementation, target accuracy module 144 may additionally base its determination of target accuracy on environmental factors such as air temperature, wind speed, wind direction, barometric, humidity, air density, altitude, pressure and the like. In one implementation, the starting point of the football and/or one or more the environmental factors may be manually input. In another implementation, the starting point of football and/or one or more environmental factors may be sensed by sensor that communicates such data directly to processor 126 or may be retrieved from a remote data source (a weather data web site). In one implementation, the starting point of football and/or the one or more environmental factors may be actual conditions for the sample kick. In another implementation, the starting point of football and/or the one or more environmental factors may be hypothetical, wherein the target accuracy is a hypothetical target accuracy based upon hypothetical conditions.

In other implementations, the accuracy for other targets may be determined by target accuracy module 144 and displayed by display model 146. For example, other targets in football include, not limited to, a receiver to catch the football at a particular location on the football field and at a particular distance from the person throwing the ball or a region on the field at which the ball lands following a kick or punt. In some implementations, such predictions may be determined without a receiver actually catching the football or prior to the ball actually landing at the region on the field. For example, a person may throw, kick or punt the football into a wall, screen, net or other obstruction, wherein target accuracy module 144, using signals from sensor 252 carried by the football, to predict the ultimate travel path such as distance, height, spin and/or trajectory of the football in the hypothetical absence of the obstruction to predict whether or not the passing, kicking or punting objectives or target would be met. As a result, target accuracy module 144 allows a person to practice passing, kicking and/or punting in a relatively confined area, yet see predicted results as if the person had been practicing on a complete football field, with goalposts and with receivers. Other targets in other sports include, but are not limited to, the basket net in basketball, the goal in hockey, the goal in soccer, a strike zone for a pitcher in baseball, a region of a court during a spike or a serve in volleyball and a hole or region of a course (a region of the fairway or a region of the green) in golf.

Figure 29:
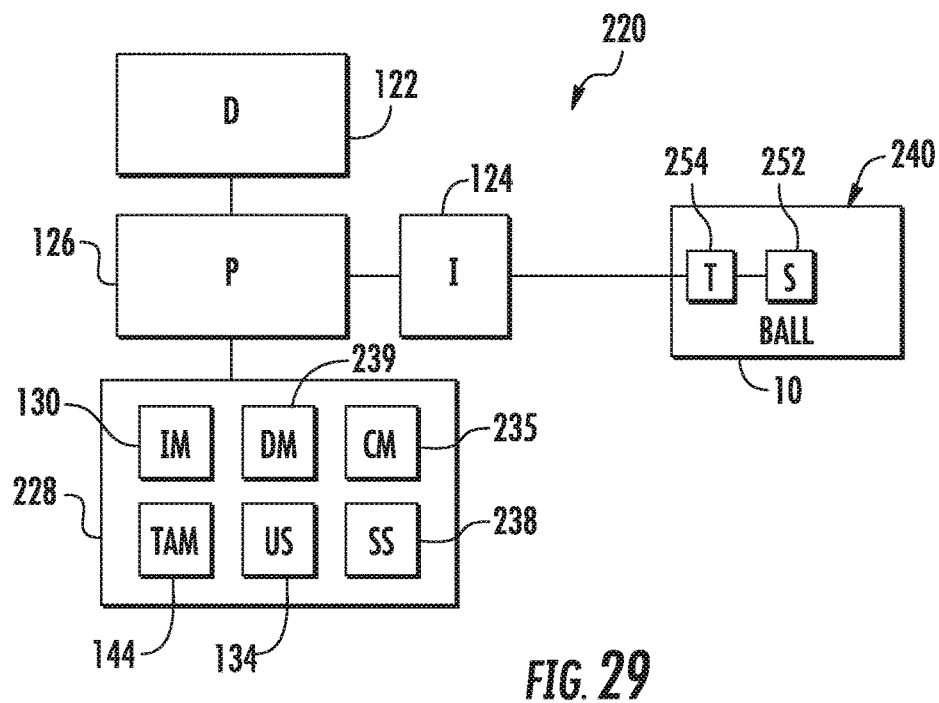

FIG. 29 schematically illustrates an example sport performance system 220. Sport performance system 220 comprises display 122, input 124, processor 126, a memory 228, and a ball sensing system 240. Memory 228 is similar to memory 128 and memory 148 in that memory 228 comprises a persistent storage device or non-transient computer-readable medium. Memory 228 comprises input module 130, user storage 132, target accuracy module 144, a comparison module 235, a suggestion storage 238 and a display module 239. Comparison module 235 comprises code or software stored on memory 228 configured to direct processor 126 to compare target accuracy (from target accuracy module 144) or individual ball travel parameter values to one or more predefined threshold values for target accuracy or for the individual ball travel parameter values. Based upon the comparison, comparison module 235 instructs processor 126 to retrieve one or more stored sport instructional packages stored on suggestion storage 238. Such instructional packages may comprise text, videos, slides, photos, graphics and the like which are stored in suggestion storage 238 of memory 228 for instructing a person or user how to address a particular mechanics issue with respect to imparting motion to the ball or how to improve upon the mechanics by which a person imparts motion to the ball. Display module 239 comprises software or code that directs processor 126 to retrieve the instructional package from suggestions storage 238 and directs processor 126 display or present the instructional package. In one implementation, display module 239 further displays the users actual parameters that resulted in the particular instructional package being presented. In some implementations, memory 228 may additionally include one or more of celebrity storage 134, display module 136 or display module 146 described above.

Ball sensing system 240 provides signals or data through input 124 regarding one or more parameters pertaining to travel imparted to a ball by the user. Ball sensing system 240 comprises the ball 10, a sensor 252 and a transmitter 254. Ball 10 comprises a physical ball to which travel or motion is imparted directly or indirectly by the user. Examples of ball 10 include, but are not limited to, footballs, basketballs, golf balls, volleyballs, arrows, hockey pucks, baseballs, soccer balls, bowling balls, kick balls, tennis balls and the like.

Sensor 252 comprises one or more sensors carried by ball 10 to sense one or more travel parameters of ball 10. Examples of sensor 252 include, not limited to, microelectromechanical sensors (MEMS), an accelerometer, a magnetometer, a gyro, a 9 degrees of freedom or motion sensor, a 6 degrees of freedom or motion sensor, pressure sensor, active RFID, passive RFID, temperature sensor, near field sensor, strain gauge, load sensor, and the like, and combinations thereof. In many implementations, the accelerometer can be one or more 1-axis accelerometers and/or one or more 3-axes accelerometers. The accelerometers may be sized to a predetermined g range, such as, for example, 2 g, 8 g, 16 g, 24 g and 100 g. 1 g represents the acceleration of gravity at sea level, which is 32.2 feet/s$^2$. The cost of such accelerometers typically increases as the g rating of the accelerometers increases. In some implementations, sensors 252 can include a global positioning system (GPS) sensor or other presently known or future developed sensors. Examples of travel parameters that may be sensed by the one or more sensors 252 include, but are not limited to, the speed (velocity and acceleration/deceleration) of the ball as it travels, the launch angle of the ball, the trajectory of the ball, the distance traveled by the ball, the spin or rotation of the ball, and the like.

Transmitter 254 transmits information pertaining to travel of the ball to input 124. In one implementation, transmitter 254 comprises a wireless antenna wireless transmitter. In another implementation, transmitter 254 comprises an optical transmitter or a radiofrequency transmitter. In one implementation, transmitter 254 may comprise a port to receive a wired connection or transmitting data. In one implementation, transmitter 254 can comprise a Bluetooth device. In another implementation, transmitter 254 can comprises a Wi-Fi or other radiofrequency transmitter. In yet other implementations, transmitter 254 comprises other presently known or future developed technology for transmitting or communicating data. Such information may be in the form of raw signals from sensor 252 or may comprise processed signals based upon the raw signals from sensor 252. In some implementations, ball 10 may additionally include one or more processors and/or memories for processing and/or storing the raw signals from sensor 252 prior to their transmission to input 124 via transmitter 254.

In one implementation, sensor 252 and transmitter 254 are embedded or mounted within ball 10. In other implementations, sensor 252 and transmitter 254 are mounted to an exterior of ball 10. In some implementations, sensor 252 and transmitter 254 are releasably or removably attached or mounted to an exterior of or within ball 10. In yet other implementations, travel parameters of ball 10 may be obtained from sensors not carried by ball 10.

Figure 30:
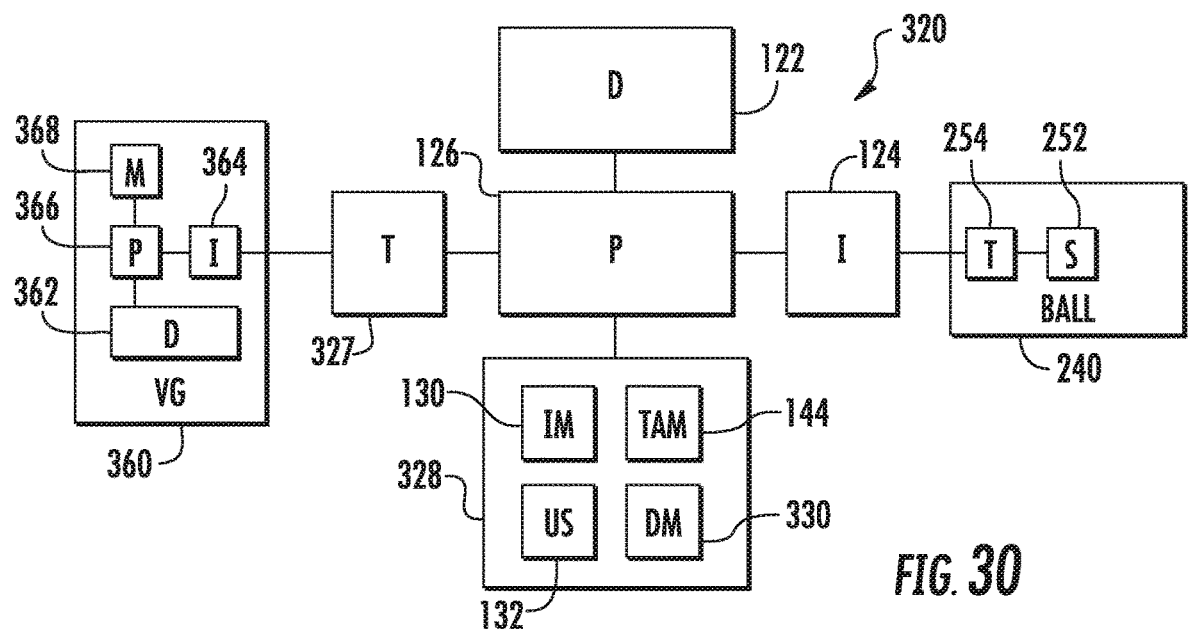

FIG. 30 schematically illustrates a sport performance system 320. Sport performance system 320 comprises display 122, input 124, processor 126, a transmitter 327, a memory 328, ball sensing system 240 and a videogame 360. Transmitter 327 is in communication with processor 126 and communicates data and signals from processor 126 to videogame 360. In one implementation, transmitter 327 may comprise a wireless transmitter. In another implementation, transmitter 327 may comprise a wired connection or port by which data may be transmitted to videogame 360. In some implementations, transmitter 327 may be omitted where videogame 360 is incorporated as part of a single unit with processor 126 and other components of system 320.

Memory 328 comprises a persistent storage device or non-transient computer-readable medium configured to store data and to store code for directing the operation of processor 126. Memory 328 comprises input module 130, user storage 132, target accuracy module 144 and an output module 330. Output module 330 comprises a module of code or computer programming configured to direct processor 126 to interact with videogame 360 and to provide one or both of ball travel parameter values or target accuracy values to videogame 360 for use by videogame 360.

Videogame 360 comprises a game which simulates a sporting game or sporting competition in which a user participates by providing one or more inputs to one or more processors using voice inputs, manual inputs (using a game controller) or camera captured inputs. Examples sporting games or competitions which are simulated by videogame 360 include, but are not limited to, a basketball game, the football game, a baseball game, a tennis match, hockey game, the bowling game, and archery match and the like. Videogame 360 may comprise a game dedicated to a particular sport or a particular group of sports or may comprise a portable game cartridge, disk, card or unit which is removably received by a system. Videogame 360 may be part of a stationary system or may be part of a portable electronic device. Videogame 360 may be stored on a server which is accessible to multiple users through wide area network or local area network.

Videogame 360 comprises a display 362, an input 364, a processor 366, and a memory 368. Display 362 comprises a screen, monitor or the like by which the game is visually presented to a player. Input 364 comprises a device by which data comprising either target accuracy data and/or ball travel parameter values may be received from transmitter 327. Processor 366 comprise one or more processing units to carry out instructions contained in memory 368 for presenting graphical images upon display 362 and for altering the graphical images based upon input from the player and data received through input 364 to simulate a sporting game, match or competition. Memory 368 comprise a persistent storage device or non-transient computer-readable medium containing instructions for directing processor 366 to carry out the videogame. Although illustrated as a single unit, in other implementations, one or more of the components of videogame 360 may be located remote with respect to one another, such as across one or more servers and the like which communicate with one another across a wide area network or local area network.

According to one implementation, system 320 stores in user storage 132 target accuracy based upon ball travel parameters received through input 124. The stored target accuracy values or results may be utilized as part of videogame 360. In one implementation, the stored accuracy values may be presented on display 122 (or display 362) by processor 126 or processor 366 for selection by the player of videogame 360 that particular moment during the game being simulated on videogame 360. In another implementation, the stored accuracy values serve as a source of possible values from which videogame 360 randomly picks an accuracy value for use in videogame 360 so as to alter an outcome or graphical display of videogame 360. In one implementation, one or more individual ball travel parameters may either be selected by the player of videogame 360 at a particular moment or may be randomly chosen for use in videogame 360.

For example, in one implementation in which videogame 360 comprises a football game, a player may have previously punted, kicked or thrown a football which resulted in signals or data from travel of the ball being provided to system 320 through input 124. Target accuracy results or individual ball travel parameters (speed, distance, direction, launch angle, trajectory, spin or rotation and the like) are stored in user storage 132. During the game, such values may be selected for use by the player or randomly chosen for use in the videogame 360. For example, at a point in the game when a field-goal kick is to be simulated, the player may choose (using an input device associated with videogame 360) a particular target accuracy result from a stored pool of results displayed on display 122 or 362, wherein the stored pool results are obtained using a real physical football in the performance of a football play, act or event by the player for use in the football game. Alternatively, the player may provide input indicating that the particular field-goal to be tried in the videogame 360 is to utilize one of the actual stored target results from the kicking of a real physical football, wherein the particular target result (good, wide left, wide right, short) is randomly chosen from the stored pool of results. Similar inputs of real-world target accuracy results or real-world ball travel parameters into the simulated football videogame may be provided for other aspects of the football game such as a pass, a punt or a kickoff.

In other implementations, instead of importing real-world target accuracy results into videogame 360, individual real world ball travel parameters may be imported into videogame 360. For example, the player may have previously "recorded" a multitude of throws of a real-world football. During a simulated football game on videogame 360, the player may import previously recorded throws into videogame 360. The player may utilize a stored short throw in circumstances where a short pass to receiver is desired in videogame 360 or may utilize a stored deep throw in circumstances where a long pass to receiver is desired in videogame 360. In other implementations, other types of passes or events may be used. In one implementation, stored ball travel parameters may be used more than once during a particular videogame. In another implementation, stored ball travel parameters may be withdrawn from a bank, wherein once a stored ball travel parameters used in a particular videogame, it cannot be reused. As a result, a player of videogame 360 is provided an enhanced experience by implementing actual real-world results into videogame 360. In addition, the player may be encouraged to build up and store a pool or bank of real-world target accuracy values or for subsequent import into a videogame. Such an implementation may motivate youth to participate in actual real-world sport activities in association with videogames. Similar implementations may be made to other sports.

In some implementations, system 320 may incorporate a handicapping system based upon the player skill level, age, size, weight and the like. For example, target accuracy values or ball travel parameters stored on user storage 132 may be enhanced or upgraded for particular players in videogame 360 based upon a selected skill level or characteristics of the player or characteristics of the competition presented on videogame 360. For example, a videogame 360 simulating a professional football game may automatically upgrade the target result of one or more ball travel parameters of the football retrieved from user storage 132. By way of example, stored distance results for field-goal kick may be upgraded from the stored 20 yards to 30 yards for use in the videogame as an option selectable by the player. If videogame 360 involves individuals of different skill levels or different ages, the player with a lesser skill or younger age may be provided with an enhancement or upgrade to his or her stored target accuracy values or ball travel parameter values. By way of example, a younger player competing against an older player in videogame 360 may have stored field-goal kick values enhancer upgraded from 15 yards to 25 yards to level the playing field for the younger player against the older player and provide a more competitive videogame 360. Similar implementations may be made to other sports.

FIG. 31 schematically illustrates a sport performance system 420. Sport performance system 420 is similar to systems 120, 140 and 220 combined except that ball sensing system 240 specifically employs the football 10 and receives data from ball sensing system 420 in the form of football travel parameters. Sport performance system 420 is specifically illustrated as comprising a memory 428. Those remaining components of system 420 which correspond to components of systems 120, 140 and 220 are numbered similarly.

Similar to memory 128, 228 and 328, memory 428 is a non-transitory or non-transient computer-readable medium or persistent storage device in which executable programs and data are stored. In one implementation, memory 428 is embodied as part of a memory contained on a portable electronic device. In other implementations, memory 428 is embodied in a remote server or "cloud" in communication with the portable electronic device. In yet other implementations, portions of memory 428 reside in a portable electronic device while other portions of memory 428 reside in a remote server or in the "cloud" which is in communication with a portable electronic device.

In the example illustrated, memory 428 of sport performance system 420 specifically comprises a football travel parameter module 460 and a football event signature storage 462. As noted above, in some implementations, football travel parameter module 460 and football event signature storage 462 reside as part of a non-transitory or non-transient memory in a portable electronic device. In other implementations, module 460 and storage 462 reside as part of a non-transitory memory on a remote server or cloud in communication with a portable electronic device. In yet other implementations, one of module 460, storage 462 may reside on a non-transitory or non-transient memory on a remote server or cloud while the other of module 460, storage 462 may reside as part of a non-transitory or non-transient memory on a portable electronic device. In some implementations, such as sport performance system 260 (FIG. 32), football travel parameter module 460 and football event signature storage 462 reside as part of a non-transitory or non-transient memory in memory 258.

Football travel parameter module 460 contains or comprises code to direct processor 126 to analyze and/or present signals or data received from ball 10. Module 460 utilizes signals or data received from ball 10 to determine and display parameters of ball travel on display 122. For example, module 460 may display a speed of the football 10, a launch angle of the football, a spin of the football, a direction in which the football is moving or has moved, the spiral efficiency (as described below) of the football, the wobble of the football, an orientation of the football, a trajectory of the football, a maximum trajectory height of the football, a positioning of the football on a football field or with respect to a goalpost and the like.

In one implementation, input module 130 additionally receives input from ball sensing system 240 indicating an orientation or angle of the football on a tee. As a result, football travel parameter module 460 may direct processor 126 to cause display 122 to present or display a trajectory or other travel parameter (launch angle, distance, height, loft time) of the football or football travel parameters of the football as a function of the sensed football orientation or angle on the tee. Such correlation may be presented either graphically or textually using tables and the like. As a result, system 420 may assist in enhancing performance with respect to kickoffs.

In one implementation, input module 130 direct processor 126 to receive input from ball sensing system 240 sensing impacts upon football 10. Such impacts may be the result of the football striking the ground or impacting a person's hands such as a quarterback, running back or receiver. Display module 239 may utilize such information to display bounces of the football (for enhancing on-side kick performance) or may display the time consumed prior to handoff or while the ball travels through the air to being caught by a receiver or by a kick/punt returner. In each case, display module 239 may cause such data to be displayed on display 122. Such information may be further stored in a memory such as storage 238.

In one implementation, football travel parameter module 460 directs processor 126 to determine or identify at least one football event by comparing at least one attribute of the football, based upon signals received from sensor 252 or derived from such signals, to one or more predetermined signature characteristics of different football events. For purpose of this disclosure, a "football event" is one or more particular action of the football with respect to one or more of a playing field, a player or goalpost. Examples of different individual "football events" include but are not limited to, an under center snap of the football; a shotgun/quick snap of the football; a multi-step drop back with the football; a handoff of the football; a pass release of the football; pass flight of the football; a catch of the football; a drop of the football; a fumble of the football; an initiation of a pass of the football; a run with the football; a punt of the football; initial ground impact of the football; a kickoff of the football; and an onside kick of the football.

In one implementation, the one or more predetermined signature characteristics of different football events are stored in event signal storage 462. Such football event signatures comprise distinct sets of ball travel parameters or characteristics associated with each different football event. For example, an under center snap of a football may be associated with one or more distinct acceleration characteristics over time as compared to acceleration characteristics over time of the steps taken by a quarterback during a multi-step drop following the snap, as compared to acceleration characteristics over time of the initiation of a pass (when the quarterback or thrower begins to cock his or her arm prior to a throw), and the like. In some implementations, signature characteristics for an event may comprise unique sets or groups of multiple football travel parameters. For example, different football events may be distinguished from one another based upon a combination of two or more of a sensed acceleration of the football, a sensed internal pressure of the football, a sensed height of the football, a sensed speed/velocity of the football, a sensed spin of the football, a sensed rotation of the football using gyro sensed information, a sensed movement of the football using magnetometer sensed information, and combinations thereof.

Pattern recognition through the use of a neural network or a machine learning techniques can be employed to determine complicated motion or timing events involving the football and an act or event with the football, such as football event signatures. In one implementation, such football event signatures are obtained by sports performance system 420 through use of a "neural network" in which the football event signatures are identified or learned through the analysis of multiple calibration football events. For example, multiple football events with football 10 may be sensed and stored, wherein processor 126, following instructions contained in football travel parameters module 460 or another set of computer code, compares one or more of the sensed ball travel parameters (acceleration values, spin, orientation, height, velocity composition over a period of time) with the known identity of each football event to associate each known football event with a specific football event signature comprising a group of one or more of the sensed ball travel parameters. Such football event signatures are stored for subsequent use in identifying subsequent football events. Neural network can also be referred to as machine learning.

A neural network is a form of pattern recognition, and can involve analysis of multiple events or variables occurring over time.

In one implementation, module 460 may utilize the identification of the initiation of a football pass (the cocking of the arm) and the identification of a pass release to track a quarterback pass release time (a quick release) for display, comparison or coaching. For display or communication purposes, the term "pass release" includes the upward and/or rearward movement of the player's arm in "cocking" or drawing back his or her arm to initiate a pass and the forward and/or upward movement and/or extension of the player's arm to launch or impart acceleration and/or spin onto the ball as it releases from the player's throwing hand. In yet another implementation, module 460 may utilize the identification of a punt of the football and an identification of either a catch of the football or a ground impact of the football to determine, display and/or record hang time of the football for the punt. In one implementation, module 460 may utilize the identification of football drops and football catches to track, display and store pass completion percentages for analysis, comparison between players, training and game use (as described above).

In one implementation, module 460 directs processor 126 to receive or obtain signals from ball 10 during a continuous series of football events and to determine or identify each of the multiple football events of the continuous series. Examples of continuous series of football events, such as might occur during a single play or "down" of a football scrimmage, or game include, but are not limited to, (1) snap, 3 step drop, pass release; (2) snap, 3 step drop, pass release, catch; (3) snap, 3 step drop, pass release, drop; (4) snap, 5 step drop, pass release; (5) snap, 5 step drop, pass release, catch; (6) snap, 5 step drop, pass release, drop; (7) snap, 5 step drop, pass release; (8) snap, 7 step drop, pass release, catch; (9) snap, 7 step drop, pass release, drop; (10) shotgun/quick snap, pass release; (11) shotgun/quick snap, pass release, catch; (12) shotgun/quick snap, pass release, drop; (13) pass release, catch; (14) pass release, drop; (15) snap, catch, step, punt; (16) snap, two steps, punt; (17) snap, catch, punt; (18) catch, step, punt; (20) catch, two steps, punt; (21) catch, punt; (22) punt, hang time, catch; (23) punt, hang time, ground impact; (24) punt, hang time, ground impact, subsequent ground impact, ball stop; (25) snap, hold, kick; (26) hold, kick; and (27) other combinations of one or more of the above-listed events. Using such signals, module 460 determines or identifies each of the distinct individual events of the series.

In one implementation, module 460 additionally tracks the timing at each of the identified football events using the time at which different ball travel parameters or signals were generated by sensor 252 and/or received from ball 10. For example, module 460 may identify the time at which each individual event began, the duration of each individual event and the time which each individual event ended. Module 460 may identify elapsed time between different events, whether they be consecutive events in a series of events or non-consecutive events separated by one or more intervening events.

Figure 32:
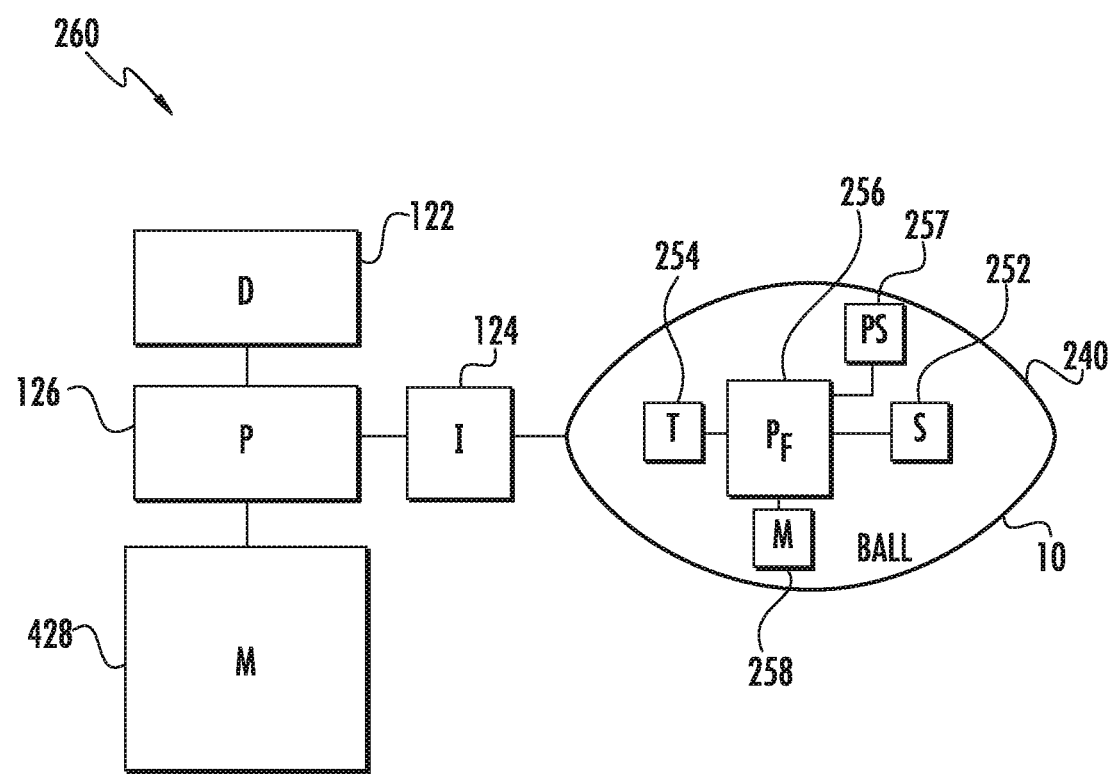

FIG. 32 schematically illustrates a sport performance system 260. System 260 can be substantially similar to system 420 and can include all the components of system 420. The ball 10 comprises another implementation of the ball sensing system 240 including sensors 252 and transmitter 254. The ball 10 and the ball sensing system 240 can further include a processor 256 and a ball system memory 258. The processor 256 can be similar to processor 126. Ball system memory 258 can be similar to memory 428 with the some or all of the modules as memory 428. Memory 258 can be used to store information, data, signals, and processed signals collected, produced, or generated by the sensors and/or the processor 256. In one implementation, the ball sensing system 240 can also include a power source 257, such as a battery or a rechargeable battery.

Memory 258 can include football travel parameter module 460 and football event signature storage 462. Football travel parameter module 460 of memory 258 can contain or comprise code to direct processor 256 to analyze and/or present signals or data received from sensors 252. In one implementation, football travel parameter module 460 of memory 258 can direct processor 256 to determine or identify at least one football event by comparing at least one attribute of the football, based upon signals received from sensor 252 or derived from such signals, to one or more predetermined signature characteristics of different football events. In one implementation, the one or more predetermined signature characteristics of different football events are stored in event signal storage 462 of memory 258. For example, multiple football events with football 270 may be sensed and stored, wherein processor 256, following instructions contained in football travel parameters module 460 or another set of computer code, compares one or more of the sensed ball travel parameters (acceleration values, spin, orientation, height, velocity composition over a period of time) with the known identity of each football event to associate each known football event with a specific football event signature comprising a group of one or more of the sensed ball travel parameters. In one implementation, module 460 of memory 258 can direct processor 256 to receive or obtain signals from ball 270 during a continuous series of football events and to determine or identify each of the multiple football events of the continuous series. In one implementation, module 460 of memory 258 additionally tracks the timing at each of the identified football events using the time at which different ball travel parameters or signals were generated by sensor 252 and/or received from ball 270.

In one implementation, sensor 252 comprises accelerometers carried by football 10 sensing acceleration of football 10. In one such implementation, module 460 identifies football events and also tracks the timing of such football events by comparing signals received from football 10 indicating acceleration of football 10 over time to corresponding football event acceleration signatures. FIGS. 33-39 illustrate example football event acceleration signatures for comparison with acceleration signals received by module 460 from ball 10 identify and time track different football events.

Figure 33:
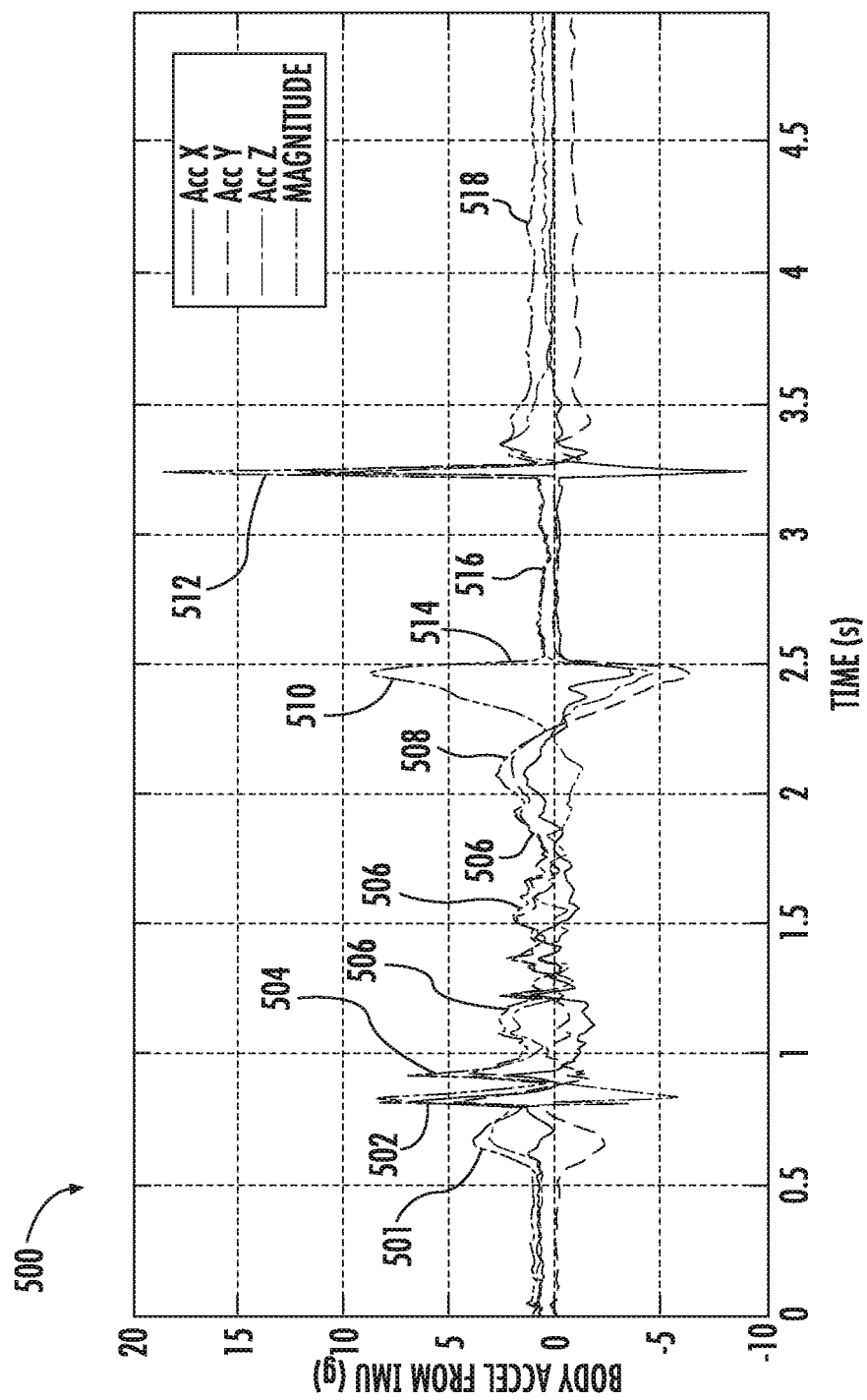
FIG. 33 is a diagram of an example American football event acceleration trace signature for a continuous series of football events utilized by the sport performance system of FIG. 31.

FIG. 33 illustrates an example football event acceleration trace signature for a continuous series of football events. In particular, FIG. 33 illustrates signals output for acceleration along X, Y and Z orthogonal axes along with a magnitude tracing from a single 3-axes accelerometer positioned within the football 10. FIG. 33 illustrates an example football acceleration trace signature for an under center snap, a three step quarterback drop, a pass and a catch. As shown by FIG. 33, trace 500 of acceleration comprises amplitude spikes that occur in response to the ball being snapped (spike 501), in response to the ball being received under center by impacting the quarterback's hands (spike 502), in response to the ball being withdrawn from beneath the center by the quarterback (spike 504), in response to each of the rearward drop back steps taken by the quarterback (spikes 506), in response to the drawback (cocking or drawback) of the quarterback's arm carrying the ball (the initiation of a pass) (spike 508), in response to the forward motion of the arm in the launch of the ball (spike 510), in response to impact of the ball with the receivers hands, chest or the like during a catch (spike 512). As shown by FIG. 33, at completion of the launch indicated by spike 510, forces no longer being applied to the ball such that acceleration drops as indicated by portion 514. While in flight, acceleration remains substantially constant or declines as indicated by portion 516 of trace 500. As indicated by portion 518 of trace 500, the ball remains generally static while in the receiver's hands after a catch, reflected by the fact that no acceleration spikes take place. Although portion 516 of trace 500 is illustrated as lasting 0.6 seconds, the length of this portion will vary depending upon the length, acceleration, speed, launch angle, and environmental conditions at the time of a throw/pass. Utilizing this length and a detected acceleration or speed of football 10, a distance of a throw/pass may be calculated by module 460. Should a fumble occur after a catch, acceleration spikes would be exhibited and identified.

Although trace 500 illustrates a continuous series of events, football event signatures may comprise distinct events not part of a series of events. In some implementations, the database forming event signature storage 462 is established by sensing multiple calibration samples of a single known or pre-identified event or multiple calibration samples of few known or pre-identified consecutive football events and storing their associated acceleration traces. In some implementations, the database forming event signature storage 462 is established by sensing several continuous series of known events and subsequent parsing out the individual events and storing the individual football events as separate items. In yet another implementation, event signature storage 462 may be established by storing multiple continuous series or sequences of known events. In some implementations, statistical procedures, such as averaging, cropping, normalizing and the like may be applied to the captured calibration traces when establishing the football event signature acceleration traces.

Figure 34:
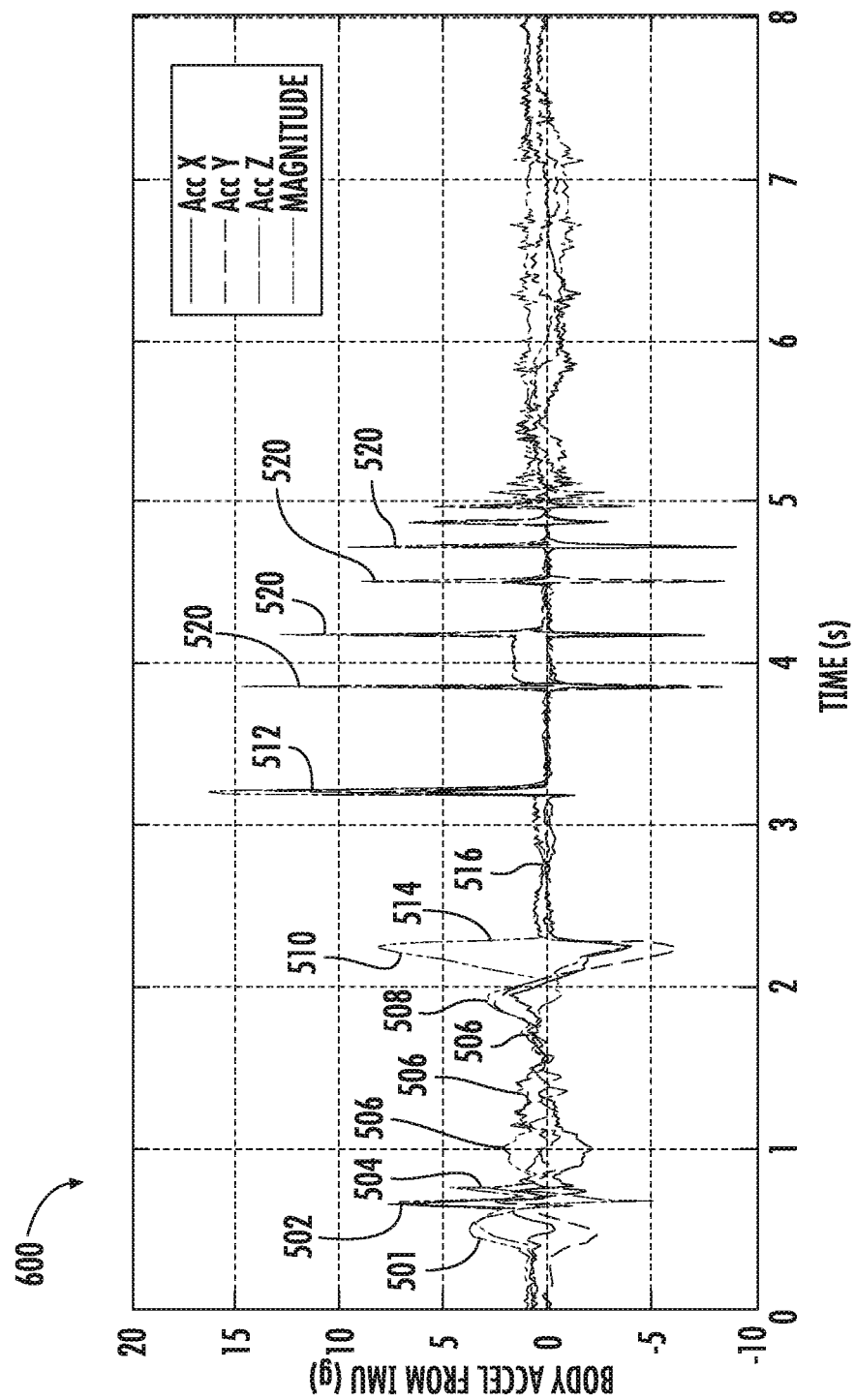
FIG. 34 is a diagram of another example American football event acceleration trace signature for a continuous series of football events utilized by the sport performance system of FIG. 31.

FIG. 34 illustrates a second example football event acceleration trace signature for a continuous series of football events. FIG. 34 illustrates an example football event acceleration signature trace 600 for a three step quarterback drop, pass and drop. As shown by FIG. 34, signature 600, depicting multiple football events, corresponds to signature 500 up until the time that the football impacts a receiver's (or defenders) body (hands, chest or the like) indicated by acceleration spike 612, but wherein football 10 is subsequently dropped as reflected by the acceleration spikes 620 at each impact of football 10 with the ground, following impacts 612 in close time proximity. The same football events indicated by their corresponding similarly portions of traces 500, 600 are numbered similarly. As reflected by FIGS. 33 and 34, the acceleration spikes portions of traces 500, 600 corresponding to the same individual football events correspond to one another in shape such that such shapes serve as signatures or fingerprints for the football particular events. Should the time delay between impact 612 and the next consecutive identified ground impact 620 be sufficiently long to exceed a predefined time threshold, module 460 may alternatively identify acceleration spike 612 as indicating a catch of the football with the next subsequent acceleration spike 620 being identified as a fumble of the football. In such a manner, not always the shape of the portion of the trace utilize in identifying a football event, but also its proximity and time to adjacent portions of the trace and the shapes of such adjacent portions of the trace.

Figure 35:
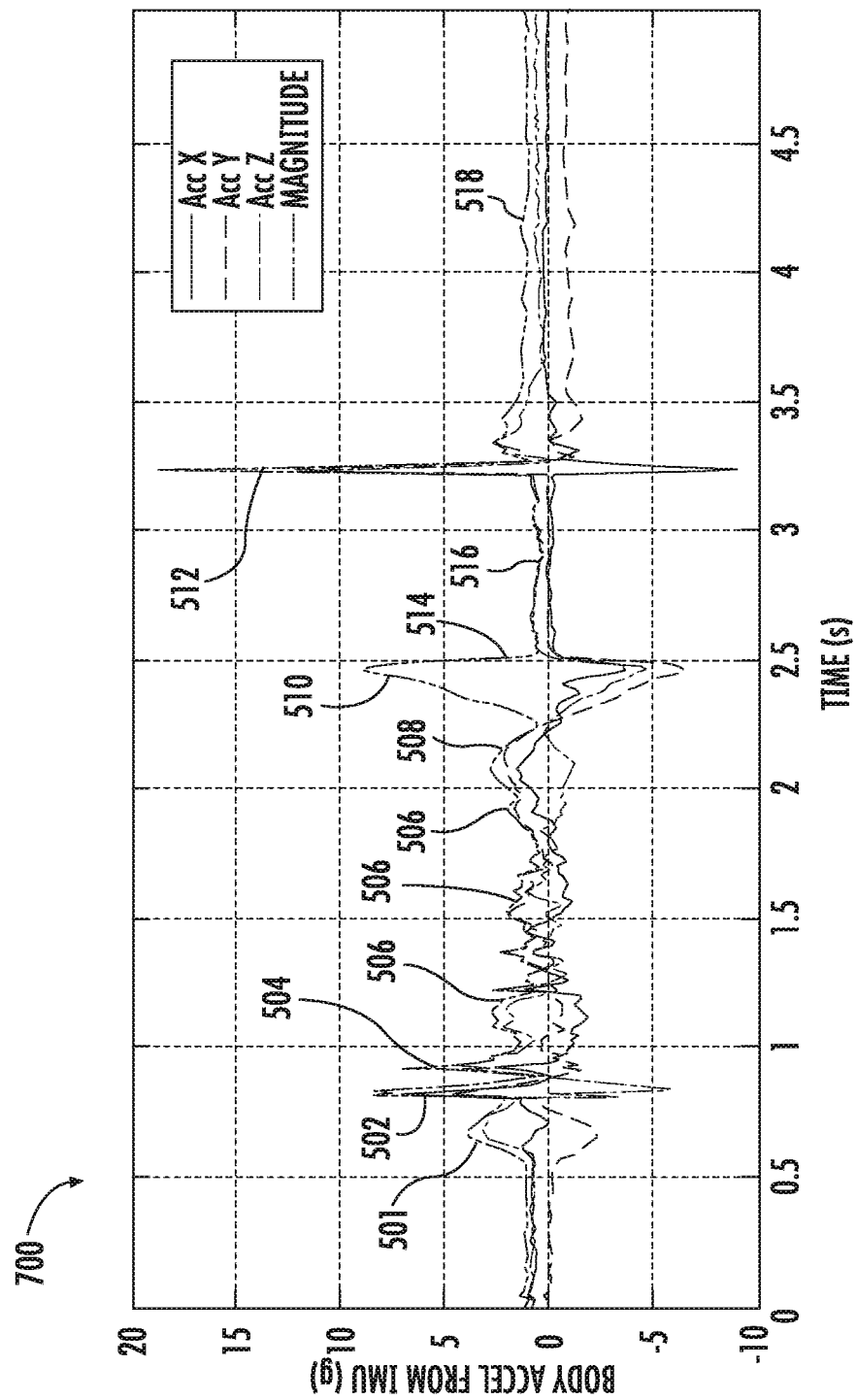
FIG. 35 is a diagram of another example American football event acceleration trace signature for a continuous series of football events utilized by the sport performance system of FIG. 31.
Figure 36:
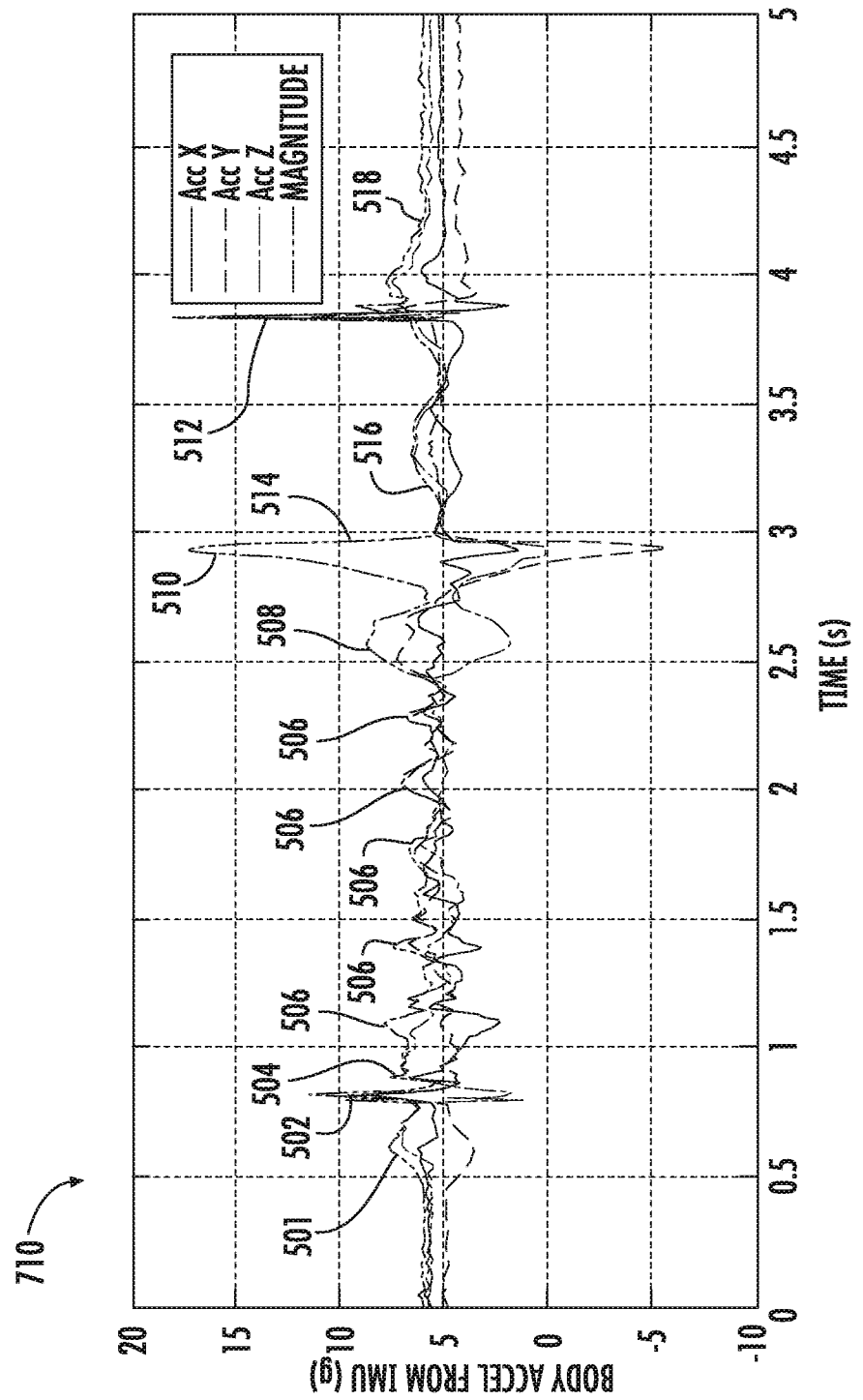
FIG. 36 is a diagram of another example American football event acceleration trace signature for a continuous series of football events utilized by the sport performance system of FIG. 31.
Figure 37:
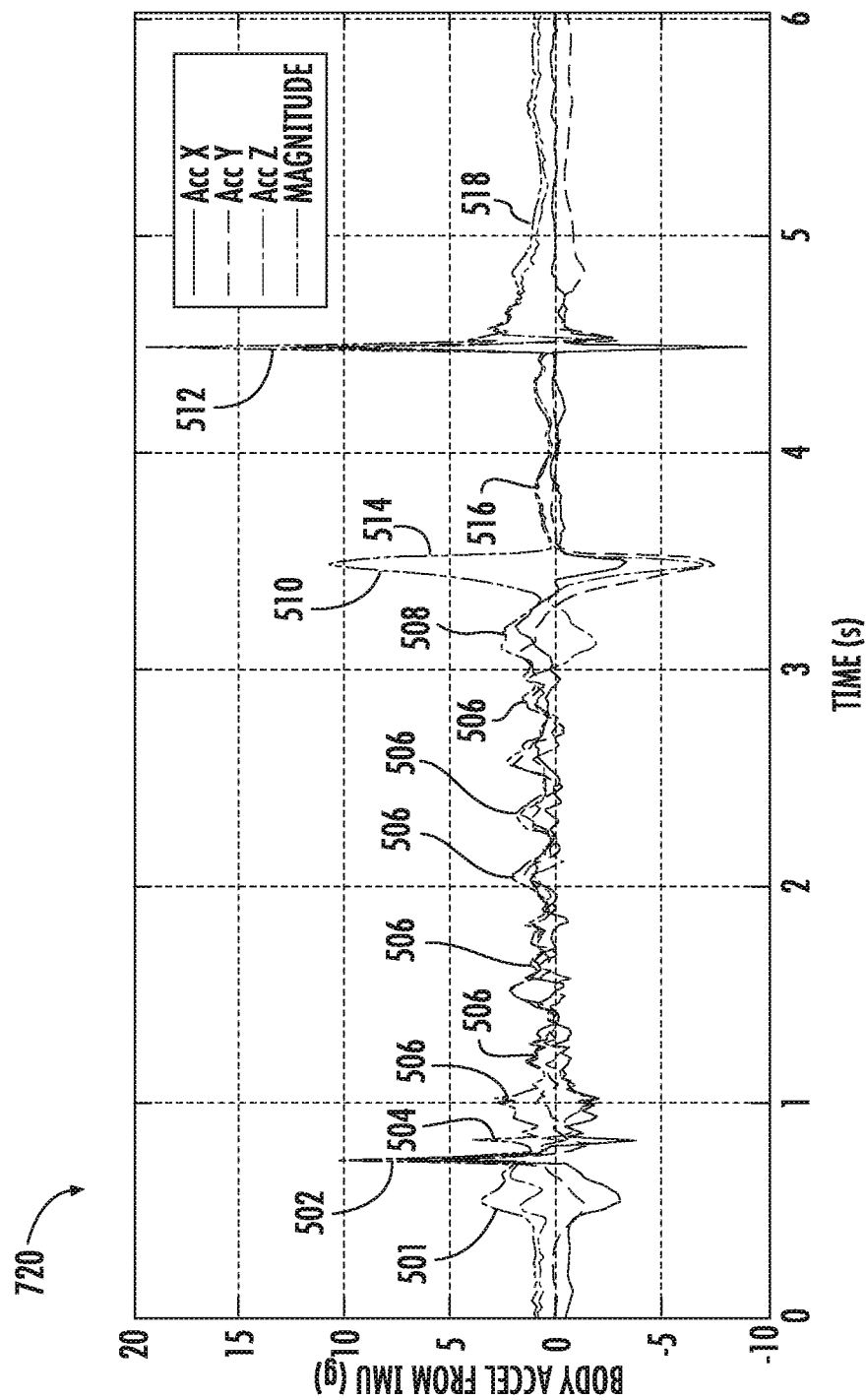
FIG. 37 is a diagram of another example American football event acceleration trace signature for a continuous series of football events utilized by the sport performance system of FIG. 31.

FIGS. 35-37 illustrate example acceleration traces serving as signature traces for various multi-step quarterback drops from under center follow a snap and subsequent passes which are caught. FIG. 35 illustrates an example signature trace 700 produced by a continuous series of football events comprising an under center snap, a three-step drop, a pass and a catch. FIG. 36 illustrates an example signature trace 710 produced by a continuous series of football events comprising an under center snap, a five-step drop, a pass and a catch. FIG. 37 illustrates an example signature trace 720 produced by a continuous series of football events comprising an under center snap, a seven-step drop, a pass and a catch. Each drop back step is indicated by spikes 506. In other implementations, the signature trace can track other forms of incomplete passes beyond a pass impacting the receivers' hands followed by an impact with the ground. The passed ball may not impact the receivers' hands. It may impact the ground directly, or impact other body part or parts or a defender and then impact the ground.

As illustrated by FIGS. 35-37, each of the individual football events of the different series has similar, consistent shapes and characteristics, reflecting that each event has a unique signature that is used by module 460 to identify subsequent football events through comparison. As illustrated by FIGS. 35-37, three-step, five-step and seven set drops each produce distinct and distinguishable acceleration traces with a distinct number of spikes, allowing module 460 to identify the number of drop back steps taken by quarterback from under center. In implementations where the positioning or movement direction of football 10 may also be determined from signals produced by sensor 252, module 460 may also identify football event such as the quarterback stepping up in a pocket, bootlegging or scrambling to the left or to the right prior to a pass. The extent or distance of such quarterback movement may be indicated by the number of steps indicated from an acceleration trace.

Figure 38:
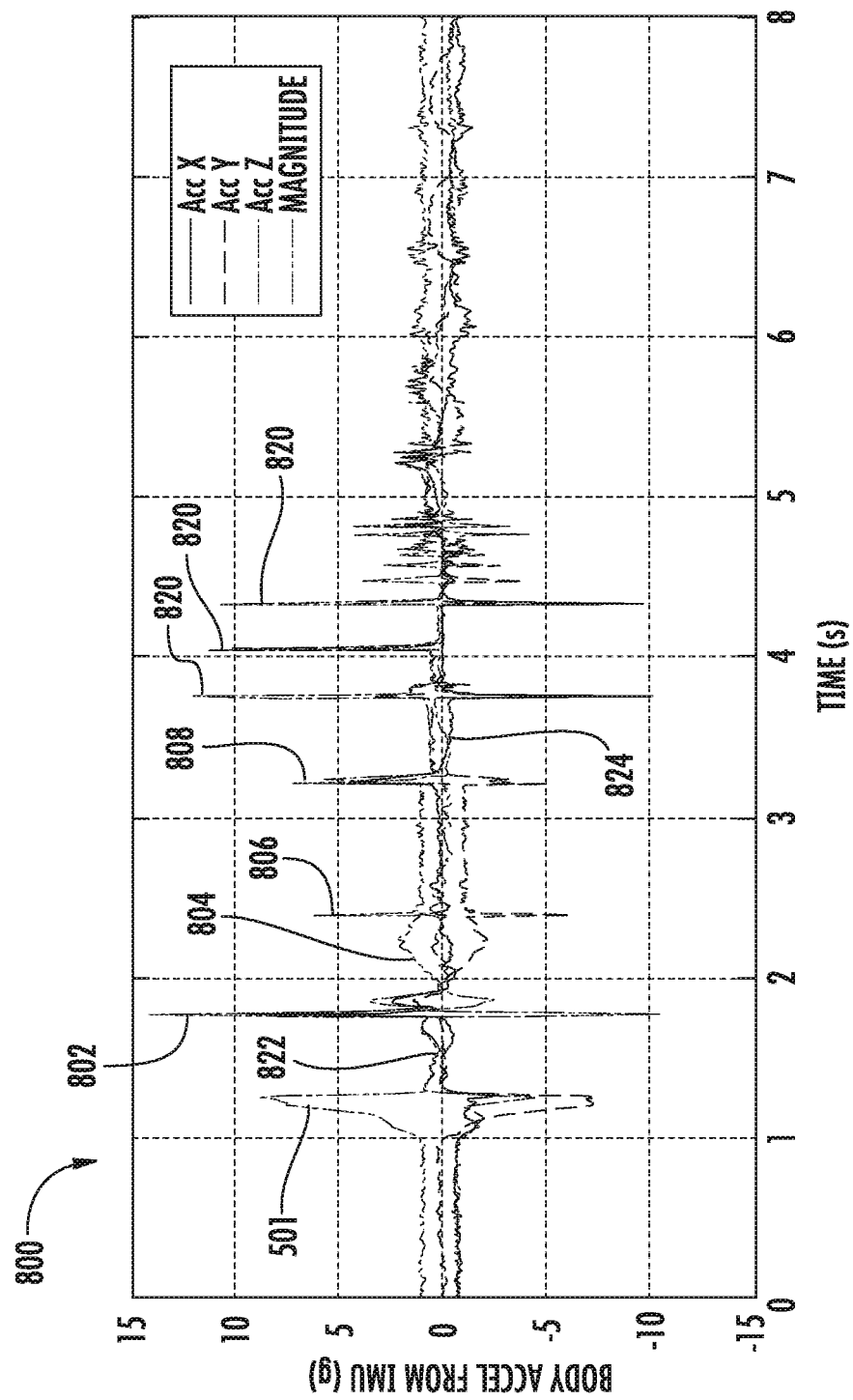
FIG. 38 is a diagram of another example American football event acceleration trace signature for a continuous series of football events utilized by the sport performance system of FIG. 31.
Figure 39:
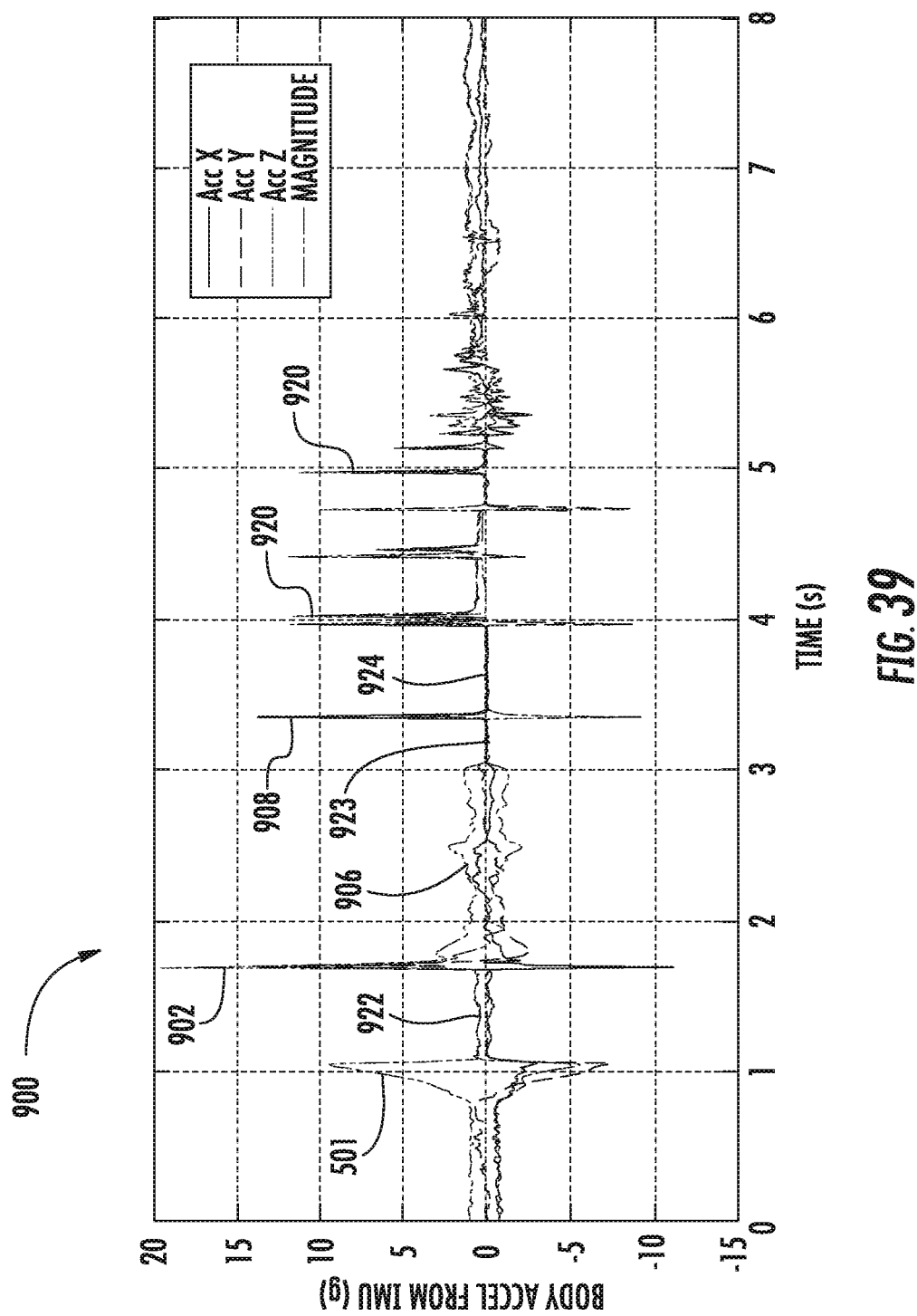
FIG. 39 is a diagram of another example American football event acceleration trace signature for a continuous series of football events utilized by the sport performance system of FIG. 31.

FIGS. 38 and 39 illustrate example acceleration traces serving as signature traces for continuous series of football events involving kicking and punting of football 10. As with the above signature traces, FIGS. 38 and 39 illustrate signals output for acceleration along X, Y and Z orthogonal axes along with a magnitude tracing using a single 3-axes accelerometer coupled to the ball 10. FIG. 38 illustrates an example trace 800 produced by a continuous series of football events during an example field goal kick that is short or which impacts the ground rather than being caught by a net or a capture behind the goalpost. As shown by FIG. 38, trace 800 of acceleration comprises amplitude spikes that occur in response to the ball being snapped (spike 501), in response to the ball being received by the hands of a holder (spike 802), in response to the ball being lowered to the ground by the holder (spike 804), in response to the ball impacting and placed on the ground (spike 806), in response to the ball being impacted by the kicker's foot (spike 808), and in response to the ball subsequently bouncing or impacting the ground after flight (spikes 820). In other implementations where the field-goal is good and the football is caught by a net behind the goalpost or is caught by a catcher, spikes 820 may not occur or may be omitted from signature trace 800. As further shown by FIG. 38, the flight of the football from the snap to the holder is represented by portions 822 of trace 800. The flight of the football following the kick is represented by portion 824 of trace 800. Although portion 824 of trace 800 is illustrated as lasting less than one second, the length of this portion will vary depending upon the length, acceleration, speed, launch angle, and environmental conditions at the time of the kick. Utilizing this length and a detected acceleration or speed of football 10, a distance of a kick may be calculated by module 460. A fake field goal would have a different acceleration signature trace.

FIG. 39 illustrates an example trace 900 produced by a continuous series of football events during an example punt that impacts the ground rather than being caught. As shown by FIG. 39, trace 900 of acceleration comprises different spikes corresponding to different football events in the series. Different spikes having different shapes and/are different amplitude occur or are produced in response to the ball being snapped (spike 501), in response to the ball being received by the hands of the punter (spike 902), in response to the steps by the punter prior to the punt (spikes 906), in response to the ball being impacted by the punter's foot (spike 908), and in response to the ball subsequently bouncing or impacting the ground after flight (spikes 920). In other implementations where the punted football is caught, spikes 920 may not occur or may be omitted, or may be a single spike from signature trace 900. As further shown by FIG. 39, the flight of the football from the snap to the holder is represented by portions 922 of trace 900. The release of the ball by the punter prior to the ball being punted is indicated by portion 923 of trace 900. The flight of the football following the punt, or hang time, is represented by portion 924 of trace 900. Although portion 924 of trace 900 is illustrated as lasting less than one second, the length of this portion will vary depending upon the length, acceleration, speed, launch angle, and environmental conditions at the time of the punt. Utilizing this length and a detected acceleration or speed of football 10, a distance of a punt may be calculated by module 460. A fake punt would have a different acceleration signature trace.

Once football travel parameter module 460 has identified or determined one or more football events, module 460 directs processor 126, 256 to output graphics, information, lights, sound or other indicators based upon and/or utilizing the determined or identified football events. In one implementation, module 460 cooperates with display module 239 to display graphics representing the one or more football events by displaying a simulation of football 10 experiencing or undergoing the one or more football events. In one implementation, the timing, distances and/or positioning of the football in the graphical simulation are based upon football travel parameters received from sensor 252 of football 10.

In one implementation, module 460 stores and displays different data based upon identified football events in the timing of such identified football events for evaluation, comparison and/or training. For example, by identifying a snap of a football, module 460 may also identify the time elapsed from the identified snap to a second football event such as a punt, kick or pass of the football. By identifying a cocking of a football throw (a first football event) and the pass release or launch of the football (a second football event), module 460 may identify the time elapsed to determine a quarterback release time or quick release for storage, display and/or comparison/training purposes. By identifying a snap of the football and receipt of the snapped football by holder, punter or quarterback (during a quick snap or shotgun snap), the quality of the long snap may be stored, displayed and evaluated by module 460. By identifying when the football initially impact the ground following a kickoff for punt and by identifying each bounce of the football as well as a velocity and spin of football, model 460 made determine and display a travel distance of the football following the determined initial ground impact. Such a determination may facilitate training for kickoffs and onside kicks. As will be described below, the spiral efficiency of such long snaps may further be evaluated, displayed and compared by module 460. The present system provides the ability for a player, coach, team or organization to analyze one or more football events in a variety of different ways, simply, accurately, and comprehensively to evaluate a practice, an exercise, an in game play, or other football event(s). Additionally, the present system can be used to identify what event or events occurred to the football. In other words, a player could pick up the football and perform a series of football events, and the system can determine what the football event or events were based upon the signature trace. For example, the system can be configured to communicate that the football was just snapped, thrown and caught by a receiver. The system can also communicate more details such as the duration of each event or combination of events.

In one implementation, module 460 utilizes the one or more events as a basis for triggering a visible or audible alarm. For example, in one implementation, module 460 may utilize the identification of a football snap as a starting point for tracking the time for the quarterback to throw the ball or for a punter to kick a ball, wherein a visible or audible alarm is triggered at a predetermined time period following the identified snap. In another implementation, the visual or audible alarms may be emitted at a pre-determined frequency, such as, for example, once per second. In one implementation, module 460 may utilize the identification of the football snap as a starting point for determining a time following the snap to output a visible or audible indication that an opposing defense may initiate a rush, such as in a touch or flag football game. In one implementation, visible and/or audible alarms are provided with one or more light or emitters carried by football 10, wherein processor 126, 256 transmits signals to football 10 initiating the alarm, and/or processor 256 initiates the alarm. In another implementation, such visible and/or audible alarms are provided by an auxiliary sound or light emitter, positioned along a playing field, which receives triggering signals from processor 126 or 256. In another implementation, such visible and/or audible alarms are provided on the personal electronic device itself. In another implementation, such visible and/or audible alarms may be produced by a sound and/or light emitter positioned within or attached to the ball. In another implementation, such visible and/or audible alarms are provided by a remote sound and/or light emitting device. In other implementations, the occurrence or the time of the snap event of the football can be substituted by another event to indicate the snap of the football. An audible indicator can be used to indicate the snap of the football, such as the user saying "hike!". In another implementation, one or more predetermined taps on the football by the user in a predetermined location on the football can be used to indicate the snap of the football. In another implementation, an input can be made on a remote electronic device at the time of the snap of the football. In another implementation, the football may be positioned in a predetermined position for a predetermined amount of time to indicate the snap of the football, such as the football can be held in a horizontal position for 2 seconds to trigger, simulate or initiate the snapping of the football.

In one implementation, module 460 not only associates time with each football event or the series of football events, but also associates football travel parameters, characteristics of the football in motion, with the identified or determined football event or series of football events. For example, in one implementation, module 460 may identify the withdrawal or cocking of a quarterback's arm to initiate a pass. Utilizing such information and the time at which the cocking of a quarterback's arm begins, module 460 determines and associates a sensed height of the football at such time to the determined beginning of the throwing motion, facilitating analysis of throw mechanics. Likewise, module 460 may identify the release of the football. Utilizing the time at which the football is determined to be released, module 460 may associate sensed data regarding a height of the football to the time at which the release of the football takes place, allowing analysis and training regarding the release height of football by the quarterback. In another implementation, module 460 determines when a ball is released or when the ball initiates flight following a punt or kick, wherein module 460 may associate spin characteristics for the particular time in which module 460 determines that the ball is in flight to determine spiral efficiency or other spin characteristics for a pass, punt or kick.

Figure 40:
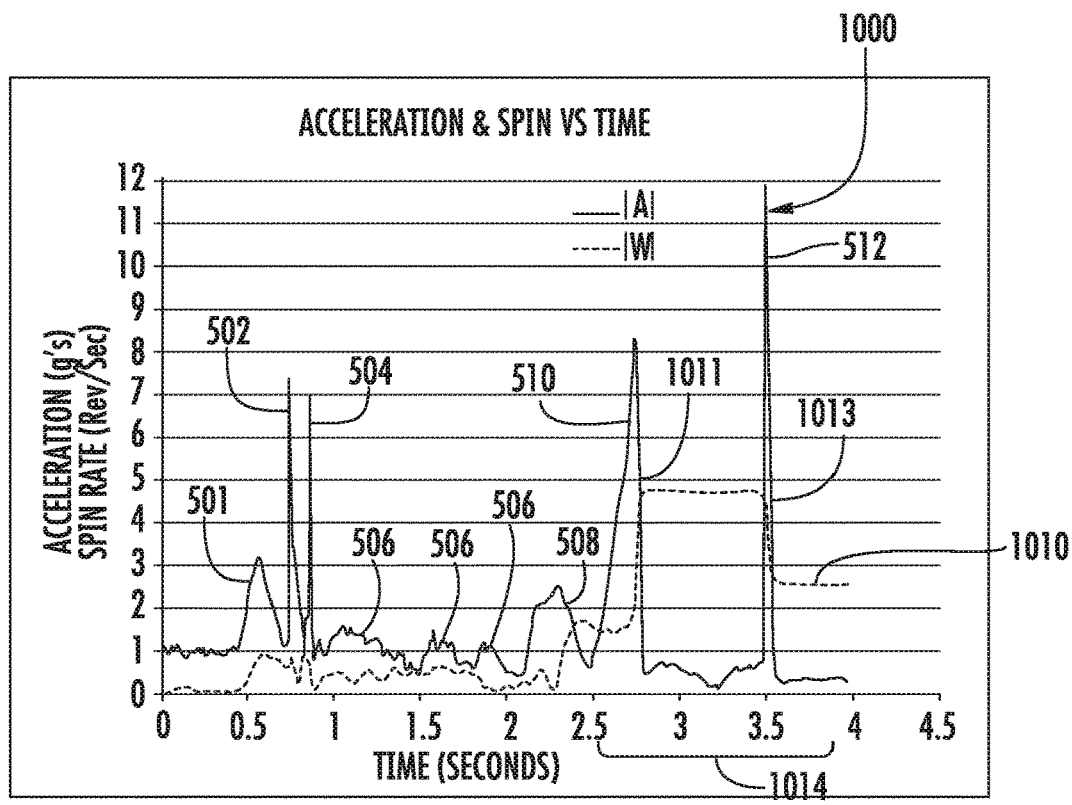
FIG. 40 is a diagram of an example football event acceleration trace overlaid with respect to an example spin rate trace and revolutions per second.

FIG. 40 is a graph overlaying a received acceleration trace 1000 over time with a spin rate trace 1010 over the same period of time. In addition to comparing the received acceleration trace to one or more stored signature acceleration traces to identify distinct events, module 460 evaluates the spin, if any, of the football, or its spiral efficiency during flight, during different football events. For example, module 460 evaluates the spin and/or spiral efficiency of a football when in flight during a pass (portions 824, 924 and FIGS. 38 and 39, respectively), the spin and/or spiral efficiency of a football when in-flight following a snap to a holder (portion 822 of trace 800 of FIG. 38), to a punter (portion 922 of trace 900 of FIG. 39), or to a quarterback such as following a shotgun or quick snap; and evaluates the spin and/or spiral efficiency of a football when in-flight after being kicked (portion 824 of trace 800 of FIG. 38) or punted (portion 924 of trace 900 of FIG. 39).

FIG. 40 illustrates the received acceleration trace 1000 and the received spin (revolutions per second) trace 1010 over time for a series of events comprising an under center snap, three step drop, throw and catch. Module 460 directs processor 126, 256 to compare the received acceleration trace with previously stored acceleration signature traces (such as shown in FIGS. 33-39). Based upon this comparison, processor 126, 256 identifies acceleration spike 501 as corresponding to a snap of the football, acceleration spike 502 as corresponding to the quarterback receiving the ball under center, acceleration spike 504 as corresponding to moving of the ball from under center by the quarterback, acceleration spikes 506 to each of the three steps of the three-step drop, acceleration spike 508 is a cocking of the arm prior to the throw, acceleration spike 510 is forward movement of the arm and the final launch of the football, and acceleration spike 512 as the catch of the football (the impact of the ball with the receiver). If additional acceleration spikes immediately followed the catch within a pre-defined period of time, module 460 may alternatively identify spike 512 as part of a football event constituting a drop of the football (or an incompletion). As further shown by FIG. 40, the spin rate of the football drastically increased upon release of the football at time 1011 (can be indicative of the quarterback's finger tips imparting spin to the football at the point of release) and dropped off upon impact with the receiver's hands at time 1013.

Figure 41:
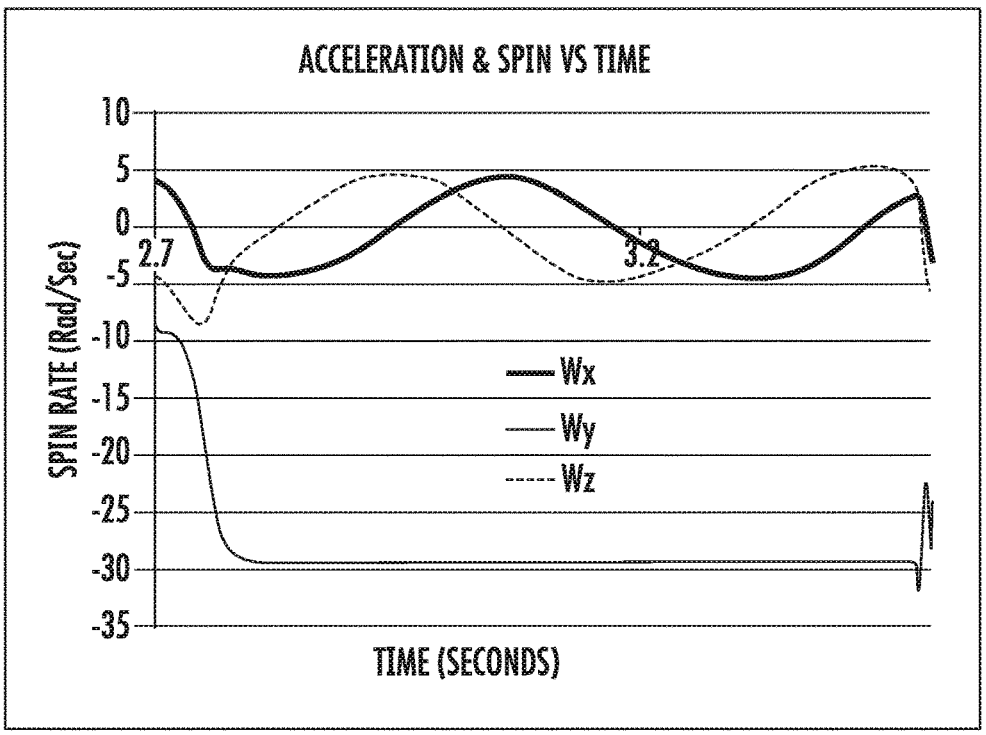
FIG. 41 is a diagram of an example spin rate trace in radians per second.

FIG. 41 is a graph depicting a football travel parameter of football 10 during the time period 1014 shown in FIG. 40. The football travel parameter shown in FIG. 41 is the spin rate in radians per second of football 10 along each of the three axes x, y and z during time period 1014. The illustrated spin rate $W_y$ shows generally reflects the spin of the football 10 about its longitudinal axis. The spin rate is highest upon leaving the quarterback's hands, drops and remains generally constant during most of the flight of the football. The illustrated spin rates $W_x$ and $W_z$ in radians per second indicate a degree of wobble of football 10 over time, and illustrates the spiral efficiency of football 10 during flight over time. In the example illustrated, football 10 is illustrated as rotating between +5 and −5 radians per second. A tighter spiral would be a case where football 10 rotates within a smaller spiral range about 0, say, for example, between +3 and −3 radians per second. A looser spiral (sometimes referred to as a "duck") would be reflected by a larger spiral range about the $W_x$ and $W_z$ spin rates. By determining a spin rate in radians per second, module 460 is able to determine a spiral efficiency of football 10 during the noted time period 1014. As a result, module 460 may output an evaluation of a pass, kick, punt or snap of a football on the basis of its spiral efficiency for training and comparison purposes.

Figure 42:
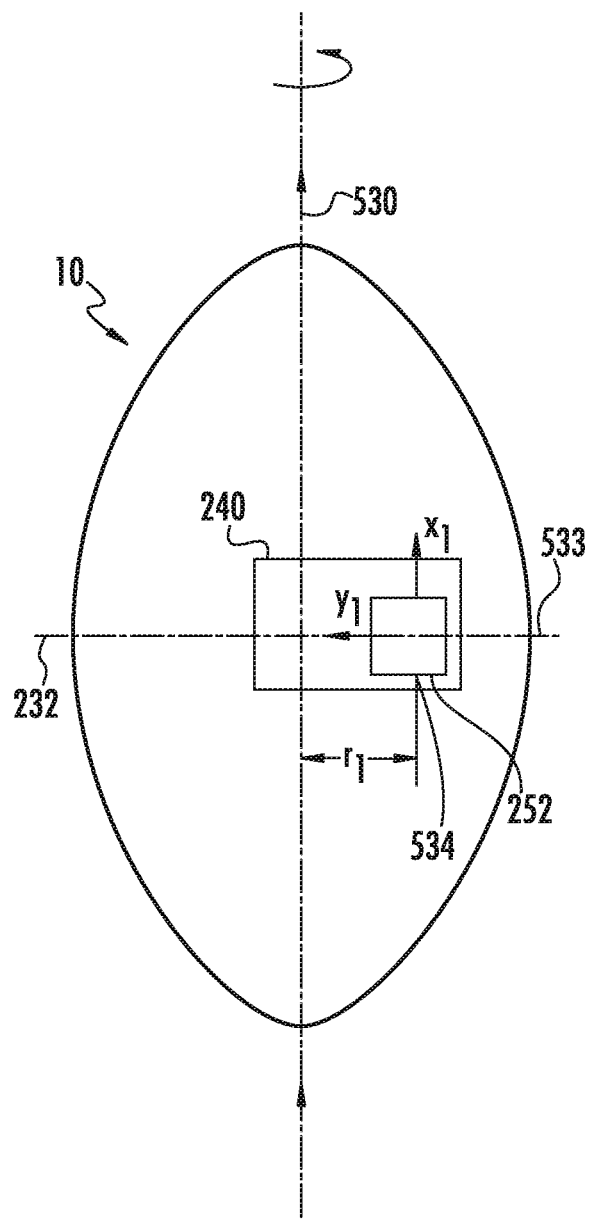
FIG. 42 is a top view of a football including a ball sensing system in accordance with an alternative implementation of the present invention.

Referring to FIG. 42, one implementation of the football 10 with the ball sensing system 240 is illustrated. The football 10 includes a major dimension that extends along a longitudinal axis 530 and a maximum transverse width of the football that extends along a transverse axis 532. The transverse axis 532 extends along a transverse plane 533. As shown in FIGS. 33-39, the at least one sensor 252 can be a three-axes accelerometer 534. The accelerometer 534 is configured for measuring acceleration in terms of g units (a unit of measure of acceleration due to the Earth's gravity at sea level, which is 32.2 feet/s$^2$) about three axes (x, y and z axes). The accelerometer 534 can be specified for various g ranges. The g range refers to the full scale range of the accelerometer in a single axis (often referred to as its specification range or spec range). For example, the accelerometer can be rated with a maximum g range of 2 g, 8 g, 16 g, 24 g, 100 g, or larger. Accelerometers are commonly priced based upon their g rating. Accordingly, a 24 g rated accelerometer is typically more expensive than a 16 g accelerometer. The g rating of the accelerometer used for a particular application can be a function of the information that is desired or a desired cost target. For example, the g's applied to a football during a kick-off or a field goal attempt can be as large as 300 g over a short time period. If the peak force applied to a football during such a kick is desired, then use of one or more accelerometers rated near 300 g or higher would be required. In other implementations, accelerometers of other sizes can be used.

Figure 43:
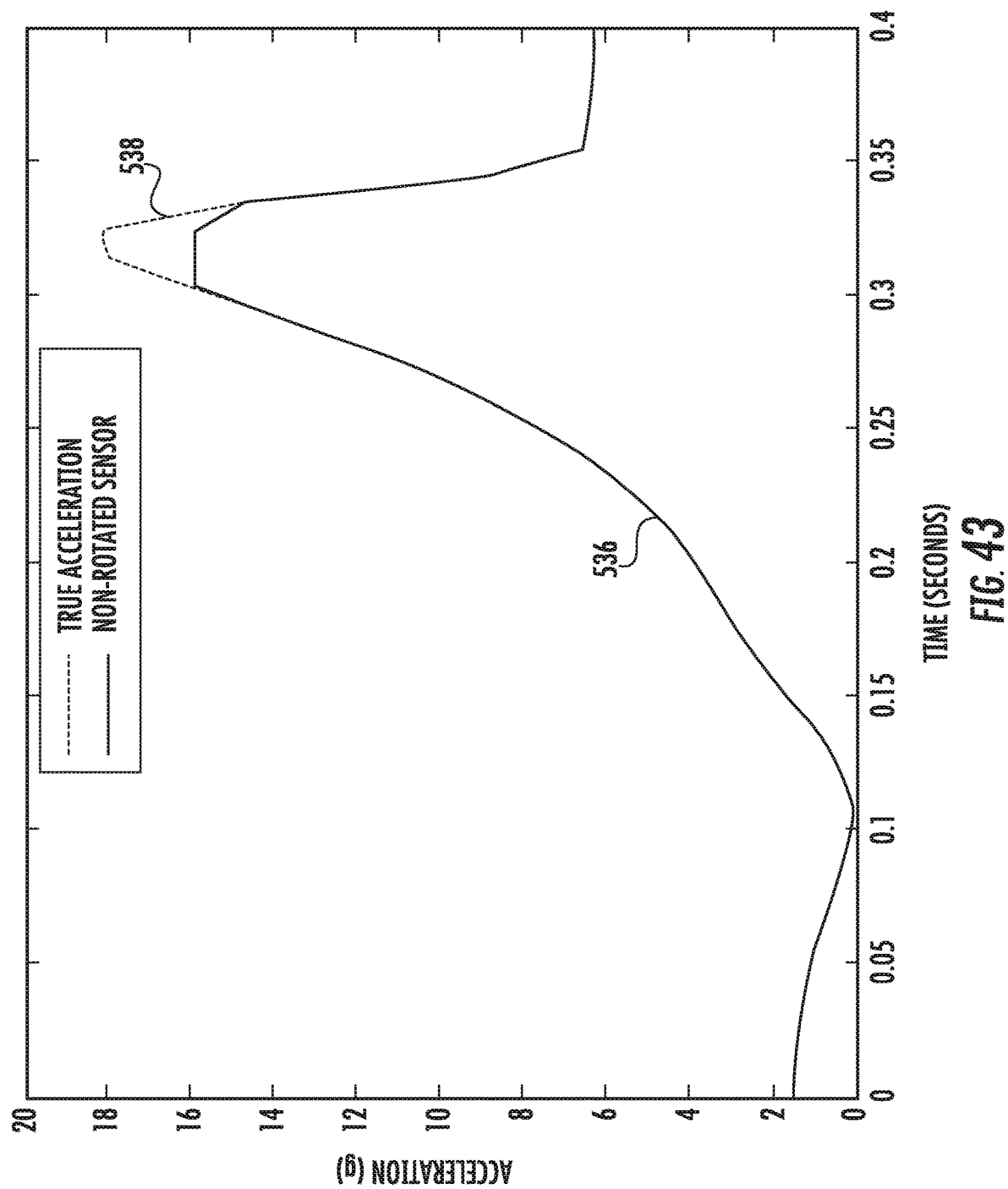
FIG. 43 is a graphical representation of the acceleration of a football during the throwing motion of a user.

The accelerometer of FIG. 42 can be a 3-axes, 16 g accelerometer aligned with its x axis being parallel to the longitudinal axis 530 and its y-axis parallel in line with the transverse axis 532. In another implementation, the accelerometer can be a single axes (1 axis), 16 g accelerometer with the single axis being parallel to the longitudinal axis 530 of the football. In this manner, the x-axis (or single axis for a 1 axis accelerometer) extends in the direction of travel, or trajectory, of the football when thrown. FIG. 43 is a graph representing the acceleration of a football over time in g units in the direction of travel or trajectory of the football as it is thrown. The data trace 536 shows the acceleration measured by the accelerometer 534 aligned as shown in FIG. 42 with the x-axis parallel to axis 530. During the act of throwing the football, the acceleration of the football along the x-axis increases as the user starts his or her throwing motion, and then drops off when the football leaves the user's hand. However, the peak acceleration of the thrown football 10 represented by data curve 536 cannot be determined from accelerometer 534 as shown by data trace 536 because the maximum reading of the accelerometer 534 of FIG. 42 is 16 g. Accordingly, the data trace 536 appears as a truncated data trace.

Figure 44:
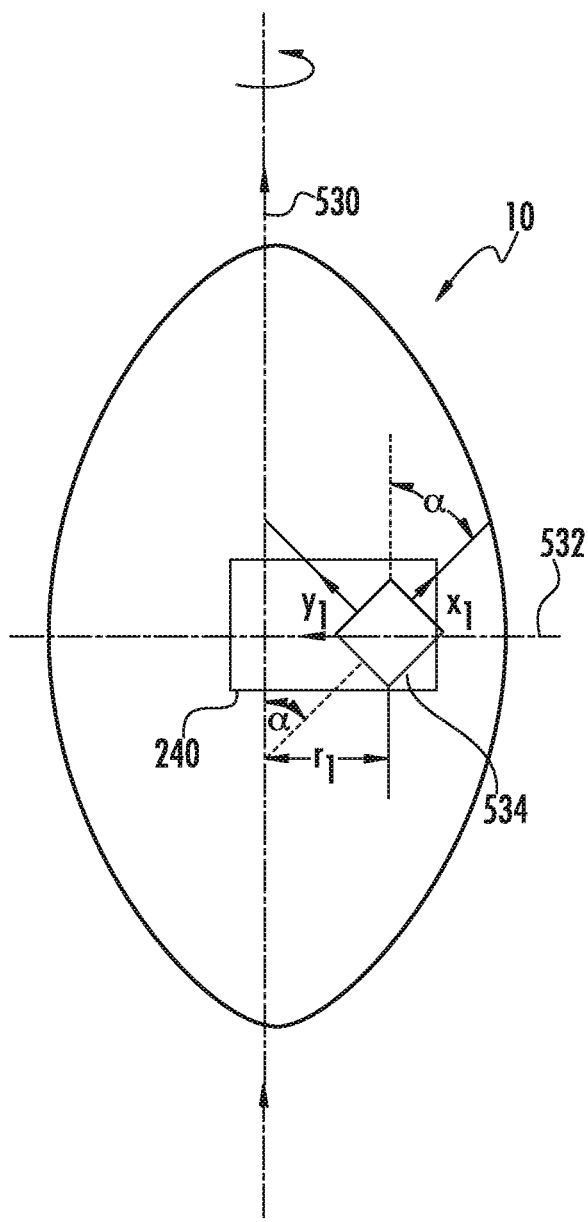
FIG. 44 is a top view of a football including a ball sensing system in accordance with an alternative implementation of the present invention.

One way to capture the peak acceleration of the thrown football in this instance would be to use a more expensive, larger accelerometer, such as a 24 g accelerometer. Importantly, the co-inventors have determined an alternate, more cost-effective accelerometer configuration that can be used to optimize the maximum g rating that can be recorded by a single sensor in a pre-determined direction. Referring to FIG. 44, when the accelerometer 534 is positioned such that the x-axis of the 16 g accelerometer is angled with respect to the longitudinal axis 530 (angle α), then the range of measurement of the accelerometer 534 for acceleration in the direction of the axis 530 can be increased by a factor inversely proportional to the cosine of angle α.

Acceleration=(g rating of Accelerometer)/(cosine α)

For example, the 16 g accelerometer of FIG. 44, when angled at an angle α of 45 degrees from the direction of travel of the thrown football (the longitudinal axis 530), can record g values in the direction of the thrown football up to 22.6 g. Data trace 538 of FIG. 43 represents the acceleration over time of the football being thrown and measured in the direction of travel of the football (the trajectory of the football) with one angled accelerometer 534. As shown in FIG. 43, the peak acceleration of the thrown ball is greater than 16 g and less than 22.6 g and therefore is fully shown by data trace 538. Accordingly, in applications where the direction of desired acceleration measurement of an object such as the football 10 is known, the one or more accelerometers used to measure such acceleration in the object can be positioned to be angled by angle α (up to 75 degrees) from the desired axis. In the present example, the desired direction or axis is the longitudinal axis 530. In other implementations, other sizes of accelerometers and other angles other than 75 degrees can be used. In one implementation, the angle α can be within the range of 15 to 75 degrees from the axis 530. As the angle α increases, the sensitivity of the accelerometer in the direction of the trajectory of the ball (generally along the axis 530) decreases. Accordingly, values of the angle α of less than 75 degrees can be desirable to maintain an acceptable level of sensitivity.

Figure 45:
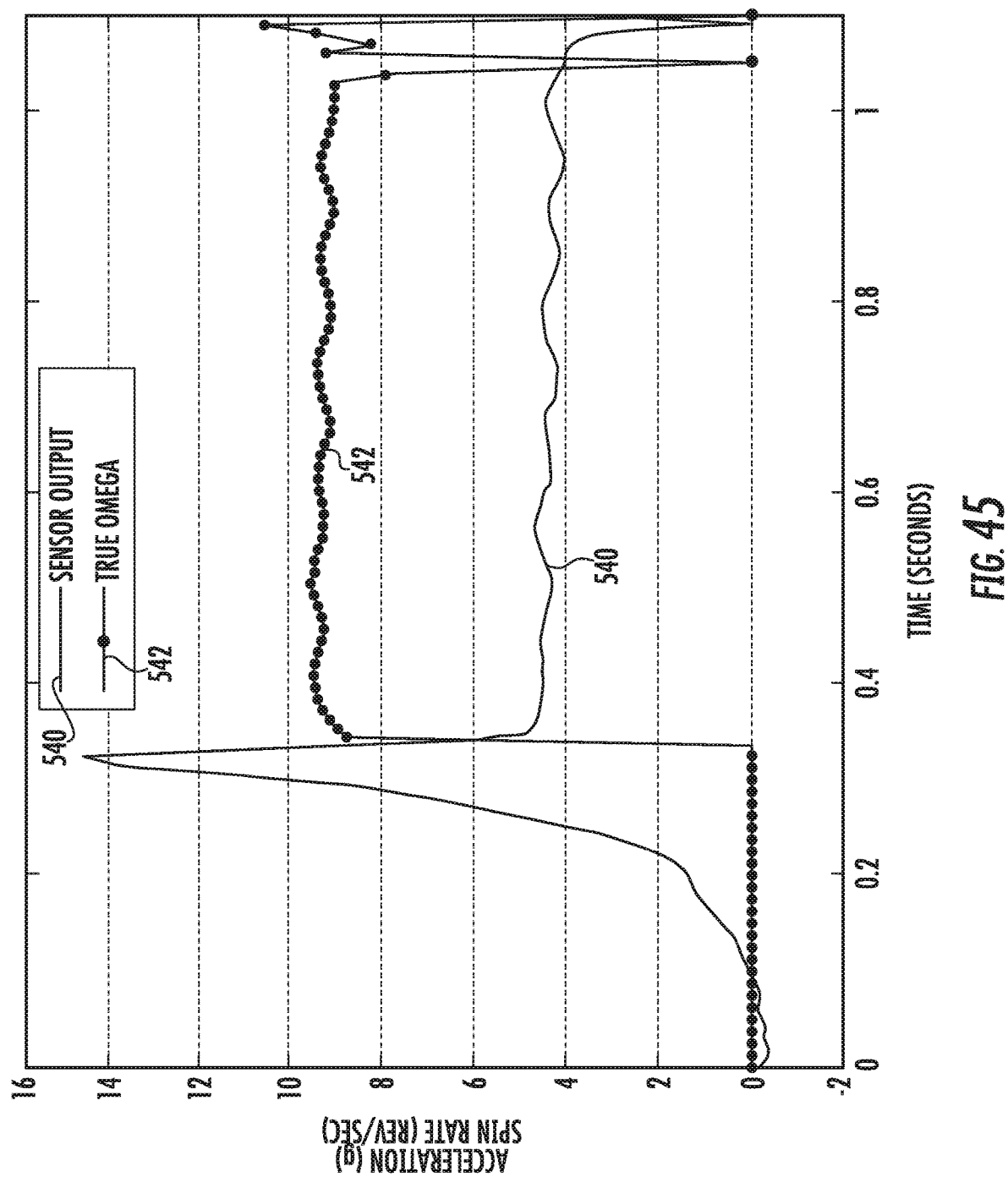
FIGS. 45 and 46 are graphical representations of the acceleration values and calculated spin rates of a thrown football over time.

Referring to FIGS. 44 and 45, in one implementation the accelerometer 534 can be used to measure the rotation or spin rate of the football 10 about the longitudinal axis 530 when thrown or otherwise traveling in the direction of the longitudinal axis 530. The accelerometer 534 can measure acceleration in a first direction that is in line with or parallel to the transverse axis (the centripedal acceleration) of the football. The amplitude of the centripedal acceleration created by the rotation of the ball in flight about the axis 530 is proportional to the distance, $r_1$, in which the accelerometer is positioned away from the axis 530. $A_t$ is the centripedal acceleration, with t referring to acceleration measured with respect to the transverse axis 532

Acceleration=(distance $r_1$)*(rotational speed)$^2$.

$A_t=(r_1)*(w)^2$

Accordingly, the rotational speed of the football can be determined if the acceleration $A_t$ is known and the distance $r_1$ is known. The acceleration readings of the accelerometer 534 in a direction in line with, or parallel to, the transverse axis 532 can be used to measure the spin rate of the football 10 about the longitudinal axis 530. It is advantageous and preferred to utilize one or more accelerometers to calculate the spin rate of the football 10 as opposed to the use of one or more gyroscopes because the cost of an accelerometer is substantially less than the cost of a gyroscope. Additionally, the use of one or more accelerometers to determine acceleration and rotation of the football is more energy efficient than using the combination of an accelerometer and a gyroscope, thereby extending the life of the battery. When the one or more accelerometers are used within the ball sensing system 240, the processor 256 can perform analysis of the data and signals inputted from the one or more sensors and then transmit processed signals or data to a remote electronic device at discrete intervals or at predetermined points in time, such as, for example, at the completion of each throw of the football. The use of the ball sensing system 240 to receive and process signals from the sensors and to transmit information and data relating to the signals at different points in time can be used to significantly increase the life of the power supply, such as a battery, used for the football 10. The sampling frequency of the ball sensing system 240 is another variable that can affect battery life. In one implementation, the sampling frequency of the processor 256 of the ball sensing system 240 is 90 hertz. The 90 Hz sampling frequency is sufficient to effectively monitor the motion of the football and the forces applied to the football during passing or running events. In other implementations, the sampling frequency to can be increased to 1000 Hz or up to 5000 Hz depending upon the information that is desired. One example where a higher sampling frequency may be desired is for monitoring kicking events. A higher sampling rate can be required to properly monitor the forces applied to the football 10 during a kicking event.

Another feature of present invention, as discussed above with respect to the implementation of FIG. 10B, is the incorporation of a sleep mode or standby mode within the electronic circuit 18 or ball sensing system 240 that also helps to extend or preserve battery life. The electronic circuit 18 or ball sensing system 240 can include shutdown logic that places the electronics of the electronic circuit 18 into a standby or sleep mode until the ball is put into play. In one implementation, the ball (which can be a football or a basketball or other sports ball) can be activated or brought out of the sleep mode by the motion of spinning the ball at or above a predetermined spin rate thereby producing a minimum g acceleration value for a predetermined amount of time. For example, in one implementation, the at least one accelerometer 534 and/or gyroscope 252 can be used to detect and measure the spin rate of the ball about an axis of the ball, such as the longitudinal axis 530. The ball sensing system 240 can be awakened out of the sleep mode when an acceleration level equal to or greater than 5 g is measured over a period of time equal to or greater than 1.5 seconds. In other implementations, other g acceleration values can be used and/or other durations can be used.

Referring to FIG. 45, a graph of acceleration and spin rate of a thrown football is shown overtime from a single accelerometer such as the configuration of the football of FIG. 44. The acceleration is measured from the accelerometer 534 and is illustrated as data trace 540, and the spin rate can be determined from the acceleration readings through the formula below. The distance $r_1$ can be measured from the original positioning of the ball sensing system 240 within the football 10.

$$w=\sqrt{(A_r/r_1)}$$

In one implementation, $r_1$ can be 0.5 inch. In other implementations, $r_1$ can be as low as 0.1 inch to great as the full radius of the football measured about axis 532. Accordingly, the spin rate trace 542 derived from the acceleration trace 540 is illustrated in FIG. 45.

Figure 46:
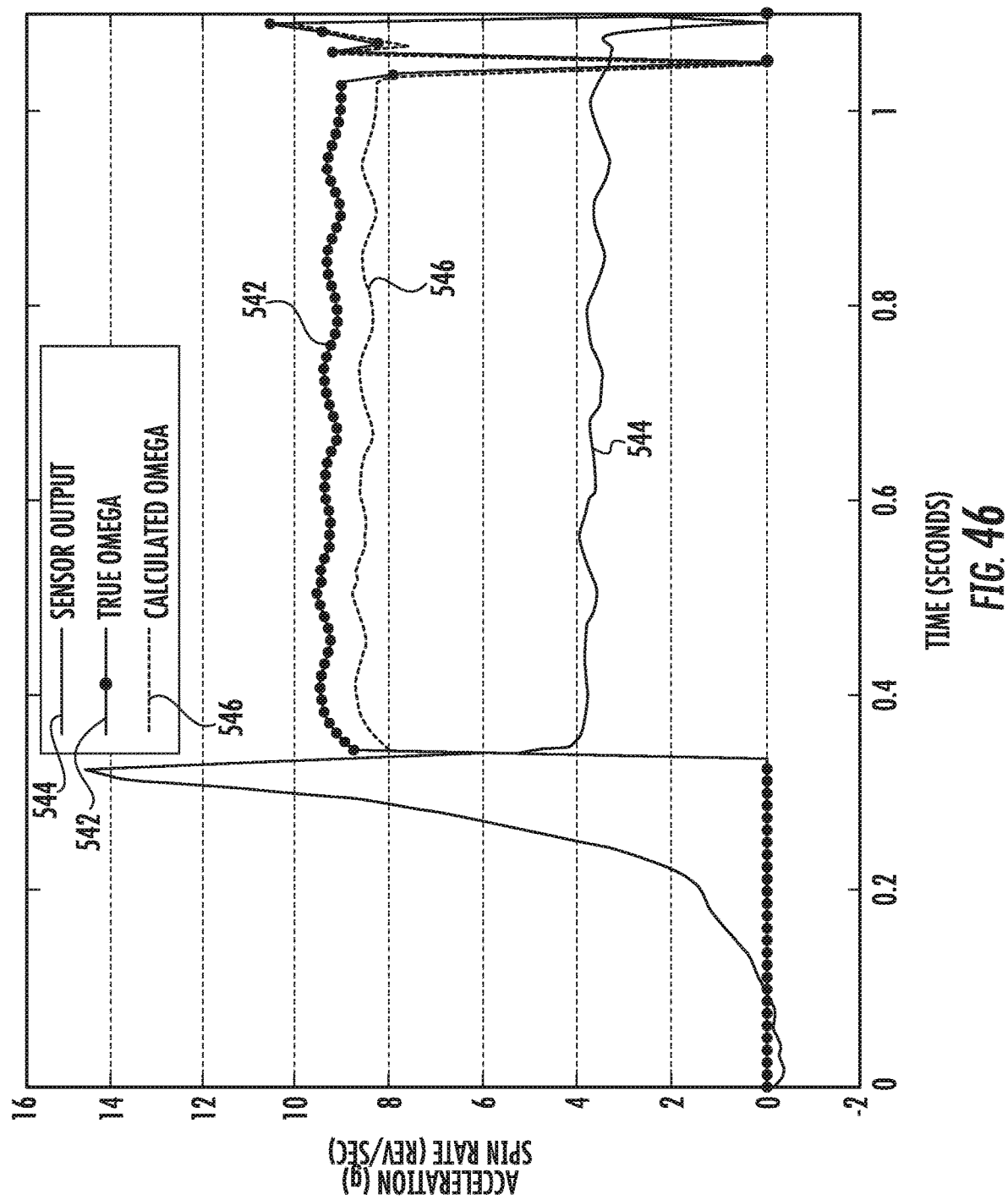

The spin rate of a thrown football is typically within the range of 200 to 1000 rpm. A more proficient thrower or passer of the football may have a spin rate of a thrown football within the range of 333 to 733 rpm. A well-thrown football can have a spin rate of approximately 600 rpm. The accuracy of the derived spin rate in FIG. 45 relies upon the position of the accelerometer 534 not changing or moving during use with respect to the longitudinal axis 530. In other words, the spin rate determination relies on the distance $r_1$ remaining constant during use. FIG. 46 illustrates how the calculated spin rate can vary from the true spin rate of the football 10 if the accelerometer 534 moves with respect to the longitudinal axis 530 during use. FIG. 46 illustrates the measured acceleration of the football 10 in accordance with the implementation of FIG. 44 with the ball sensing system 240 and accelerometer 534 shifting slightly away from the longitudinal axis 530 when the ball 10 is thrown. One reason for such a shift can be the centrifugal forces acting upon the ball sensing system 240 as the ball 10 rotates through the air. If the accelerometer 534 shifts further away from axis 530, the distance $r_1$ increases and the calculated spin rate of the football 10 decreases. Conversely, if the accelerometer 534 shifts closer to the axis 530, the distance $r_1$ will decrease and the calculated spin rate of the football will increase. Data trace 544 of FIG. 46 illustrates an example acceleration trace of the football 10 where the accelerometer 534 is moved outward slightly away from the axis 530 during use and as a result $r_1$ has increased. Data trace 546 represents the calculated spin rate from the acceleration data in this scenario. The calculated spin rate of data trace 546 is lower than the true or accurate spin rate of the ball 10 shown as data trace 544.

Figure 47:
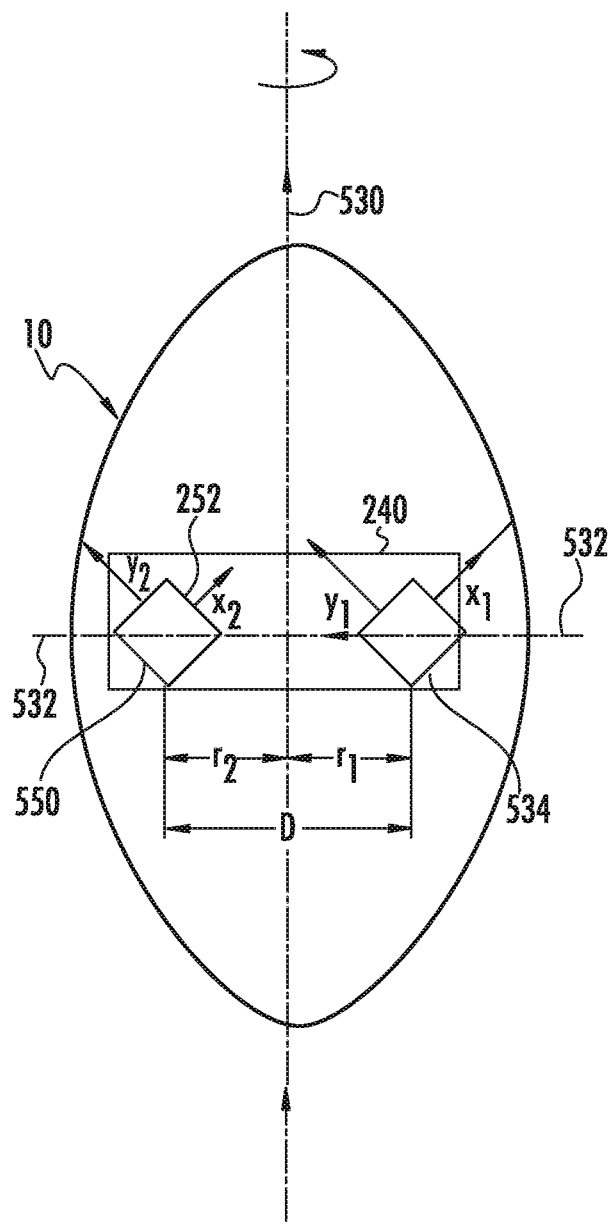
FIG. 47 is a top view of a football including a ball sensing system in accordance with an alternative implementation of the present invention.

FIG. 47 illustrates another implementation of the football 10 that overcomes the spin rate calculation item discussed above. In the implementation of FIG. 47, the at least one sensor 252 of the ball sensing system 240 includes first and second accelerometers 534 and 550 positioned onto a single substrate. As discussed above with respect to FIG. 44, the accelerometer 534 can be positioned a distance $r_1$ from the axis 530. In the implementation of FIG. 47, the second accelerometer 550 is positioned on the opposite side of the axis 530 at a distance $r_2$ from the axis 530. The distance between the first and second accelerometers 534 and 550 can be referred to distance D, ($D=r_1+r_2$), which remains constant regardless of whether the ball sensing system 240 and the first and second accelerometers 534 and 550 move or shift with respect to the axis 530 during use.

Figure 48:
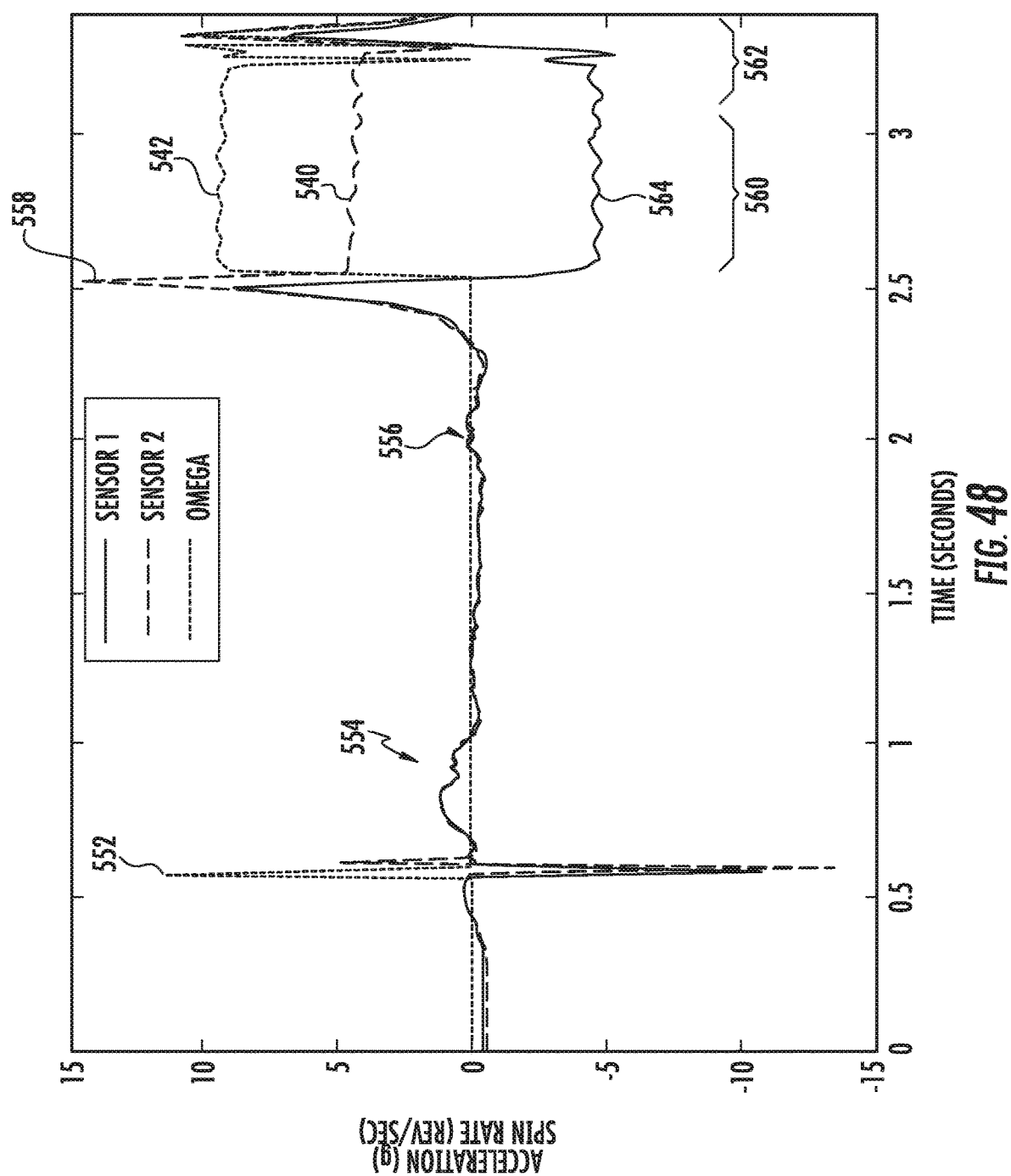
FIGS. 48 and 49 are example American football event acceleration trace signatures for a continuous series of football events and a calculated spin rate of the football utilized by the sport performance system of FIG. 32.
Figure 49:
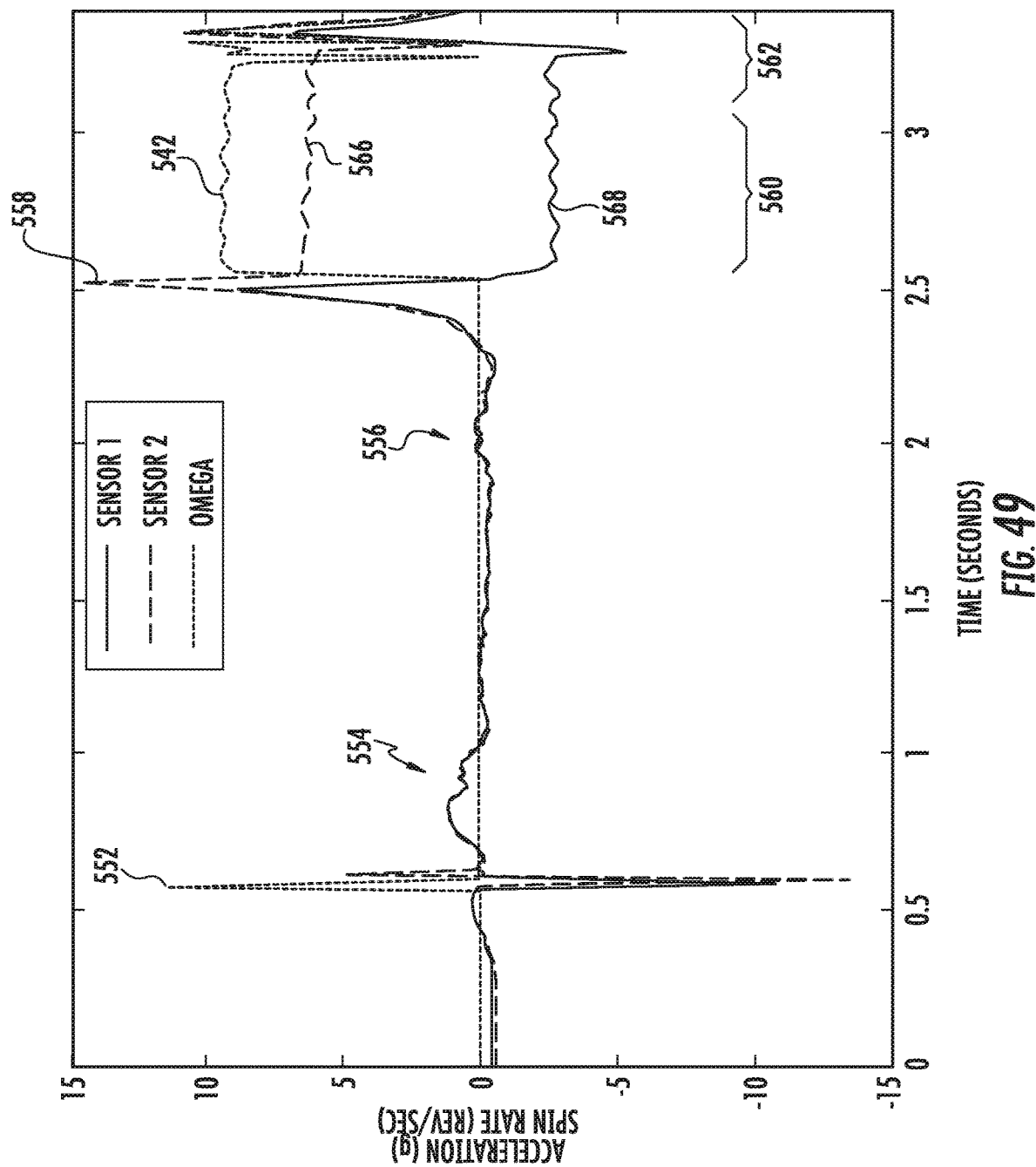

FIGS. 48 and 49 illustrate two examples of acceleration and spin rate data obtained from the football 10 built in accordance with the implementation of FIG. 47. An entire throwing play of the football 10 by a user throwing the football 10 into a net is illustrated. The throw includes several football events including a snap of the football 10 shown as spike 552, then a drop back steps by the user, shown as spikes 554 and 556, the throwing motion of the user, spike 558, the travel of the thrown football by region 560 and impact of the football 10 with the net at region 562. The throw illustrated in FIGS. 48 and 49 traveled approximately 10 yards in the air at approximately 34 mph with a spin rate of approximately 567 rpm.

Referring to FIG. 48, data trace 540 represents the acceleration readings of the first accelerometer 534, and data trace 564 represents the acceleration readings of the second accelerometer 550. The data trace 564 produces a negative value on FIG. 48 when the ball is thrown due to the orientation of the accelerometer 550 positioned opposite of the first accelerometer 534 with respect to the axis 530. The processor 256 (FIG. 32) of ball sensing system 240 receives the acceleration signals or readings from the accelerometers 534 and 550 and calculates the spin rate of the football 10 shown as data trace 542. In the example of FIG. 48, the ball sensing system 240 and accelerometers 534 and 550 do not shift with respect to the axis 530. In other words, the accelerometers 534 and 550 rotate about the axis 530 with distances $r_1$ and $r_2$ remaining constant during the throw. Accordingly, the absolute distance of the data traces 540 and 564 are substantially the same with respect to the line representing a 0 spin rate.

Figure 50:
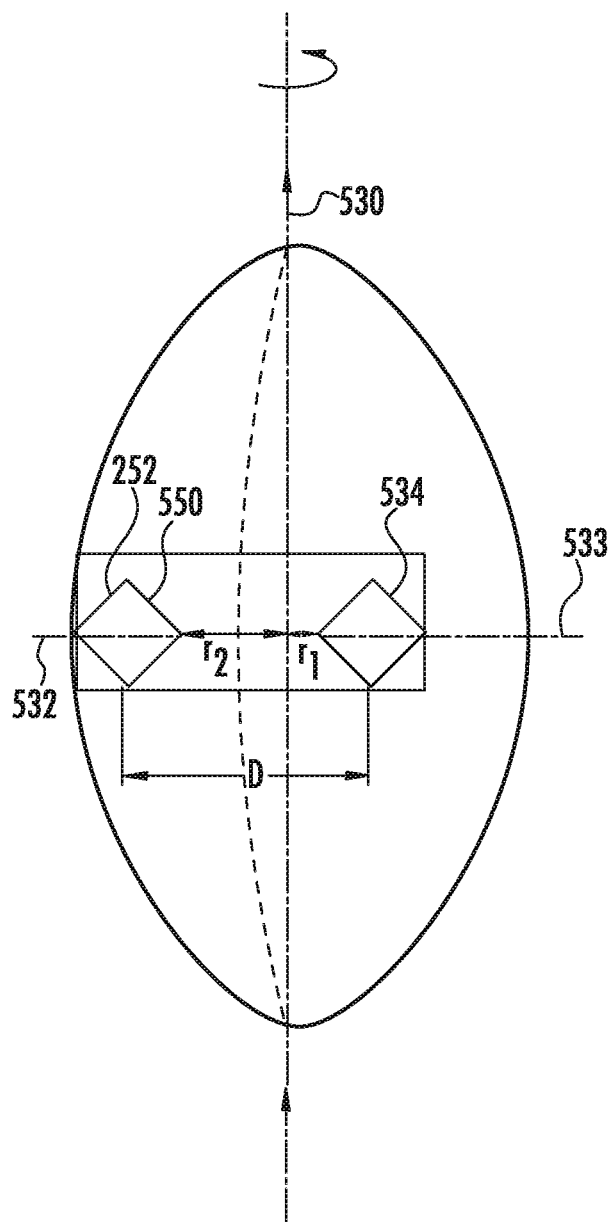
FIG. 50 is a top view of the football of FIG. 47 with the ball sensing system shifted within the football.

In the example illustrated in FIG. 49, the ball sensing system 240 shifts as the ball is thrown with respect to the axis 530 such that the distances $r_1$ and $r_2$ change, with one becoming smaller and one larger. FIG. 50 provides an illustration of the football of FIG. 47 wherein the ball sensing system 240 has shifted or moved with respect to the axis 530 when the ball is thrown. The result is that data traces 566 and 568 representing the acceleration data from the first and second accelerometers 534 and 550, respectively, each show acceleration data that is higher than the values of data traces 540 and 564 of FIG. 48. However, the distance separating the data traces 566 and 568 of FIG. 49 is substantially the same as the distance separating the data traces 540 and 564 of FIG. 48. The ball sensing system 240 uses the relative difference between the acceleration readings of the first and second accelerometers 534 and 550 to determine the actual spin rate of the ball. As a result, the calculated spin rate of the example illustrated in FIG. 48 represented by data trace 542 is the same calculated spin rate of the example illustrated by data trace 542 of FIG. 49. The use two separate accelerometers on opposite sides of the spin axis (such as axis 530) allows for the ball sensing system 240 to be self-correcting or self-calibrating in the event the ball sensing system 240 and the first and second accelerometer 534 and 550 shift with respect to the longitudinal axis 530 when the ball is thrown. The ball sensing system 240 using the distance D to calculate the spin rate and not the distance $r_1$ or $r_2$ alone. As a result, the calculated spin rate remains accurate regardless of whether the ball sensing system 240 shifts with respect to the axis 530. In the implementation of FIG. 47, the first and second accelerometers 534 and 550 are fixed to the same circuit board of the ball sensing system 240, and therefore, the distance D between the two accelerometers 534 and 550 remains constant whether the ball sensing system 240 shifts with respect to the axis 530 or not. Accordingly, the configuration of the football 10 of FIG. 47 overcomes the potential accuracy issue of the acceleration readings and/or the calculated spin rate of the football that can arise if the position of a single accelerometer shifts with respect to the axis 530 when the ball is thrown or kicked.

In one implementation, a football sensing system includes the American-style football 10 extending along the longitudinal axis 530 and having a maximum transverse dimension defining the transverse axis 532 extending along a transverse plane 533, at least first and second accelerometers 534 and 550 carried by the football 10 to sense acceleration of the football in at least one axis, and a processor 126 or 256 operably coupled to the first and second accelerometers 534 and 550. The first and second accelerometers 534 and 550 are positioned on opposite sides of the longitudinal axis 530 and spaced apart by a predetermined transverse distance D. The first and second accelerometers 534 and 550 are configured to measure the centripedal acceleration of the football 10 in first and second directions parallel to or in line with the transverse plane 533. The processor is configured to receive signals from the first and second accelerometers 534 and 550 representing the acceleration of the football 10 in the first and second directions. The processor is configured to process the acceleration signals and the predetermined transverse distance D to calculate a spin rate of the football about the longitudinal axis 530.

Figure 51:
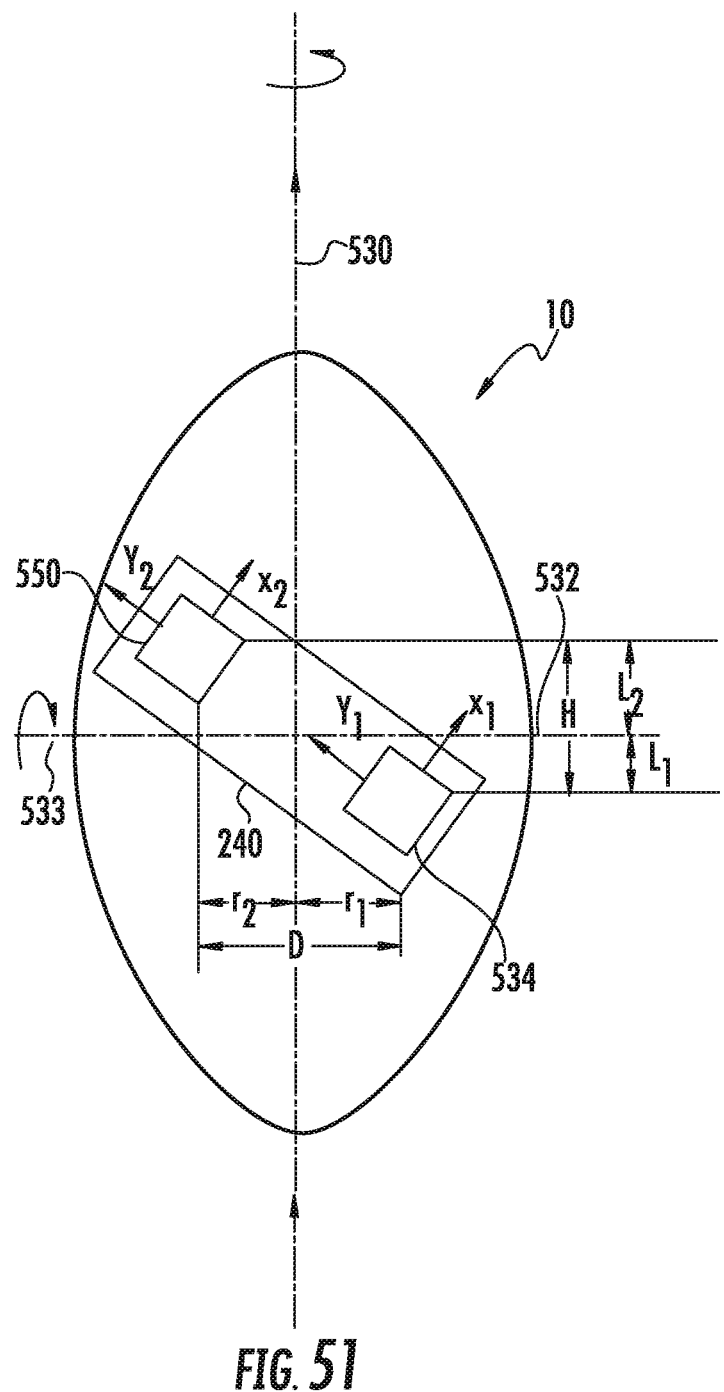
FIGS. 51-53 are top views of a football including a ball sensing system in accordance with alternative implementations of the present invention.

FIG. 51 illustrates another implementation wherein the ball sensing system 240 includes two spaced apart accelerometers 534 and 550. In the implementation of the football of FIG. 51, the ball sensing system 240 is positioned within the football 10 such that the first and second accelerometers 534 and 550 are positioned at distances $r_1$ and $r_2$, respectively, from the longitudinal axis 530. Accordingly, the first and second accelerometers 534 and 550 provide substantially the same acceleration data of the football with respect to the axis 530 as described with respect to the implementation of FIG. 47. In the implementation of FIG. 51, the first and second accelerometers 534 and 550 are also positioned on opposite sides of the maximum transverse axis 532 and transverse plane 533 of the football 10 by distances $h_1$ and $h_2$, respectively. The positioning of the first and second accelerometers 534 and 550 on opposite sides of the transverse plane 533 enables the ball sensing system 240 to monitor or receive data relating to the tumbling or end-over-end movement or motion of the football 10 that often occurs when the football 10 is kicked. The tumbling, end-over-end spin rate of the kicked football 10 of FIG. 51 can be determined from the acceleration readings of the first and second accelerometers 534 and 550 with respect to the transverse plane 533. Similar to the distance D formed by the first and second distances $r_1$ and $r_2$, the football 10 of FIG. 51 includes the ball sensing system 240 wherein the first and second accelerometers are positioned a distance H apart from each other when measured along a plane that is perpendicular to the transverse axis. The distance H is the sum of the distances $h_1$ and $h_2$, and the distance H remains constant regardless of whether the ball sensing system 240 shifts slightly with respect to the transverse plane 533 when the ball is kicked or otherwise in motion. Accordingly, the first and second accelerometers 534 and 550 of the football 10 of FIG. 51 can accurately monitor the acceleration of the football 10 as it is thrown, the spin rate of the football 10 as it is thrown or kicked about the longitudinal axis, and the tumbling rate of the football 10 with respect to the transverse axis 532 when the ball is kicked or otherwise travels in an end-over-end tumbling manner.

In one implementation, a football sensing system includes the American-style football 10 extending along the longitudinal axis 530 and having a maximum transverse dimension defining the transverse axis 532, at least first and second three-axes accelerometers 534 and 550 carried by the football 10 to sense acceleration of the football at three axes, and a processor 126 or 256 operably coupled to the first and second accelerometers 534 and 550. The transverse axis 532 extends along a transverse plane 533. The first and second accelerometers 534 and 550 are positioned on opposite sides of the transverse plane 533 and spaced apart by a predetermined transverse distance H. The first and second accelerometers 534 and 550 are spaced apart from the transverse plane 533 such that the first and second accelerometers 534 and 550 can measure acceleration of the football 10 in third and fourth directions that are parallel to the transverse plane 533. The acceleration measurements of the first and second accelerometers 534 and 550 in the third and fourth directions can be processed by the processor 126 or 256 to calculate the end-over-end spin rate of the football 10 with respect to the transverse plane 533.

Figure 52:
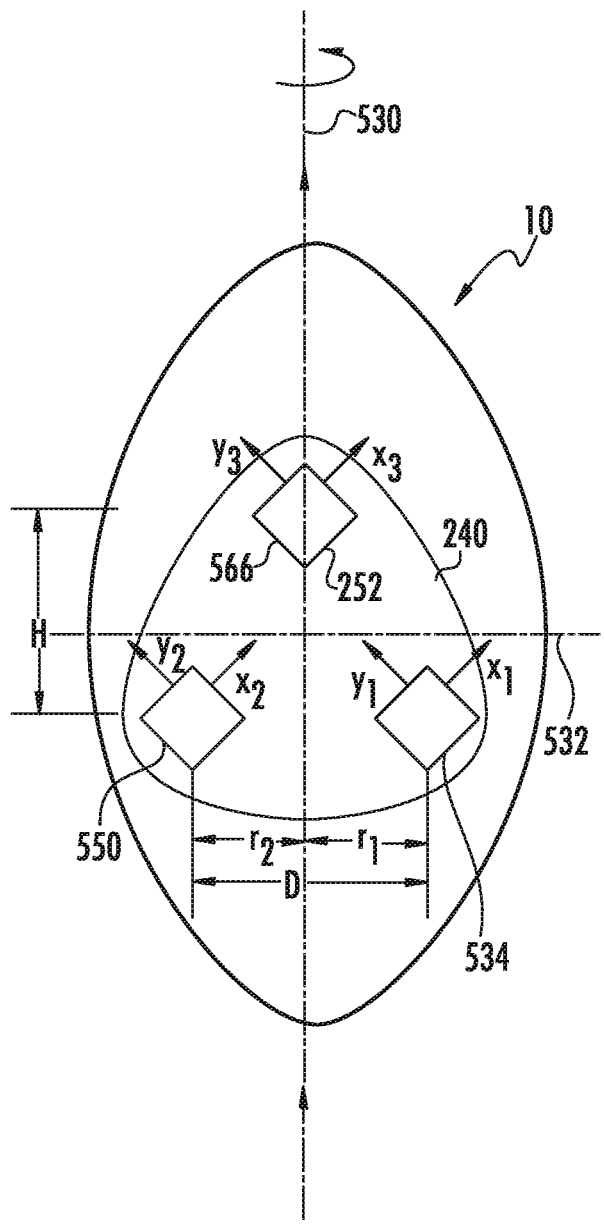
Figure 53:
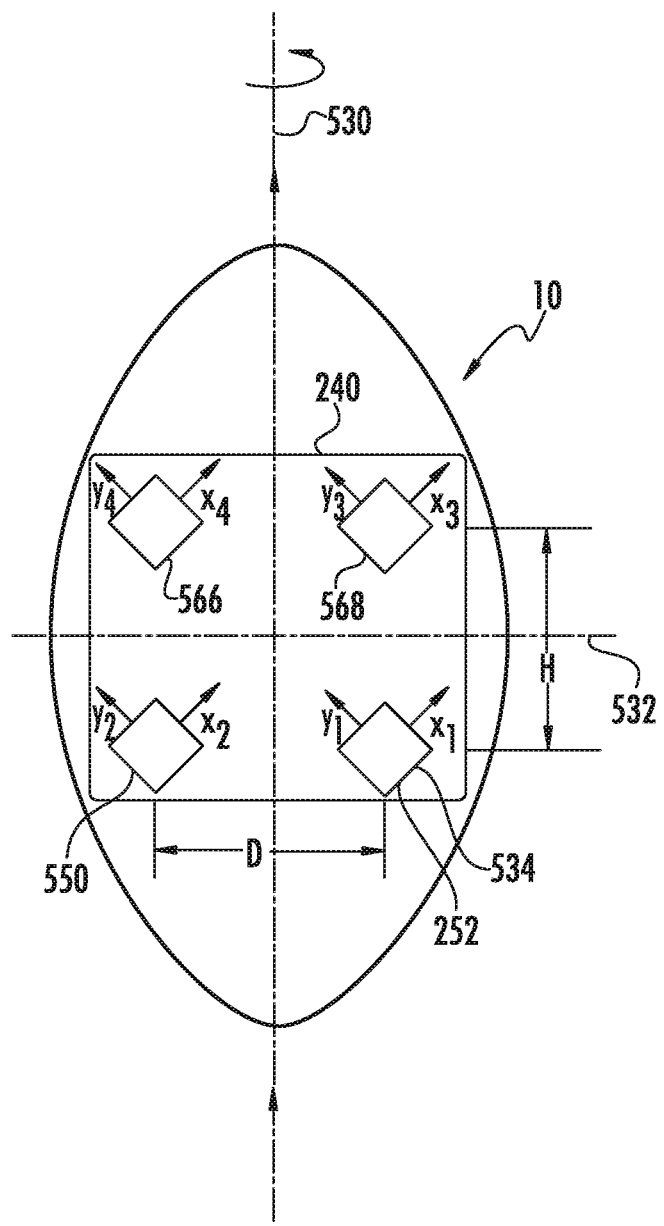

FIGS. 52 and 53 illustrate two additional implementations of the present invention. In FIG. 52, the football 10 includes the ball sensing system 240 that includes at least one sensor 252. In the implementation of FIG. 52, the at least one sensor 252 includes at least three spaced apart accelerometers (first accelerometer 534, second accelerometer 550 and third accelerometer 566). In the implementation of FIG. 53, the at least one sensor 252 includes at least four spaced apart accelerometers (first accelerometer 534, second accelerometer 550, third accelerometer 566 and fourth accelerometer 568). In the implementation of FIG. 52, the first and second accelerometers 534 and 550 are positioned on opposite sides of the longitudinal axis 530 of the football 10, and are separated by the distance D. Accordingly, the first and second accelerometers 534 and 550 enable the spin rate of the football 10 about the axis 530 to be accurately calculated from the acceleration measurements of the first and second accelerometers 534 and 550 regardless of whether the ball sensing system 240 has shifted with respect to the axis 530. Additionally, the third accelerometer 566 is positioned on the opposite side of the transverse axis 532 than the first and second accelerometers 534 and 550. The distance between the first and the third accelerometers 534 and 566, and the distance between the second and third accelerometers 550 and 566 measured with respect to a plane extending perpendicular to the transverse axis is the distance H. Accordingly, the tumbling or end-over-end spin rate of the football 10 can be accurately determined from either the first and third accelerometers 534 and 566, or from the second and third accelerometers 550 and 566 regardless of whether the ball sensing system 240 shifts with respect to the axis 532 when the ball is kicked or otherwise in motion. The use of the third accelerometer 566 provides a level of redundancy when measuring the tumbling spin rate of the football.

Additionally, the location of the third accelerometer 566 along the longitudinal axis 530 enables the first and third accelerometers 534 and 566 and/or the second and third accelerometers 550 and 566 to be used to accurately determine the spin rate of the football 10 with respect to the axis 530 regardless of whether the ball sensing system 240 shifts with respect to the axis 530 when the ball is thrown. The distances $r_1$ and $r_2$ can be used by the ball sensing system 240 to assist in self-correcting or self-calibrating the calculated spin rate value of the football 10 about the axis 530. When the ball sensing system 240 remains in place and does not shift when the ball is thrown, the third accelerometer 566 will provide essentially no acceleration or negligible acceleration data with respect to the rotation of the accelerometer about the axis 530. However, if the ball sensing system 240 shifts with respect to the axis 530 when the ball is thrown, the third accelerometer 566 will provide acceleration data with respect to rotation about the axis 530 that can be used to calculate the spin rate of the football. This acceleration data from the third accelerometer 566 in combination with one or both of the first and second accelerometers 534 and 550 can be used to accurately calculate the spin rate of the football 10. In this respect the measurement $r_1$ or $r_2$ is constant like the distance D in the embodiment of FIG. 47 discussed above. The addition of a third accelerometer 566 provides additional redundancy to the ball sensing system 240 for the measuring of all accelerations and rotations of the football.

The implementation of FIG. 53 provides similar benefits to the implementation of FIG. 52 but with an additional level of redundancy and reliability. Like the implementation of FIG. 52, the implementation of FIG. 53 allows for the ball sensing system 240 to accurately measure and calculate the acceleration and spin rate of the football 10 about the axis 530 and/or the axis 532, regardless of whether the ball sensing system 240 shifts or moves when the ball is in motion. Any combination of two accelerometers across an axis can be used to accurately measure the acceleration and rotation or spin rate of the ball about such axis.

FIGS. 43, 44, 47 and 51-53 are example implementations of the present invention. The ball sensing system 240 may be positioned within the bladder 12 through any of the implementations of FIGS. 17 through 23. In other implementations, the accelerometers may be positioned on or within the football in accordance with the implementations of FIGS. 9-26 or combinations thereof. In other implementations, the at least one accelerometer may be positioned on the cover, under the cover, between the lining and the cover, within the lining, between the lining and the bladder, within the bladder, within the lacing, underneath the lacing or any location to monitor acceleration and rotation of the football. In other implementations, the number of accelerometers can be five or more. In other implementations, one or more of the first, second, third and/or fourth accelerometers 534, 550, 566 and 568 may be positioned in a non-angled position, or can be angled up to 45 degrees, with respect to the longitudinal axis 530. In other implementations, the first, second, third and/or fourth accelerometers 534, 550, 566 and 568 can be a single-axis accelerometer, a three-axes accelerometer or combinations thereof.

Figure 54:
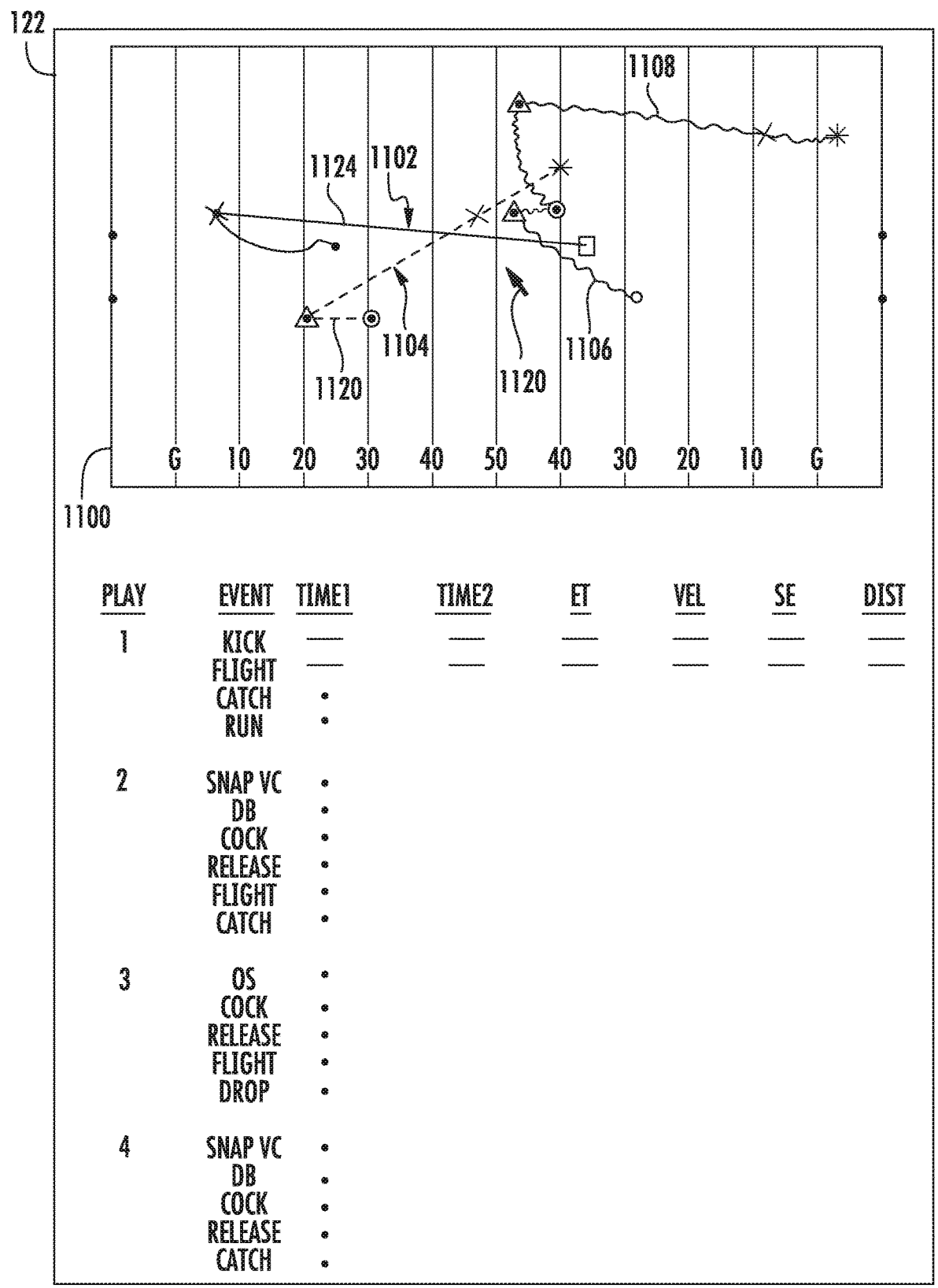
FIG. 54 is a diagram of an example screenshot presented by the system of FIG. 31 including a representation of a football field and event data presentation.

FIG. 54 illustrates an example presentation of football field tracking on display 122. In one implementation, module 460 is further configured to display, using display 122 and display module 239, a tracking of football 10 across a football field or playfield utilizing the identified football events. As shown by FIG. 54, module 460 displays a representation of a playing or football field 1100. Utilizing the identified football events, module 460 further displays each continuous series of identified football events and the respective positions on football field 1100. In the example illustrated, module 460 presents for continuous series of football events or "plays", a kickoff 1102, a completed pass 1104, an incomplete pass 1106 and a completed pass 1108.

In the example illustrated, module 460 further presents data on display 122 pertaining to each of the depicted plays, as applicable. The example illustrated, module 460 presents data regarding information such as the start time of an event (time 1), the ending time of an event (time 2), the elapsed time of an event (ET), the velocity of the ball (VEL), the spiral efficiency of the ball (SE) and the distance traveled by the ball (DIST). In other implementations, other information or data may be presented for each event, as applicable.

In one implementation, different events of each individual play are graphically distinguished from one another on the graphic of football field 1100. For example, in the example illustrated, different plays are represented by different line styles representing movement of the football during a run or pass. Individual events in a play, other than the travel or flight of the ball which is used to distinguish between different plays, are represented by different symbols. In the example illustrated, a kick is represented by a dot inside a square. A snap is represented by a dot inside a circle, a catch is represented by an x, and endpoint of a plays represented by a dot and a dropped pass is represented by an empty circle. A throw of a football is represented by a dot in a triangle. The endpoint of a run following a handover or following a catch is represented by an asterisk (*). In other implementations, other symbols, colors, fonts or other graphic variations may be additionally or alternatively employed to distinguish between different events in a play as well as to distinguish between different plays. Although not illustrated, in some implementations, a legend or key may additionally be presented by module 460.

In one implementation, module 460 may graphically represent or present the plays on a graphic of football field 1100 which serves as a graphical user interface. In such an implementation, module 460 may provide a selector 1120, such as a cursor, pointer or movable icon, which may be moved through manipulation of a mouse, keyboard, touchpad or the like to locate the selector 1120 over the graphics or icons representing identified events of a play. Based upon the positioning of selector 1120, module 460 presents any and all relevant information for the particular event beneath selector 1120. For example, in response to selector 1120 may be positioned over the depiction of event 1122 representing a quarter back drop back following under center snap. In response, module 460 presents the number of steps taken, and the time elapsed for the drop back. In response to selector 1120 being positioned over the graphic representing the event 1124 representing the flight of a kick, module 460 presents the velocity the football, the spiral efficiency of the football during flight, the hang time of the football and the distance of such flight. In response to selector 1120 being positioned over a throw event, module 460 automatically retrieves and presents information pertaining to the throw event such as the pass release time, the elapsed time from the snap of the ball. In one implementation, module 460 may additionally present the spiral efficiency during flight, velocity and distance of the ball in response to the throw event being selected. In some implementations, module 460 is configured such that selector 1120 may be utilized to highlight or select multiple events forming a portion of a play for the presentation of associated data.

In one implementation, module 460 is configured to allow or prompt a user to input various settings, varying what information, such as what data is presented, the number of plays presented, how such plays and events are graphically distinguished from one another upon the selection of a particular event on the graphical user interface formed by football field 1100 and the presented plays. In this manner, module 460 facilitates evaluation of an entire possession of the football by a team or a longer period of time such as a quarter, half or entire game.

In one implementation, module 460 allows a user to filter out what is displayed. For example, module 460 may allow a person to enter commands or selection such that only passing completions are presented, such that only pass completions are presented, such that only kicks are presented, such that only punts are presented or the like. In one implementation, module 460 is configured to allow a person to establish or adjust settings such that only particular events or categories of events are presented to allow user to focus his or her analysis on a particular type of football event. For example, such settings may be adjusted such that only under center snaps or only quick/shotgun snaps are presented on field 100 or the underlying data table. As a result, in such an implementation, module 460 provides an easy-to-use interface allowing a coach, player or other person to quickly and easily sort through and analyze data for particular football events or groups of football events.

Figure 55:
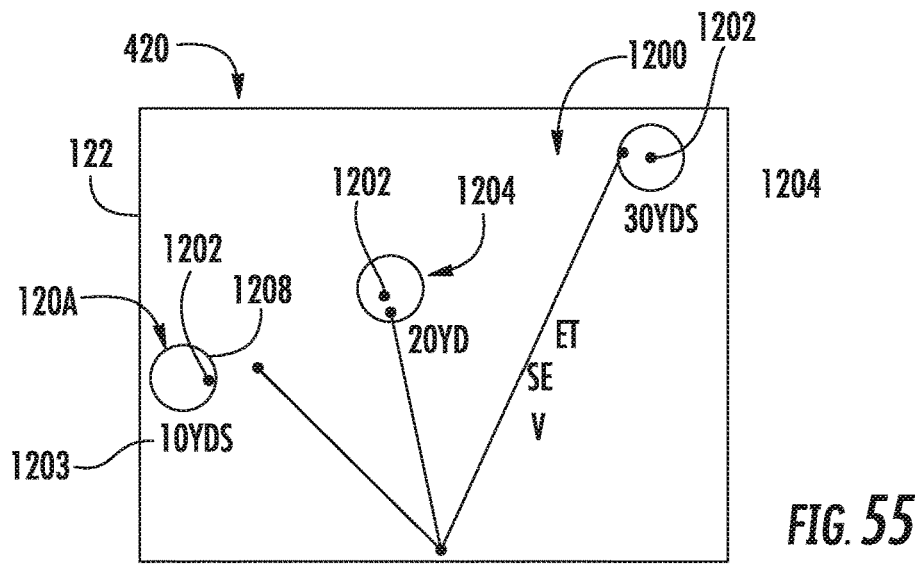
FIG. 55 is a diagram of an example screenshot presented by the system of FIG. 31 including representations of a plurality of targets on a playing field and the paths taken by practices throws of an example football.

FIG. 55 illustrates system 420 operating in a selected mode in which system 420 provides a player with a practice routine, instructing the player to perform a series of practice throws for data capture and analysis. FIG. 55 illustrates an example presentation 1200 on display 122 directing a player to complete passes for predetermined locations 1202 at predefined distances 1203 and at predefined lateral regions 1204 of a field. In the example illustrated, each predefined location 1202 is surrounded by a target window 1208 in which will be deemed as accurate. Window 1208 is a window of distances and feel regions that are deemed by module 460 as sufficiently close so as to count as satisfying the target. In one implementation, module 460 may be configured to allow a person to adjust the size of such windows for deeming a pass to have been completed or for deeming a pass as being sufficiently accurate. In one implementation, the size of such windows may automatically increase or decrease depending upon accuracy results currently being achieved by a player using the current window size. For example, if such target training is becoming too easy for a player, module 460 may automatically adjust a size of one or more of windows 1208.

In one implementation, module 460 may present differently sized windows depending upon the particular field region or the particular distance of a throw. For example, short throws may have a tighter/smaller window 1208 as compared to windows for longer distance throws. If a particular throw to a particular location yields poor results, module 460 may enlarge the size of the associated window 1208. Alternatively, if a particular throw to a particular location yields results exceeding a predefined success threshold, module 460 may decrease the size of the associated window 1208 to increase the challenge to the player. In one implementation, module 460 may present differently shaped windows or windows that are non-uniformly or eccentrically positioned with respect to the primary target location, so as to more strongly discourage errors to a predetermined side of the target location. For example, in situations where it may be more acceptable to miss a target to the outside of the target as compared to the inside of the target (so as to avoid an interception) module 460 may eccentrically locate the window towards the outside of the target.

FIG. 55 further illustrates the detected actual results of such pass attempts presented on the same display. As a result, the player may visibly ascertain the accuracy of his or her throws. In some implementations, such accuracy results may further be textually displayed on display 122. Although module 46 is illustrated as concurrently depicting multiple pass targets and concurrently depicting multiple pass target results, in other implementations, module 460 may depict a single pass target and pass target result. In one implementation, module 460 may additionally present on display 122 football travel parameters associated with the individual throws such as spiral efficiency (SE), elapsed time (ET) and/or velocity (V) of the throw.

Figure 56:
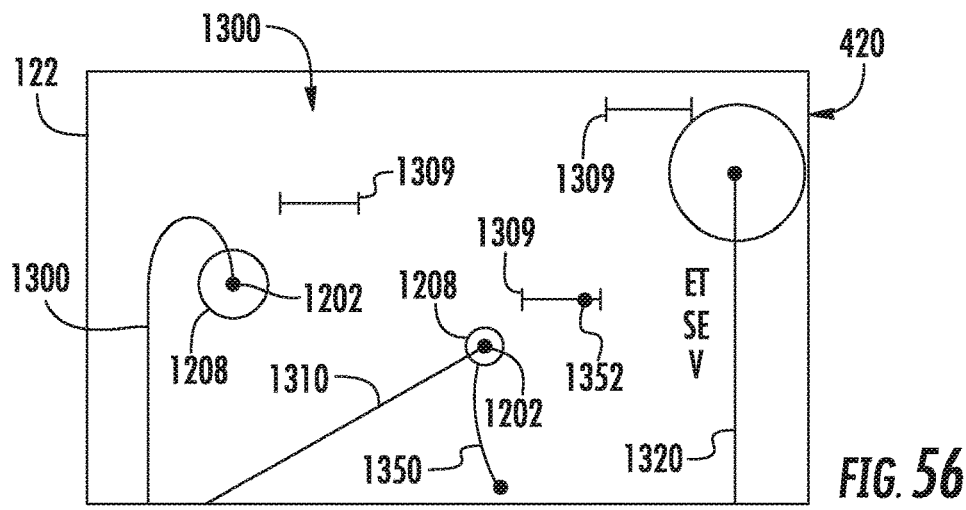
FIG. 56 is a diagram of an example screenshot presented by the system of FIG. 31 including representations of a plurality of practice timing routes on a playing field and the associated throwing targets.

FIG. 56 illustrates system 420 operating in a selected mode in which system 420 provides a player with a practice routine, instructing the player to perform a series of timing route practice throws for data capture and analysis. FIG. 56 illustrates an example presentation 1300 in which different example timing routes are presented for completion by a player in training. In the example illustrated, module 460 directs processor 126 to present three different receiver pass routes: a button hook 1300 with a target location 1202, a completion window 1208 and a timing window 1309; a slant 1310 with a target location 1202, a target completion window 1208 and a timing window 1309; and a fly pattern 1320 with a target location 1202, a completion window 1208 and a timing window 1309. In other implementations, other passing routes can be used. The target location 1202 and target completion window 1208 are described above with respect to FIG. 55. Timing window 1309 indicates a range or window of times for which the ball is to arrive at the target window 1208 or at the target location 1202 (depending upon a player's settings or preferences). The scale of timing windows 1309 present on display 122 may be uniform or may alternatively vary depending upon the length of time being presented for each pass. In one implementation, the timing for each timing window is based upon an elapsed time from a determined snap of the football. In another implementation, the timing for each timing window is based upon elapsed time from a determined initiation of a pass (beginning of arm cocking) or release/launch of a pass. Because system 420 determines the timing of the relevant football event (snap, arm cocking, pass release), system 420 accurately tracks the timing in which the ball reaches or passes through the target region defined by the particular window 1208. As a result, system 420 facilitates evaluation of positional accuracy and time accuracy for a throw. In one implementation, the user may be presented with multiple target regions and windows 1208 and be provided with an indication of which of the multiple target regions and windows is the desired target. Such an implementation can be used to improve decision making, release of the football and/or surveying of the field.

In the example illustrated in FIG. 56, window 1208 of pass 1310 is reduced in size as compared to window 1208 of pass 1300. Likewise, window 1208 of pass 1320 can be a non-uniform shape and can be eccentrically positioned with respect to location 1202. Window 1208 is also larger than windows 1208 of passes 1300 and 1310. In some implementations, module 460 may establish or adjust the size of timing windows 1309 in a fashion similar to the adjustment of the size of windows 1208. For example, module 460 may direct processor 126 to automatically increase or decrease the size of the timing window 1309 depending upon the degree of success being achieved by the player with the current timing window 1309. In some implementations, module 460 may additionally or alternatively adjust the size of the timing window 1309 based upon the type of the pass, the distance of the pass and/or the region of the field for a particular pass. In other implementations, system 420 may prompt a person to input various settings or parameters for establishing such timing windows 1309.

FIG. 56 further illustrates the display of throw results 1350 (or the path of the football) for one of the illustrated targets, slant 1310. In the example illustrated, the timing accuracy of the actual throw is depicted on the timing window 1309 at point 1352. In the example illustrated, the player may visibly ascertain that his or her throw was on the long side of the range of times which the ball was to reach our pass through window 1208 for the particular pass. In other circumstances, point 1352 may be illustrated at a location within timing window 1309, or depending upon the timing of the actual throw, to the left or to the right of the illustrated timing window 1309 illustrating that the ball arrived at the location target window 1208 early or late, respectively.

In one implementation, module 460 directs processor 126 to determine, assess or calculate a level of the quality of a play. For example, module 460 can direct the processor 126 to present a particular play from a group of available plays (e.g. the passes or pass patterns discussed above). One example, could be a 5 step drop followed by a 15 yard out pass. The system 420 may assign an expected time to complete each step, such as 3 seconds for the 5 step drop, and 2 seconds for the pass. The system 420 tracks the timing and other characteristics of the selected football events and then can generate a quality of the play result. The quality of the play score or result can be based upon the timing of the play, the accuracy of the throw, the tightness of the spiral (spiral efficiency), the speed of the throw, the trajectory of the throw, other events, or combinations thereof. The quality of play activity can also be used to generate a play result based upon the characteristics of the football events, the skill level of the player, random generation or combinations thereof. For example, a poorly thrown ball may result in an "interception" being displayed. In other examples, a well thrown ball may be identified as a completion, a touchdown, an incompletion etc. The activity may require a specific type of target associated with the assigned play. For example, the system 420 may call for a back shoulder throw to a receiver running a fly pattern 1320. The quality of the play activity can be performed by a single user with the system 420 or with two or more users. The quality of the play activity can be a useful training tool, as an entertaining game or as a competitive activity. The quality of play activity can also be applied to running plays or kicking plays.

Figure 57:
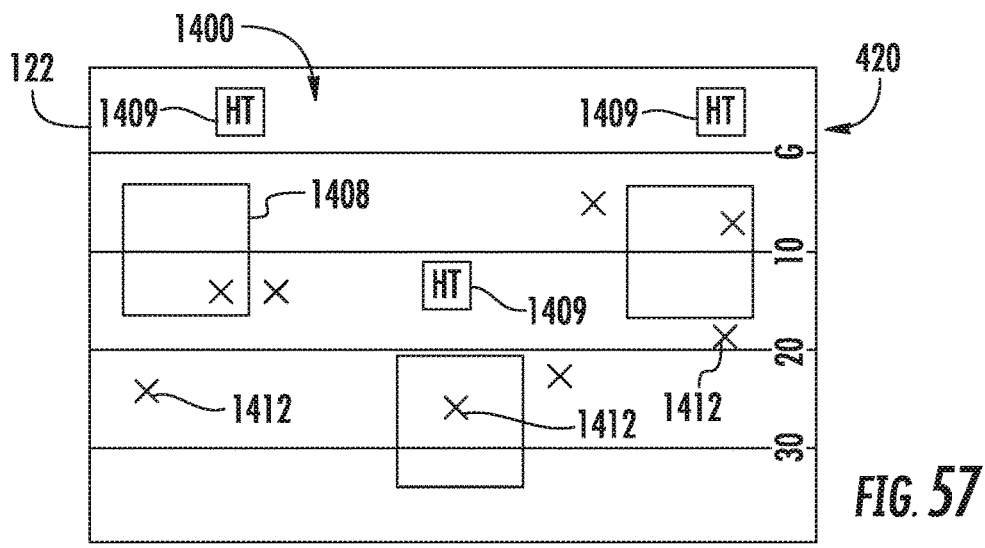
FIG. 57 is a diagram of an example screenshot presented by the system of FIG. 31 including representations of a plurality of targets on a playing field and the landing locations of an example football.

FIG. 57 illustrates system 420 operating in a selected mode in which system 420 provides a player with a practice routine, instructing the player to perform a series of timing routes, practice kickoffs or punts for data capture and analysis. FIG. 57 illustrates an example presentation 1400 in which different example kicks or punts to different regions of a football playing field are presented for completion by a player in training. In the example illustrated, module 460 directs processor 126 to present three different kick or punt target regions defined by a target window 1408 and having a minimum hang time values (HT) 1409. Each target window 1408 defines the region of the football field in which a kick or punt is to land. Each hang time value 1409 is a minimum hang time for the kick or punt.

As shown by FIG. 57, in addition to displaying target regions 1408 and target minimum hang times 1409, module 460 may direct processor 126 to visibly present actual results for different kicks and/or punts with respect to the different target regions 1408. In the example illustrated, actual landing locations are identified by x-shaped graphics 1412. In one implementation, module 460 utilizes the determined kick football event (impact of football by the kickers foot) to determine the hang time. In one implementation, module 460 indicates whether a particular punt or kick satisfies the minimum hang time value HT by displaying the punt or kick landing spot x in different colors. In one implementation, a kick or punt satisfying minimum hang time will be displayed in the color green by kicker but a kick or punt not satisfying the minimum hang time will be displayed in the color red. In one implementation, the extent to which a punt or kick satisfies or fails to satisfy the minimum hang time value may be indicated through different indicia or other form such as colors, brightnesses or the like. For example, different kicks or punts having hangtimes falling within different ranges of time may be presented with different colors, brightnesses, symbols or the like. As a result, system 420 allows a person or player to visibly ascertain his or her kicking or punting performance, not only taking into account positional accuracy but concurrently taking into account hang time.

FIGS. 58-83 illustrate various screenshots of an example sport performance system 420 or 260. In one implementation, such screenshots are presented on a screen or display 122 of a portable electronic device such as a portable smart phone, a portable personal data assistant, a portable digital music player (IPOD etc) or a portable tablet. In other implementations, such screenshots may be presented on a laptop, a wrist-top computer, or desktop computer. In another implementation, such screenshots can be displayed using a projection device worn by a user, such as a cicret bracelet from cicret.com that projects the display onto the user's arm or other body part, or on the ground, wall or other surface. The projection device may also project a keyboard or other input device.

Figure 58:
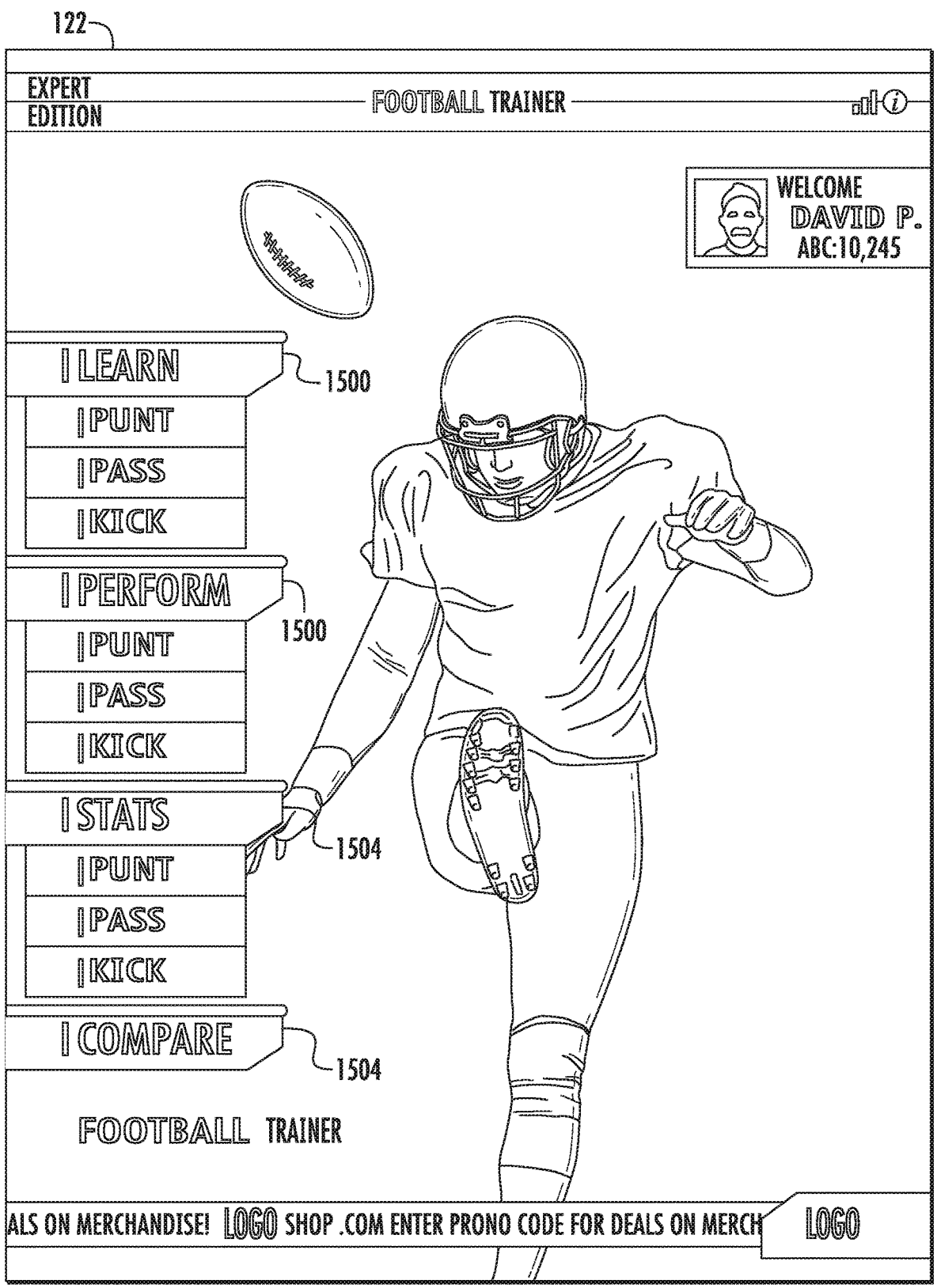
FIG. 58 illustrates an example screenshot of an example implementation of the sport performance system of FIG. 31 including a player punting a football and selectable tabs.

As shown by FIG. 58, processor 126 or 256, following instructions contained in memory 428 provides a user (David P. in the example) with the options to learn 1500, perform 1502, stats 1504 or compare 1506. As further shown by FIG. 58, under the learn tab or option 1500, the user is further provided with the option to select categories of punt, pass or kick. Each of such selections can be made using a touchscreen or may be made using a keyboard, touchpad or other input device. As shown by FIG. 58, under the perform option, the user is further provided with the option to select categories of punt, pass and kick. As shown by FIG. 58, similar categories are provided under the option of stats.

Figure 59:
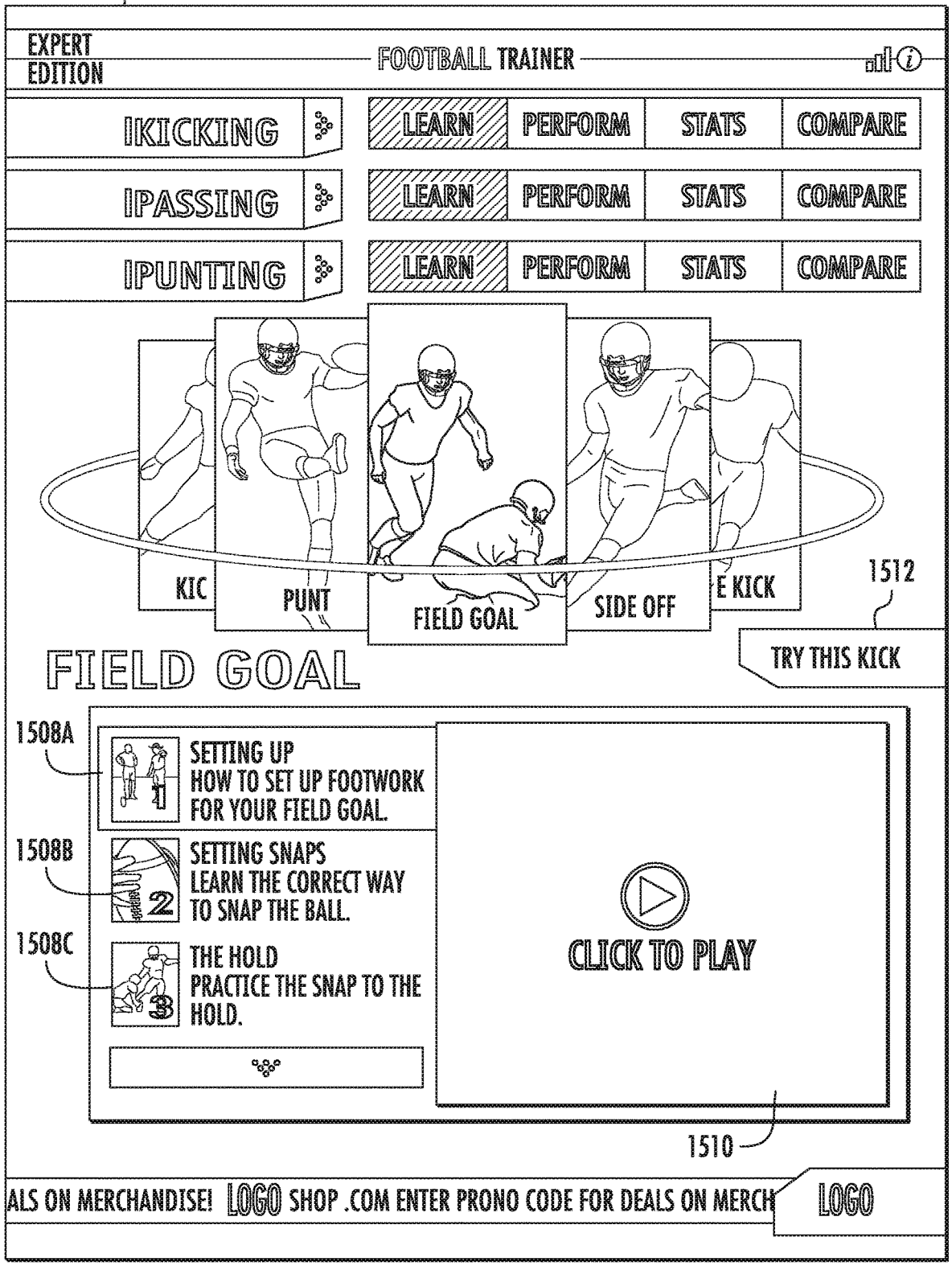
FIG. 59 illustrates an example screenshot of an example implementation of the sport performance system of FIG. 31 in which the learn tab option of kick is selected.

FIG. 59 illustrates a presented screenshot produced by processor 126 or 256 in response to a person selecting the kick category under the learn option 1500 of the screenshot presented in FIG. 58. In the example illustrated, the user is provided with the options of selecting various instructional videos 1508A, 1508B, 1508C pertaining to field-goal kicking. In response to such selections, instructional videos are presented on a video window portion 1510 of display 122. As shown by FIG. 59, after instructional videos for each of the individual steps or portions of a field-goal kicking attempt are presented, the user may select presentation of all of the steps or portions of the field-goal kicking attempt for review. When the user is ready to try the kick, he or she may select the "try this kick graphical user interface or icon 1512 which transitions system 420 to a sensing and analysis mode.

Figure 60:
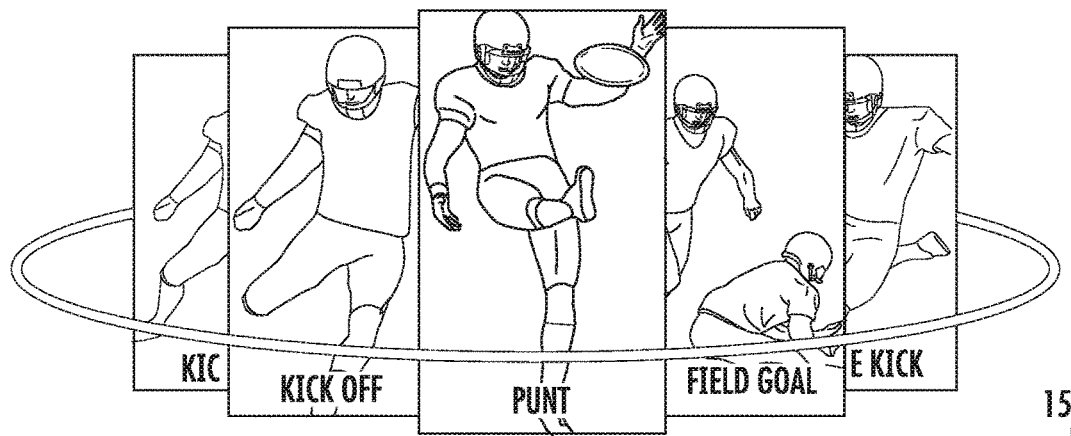
FIG. 60 illustrates an example screenshot of an example implementation of the sport performance system of FIG. 31 in which the learn tab option of punt is selected.

FIG. 60 illustrates a presented screenshot produced by processor 126 or 256 in response to a person selecting the punt category under the learn option 1500 of the screenshot presented in FIG. 58. In the example illustrated, the user is provided with the options of selecting various instructional videos 1518A, 1518B, 1518C pertaining to punting. In response to such selections, instructional videos are presented on display 122. As shown by FIG. 60, after instructional videos for each of the individual steps or portions of a punt are presented, the user may select presentation of all of the steps or portions of the punt for review. When the user is ready to try the punt, he or she may select the "try this kick" graphical user interface or icon 1512 which transitions system 420 to a sensing and analysis mode.

Figure 61:
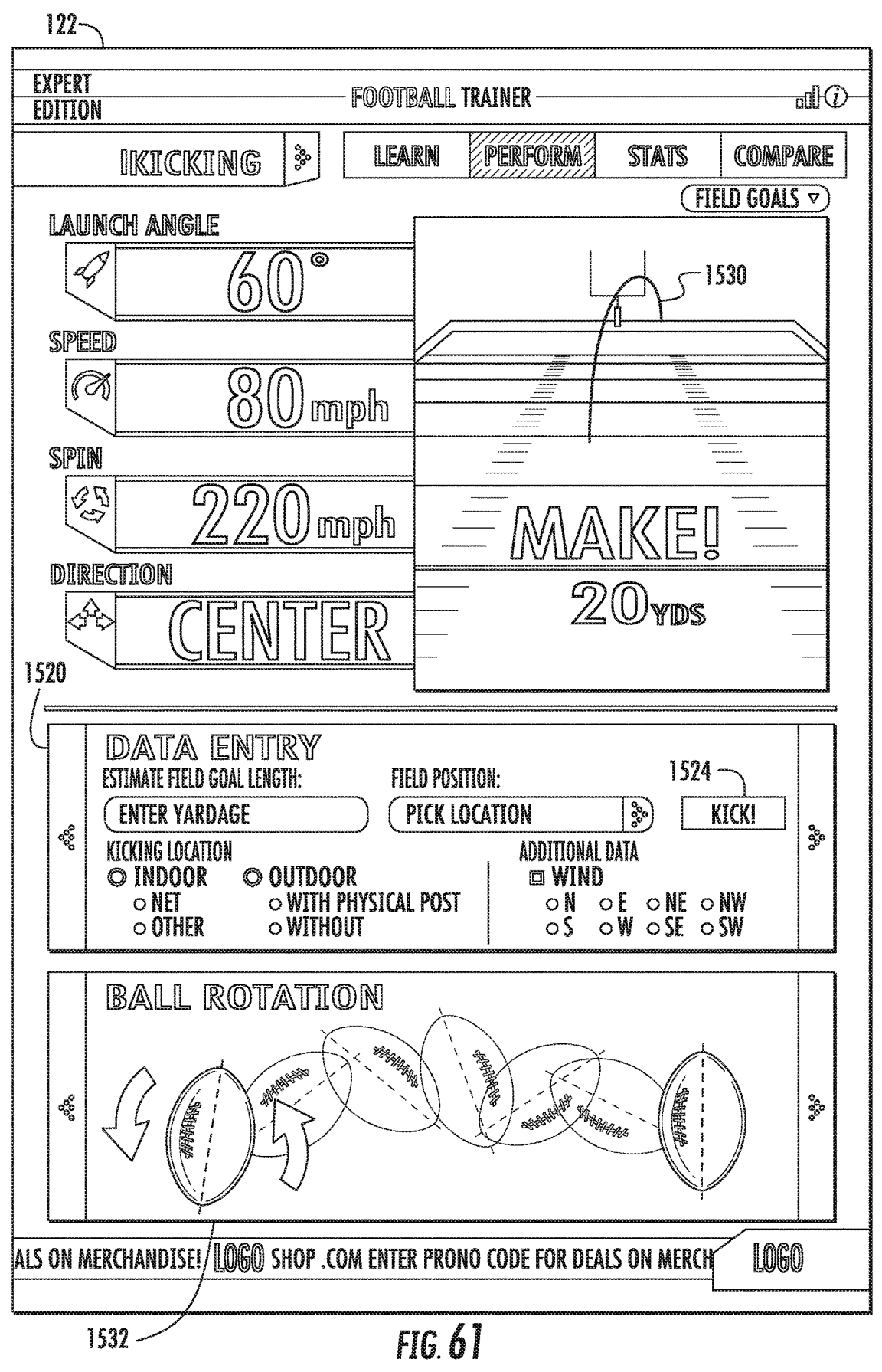
Figure 62:
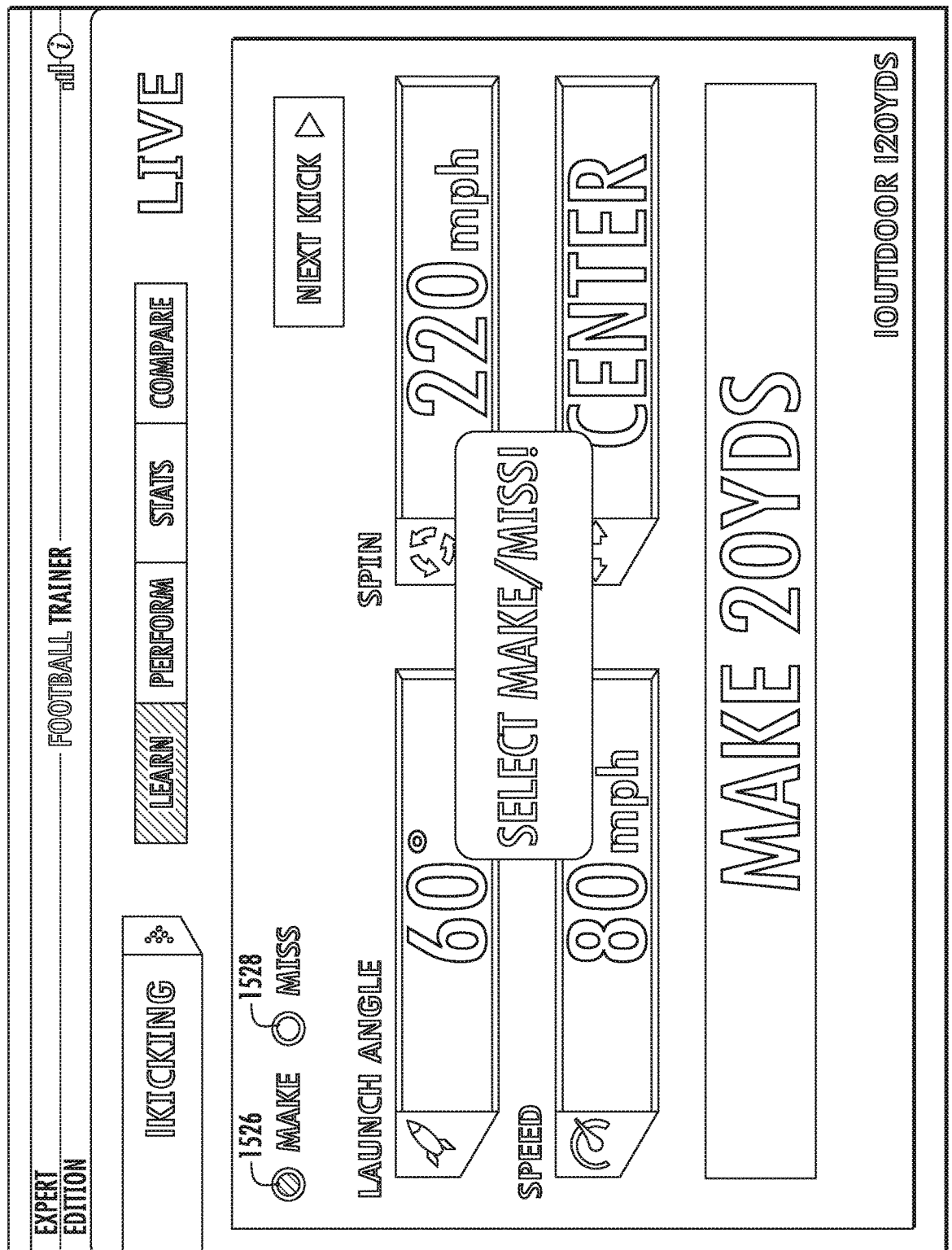
FIG. 62 illustrates an example screenshot of an example implementation of the sport performance system of FIG. 31 in which the perform tab option of kick is selected including data relating the field goal attempt and a user prompt.

FIGS. 61 and 62 illustrate screenshots presented on display 122 by processor 126 or 256 in accordance with instructions in memory 428 in response to the user selecting the kick category under the perform option (see FIG. 58). As indicated by a data entry section or screenshot portion 1520, processor 126 prompts the user to enter data regarding the conditions of the kick. In the example, processor 126 prompts the user, on display 122, to enter the field-goal length and the field position (center, left hash, right hash). Processor 126 or 256 may also prompt a user to input whether the kick is taking place indoors, outdoors, or whether the kick is with a net or a physical post. In some implementations, processor 126 or 256 may prompt a user to indicate whether the physical field-goal post is a high school, college or professional field-goal post. Processor 126 or 256 further prompts user to provide environmental data such as wind direction. As noted above, in some implementations, such environmental conditions may be sensed or may be retrieved from remote sources. One such information has been entered, the user may select the "kick!" button 1524 to initiate the kicking sample.

In response to receiving the "kick!" selection 1524, processor 126 or 256 notifies the user that system 420 is ready for the sample kick. Such notification may occur after synchronization between input 124 and transmitter 254 of ball 10. During the sample kick, sensor 252 gathers data are values for various ball travel parameters and transmits them to input 124 using transmitter 254. As noted above, the provision of data to input 124 may occur in other fashions in other implementations.

Figure 63:
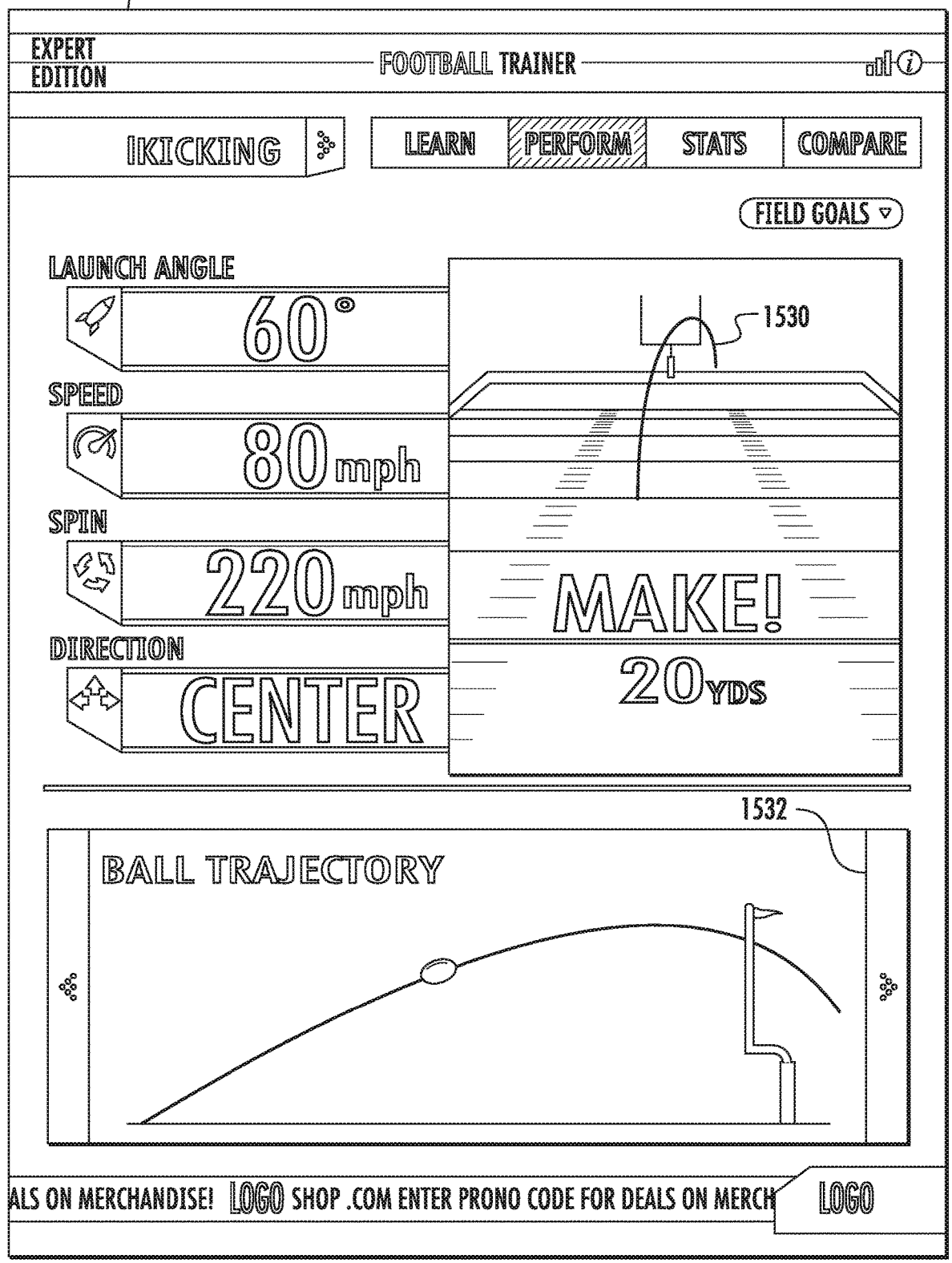
FIG. 63 illustrates an example screenshot of an example implementation of the sport performance system of FIG. 31 in which the perform tab option of kick is selected including graphics depicting the trajectory of a football during a field-goal kick attempt and data relating the field goal attempt.

Upon completion of the kick sample, processor 126 or 256 displays the ball travel parameters. In the example illustrated, the data collected comprises launch angle, speed, spin and direction of the football. As shown by FIG. 62, processor 126 or 256 prompts the user to indicate whether or not the particular field-goal kick attempt was successful by selecting either the make 1526 or miss 1528 inputs. In other implementations, the screenshot of FIG. 62 may be omitted where processor 126 or 256 determines whether or not the field-goal attempt was successful based upon the received values for the ball travel parameters, the environmental conditions, the field position and the field-goal length. In some implementations, processor 126 or 256 may indicate on display 122 at what distance the field-goal attempt would've been successful, or at what distances the field-goal attempt would not have been successful. The processor may indicate with what types of field-goal post the kick would've been successful or unsuccessful. This may be beneficial in those circumstances where the kick attempt is being made without actual field-goal posts. As shown by FIGS. 61 and 62, processor 126 or 256 displays the outcome. As shown by FIG. 61, processor 126 or 256 further presents a graphic 1530 depicting the trajectory of the football during the field-goal kick attempt. As shown by FIG. 61, processor 126 or 256 may present on display 122 a graphic 1532 indicating a rotation of the ball during the kick. As shown by FIG. 63, processor 126 or 256 may further display on display 122 a side view of the ball trajectory. Similar presentations may be made with the field-goal attempt is indicated to be wide left, wide right or short.

Figure 64:

FIGS. 64-76 illustrate example screenshots presented by processor 126 or 256 on display 122 in response to a user selecting the kick category under the stats option (See FIG. 61). As shown by FIG. 64, processor 126 or 256 presents on display 122 launch angle data 1600, ball speed data 1602, ball spin data 1604 and field-goal attempt or accuracy data 1606. Such statistics are further broken down according to the different distances of the field-goal kick attempts. As shown by FIG. 64, a user may select one of various time ranges 1610 for data from which such statistics are derived. In the example illustrated, processor 126 or 256 allows the user to look at historical data for various years, months, weeks or days. Although the current selection for the time period is illustrated as being indicated by hatching, the current selection may be indicated in other manners such as color change, brightness and the like. As further shown by FIG. 64, graphical user interface icons 1612 are presented for allowing a person to obtain additional details regarding launch angle, speed, spin and field-goal accuracy.

Figure 65:
Figure 66:
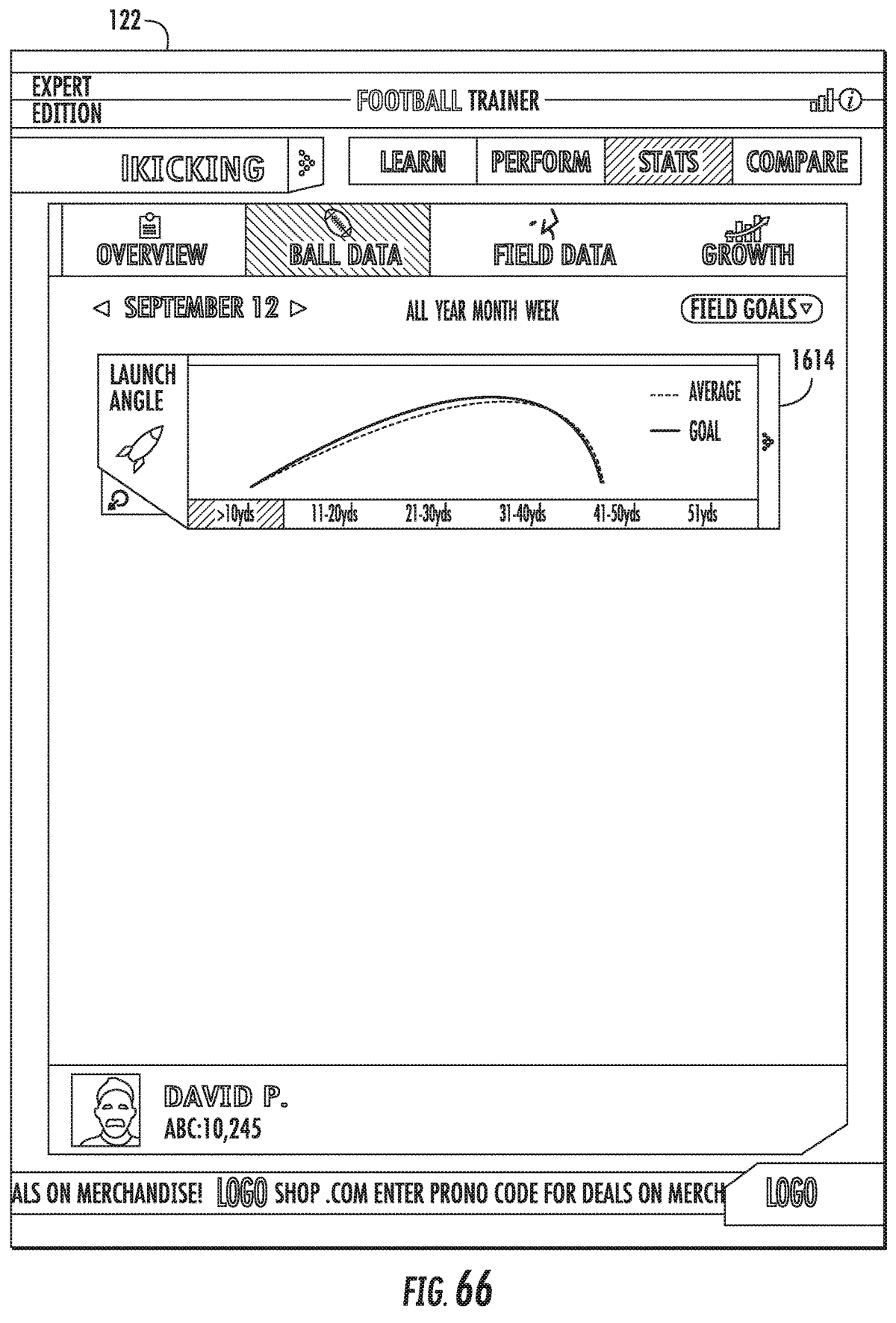
Figure 67:
Figure 68:
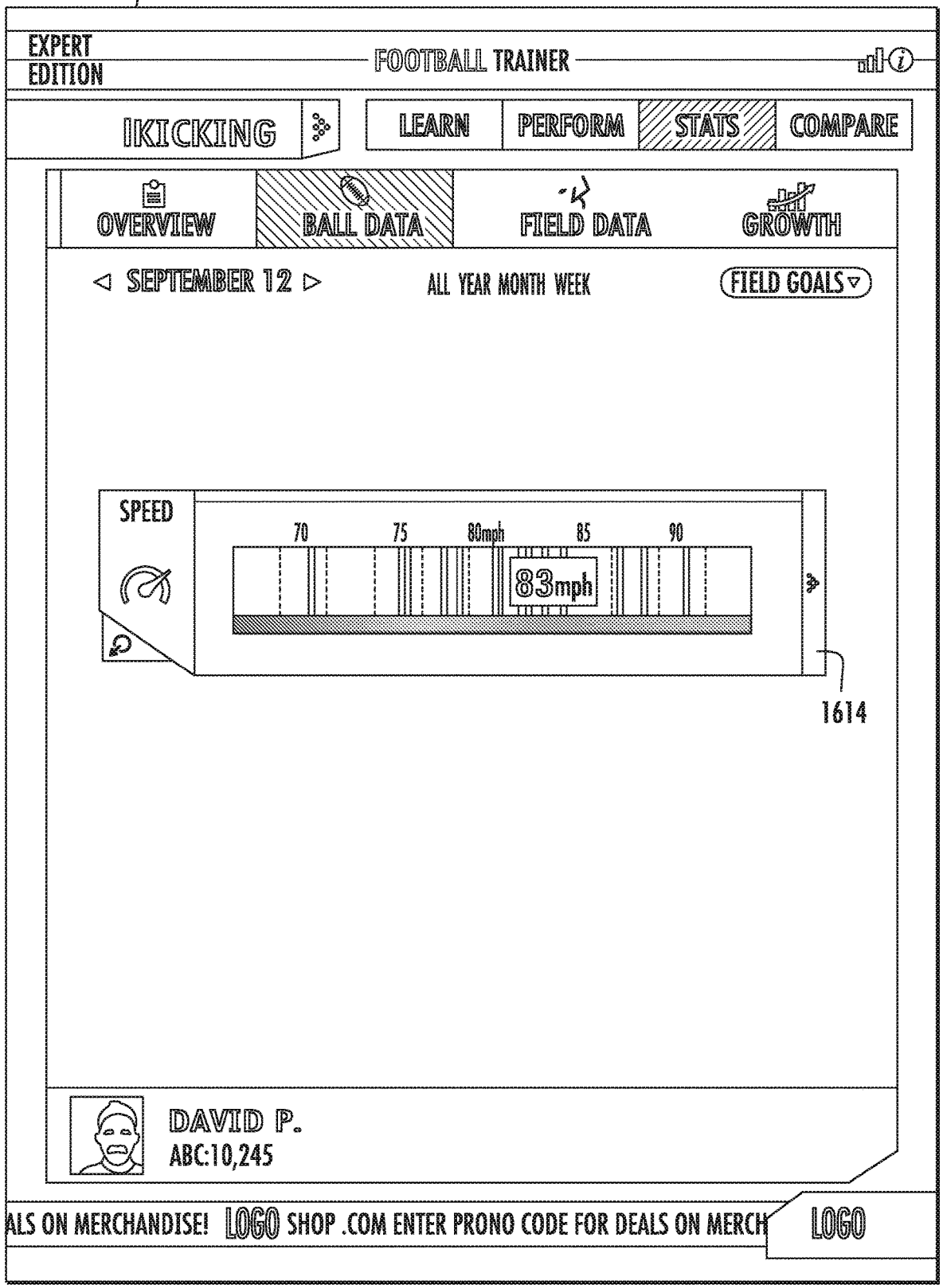
Figure 69:

FIG. 65 illustrate an example screenshot presented by processor 126 or 256 on display 122 in response to the user selecting detail icon 1612 (shown in FIG. 25) for launch angle data 1600. As shown by FIG. 65, in response to selection of interface icon 612 associated with launch angle data 1600 (shown in FIG. 64), processor 126 or 256 presents on display 122 data regarding launch angle of the kick attempts and compares such data with objective or goal launch angles. In the example illustrated, in response to receiving signals indicating that the screen of FIG. 65 has been clicked upon, processor 126 or 256 advances through a series or progression of different presentations regarding information about launch angle data. FIGS. 65 and 66 illustrate an example presentation of data by processor 126 or 256 which allows a person to choose amongst several different yardages for field-goal kicks so as to visibly ascertain the average launch angle and trajectory for kicks at the chosen distance and compare such launch angles/trajectories with respect to goal launch angles/trajectories for the particular distance. In response to receiving signals that advancement graphical user interface 1614 has been selected, processor 126 or 256 presents more detailed information on the screen shown in FIG. 67. The screenshot shown in FIG. 67 depicts other information associated with the particular kicks at the different launch angles. In other implementations, the information provided in the screenshots shown in FIGS. 66 and 67 may be presented on a single screenshot or may be accessed in other manners. FIGS. 68 and 69 illustrate screenshots presented by processor 126 or 256 on display 122 in response to the graphical user interface 1612 of ball speed data 1602 (shown in FIG. 64) being selected or clicked upon. FIG. 68 illustrates a graph of an average speed for field-goal kicks sensed doing the selected period of time. In response to receiving signals indicating that advancement icon 1614 has been selected, processor 126 or 256 advances to present the screenshot shown in FIG. 69 provides additional information associated with each kick from which the average speed was derived. Selection of advancement icon 1616 of the screenshot shown FIG. 69 cause processor 126 or 256 to return display 122 to the overview screenshot shown FIG. 64.

Figure 70:
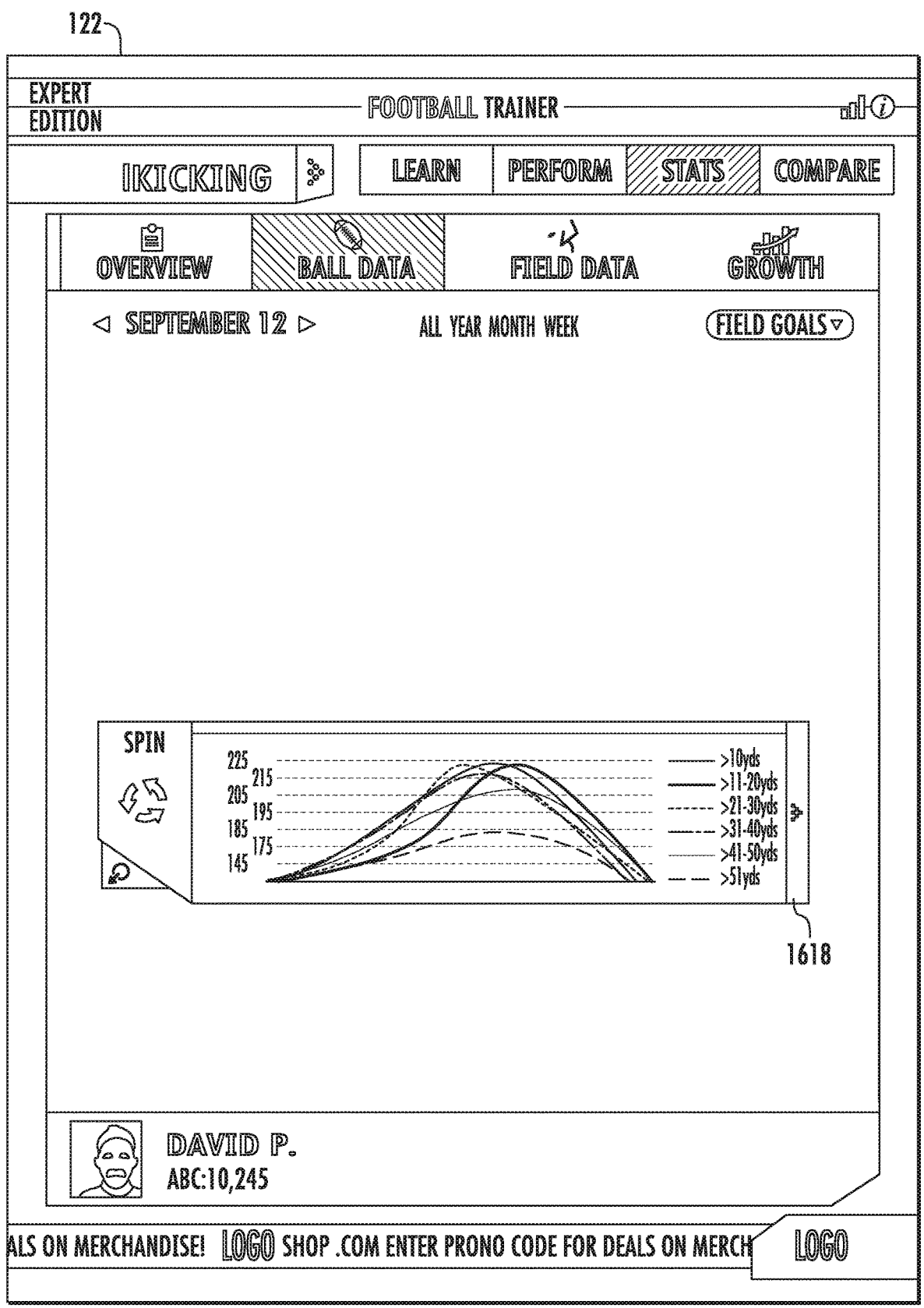
Figure 71:
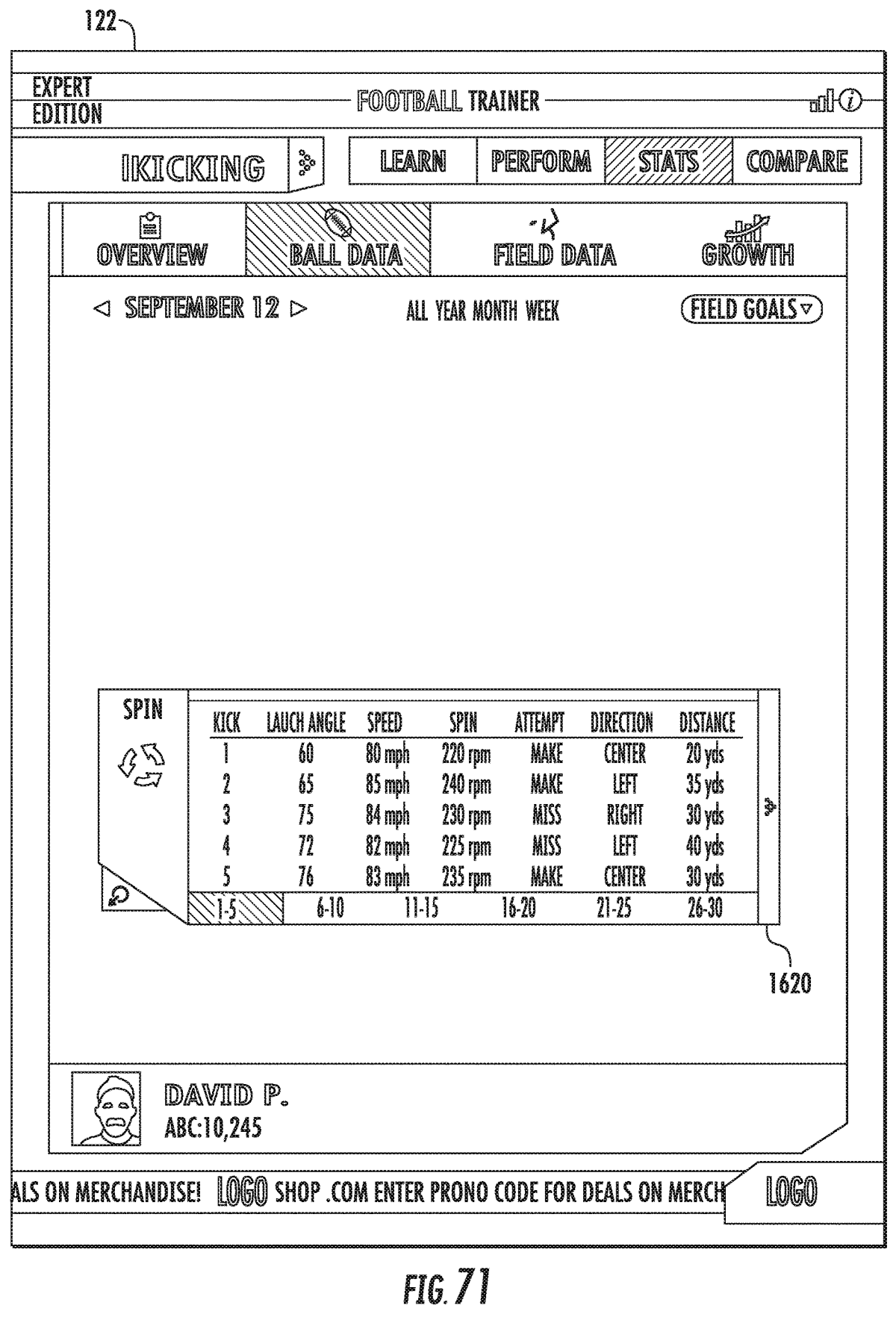

FIGS. 70 and 71 illustrate screenshots presented by processor 126 or 256 on display 122 in response to the graphical user interface 1612 of spin data 1604 (shown in FIG. 64) being selected or clicked upon. FIG. 69 illustrates a graph of an average spin for field-goal kicks at different distances sensed doing the selected period of time. The spin can be about a non-longitudinal axis of the football. In response to receiving signals indicating that advancement icon 1618 has been selected, processor 126 or 256 advances to present the screenshot shown in FIG. 71 provides additional information associated with each kick from which the average speed was derived. Selection of advancement icon 1620 of the screenshot shown FIG. 71 causes processor 126 or 256 to return display 122 to the overview screenshot shown FIG. 64.

Figure 72:
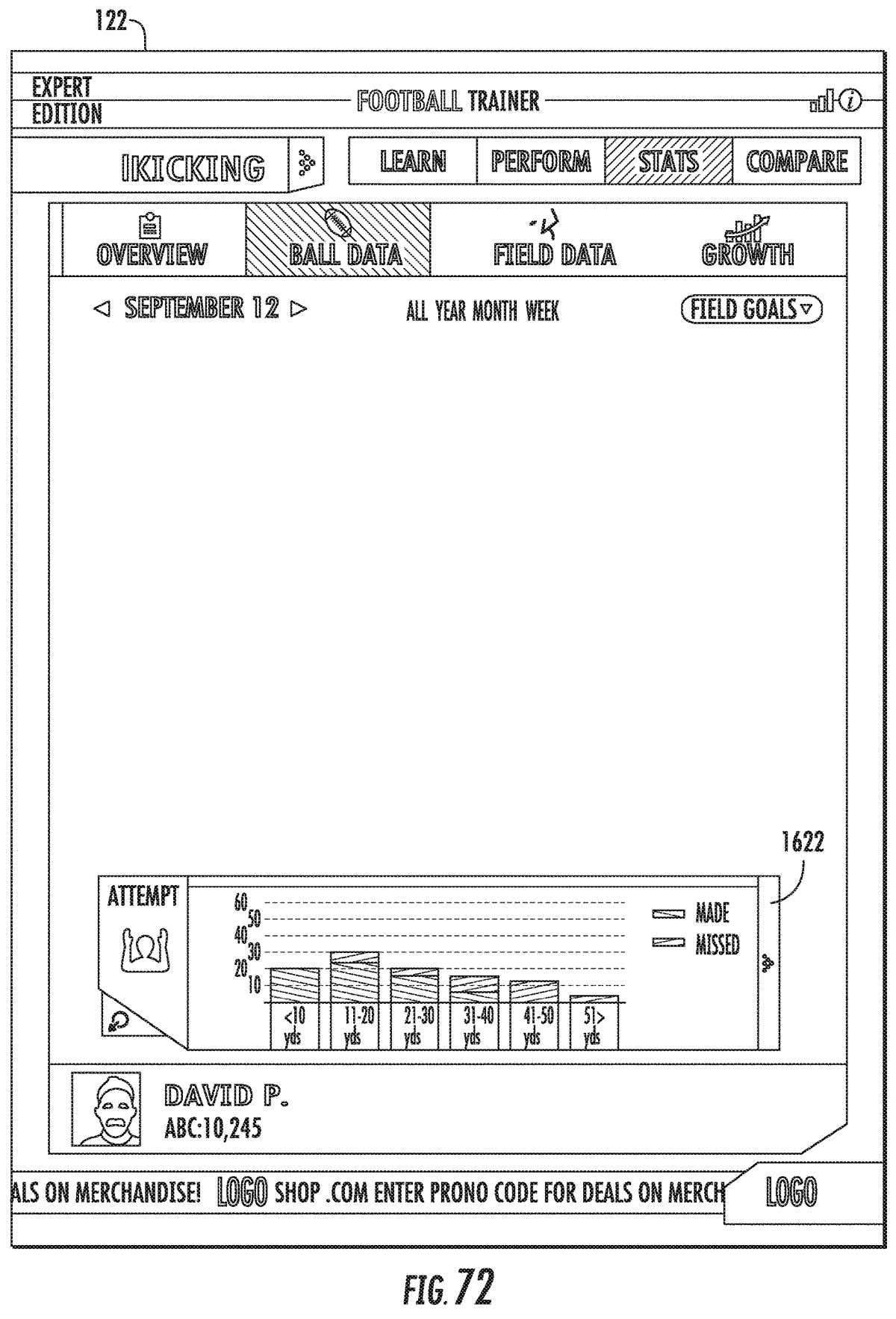
Figure 73:
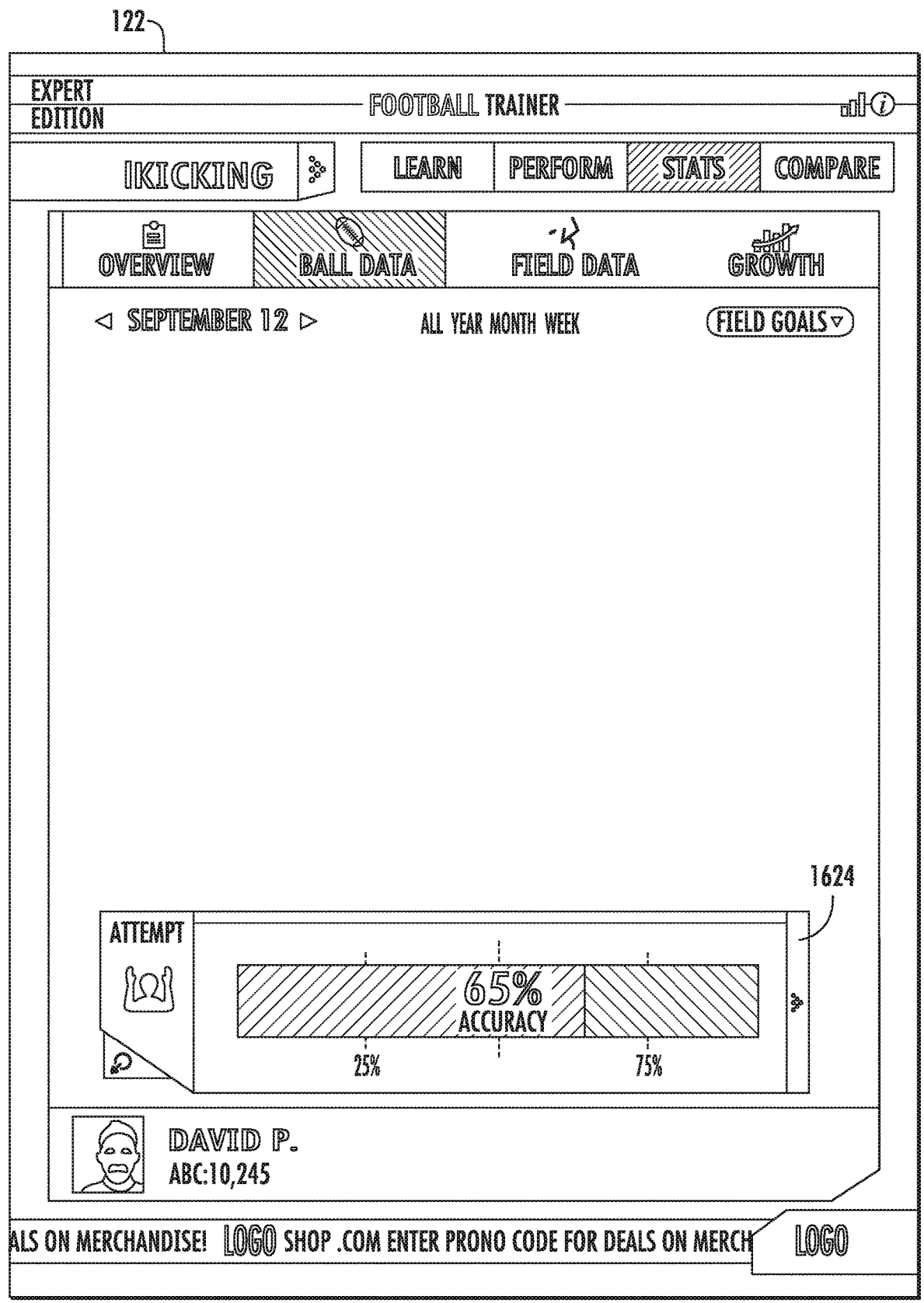

FIGS. 72-74 illustrate screenshots presented by processor 126 or 256 on display 122 in response to the graphical user interface 1612 of attempt data 1606 (shown in FIG. 64) being selected or clicked upon. FIG. 72 illustrates an enlarged view of the data shown in FIG. 64. In response to receiving signals indicating that advancement icon 1622 has been selected, processor 126 or 256 advances to present the screenshot shown in FIG. 73. FIG. 73 illustrates a graph of an average kick accuracy for all of the field-goal kicks at different distances sensed doing the selected period of time. In response to receiving signals indicating that advancement icon 1624 has been selected, processor 126 or 256 advances to present the screenshot shown in FIG. 74 providing additional information associated with each kick from which the average field-goal accuracy was derived. Selection of advancement icon 1626 of the screenshot shown FIG. 74 causes processor 126 or 256 to return display 122 to the overview screenshot shown FIG. 64.

Figure 75:
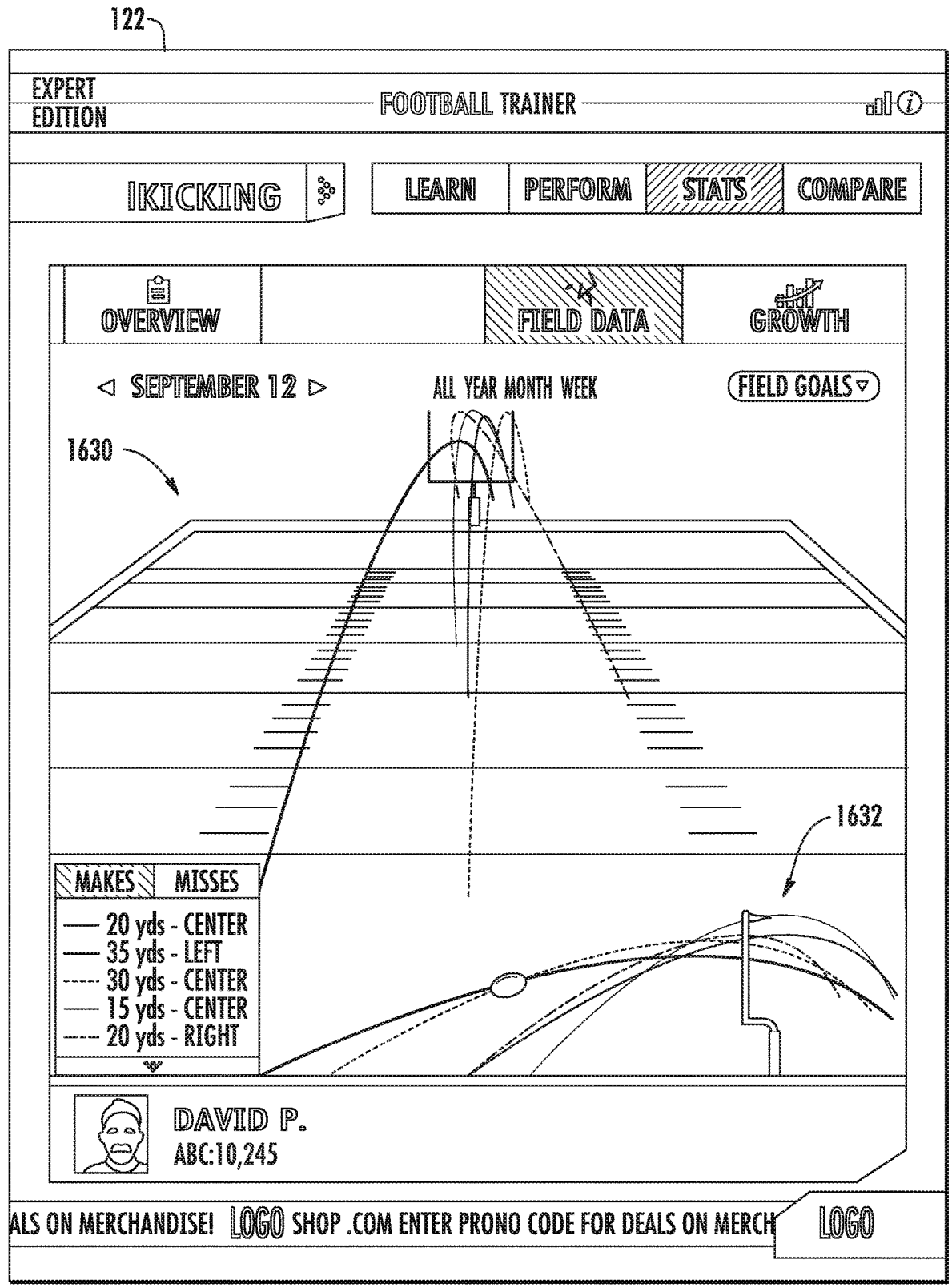
FIG. 75 illustrates an example screenshot of an example implementation of the sport performance system of FIG. 31 in which the perform tab option of kick selected including graphics depicting the trajectories of footballs during a plurality of field-goal kick attempts and data relating the field goal attempts.

FIG. 75 illustrates an example screenshot generating on display 122 by processor 126 or 256 in response to a user selecting the "field data" icon on the screenshot shown in FIG. 64. In the screenshot shown FIG. 75, processor 126 or 256 presents graphical animations or graphic depictions of each of the field-goal attempts for the selected period of time, using graphical indicators (line font, color, brightness, line characteristic and the like) to distinguish between made and missed field goals. Made and missed field goals are further indicated by the depicted trajectory of the ball with respect to the depicted goalpost. In the example illustrated, processor 126 or 256 graphically depicts both a front view 1630 and a side view 1632 of the trajectories of the field-goal attempts. As a result, the user can visibly ascertain the height relative to the low point of the crossbar as well as determine the trajectory with respect to the vertical end posts of the goalpost.

Figure 76:
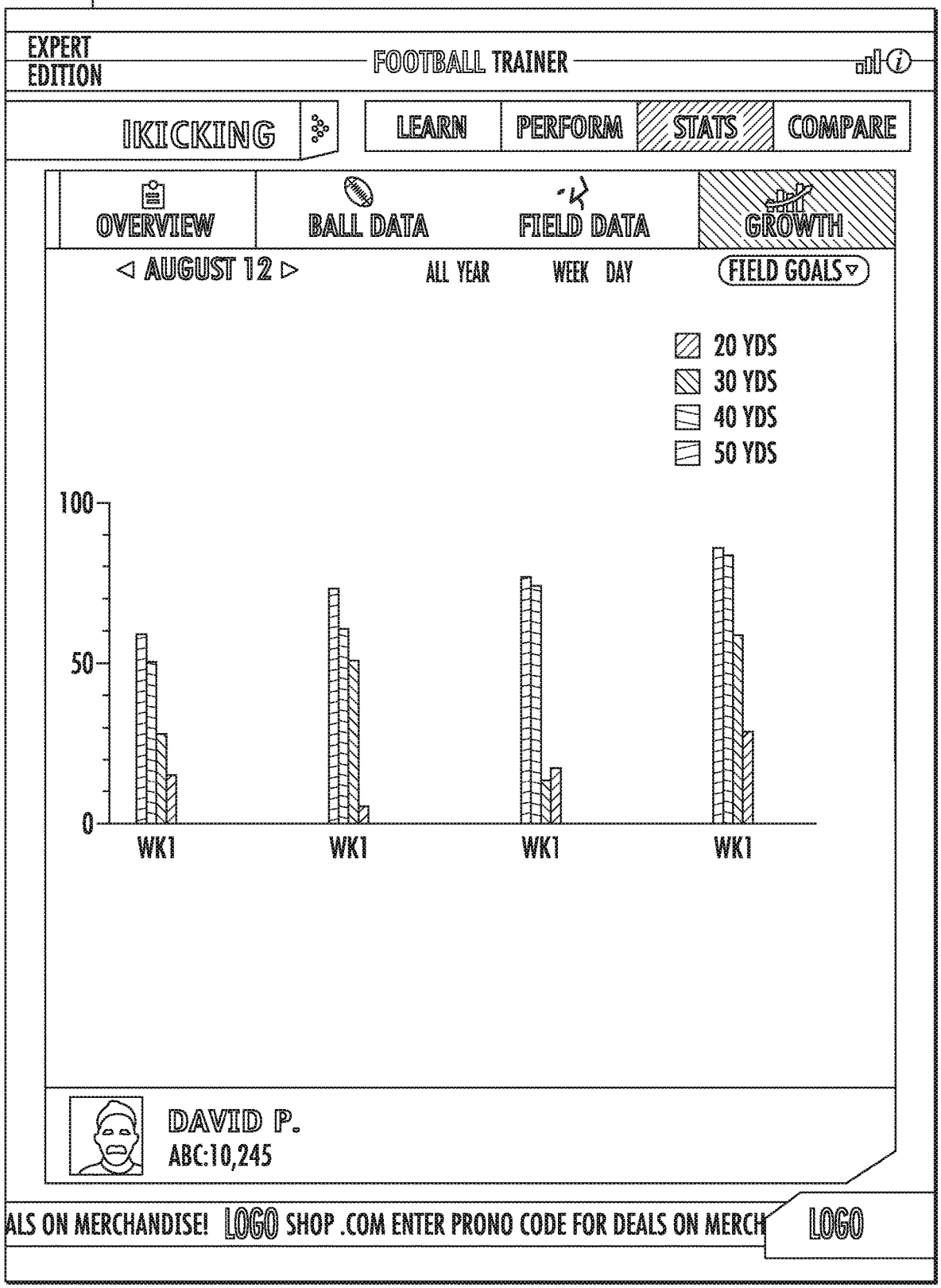
FIG. 76 illustrates an example screenshot of an example implementation of the sport performance system of FIG. 31 in which the perform tab option of kick is selected including a statistical output of a person's field goal kicking results over time.

FIG. 76 illustrates an example screenshot generating on display 122 by processor 126 or 256 in response to a user selecting the "growth" icon on the screenshot shown in FIG. 64. In the screenshot shown FIG. 76, processor 126 or 256 provides a graph or other statistical output of a person's results over time to visibly indicate growth or skill development or the selected time period. In the example illustrated, processor 126 or 256 depicts growth over the previous one-month period. In the example illustrated, processor 126 or 256 depicts average field-goal accuracy for particular weeks at different field-goal distances. By inputting different settings, user assess accuracy growth for other time periods left in other than week to week) such as day-to-day, month-to-month, year-to-year and the like. In other implementations, such growth or development may be visibly depicted by processor 126 or 256 in other manners.

Figure 77:
FIG. 77 illustrates an example screenshot of an example implementation of the sport performance system of FIG. 31 in which the perform tab option of kick selected including information comparing the user to other users or celebrities.

FIG. 77 illustrates a screenshot presented on display 122 by processor 126 or 256 in response to the user selecting the compare option. In the example shown in FIG. 77, the user is presented with ranking information and all-time high scores for a particular kick accuracy (or for other ball travel parameters) with respect to other users. Such users may be a select group of friends or those in a league. In one implementation, such accuracy or ball travel parameter values may also be compared to accuracies or ball travel parameters of celebrities. As a result, system 420 may facilitate remote competitions. In one implementation causes 420 may be used in PUNT, PASS AND KICK competitions to track results.

Figure 78:
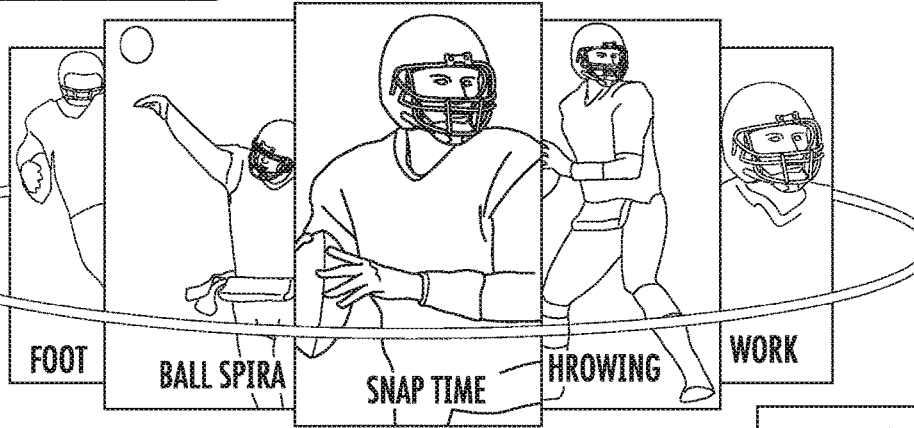
FIG. 78 illustrates an example screenshot of an example implementation of the sport performance system of FIG. 31 in which the learn tab option of pass is selected.

FIG. 78 illustrates a screenshot presented on display 122 by processor 126 or 256 in response to a user selecting the pass category under the learn option (shown in FIG. 58). In the example illustrated, the user is provided with the options of selecting various instructional videos pertaining to passing. In the example illustrated, snap timing is the presented subcategory of passing. Other subcategories include ball spiral and throwing motion. In response to such selections, instructional videos 1708A, 1708B, 1708C are presented on display 122. As shown by FIG. 78, after instructional videos for each of the individual steps or portions of a pass are presented, the user may select presentation of all of the steps or portions of the pass for review.

Figure 79:
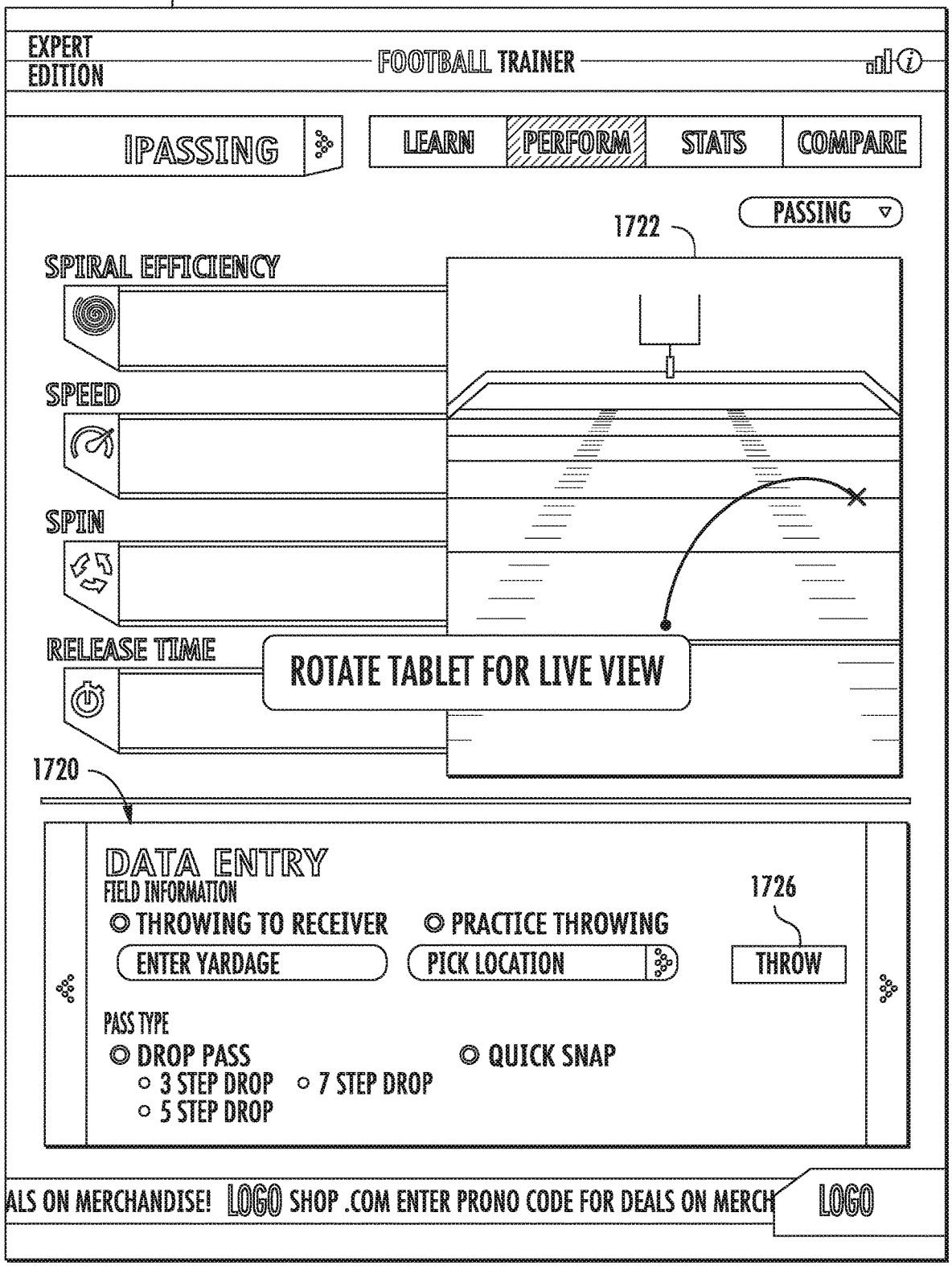
FIG. 79 illustrates an example screenshot of an example implementation of the sport performance system of FIG. 31 in which the perform tab option of pass is selected including a graphic depicting the trajectory of a football during a pass.

FIGS. 79-82 illustrate screenshots presented on display 122 by processor 126 or 256 in response to the user selecting the pass category under the perform option (shown in FIG. 58). As shown by FIG. 79, processor 126 or 256 presents on display 122 the various ball travel parameters for which data will be collected during the performing of the throw sample. In the example illustrated, the data collected comprises spiral efficiency, speed, spin and release time. In data entry window 1720, processor 126 or 256 further prompts the user to enter data regarding the conditions of the pass or throw. In the example, processor 126 or 256 prompts the user, on display 122, to enter whether the throw is to a receiver or simply a practice throw. Processor 126 or 256 may also prompt a user to input whether throw is following a three step drop, a five-step drop or a seven step drop or whether the throw was part of a quick snap (such as a shot-gun snap). In some implementations, processor 126 or 256 further prompts a user to provide environmental data such as wind direction. As noted above, in some implementations, such environmental conditions may be sensed or may be retrieved from remote sources.

In the example illustrated, processor 126 or 256 further prompts a user to enter a target yardage in a target location for the upcoming throw. In one implementation, the input target yardage and target location visibly presented on display window 1722 which depicts a trajectory 1724 of a football utilizing the entered target yardage and target location. As noted above, in other implementations, the target location for practice throw may be automatically selected by module 460. Moreover, the manner in which the target is depicted may occur in other fashions, such as shown in FIGS. 55 and 56. Once such information has been entered, the user may select the "throw" button 1726 to initiate the throwing sample.

Figure 80:
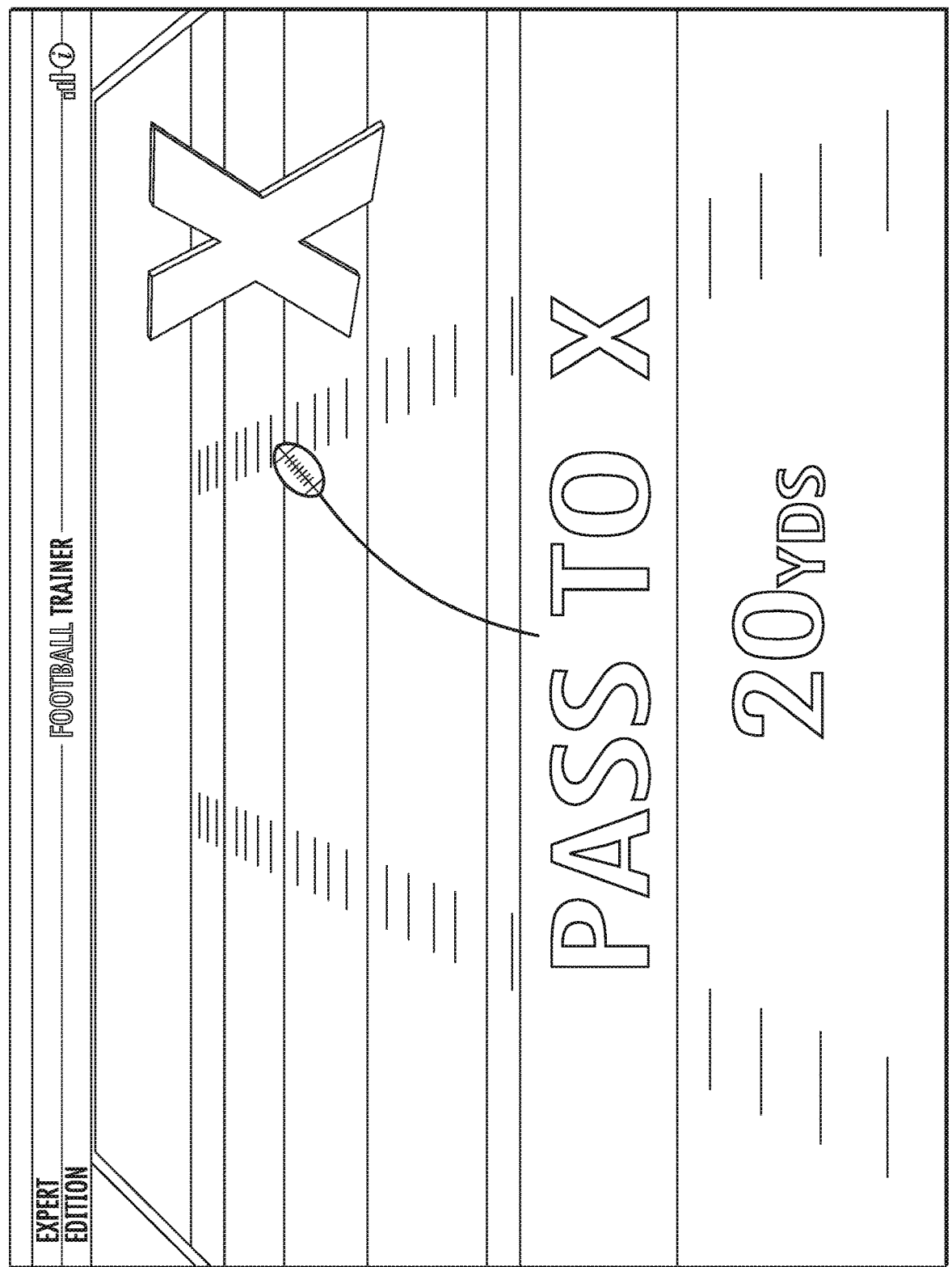
FIG. 80 illustrates an example screenshot of an example implementation of the sport performance system of FIG. 31 in which the perform tab option of pass is selected including a graphic of a simulated football traveling towards a target.
Figure 81:
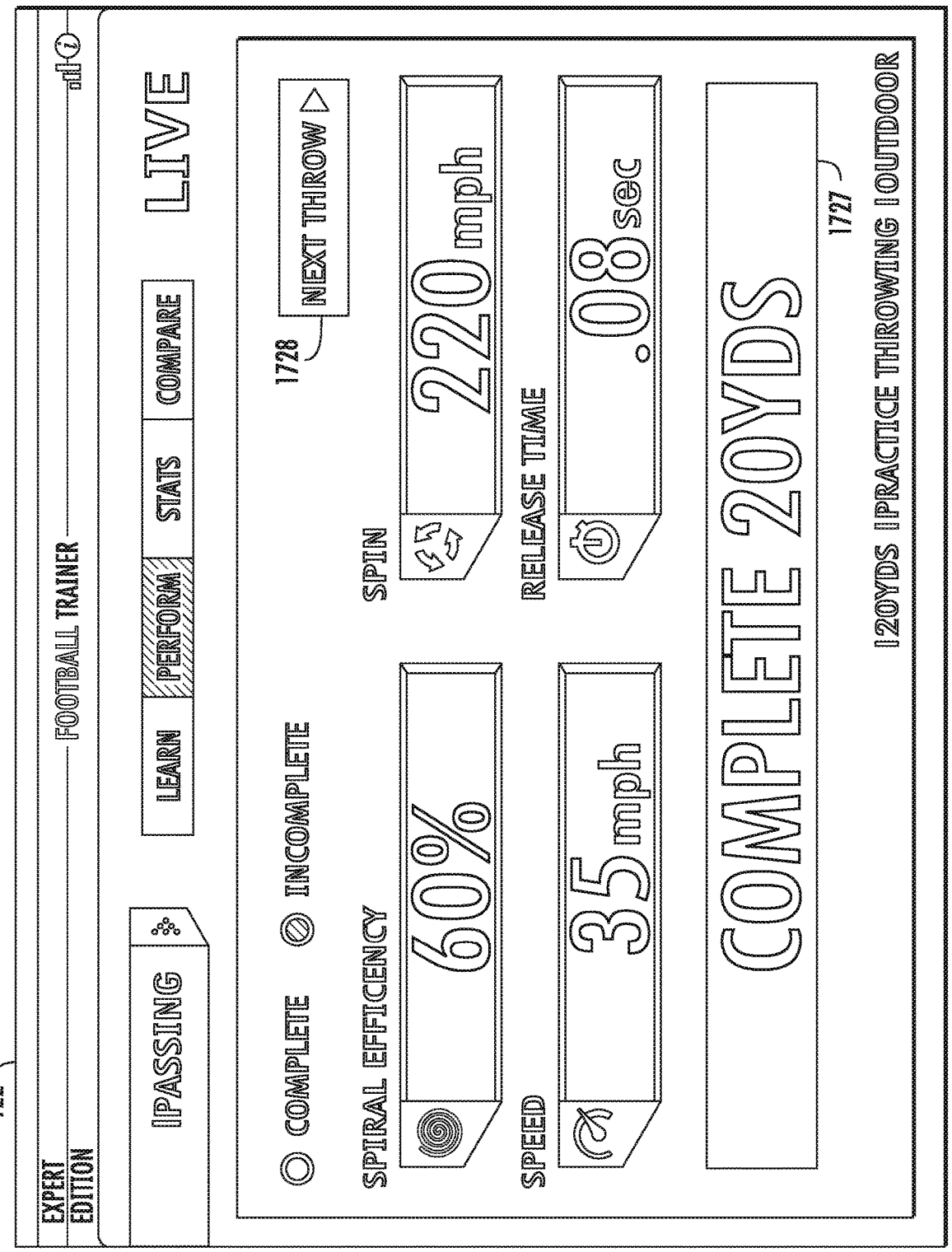
FIG. 81 illustrates an example screenshot of an example implementation of the sport performance system of FIG. 31 in which the perform tab option of pass is selected including a presentation of football travel parameters.

As indicated by FIGS. 80-81, in one implementation, processor 126 or 256 may present one or more ball travel parameters in real time or live while the ball is traveling. For example, the trajectory of the ball may be drawn in real time upon display 122 as a ball is moving through its trajectory. FIG. 80 illustrates an example real-time or live view on display 122. FIG. 80 illustrates the target location "X" and further illustrates a graphic of the simulated ball as it is traveling in real time towards the target. In the example illustrated, the real-time view is triggered by rotation of the display 122, wherein the gyroscope sensor such rotation and switches to a live view of the traveling football. In one implementation, the travel of the ball may be recorded and subsequently presented to the person who threw the football.

In response to receiving the "throw" selection, processor 126 or 256 notifies the user that system 420 is ready for the sample throw. Such notification may occur after synchronization between input 124 and transmitter 254 of ball 10. During the sample kick, sensor 252 gathers data are values for various ball travel parameters and transmits them to input 124 using transmitter 254. As noted above, the provision of data to input 124 may occur in other fashions in other implementations.

In one implementation, processor 126 or 256 displays a count for each of the steps of the drop pass. The displayed count may assist the user in timing the steps and in releasing the ball. In one implementation, processor 126 or 256 may utilize signals from ball 10 to determine when the ball is snapped (based upon accelerated movement of ball 10 from an at rest state) and may cause electronic device to emit an alert or sound at a predetermined lapse of time following the determined snap. As discussed above, in other implementations, the occurrence or the time of the snap event of the football can be substituted by another event to indicate the snap of the football, such as the user saying "hike!", the user tapping the football in a predetermined location or in a predetermined manner, moving the football in a predetermined manner, or using a remote electronic device to indicate the snap of the football. In other implementations, processor 126 or 256 may communicate with other sound emitting devices, such as remote sound emitting devices, and direct such other sound emitting devices to produce the audible alert following the predetermined lapse of time after the determine snap of the football. The alert triggered by processor 126 or 256 based upon the determined snap of football 10 may be utilized to indicate when a quarterback should pass or release the ball following a snap or may be used to indicate when a rush of the quarterback may begin such as in various flag or touch football leagues. In other implementations, the audible alert or light emission can be triggered from an initiating event, such as a snap, and then repeated at a fixed interval or frequency (e.g., once per second). The alert can then terminate upon indication of the release or passing of the football.

As shown by FIGS. 81-82, upon completion of the throw, processor 126 or 256 displays the ball travel parameters. As shown by FIG. 81, processor 126 or 256 displays the various ball travel parameters. In the example illustrated, processor 126 or 256, following instructions for module 460, displays spiral efficiency, speed, spin and release time. In the example illustrated, pass release time or quarterback release time refers to the elapsed time when the person throwing the ball begins to draw the ball upward and/or rearward during cocking of the arm to the time of the ball is actually separated or released from the hand of the person throwing the ball. As shown by FIG. 82, processor 126 or 256 further presents a graphic 1730 depicting the trajectory of the football during the throw towards the target "X". In the example illustrated, module 460 directs processor 126 or 256 to determine and accuracy of the throw completed and indicates whether the practice throw was "complete" in display window 1727 in FIG. 81 and/or in window 1731 of the screenshot displayed in FIG. 82. As further indicated by FIG. 81, should the person choose to immediately throw another pass, he or she may select (click on) the next throw button 1728.

FIG. 83 illustrates an example screenshot presented by processor 126 or 256 on display 122 in response to a user selecting the pass category under the stats option (See FIG. 59). As shown by FIG. 83, processor 126 or 256 presents on display 122 data regarding spiral efficiency, speed, spin and quarterback release time for one or more throws for various distances. Spiral efficiency can be used to measure the effectiveness of a thrown American-style football. In other words, spiral efficiency a measure of how "tight" the spiral motion of the football is to the trajectory of the ball during flight. The spiral motion allows for the football to be thrown farther, at greater speeds and with greater accuracy than a non-spiral motion. American-style footballs have a prolate spheroidal shape in which the polar axis or major axis 530 of the football is greater than its equatorial diameter or minor axis 532. When an American football is thrown in a "spiral", the football rotates about the major axis 530 or polar axis of the football as it travels through the air. However, thrown footballs do not achieve perfect spiral motion because a slight torque is typically applied to the ball in the direction of handedness of the thrower. A right handed player will generally pull with his or her fingers on the right of the ball resulting in a yaw or lateral movement. The yaw generally results in the football moving slightly left upon release and then right for a right-handed player, and slightly right upon release and then left for a left handled player. Additionally, aerodynamic drag forces are not perfectly symmetrical and create a torque onto the football, which can cause a gyroscopic or wobble to the thrown football. Almost all thrown or punted footballs include some degree of "wobble" as measured by the rotation of the center front end of the football away from or about the trajectory of the thrown or punted football. The term spiral efficiency is a measure of the degree in which the longitudinal axis 530 of the football remains in line with the trajectory of the football as the football travels through the air and rotates about its longitudinal axis 530. A football thrown with a perfect spiral would have a 100% spiral efficiency, in which the center front end of the football does not deviate from the trajectory of the football as it travels through the air. Accordingly, the spiral efficiency is a measure of how "tight" the longitudinal axis 530 and center front end of the football remains to the trajectory of the football as it travels through the air.

In one implementation, in response to receiving signals indicating that the advanced graphical user interface 1800 has been selected for the spiral efficiency data (FIG. 83), processor 126 or 256 displays additional data regarding or associated with spiral efficiency. FIG. 84 illustrates an example screen shot of information presented on display 122 by processor 126 or 256 for 10 example throws. An example illustrated, signals from sensor 252 carried by ball 10, such as accelerometers, gyro sensors, provide data regarding spiral RPM, wobble RPM, the ratio of wobble to spiral RPM and the angle of the football wobble axis to the longitudinal vector of the football. FIG. 85 is a free body diagram of an example football 10, illustrating the noted axes and rotational movement of the football. $w_y$ is rotation about they axis and is referred to as the spin of the ball.

In one implementation, processor 126 or 256 further presents graphical information relating to each of the individual throws. FIGS. 86-89 illustrate example displays of graphical data from throws 1 and 9, from FIG. 84. The presentation of such information permits a person to evaluate his or her spiral efficiency. In addition, the graphical presentation of such information permits a person to evaluate the nose angle of a thrown ball and the wobble to spiral ratio (60% is viewed as ideal). Through the evaluation of the wobble to spiral ratio over time, the person may further evaluate the stability of the spiral. Stability of spiral motion of the thrown football at the time of release from the thrower, immediately after release, and during the course of the entire throw can be measured, stored, compared, analyzed and monitored. The characteristics of a thrown football or the spiral of a thrown football can vary over the course of the throw. Accordingly, the present system contemplates sensing, measuring, analyzing, and comparing information regarding the thrown ball. As a result, system 420 provides yet another tool for the person to evaluate and improve his or her football passing or throwing skills.

Referring to FIG. 90, the accelerometers 534, 550 can be used measure spiral efficiency or wobble of the football during flight. FIG. 90 illustrates vibration data of the football 10 during an example pass of approximately 10 yards at a speed of approximately 34 mph. The variation in acceleration values recorded by the accelerometers 534 and 550 when the ball in the air during a pass include oscillating patterns that can be used to determine the wobble or spiral efficiency of the thrown or kicked football. Data traces 570 and 572 illustrate acceleration values obtained from accelerometers 534 and 550 of the implementation of the football 10 of FIG. 47 measured in the direction of travel or the trajectory of the football 10 (a direction parallel to the longitudinal axis 530 of the football 10). The oscillating amplitude a of the acceleration readings represents the wobble of the thrown football. The spiral efficiency (S.E.) can be determined using the following formula. The spin in the direction of travel or the trajectory of the football in flight is $w_y$. The conversion factor is CF. The maximum amplitude of trace 572 is max $a_y$, and the minimum amplitude of trace 572 is min $a_y$. Accordingly, in one implementation, spiral efficiency can be measured using the following equation.

Spiral Efficiency=Spin/(amplitude of oscillation) (conversion factor)

$$S.E.=[(w_y*6)/(CF*(\max a_y - \min a_y))]*10$$

The oscillations of data traces 570 and 572 do not match in time, but are slightly offset due to the accelerometers being positioned on opposite sides of the axis 530 within the ball 10. The data traces 570 and 572 provide an efficient, accurate manner of determining the wobble or spiral efficiency of the football 10 without having to use one or more gyros.

In one implementation, a football sensing system includes the American-style football 10 extending along the longitudinal axis 530 and having a maximum transverse dimension defining the transverse axis 532, at least first and second accelerometers 534 and 550 carried by the football 10 to sense acceleration of the football in at least one axis, and a processor 126 or 256 operably coupled to the first and second accelerometers 534 and 550. The first and second accelerometers 534 and 550 are carried by the football 10 to sense acceleration of the football in at least one axis. The first and second accelerometers 534 and 550 are positioned on opposite sides of the longitudinal axis 530 and spaced apart by a predetermined transverse distance D. The first and second accelerometers 534 and 550 are configured to measure the acceleration of the football 10 in first and second directions parallel to the longitudinal axis 530. The processor 126 or 256 is configured to receive signals from the first and second accelerometers 534 and 550 representing the acceleration of the football 10 in the first and second directions. The processor is configured to process the acceleration signals to calculate a spiral efficiency about the longitudinal axis 530 when the football 10 is thrown.

The kick efficiency (KE) of a kicked football would be a measure of the efficiency of the end over end tumble rate of the football. Kicking efficiency can be calculated using the following formula. The scaling factor is used to convert the rate ratio into a percentage scale.

KE=Tumble Rate/Spiral Rate*Scaling Factor.

The primary rotation would be the tumble rate or the rotation about an axis lying in the transverse plane 533 of the football rather than the longitudinal axis 530. An ideal kick would involve rotation only about an axis lying in the transverse plane 533 without a wobble of the ends of the football. A typical tumble rate is within the range of 200 to 700 rpm. The implementations of FIG. 51, 52 or 53 can all be used to calculate a kick efficiency in addition to the spiral efficiency of the football.

As shown by FIG. 91, processor 126 or 256 allows the user to look at historical data for various years, months, weeks or days. Processor 126 or 256 presents a graphical depiction of the trajectory of multiple throws. As a result, a person may visibly ascertain not only whether the throw was on target, but whether the throw had a desired trajectory or arc. In the example illustrated, processor 126 or 256 utilizes different colors or brightnesses to indicate whether or not the particular throw was on target for the selected yardage. In other implementations, other icons or graphical indications may be used to indicate accuracy of the throw. Such graphical information regarding trajectories may be selected from any historical time.

FIG. 92 illustrates a screenshot presented on display 122 by processor 126 or 256 in response to the user selecting the compare option. In the example shown in FIG. 92, the user is presented with ranking information and all-time high scores for a particular kick accuracy (or for other ball travel parameters) with respect to other users. Such users may be a select group of friends or those in a league. In one implementation, such accuracy or ball travel parameter values may also be compared to accuracies or ball travel parameters of celebrities. As a result, system 420 may facilitate remote competitions. In one implementation system 420 may be used in PUNT, PASS AND KICK competitions to track results.

FIG. 93 schematically illustrates portions of another example sports performance system 1660. Sports performance system 1660 provides an automated objective American-football evaluation system, facilitating the objective evaluation of football performance or events independent of subjective human evaluation. System 1660 is similar to system 260 described above with respect to FIG. 32 except that memory 428 of system 1660 comprises football travel parameter module 1662 in place of football travel parameter module 460. Those remaining components of system 1660 which correspond to components of system 260 are numbered similarly and described above.

Football travel parameter module 1662 is similar to football travel parameter module 460 described above except that module 1662 provides more extensive objective evaluation of various aspects related to football performance. In the example illustrated, football travel parameter module 1662 is configured to output an objective evaluation scores or values regarding in-flight characteristics of football 10. Such objective evaluation scores or values may be for a thrown football (a pass), a kicked football, a punted football or a snapped football (a long snap or shotgun snap).

FIG. 94 is a flow diagram of an example method 1700 that may be carried out by processor 126 following instructions contained in module 1662. Method 1700 result in the output of objective evaluation scores or values for in-flight characteristics of football 10. As indicated by block 1702, processor 1660 receives sensor signals strings from sensor 252 through input 124. In the example illustrated, sensor 252 may comprise accelerometers, such as the arrangement of accelerometers shown and discussed above with respect to FIG. 44, 47, 50, 51 or 53. In other implementations, sensor 252 may comprise a gyroscope which outputs sensor signals in the form of angular velocity signals. Sensor signals can include linear acceleration signals and/or angular velocity signals (which can be converted to angular acceleration signals). Such strings of acceleration signals extend across multiple football events such as the snap of the football, carrying of the football, a punt, kick or throw of the football, a catch of the football, and after catch carrying of the football. As game actions involving a football are fluid and continuous, it is generally not possible to simply produce a string of sensor signals having a starting point and ending point that identically match the beginning and end of an individual discrete event. In other implementations, combinations of one or more accelerometers, one or more gyroscopes, one or more gps sensors, and/or other forms of sensors can be used.

As indicated by block 1704, football travel parameter module 1662 directs processor 126 to divide the at least one string of sensor signals received from sensor 252 into discrete events. Module 1662 directs processor 126 to identify the discrete in-flight portion/event of the at least one string of sensor signals. In the example illustrated, model 1662 correlates the received string or strings of sensor signals to predefined patterns or shapes of such strings stored in event signature storage 462 and corresponding to individual football events. For example, certain events may be characterized by signature shapes or oscillation patterns.

FIG. 95 illustrates the pattern exhibited by strings of sensor signals during an example throw a football 10. FIG. 95 illustrates for example strings of sensor signals: string 1750 taken along the x-axis of football 10 (described above), string 1752 taken along the Y axis of football 10 during the throw, string 1754 taken along the z-axis of football 10 during a throw and string 1756 corresponding to the magnitude of overall acceleration of football 10 (a composite of strings 1750, 1752 and 1754). Such strings extend across multiple football events, each football event having an identifiable characteristic. For example, the cocking of the arm and imparting of acceleration to the throw corresponds to the point in time at which string 1756 (or another of the strings) reaches a peak amplitude 1760. The endpoint of the throw, the time at which football 10 is caught or hits the ground has a characteristic follow-up amplitude peak 1762 in string 1756 (or another of the strings). The time period 1764 between peaks 1760 and 1762 generally constitutes the in-flight time of ball 10. In block 1704, system 1660 identifies a discrete in-flight time period 1764 of a throw. The in-flight portion of the acceleration strings may likewise be determined for kicks, punts or long snaps.

As indicated by block 1706, module 1662 directs processor 126 to extract those sensor or acceleration values for the in-flight portion 1764 of such strings. As indicated by block 1708, module 1662 directs processor 126 to compare such extracted acceleration string values or extracted shapes/patterns against various templates or thresholds. As indicated by block 1710, based upon such comparison, module 1662 directs processor 126 to output and in-flight score (also referred to as a rating or value) for a particular aspect of the in-flight characteristics of football 10. The in-flight score is outputted on display 122 by display module 239.

As shown by FIGS. 96A-98C, module 1662 is configured to determine and angle of attack 1664 of a thrown football 10. The angle of attack refers to the angle between the axis 1666 about which football 10 spins and its velocity vector 1668 during the throw. FIG. 96A illustrates a football 10 traveling with a high angle of attack. FIG. 97A illustrates football 10 traveling with a low angle of attack. FIG. 98A illustrate football 10 traveling with a zero angle of attack (e.g., a vertical toss case).

FIGS. 96B, 97B and 97B are graphs illustrating data from sensor 252 indicating acceleration over time in each of the X, Y and Z axes during each of the throws depicted in FIGS. 96A, 97A and 98A, respectively. The angle of attack may be quantified by processor 126, under the direction of instructions contained in memory 428, based upon the acceleration signals for axis Y received from sensor 252 (shown in FIG. 93). The closer that the pattern or wave of acceleration along axis Y approximates a sine wave, the smaller the angle of attack.

FIGS. 96C, 97C and 98C are graphs illustrating acceleration data from axis Y after the application of signal processing, such as fast Fourier transform to the raw acceleration signals shown in FIGS. 96B, 97B and 98B, respectively. A Fast Fourier Transform (FFT) is a mathematical approach to converting a digital, time-based signal into a breakdown of the frequencies seen within the signal. A FFT is a mathematical approach to calculating the oscillation frequency and amplitude of a wave. For these plots, the horizontal axes of FIGS. 96C, 97C and 98C give the frequency location of each oscillation that is present in the signal. For the zero angle of attack (AoA) case, the AY trace is oscillating at a frequency of about 3.3 Hz. The vertical axes of FIGS. 96C, 97C and 98C give the amplitude of that oscillation. For zero AoA case, the AY trace is oscillating at an amplitude of 0.4 g, away from 0 g. A peak to peak amplitude is used for the calculation of calculation of spiral efficiency such that a 0.8 g value is used. As you increase the AoA, additional spikes emerge in the FFT plot.

Power spectral density is a mathematical approach determining the energy stored within certain frequencies within a signal. Together, these methods may be used to find the most powerful frequencies present in a time-series signal. Football travel parameter module 1662 of memory 428 uses Fast Fourier Transform and power spectral density to identify the frequencies of oscillation of the ball during flight. The greater the number frequencies of oscillation, the larger the angle of attack. As shown by FIG. 96C, the ball 10 with a high angle of attack has a larger number of frequencies, wherein the ball 10 with the low angle of attack has a smaller number of frequencies and wherein the ball 10 with the zero angle of attack has a single frequency. In the example illustrated, football travel parameter module 1662 of memory 428 identifies a number of frequencies and, based upon the number of frequencies, provides an output indicating the angle of attack of each of the throws of football 10.

As shown by FIG. 99, football travel parameter module 1662 may further calculate the launch angle or release angle 1674 of football 10. As shown by FIG. 99, the release angle is angle of the long axis 1666 of football 10 above the horizontal 1676 at release or launch. Upon completion of the thrower flight, such a release angle may be back calculated based upon projectile motion equations. In some implementations, dead reckoning may be utilized with an inertial measurement unit ("IMU") by tracking ball orientation throughout the entire throwing motion. As with angle of attack, the release angle may likewise be calculated and determined with respect to a kick or punt of football 10.

In the example illustrated, football travel parameter module 1662 contains instructions or code configured to further direct the processor 126 to calculate or determine a cone angle 1680 of football 10 during flight of football 10 following the throw, kick or punt. As shown by FIGS. 100A-C, the cone angle 1680 is a measure of the size of the radius of the cone by which the tip of longitudinal axis of the football 10 spins or rotates during flight. The cone angle 1680 may correspond to spiral quality of a football during flight following a kick, punt, throw, long snap or shotgun snap.

As shown by FIG. 101, in one implementation, football travel parameter module 1662 comprises instructions that direct processor 126 to calculate the cone angle 1680 using multivariable polynomial regression on the wobble magnitude 1682 as determined from the signals from sensor 252 carried by football 10. The wobble magnitude corresponds to the cone angle 1680. FIGS. 100A, 100B and 100C illustrate various cone angles that a thrown football may experience as it rotates about its longitudinal axis. FIG. 100A illustrates a 5° cone angle. FIG. 100B illustrates a 15° cone angle. FIG. 100C illustrates a 30° cone angle. Cone angle impacts spiral efficiency. The spiral efficiency is a function of the cone angle and spin rate 1684 (shown graphically in FIG. 101). In one implementation, the spiral efficiency is a value based upon the cone angle divided by the spin rate. In another implementation, spiral efficiency can be a regression between cone angle and spin rate. Regression is a mathematical trend line or moving average of the spiral efficiency value. SE=(sum of n numbers) $(\beta_i * spin_i * cone\ angle_i)$.

In addition to determining and outputting spiral efficiency, as described above, system 1660 may additionally determine and output spiral decay or spiral efficiency over time. For example, during a throw, the spiral efficiency of a ball 10 during flight may erode, presenting a larger challenge to the receiver when catching the ball. Spiral decay indicates how the quality of the throw changes over time and distance, resulting in a loss of stability. A ball in flight that maintains its spiral efficiency over time may be easier to catch.

FIG. 102 illustrate acceleration traces derived from signals received from sensor 252 during an example flight 1698 of football 10. The acceleration traces reflect the initial spiral efficiency on release and the spiral efficiency throughout the flight until just prior to football 10 being caught. As shown by the acceleration trace along the y-axis in FIG. 102, the spin rate of football 10 declines over time during the flight. As shown by the acceleration trace along the x-axis in FIG. 102, the wobble of football 10 increases over the same time during the flight of football 10. Football travel parameter module 1662 may direct processor 126 to identify such changes in the spin rate and wobble over time and to output a quantitative value or score for the decline or a qualitative rating for the spiral decay value. Display module 239 may direct processor 126 to output such objective analysis on display 122.

The spiral decay may further impact the efficiency of the flight of the ball following a throw, kick, punt, long snap or shotgun snap. The efficiency of a throw or the efficiency of the flight of the football 10 may be a composite metric of ball velocity, angle of attack, release angle and spiral efficiency. For example, the efficiency of a throw, kick, punt, long snap or shotgun snap may depend upon whether an optimal trajectory was achieved. Such efficiency may related to time-of-flight of the ball for a given amount of acceleration imparted to the ball 10.

In one implementation, flight efficiency is determined according to the following formula: Flight Efficiency=$AV_1+BV_1+CV_3+DV_4$, where A, B, C and D are constants and wherein V1-V4 are normalized quality scores for velocity, angle of attack, release angle and spiral efficiency, respectively. In one implementation, processor 126, under the direction of instructions contained in memory 428, stores multiple sets of constants A, B, C and D, wherein the particular set of constants applied to determine flight efficiency varies based upon the type or level of a throw. For example, flight/throw efficiency for a short throw, such as a slant, may be based upon application of a first set of constants or weights. In one implementation, due to the short nature of the throw or pass, velocity may be given a higher weight while spiral efficiency is given a lower weight. Flight efficiency for a touch pass may be based upon application of a second set of constants or weights different than the first set of constants or weights. In one implementation, due to the pass being a short touch pass, velocity may be given a lower weight. Flight efficiency for a long or deep path may be based upon application of a third set of constants or weights, different than the first and second sets. In one implementation, due to the pass being a deeper or along path, the release angle and spiral efficiency may have a larger weight.

In one implementation, processor 126, under the direction of instructions contained in memory 428, prompts a person to identify which set of constants stored in memory are to be applied to a given pass or to a given set of passes. In one implementation, processor 126, under the direction of instructions contained in memory 428, prompts a person to identify the type or level of the pass being evaluated, wherein processor 126, under the direction of instructions contained in memory 428, applies the appropriate set of constants/weights based upon the inputted type or level of pass. In one implementation, processor 126, under the direction of instructions contained in memory 428, prompts a person to identify a group or number of passes or a time duration for which a particular single type of pass will be thrown. For each of the number of passes or for the time duration, processor 126, under the direction of instructions contained in memory 428, applies the appropriate set of constants or weights given the type or level of passes being thrown for each of the number of passes or for the time duration.

In one implementation, processor 126, under the direction of instructions contained in memory 428, automatically determines the type or level of pass being thrown and automatically applies the appropriate set of constants. In one implementation, processor 126, under the direction of instructions contained in memory 428, may automatically determine the type or level of pass based upon sensed values indicating the release angle, velocity and duration of a throw. For example, a short pass may be characterized by a short duration with a high velocity and a low release angle (a flatter pass). A touch pass may be characterized by a short pass with a low velocity. A deep or long pass may be characterized by a longer duration and a high release angle. In making such determinations, processor 126, under the direction of instructions contained in memory 428, may identify the type or level of pass being thrown by comparing sensed values corresponding to release angle, velocity and duration to individual threshold values. In such an implementation, the flight efficiency is stored with its associated level or type of pass such that different levels or types of passes may be grouped along with their flight efficiency scores to facilitate analysis.

FIGS. 103 and 104 are graphs depicting acceleration traces for two throws or flights 1800, 1802 of football 10, determined by processor 126 following instructions contained in football travel parameter module 1662 and based upon signals received from sensor 252 in football 10. FIG. 103 illustrates a more efficient throw while FIG. 104 illustrates a less efficient throw. The total flight time of the two throws is the time between the first acceleration peak 1804, identifying release of the football, and the second acceleration peak 1806, identifying a catch or end of flight of the football. As shown by comparison of the two throws 1800, 1802, throw 1800 had a longer total flight time, yet required a lower amount of imparted acceleration (the amplitude of peak 1804). As a result, throw 1800 was a more efficient throw. In the example illustrated, football travel parameter module 1662 contains instructions directing processor 126 to compare a ratio of the total flight time to the imparted acceleration to identify a flight efficiency score for the flight of the football 10. In other implementations, other parameters may be utilized by system 1660 to identify or calculate an efficiency of the flight of the football. Display module 239 may contain instructions directing processor 126 to present the flight efficiency score or rating on display 122, providing objective evaluation.

In some implementations, system 1660 quantifies or objectively evaluates the catchability of a thrown ball. FIG. 105 is a flow diagram of an example method 1900 that may be carried out by processor 126 in accordance with instructions contained in module 1662 to objectively quantify the catchability of a ball in flight. FIGS. 106 and 107 illustrate two example throws of football 10, the different throws having different catchabilities that are to be objectively identified by system 1660 pursuant to method 1900. FIG. 107 is a diagram of example strings of acceleration signals or traces for a throw 1902 that is more catchable. FIG. 106 is a diagram of example strings of acceleration signals or traces for a throw 1904 that is less catchable relative to throw 1900.

As indicated by block 1910, processor 1660 receives sensor signals strings from sensor 252 through input 124. In the example illustrated, sensor 252 may comprise accelerometers, such as the arrangement of accelerometers shown and discussed above with respect to FIG. 44, 47, 50, 51 or 53. In other implementations, the sensor may comprise at least one accelerometer and/or at least one gyroscope. Such strings of acceleration signals extend across multiple football events such as the snap of the football, carrying of the football, a punt, kick or throw of the football, a catch of the football, and after catch carrying of the football. As game actions involving a football are fluid and continuous, it is generally not possible to simply produce a string of sensor signals having a starting point and ending point that identically match the beginning in and of an individual discrete event.

As indicated by block 1912, football travel parameter module 1662 directs processor 126 to identify the end of ball flight. Such end of ball flight may be identified by further identifying the point in time at which the ball is either caught or impacts the ground. Such time is characterized by a peak in acceleration amplitude following the determined in-flight time. In the example illustrated in FIGS. 106 and 107, the end of flight is identified by peaks 1762.

As indicated by block 1914, module 1662 directs processor 126 to identify a pre-catch window of time immediately preceding the identified end of ball flight. One example of such a pre-catch window is window 1950 depicted in FIGS. 106 and 107 for throws 1902 and 1904, respectively. In one implementation, the length of pre-catch window 1950 is predefined. For example, in one implementation, pre-catch window 1950 has an endpoint coinciding with peak 1762 with a length of between 0.2 seconds and 0.4 seconds. In another implementation, window 1950 may have varying lengths depending upon other predetermined characteristics of the particular throw. For example, the length of window 1950 may vary depending upon the determined velocity or distance of the particular throw. A shorter throw or a throw with higher velocity may not provide as much reaction time to a receiver, wherein window 1950 may accordingly have a shorter duration. In one implementation, processor 126, under the direction of instructions contained in memory 428, may automatically determine or identify the type of throw (as described above) and automatically apply a selected one of a plurality of pre-catch windows based upon the determined type of throw or level of throw or based upon a duration (time-of-flight) of the throw. For example, a long throw may have a pre-catch window of 0.25 seconds to 0.4 seconds while a short slant pass may have a pre-catch window of 0.1 to 0.25 seconds.

As indicated by block 1916, system 1660 extracts those accelerometer values for the window 1950. As indicated by block 1918, module 1662 directs processor 126 to compare such extracted acceleration values or extracted shapes/patterns against various templates or thresholds. As indicated by block 1920, based upon such comparison, module 1662 directs processor 126 to output a catchability score (also referred to as a rating or value) that is presented on display 122 by display module 239. The score may be based upon metrics such as the determined velocity, spin rate and spiral efficiency of the ball 10 during the time window 1950. The score may be based upon a comparison of such metrics against predefined thresholds. In one implementation, the score may be based upon a weighting of each of such metrics.

The catchability of a football 10 depends upon the characteristics of motion of the football just prior to the ball 10 impacting the receiver, whether such impact is with the hands or the chest of the receiver and whether the ball is caught or dropped. System 1660 provides an objective and quantitative evaluation regarding the catchability of football 10. In some circumstances, such as a throw or pass of the football 10, a high catchability score may be desirable. In other circumstances, such as a kick or punt of the football 10, a low catchability score may be desirable. Because only a subset of the sensor signals is used to determine catchability, the catchability score output on display 122 by system 1660 avoids tainting a result based upon parameter values occurring at the time of release of the throw, wherein spiral decay or other factors may substantially change the motion of the football at the time that the football is being caught.

In the example illustrated, processor 126 may output the rating or score indicating the throw 1904 has a first catchability rating or score while throw 1902 has a second catchability rating or score, the second catchability score being greater than the first catchability score. This output may be the result of processor 126 identifying the greater frequency and/or amplitude, or degree of oscillation of the sensor signals 1910 of throw 1904, as compared to throw 1902 in the window of time immediately preceding the catch, peak 1762.

In some implementations, the catchability score or rating for a throw may be based upon acceleration or sensor signals for a longer period of time. In some implementations, the catchability score rating may be additionally or alternatively based upon the determined distance of the throw and/or the determined spiral decay for the throw. For example, a thrown ball having a greater spiral decay be more difficult to catch given the lack of stability of football 10 during the throw. Although the above process has been described with respect to catchability of a thrown football 10, the same or a similar process may be equally applied to determining a catchability score rating for catching other in-flight balls such as catching a kick, catching a punt or catching a longer shotgun snap.

In addition to providing objective quantitative output characterizing various qualities or characteristics of an individual throw or other flight of a football, system 660 may store such determined metrics and provide a comparison amongst different throws to indicate the consistency of such metrics by an individual quarterback or other football player. In one implementation, football travel parameter module 1662 stores the determined metrics described above in user storage 132. System 1660 may prompt a user to select a time range to determine a level of consistency amongst the various throws are other ball flights during the selected time range. FIG. 108 illustrates an example output 2000 presented on display 122 by display module 239, depicting the range of multiple acceleration traces 2002 for multiple throws for a given distance and/or flight type during the input time range. The centerlines 2004, 2006, 2008 and 2010 depict the average magnitude, x axis acceleration, y-axis acceleration and z-axis acceleration, respectively, over flight time for the multiple ball flights. The surrounding region 2020 of each line, which is crosshatched, depicts the standard deviation of the throws from the average values or magnitude for each of the acceleration traces for each of the different ball flights. Output 2000 provides a person with an objective evaluation of the relative consistency of different throws and where to focus further work or practice.

In one implementation, system 1660 may further provide an output reflecting changes of an average metric over a selected period of time. System 1660 may determine a baseline for statistics for an individual and track how such statistics improve or decline over time. System 1660 may be utilized to track player development or detect injury risks. FIG. 109 illustrates one example output 2050 and may be presented on display 122 by processor 126 following instructions contained in display module 239 and based upon metrics determined by football travel parameter module 1662 based upon signals from sensor 252. FIG. 109 depicts how peak accelerations of various throws for an individual change over time, during a 10 week time period in the example. Although illustrated as a bar graph, output 2050 may take other forms while providing an evaluator with objective evaluation metrics.

In one implementation, system 1660 is further configured to assist in objectively evaluating performance before and/or after the in-flight time of a football. As will be described hereafter, system 1660 may be configured to objectively evaluate and output a score regarding response to an external stimulus prior to a throw, regarding scrambling prior to a throw, regarding a quality of the catch of the football and/or regarding securement of the football following a catch.

FIG. 110 illustrates the objective evaluation of a quarterback's response time to an external stimulus event by system 1660. For example, system 1660 or another stimulus source may output an audible or visible stimulus or signal to a football player indicating that the football 10 should be placed in flight, thrown, kicked or punted. Football travel parameter module 1662 may receive signals indicating the time of such stimulus and may further receive signals from sensor 252, wherein such signals from sensor 252 may be utilized by module 1662 to not only determine a response of the quarterback but also the quality of the response of the quarterback to the stimulus event. The external stimulus event may correspond to an onrush by a defender or a receiver getting open at a certain time.

FIG. 110 is a diagram of acceleration signals output by sensor 252 and received by input 124 during a single throw 2100 a football 10. The signals indicate the sensed acceleration, in the three axes and a magnitude of acceleration from pre-snap through a release of the football for the throw. The string of acceleration signals correspond to different football events such as a snap of the football 2102, a receipt 2104 of the football by the quarterback, an external stimulus event 2106, the start of the throw 2108, the peak acceleration 2110 of the football as force is imparted to the football to throw the football, a release of the throw 2112 and flight to the ball 2114 which may have an imparted spiral efficiency. Football travel parameter module 1660 may direct processor 126 to determine the decision time 2116 of the quarterback and the release time 2118 of the throw based upon the string of sensor signals. Football travel parameter module 1660 may further direct processor 126 to determine the snap to release time 1820 as well the time-of-flight 2122 from the string of acceleration signals. Each of such metrics may be utilized by system 1660 to evaluate performance of the quarterback and output a score or rating providing objective evaluation regarding the quality of the throw.

In some circumstances, the quality of the imparted ball flight, the quality of the throw, kick or punt may be impacted by events occurring prior to when force is imparted to the ball. For example, a punter or kicker may be under duress prior to the punt or throw. In one implementation, system 1660 further utilizes a signals from sensor 252 to identify such events, such as duress. In some implementations, system 1660 may automatically adjust the score rating for a particular throw or punt based upon the detected existence of duress from the acceleration signals or may appropriately weight the scores or values from a particular throw associated with distress or duress when a group of throws are being collectively analyzed or the results of a group of throws or a group of punts are statistically analyzed or averaged.

FIG. 111 is a diagram of acceleration signals received from sensor 252 of football 10 during a series of continuous events associated with the throw 2200 of the football 10. The acceleration signals represent the magnitude of acceleration as well as the acceleration along each of the x, y and z axes. As shown by FIG. 111, football travel parameter module 1662 may evaluate the level of duress on the quarterback based upon the degree of oscillation of the signals prior to the cocking and forward motion of the arm to impart peak acceleration to the football (as indicated by peak 2110). The high degree of oscillation of the acceleration signals during time period 2202 may indicate the rest of the quarterback, the quarterback scrambling, dodging and weaving, with the football, prior to the throw. In one implementation, module 1662 directs processor 126 to identify the peak 1860 corresponding to the throwing of the football 10 and to then evaluate the portions of the acceleration signals proceeding the peak 1860 to identify quarterback duress. In one implementation, the peak may be further identified based upon the identification of the in-flight time period 2114 of the football 10 and the catch or grounding of football 10 as indicated by peak 2128, wherein portions 2114 and peak 2128 follow the throw the football and peak 2110.

Once the throw the football 2110 has been identified, module 1662 may direct processor 126 to compare the degree of oscillation, the frequency and/or amplitude of such oscillation preceding peak 2110 against one or more predefined thresholds. Based upon the comparison, system 1660 may output on display 122 a duress score or rating indicating the degree of duress preceding the throw. In some implementations, system 1660 may output an arm efficiency value, wherein the arm efficiency value is a score pertaining to the motion of the arm prior to release of the football at peak 2110. For example, multiple acceleration peaks prior to release of the football at peak 2110 may indicate a lot of wasted energy or motion to implement the particular throw. A long release time may indicate wasted arm motion. In some implementations, system 1660 may further adjust the score rating of the throw itself or adjust the weighting of the particular throw based upon the duress score or arm efficiency value.

In one implementation, system 1660 may determine an overall throw quality score or value. The overall throw quality score or value may be a metric based upon a combination of arm efficiency, flight efficiency and catchability scores. In some implementations, each of the variables of arm efficiency, flight efficiency and catchability may be individually and differently weighted depending upon the type characteristic or level of the throw. For example, in a fashion similar to the application of weights or constants in the determination of flight efficiency, system 1660 may prompt an input of the type of throw or may automatically determine the type characteristic of the throw, wherein system 1660 automatically selects one of a plurality of stored sets of weights or constants to apply to the arm efficiency, flight efficiency and catchability scores that form the overall throw quality score. For example, for one type of throw, system 1660 may apply a greater weight to catchability as compared to another different type of throw. For one type of throw, system 1660 may apply a greater weight to arm efficiency or flight efficiency as compared to catchability.

In some implementations, system 1660 may be configured to additionally or alternatively identify a quality of the actual catch of a ball 10 in flight. For example, system 1660 may analyze the strings of sensor signals received from sensors 252 to assign an objective catch quality score rating for a catch of a thrown, snapped, kicked or punted ball. Such objective evaluation scores may assist in evaluating kicker punt returners, quarterbacks or receivers.

FIG. 112 is a flow diagram of an example method 2300 that may be carried out by processor 126 in accordance with instructions contained in module 1662 to objectively quantify the quality of post in flight activity pertaining to football 10. Such post in flight activity may be reflected by a catch quality score. In one implementation, the catch quality score comprises the quality of the catch itself, the catch rating. In another implementation, the catch quality score comprises a ball securement rating, the time consumed to secure the football after the catch and/or the degree to which the football is secured after the catch or while being carried. In one implementation, the catch quality or catch quality score may comprise a composite metric based upon a composite of the catch rating and the ball securement rating. In one implementation, the catch quality score may be determined according to the formula $CQ=A*CR+B*SR$, where CQ is catch quality, CR is catch rating and SR is securement rating and where A and B are constants or weights. In one implementation, different sets of constants A, B may be applied to the catch rating and the securement rating depending upon a type characteristic of the throw that was caught. The sets of constants may reflect the importance of the catch rating versus the importance of the securement rating or may reflect varying degrees of difficulty with respect to the type of throw. In some implementations, the sets of constants chosen by system 1662 apply to the catch rating and the securement rating may be based upon characteristics of the throw itself such as a velocity of the throw, wherein the catch rating score may be adjusted based upon the velocity the ball that was caught.

In one implementation, system 1662 may prompt a person to enter a type characteristic of the throw that was caught. In another implementation, system 1662 may automatically determine the type characteristic of the throw, such as a slant, touch pass or deep pass (greater than 20 yards) based upon the sensed string of sensor signals received while the ball 10 was in flight. Based upon the determined type characteristic of the throw, system 1662 may automatically apply the set of constants are weighting factors A, B to the catch rating and the securement rating, respectively.

As indicated by block 2310, processor 1660 receives sensor signals strings from sensor 252 through input 124. In the example illustrated, sensor 252 may comprise accelerometers, such as the arrangement of accelerometers shown and discussed above with respect to FIG. 44, 47, 50, 51 or 53. Such strings of acceleration signals extend across multiple football events such as the snap of the football, carrying of the football, a punt, kick or throw of the football, a catch of the football, and after catch carrying of the football. As game actions involving a football are fluid and continuous, it is generally not possible to simply produce a string of sensor signals having a starting point and ending point that identically match the beginning in and of an individual discrete event.

As indicated by block 2312, football travel parameter module 1662 directs processor 126 to identify a discrete post-in-flight event portion/event of such strings of sensor signals. In the example illustrated, module 1662 directs processor 126 to identify the end of flight of football 10 and thereafter identify a post in-flight event such as a catch of the football and/or securement of the football following the catch. As described above, the catch of the football have been found to correspond to an amplitude peak following the in-flight time 2114 of the football. This peak is generally due to acceleration that football undergoes as it impacts the hands of the football receiver. The string of acceleration signals following the peak correspond to securement of the football and subsequent carrying of the football.

As indicated by block 2314, once the particular post in-flight event for analysis has been identified, the acceleration or sensor signal values corresponding to the identified event are extracted for analysis. As indicated by block 2316, the extracted sensor values or patterns are compared against corresponding values or thresholds. As indicated by block 2318, the posts in-flight score is an output based upon the comparison. In particular, display module 239 outputs the result or score on display 122.

FIGS. 113 and 114 illustrate to example sets of strings of sensor signals from two different throws 2350, 2352 of football 10. The in-flight characteristics of ball 10 during each of throws 2350 and 2352 are similar. However, the catch ratings are different as reflected by the different magnitudes of the peaks 2128. The smaller magnitude of peak 2128 of FIG. 113 indicates a lower impact, "softer hands" during the catch. The higher magnitude of peak 2128 of FIG. 114 indicates a higher level of impact with the football, "harder hands" during the catch. The catch depicted by the sensor signals in FIG. 113 correspond to a higher catch rating or a higher catch rating score.

Pursuant to method 2300, processor 126 would receive the strings of sensor signals via input 124 from sensor 25 to a football 10. Prosser 126 would further identify peak 2128 for either or both of throws 2350, 2352 as corresponding to the catch event and extract those acceleration values or the magnitude of peak 2128. Pursuant to block 2316, processor 126, following instructions contained in module 1662, would compare the magnitude of peak 2128 to a predefined threshold to determine the presence of "softer hands" or "harder hands" during the catch. Based upon the comparison to the threshold, processor 126 what output a catch rating score which would be displayed on display 122 by display module 239.

FIGS. 115 and 116 illustrate an example of how system 1660 may carry out method 2300 to objectively quantify and evaluate the time consumed for a receiver to secure football 10 following a catch, the ball securement rating. FIGS. 115 and 116 illustrate to example sets of strings of sensor signals for two different catches 2402 and 2404 of football 10. Pursuant to method 2300, processor 126 receives such strings of sensor signals and identifies the ball securement portion 2406 of time as the strings corresponding to securement of the football. Portion 2406 may be identified as the time immediately following the identified catch of the football, correspond to peak 2128. As discussed above, processor 126 identifies peak 2128 as the peak following the identified flight period 2114 which follows the identified throwing action correspond to peak 2110.

Per block 2314, processor 126 extracts the accelerometer signal values for portion 2406. Per block 2316, processor 126 compares such extracted values against various thresholds. In one implementation, processor 126 compares the oscillation of sensor signals during portion 2406 and duration of time for the amplitude of such signals to drop and reach a steady state, the point in time at which the sensor signals are no longer oscillating or the point in time at which the amplitude of such oscillations are below a predefined threshold is defined as a point in time at which the ball has been secured. In such a fashion, 1660 may objectively determine from the sensor signals the time consumed by the receiver to secure the football after the catch. The faster that a receiver can secure the football after the catch may reduce the risk of the football becoming dislodged after the catch. In the example illustrated, system 1660 may output a ball securement time for throw 2402 that is shorter than the ball securement time output for throw 2404 given the shorter time for the oscillating sensor signals of throw 2402 to reach a more steady state during portion 2406 as compared to throw 2404.

In addition to quantitatively identifying the time required by a receiver to secure a ball following the catch, system 1660 may additionally output a ball security score are value indicating how well the receiver maintains control of the ball 10 following its securement. To do so, system 1660 evaluates the movement of the football by the receiver following its securement, wherein a greater degree of movement is deemed to be a result of lower ball security. FIGS. 117 and 118 illustrate example portions of strings of sensor signals as the ball is being carried. As shown by FIG. 117, the sensor signals output during carry 2502 have a much greater oscillation amplitude as compared to those of carry 2504 in FIG. 118.

To objectively quantify or analyze such ball security, processor 126, following instructions provided by module 1662 first identifies those portions of the strings of sensor signals that follow the catch football (as indicated by peak 2128 shown in FIG. 116) and that further follow securement of the ball corresponding to portion 2406 in FIG. 116. It should be appreciated that in other modes, system 1660 may alternatively identify the handoff of the football to a runner or the catch of the football by a kick or punt returner based upon the unique characteristics of the associated strings of sensor signals.

Upon identifying that portion of the strings of sensor signals that correspond to ball security, system 1660 extracts the acceleration or sensor signal values and compares them to predefined thresholds (per blocks 2314 and 2316 of method 2300). With respect to ball security, processor 126, following instructions contained in module 1662, compares the frequency and amplitude of such sensor signals during the ball security portion of such strings to predefined thresholds to objectively evaluate ball security. As indicated above, system 1660 what output a low ball security score for carry 2502 and a high ball security score for carry 2504 based upon the amplitude differences in the corresponding portions of the sensor signals.

FIG. 119 schematically illustrates portions of another example sports performance system 2660 to provide objective evaluation of football performance based upon strings of sensor signals from at least one accelerometer carried by football 10. System 2660 may be used to evaluate the performance of multiple different football players, such as multiple different quarterbacks. In addition to receiving a string of sensor signals and determining a characteristic of a throw the football based upon the string of sensor signals, system 2660 determines an identity of a football player associated with the throw the football and assigned to the determined characteristic of the throw the football to the determined identity of the football player. The determined identity the football player and the assignment of the determined characteristic to the identified football player are output for display and storage. As a result, a single football 10 may be used by multiple football players during a single session, without interruption and without the different football players having to be manually identified when a new football player begins using football 10.

System 2660 is similar to system 1660 described above except that system 2660 additionally comprises player ID module (PID) 2666 in memory 428. Those remaining components of system 2660 which correspond to components of 1660 are numbered similarly. Player ID module 2666 facilitates the identification of an individual football player in the assignment of his or her identity to the objective results for different football actions as determined by system 2660.

As shown by FIG. 119, in one implementation, system 2660 comprises at least one sensor 2670A, 2670B (collectively referred to as sensors 2670) carried or worn by a football player. Sensor 2670A is attached or embedded in the jersey, pants, shoulder pads or other article 2672 worn by of the football player. Sensor 2670B may be embedded or mounted to the helmet 2674 of the football player. Sensors 2670 are different or unique to facilitate system 2660 distinguishing between the different football players wearing the different sensors 2670. In one implementation, sensors 2670 comprise radio frequency identification tags that are different from one another and that may be sensed by at least one of the sensors 252 (in the form of an RFID reader) carried by football 10. As a result, when a particular football player is within close proximity to football 10, such as when the particular football player is throwing football 10 a receiving football 10, his or her identity may be communicated to football 10 and ultimately transmitted to processor 126 such that the characteristics of the throw, kick, punter catch may be assigned to the identified football player. In other implementations, other identification mechanisms may be utilized to facilitate unique identification of the football player to at least one sensor carried by football 10.

In yet other implementations, system 2660 distinguishes between different football players based upon determined signature attributes of the different football players with respect to football 10. For example, different quarterbacks or athletes may exhibit different throwing motion profiles, signature or fingerprint of throw characteristics. FIG. 120 is a diagram illustrating various motion profiles for throws by different athletes/quarterbacks of football 10, wherein the profiles are generated by system 2660 using the strings of sensor signals received from football 10 during various throws by the different athletes/quarterbacks. For example, multiple throws of football 10 by a known player/quarterback may be analyzed to identify a signature acceleration or motion profile for the known player. This process may be repeated for each of a plurality of players to form a database of motion profiles associated with different players, wherein the database of motion profiles is stored in user storage 132.

Each profile/trace corresponds to line 2004 of FIG. 108 (representing the average acceleration over flight time for the multiple ball flights for an individual athlete/quarterback). For example, as shown by FIG. 120, different players/athletes have profiles with signature peaks having signature shapes and amplitudes located at different relative times. Processor 126, under the direction of instructions contained in memory 428, mathematically analyzes the different traces, using the differences in the shapes, amplitude and timing of such peaks to distinguish one player from another. Based upon such analysis, processor 126, under the direction of instructions contained in memory 428, identifies individual trace characteristics associated with different players and stores such signature characteristics for individual players. Individual players exhibit distinctive average acceleration trace signatures, facilitating the identification of the person throwing the ball 10.

To determine the identity of a particular player associated with a particular subsequently received acceleration trace for a subsequent pass, processor 126, under the direction of instructions contained in memory 428, mathematically analyzes the acceleration trace of the individual pass, comparing the shapes, amplitudes and timing of such peaks to the database of stored signature values or signature traces. Processor 126, under the direction of instructions contained in memory 428, may compare a subsequent individual throw against the various signature profiles (shown in 120) of various players to determine which of the players threw the individual pass being evaluated. As a result, different throws may be assigned to different athletes/players based solely upon signals received from the sensors, such as accelerometers and/or gyroscopes, carried by football 10.

Once such motion profiles have been generated and stored for each athlete/quarterback, system 2660 may compare subsequent strings of sensor signals received from football 10 to the database of motion profiles for the different athletes/quarterbacks and assign the strings of sensor signals and/or their evaluation results to the appropriate athlete/quarterback. The comparison may be carried out by processor 126 through regression using different algorithms for different throwing profiles. In some implementations, system 2660 may utilize machine learning algorithms to perform classification and identification of throwing motion profiles based upon the received strings of sensor signals from football 10 during a throw.

Once a particular throw has been assigned to or associated with a particular player as described above, the various other objective evaluation metrics may likewise be assigned to the player. For example, a throw quality score (as described above) may be assigned to a person or player determined to have made a particular throw. The throw quality score as well as the other sensor determined values may be stored for subsequent use and analysis.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An automated objective American-football evaluation system comprising:
   an American-style football;
   at least one sensor carried by the football, the at least one sensor comprising at least one accelerometer carried by the football; and
   electronics to:
   (a) receive a string of sensor signals from the at least one sensor;
   (b) determine a characteristic of a throw of the football based upon the received string of sensor signals;
   (c) determine an identity of a football player associated with the throw of the football based solely upon the string of sensor signals from the at least one sensor carried by the football;
   (d) assign the determined characteristic of the throw of the football to the determined identity of the football player; and
   (e) output the determined characteristic of the throw, the determined identity of the football player and the assignment of the determined characteristic of the throw of the football to the determined identity the football player.

2. The evaluation system of claim 1, wherein the at least one sensor comprises a first sensor carried by the football to sense an identifier worn by the football player.

3. The evaluation system of claim 2, wherein the identifier comprises a radio frequency identification (RFID) tag and wherein the first sensor is to sense the RFID tag.

4. The evaluation system of claim 1, wherein the electronics are to receive a plurality of strings of sensor signals, including the string of sensor signals, wherein the received strings of sensor signals correspond to different throws of the football by different football players, wherein the electronics are to further: (a) compare the different strings of sensor signals to group the different strings of sensor signals; (b) automatically assign different groups of the strings of sensor signals to the different football players.

5. The evaluation system of claim 4, wherein the characteristic of the throw of the football determined by the electronics comprises throw quality, the throw quality comprising a composite metric of arm efficiency, flight efficiency and catchability.

6. The evaluation system of claim 1, wherein the characteristic of a throw of the football based upon the received string of sensor signals comprises a throw characteristic selected from a group of throw characteristics consisting of: velocity; spin rate; time-of-flight; angle of attack; release angle; cone angle; nutation angle; spiral efficiency; and spiral decay.

7. The evaluation system of claim 1, wherein the electronics are to determine the angle of attack of the throw of the football based upon signals from at least one accelerometer corresponding to the throw of the football.

8. The evaluation system of claim 1, wherein the electronics are to determine the cone angle of the throw of the football based upon a combination of an amplitude of a first axis wave signal and an amplitude of a second axis wave signal in those received strings of sensor signals corresponding to the throw the football.

9. The evaluation system of claim 1, wherein the electronics are to determine flight efficiency of the throw of the football based upon a composite metric of velocity, angle of attack, release angle and spiral efficiency.

10. The evaluation system of claim 9, wherein the flight efficiency is determined based upon application of one of a plurality of available sets of constants to values for the velocity, angle of attack, release angle and spiral efficiency based upon a type classification of the throw of the football.

11. The evaluation system of claim 10, wherein the electronics prompts a person to enter the type classification of the throw the football.

12. The evaluation system of claim 10, wherein the electronics prompts a person to enter the type classification of a group of throws of the football based upon a number of throws for the group of throws or a time duration for the group of throws.

13. The evaluation system of claim 10, wherein the electronics automatically determines the type classification of the throw of the football based upon the received string of sensor signals.

14. The evaluation system of claim 1, wherein electronics are to determine spiral decay of the throw of the football based upon a composite of changes in a spin rate of the football and changes in a wobble of the football over time as determined from the received string of sensor signals during the throw.

15. An automated objective American-football evaluation system comprising:
   an American-style football;
   at least one sensor carried by the football, the at least one sensor comprising at least one accelerometer carried by the football; and
   electronics to:
   (a) receive a string of sensor signals from the at least one sensor;
   (b) determine a characteristic of a throw of the football based upon the received string of sensor signals;
   (c) determine an identity of a football player associated with the throw of the football based solely upon the string of sensor signals from the at least one sensor carried by the football;
   (d) assign the determined characteristic of the throw of the football to the determined identity of the football player; and
   (e) output the determined characteristic of the throw, the determined identity of the football player and the assignment of the determined characteristic of the throw of the football to the determined identity the football player, wherein the characteristic of the throw of the football determined by the electronics comprises thrown ball catchability of the throw of the football and wherein the electronics are to determine the thrown ball catchability by determining an endpoint of the throw of the football, wherein the thrown ball catchability is based upon a composite of at least two of: velocity, distance, spiral efficiency, spin rate, and spiral decay, as determined from just those portions of the strings of sensor signals received during the throw immediately preceding the determined endpoint of the throw.

16. The evaluation system of claim 15, wherein the thrown ball catchability is based upon a composite of at least two of: velocity, distance, spiral efficiency, spin rate, and spiral decay as determined from just those portions of the strings of sensor signals received during the throw that are within 0.40 seconds from the determined endpoint of the throw.

17. The evaluation system of claim 15, wherein the electronics are to further:
   (a) determine an identity of a receiver associated with a catch of the throw of the football;
   (b) determine a catch quality of the catch;
   (c) assign the determined catch quality of the catch to the determined identity of the receiver; and
   (d) transmit the determined catch quality, the determined identity of the receiver and the assignment of the catch quality to the determined identity the receiver to a remote recipient.

18. The evaluation system of claim 15, wherein the electronics are to determine a catch rating of a catch of the throw the football, the catch rating being based upon a composite of the thrown ball catchability and a catch quality determined by the electronics based upon those portions of the strings of sensor signals received during the throw after a sensed impact of the football with a receiver.

19. The evaluation system of claim 1, wherein the electronics are to determine a velocity of the football immediately prior to an electronics determined impact of football with a receiver and to determine a catch rating of a catch of the throw of the football, the catch rating being based upon a catch quality determined by the electronics based upon those portions of the strings of sensor signals received during the throw after a sensed impact of the football with the receiver and the determined velocity.

20. The evaluation system of claim 1, wherein the electronics are to determine a wobble of the football immediately prior to an electronics determined impact of football with a receiver and to determine a catch rating of a catch of the throw of the football, the catch rating being based upon a catch quality determined by the electronics based upon those portions of the strings of sensor signals received during the throw after a sensed impact of the football with the receiver and the determined wobble.

21. The evaluation system of claim 1, wherein the electronics is further configured to identify those portions of the string of sensor signals pertaining to securement of the football following a catch and output a catch securement rating based upon a comparison of the identified securement signals to at least one predetermined threshold.

22. The evaluation system of claim 1, wherein the electronics is further configured to determine a trajectory of the football prior to an electronics' determined impact of football with a receiver and to determine the height at which the ball was caught based upon a combination of the determined trajectory and the electronics determined impact of the football with the receiver.

23. The evaluation system of claim 1, wherein the electronics are to further track a throw count for a quarterback, to track an acceleration magnitude over time for the number of throws of the football based upon the received sensor signals and output an arm load score based upon the track acceleration magnitude and the tracked number of throws.

24. The evaluation system of claim 19, wherein the electronics are further to: (a) determine a time at which the throw of the football is caught; and (b) determine a catch quality based upon those portions of the received strings of sensor signals during the determined time at which the throw the football is caught.

* * * * *